(12) United States Patent
Horning et al.

(10) Patent No.: US 7,430,670 B1
(45) Date of Patent: Sep. 30, 2008

(54) SOFTWARE SELF-DEFENSE SYSTEMS AND METHODS

(75) Inventors: James J. Horning, Palo Alto, CA (US); W. Olin Sibert, Lexington, MA (US); Robert E. Tarjan, Princeton, NJ (US); Umesh Maheshwari, San Jose, CA (US); William G. Horne, Lawrenceville, NJ (US); Andrew K. Wright, Monroe Township, NJ (US); Lesley R. Matheson, Campbell, CA (US); Susan K. Owicki, Palo Alto, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 1175 days.

(21) Appl. No.: 09/629,546

(22) Filed: Jul. 31, 2000

Related U.S. Application Data

(60) Provisional application No. 60/146,419, filed on Jul. 29, 1999.

(51) Int. Cl.
*G06F 12/14* (2006.01)
(52) U.S. Cl. .................. 713/190; 713/194
(58) Field of Classification Search ............... 713/190, 713/194
See application file for complete search history.

(56) References Cited

U.S. PATENT DOCUMENTS

| | | | |
|---|---|---|---|
| 3,573,747 A | 4/1971 | Adams et al. | |
| 3,609,697 A | 9/1971 | Blevins | |
| 3,790,700 A | 2/1974 | Callais et al. | |
| 3,796,830 A | 3/1974 | Smith | |
| 3,798,359 A | 3/1974 | Feistel | |
| 3,798,360 A | 3/1974 | Feistel | |
| 3,798,605 A | 3/1974 | Feistel | |

(Continued)

FOREIGN PATENT DOCUMENTS

AU    A-36815/97    2/1997

(Continued)

OTHER PUBLICATIONS

Collberg et al.; "A Taxonomy of Obfuscating Transformations"; Jul. 1997; Technical Report #148, The University of Auckland; pp. 1-36.*

(Continued)

*Primary Examiner*—Gilberto Barron, Jr.
*Assistant Examiner*—Jung Kim
(74) *Attorney, Agent, or Firm*—Finnegan, Henderson, Farabow, Garrett & Dunner LLP

(57) ABSTRACT

Systems and methods are disclosed for protecting a computer program from unauthorized analysis and modification. Obfuscation transformations can be applied to the computer program's local structure, control graph, and/or data structure to render the program more difficult to understand and/or modify. Tamper-resistance mechanisms can be incorporated into the computer program to detect attempts to tamper with the program's operation. Once an attempt to tamper with the computer program is detected, the computer program reports it to an external agent, ceases normal operation, and/or reverses any modifications made by the attempted tampering. The computer program can also be watermarked to facilitate identification of its owner. The obfuscation, tamper-resistance, and watermarking transformations can be applied to the computer program's source code, object code, or executable image.

29 Claims, 49 Drawing Sheets

U.S. PATENT DOCUMENTS

| | | |
|---|---|---|
| 3,806,874 A | 4/1974 | Ehrat |
| 3,806,882 A | 4/1974 | Clarke |
| 3,829,833 A | 8/1974 | Freeny, Jr. |
| 3,845,391 A | 10/1974 | Crosby |
| 3,906,448 A | 9/1975 | Henriques |
| 3,911,397 A | 10/1975 | Freeny, Jr. |
| 3,924,065 A | 12/1975 | Freeny, Jr. |
| 3,931,504 A | 1/1976 | Jacoby |
| 3,946,200 A | 3/1976 | Juodikis |
| 3,946,220 A | 3/1976 | Brobeck et al. |
| 3,956,615 A | 5/1976 | Anderson et al. |
| 3,958,081 A | 5/1976 | Ehrsam et al. |
| 3,970,992 A | 7/1976 | Boothroyd et al. |
| 3,996,449 A | 12/1976 | Attanasio et al. |
| 4,020,326 A | 4/1977 | Coulthurst |
| 4,048,619 A | 9/1977 | Forman, Jr. et al. |
| 4,071,911 A | 1/1978 | Mazur |
| 4,104,721 A | 8/1978 | Markstein et al. |
| 4,112,421 A | 9/1978 | Freeny, Jr. |
| 4,120,030 A | 10/1978 | Johnstone |
| 4,141,005 A | 2/1979 | Ronner et al. |
| 4,162,483 A | 7/1979 | Entenman |
| 4,163,280 A | 7/1979 | Mori et al. |
| 4,168,396 A | 9/1979 | Best |
| 4,183,085 A | 1/1980 | Roberts et al. |
| 4,196,310 A | 4/1980 | Forman et al. |
| 4,200,913 A | 4/1980 | Kuhar et al. |
| 4,209,787 A | 6/1980 | Freeny, Jr. |
| 4,217,588 A | 8/1980 | Freeny, Jr. |
| 4,220,991 A | 9/1980 | Hamano et al. |
| 4,232,193 A | 11/1980 | Gerard |
| 4,232,317 A | 11/1980 | Freeny, Jr. |
| 4,236,217 A | 11/1980 | Kennedy |
| 4,246,638 A | 1/1981 | Thomas |
| 4,253,157 A | 2/1981 | Kirschner et al. |
| 4,259,720 A | 3/1981 | Campbell |
| 4,262,329 A | 4/1981 | Bright et al. |
| 4,265,371 A | 5/1981 | Desai et al. |
| 4,270,182 A | 5/1981 | Asija |
| 4,278,837 A | 7/1981 | Best |
| 4,305,131 A | 12/1981 | Best |
| 4,306,289 A | 12/1981 | Lumley |
| 4,309,569 A | 1/1982 | Merkle |
| 4,319,079 A | 3/1982 | Best |
| 4,321,672 A | 3/1982 | Braun et al. |
| 4,323,921 A | 4/1982 | Guillou |
| 4,328,544 A | 5/1982 | Baldwin et al. |
| 4,337,483 A | 6/1982 | Guillou |
| 4,361,877 A | 11/1982 | Dyer et al. |
| 4,375,579 A | 3/1983 | Davida et al. |
| 4,405,829 A | 9/1983 | Rivest et al. |
| 4,433,207 A | 2/1984 | Best |
| 4,434,464 A | 2/1984 | Suzuki et al. |
| 4,442,484 A | 4/1984 | Childs, Jr. et al. |
| 4,442,486 A | 4/1984 | Mayer |
| 4,446,519 A | 5/1984 | Thomas |
| 4,454,594 A | 6/1984 | Heffron et al. |
| 4,458,315 A | 7/1984 | Uchenick |
| 4,462,076 A | 7/1984 | Smith, III |
| 4,462,078 A | 7/1984 | Ross |
| 4,465,901 A | 8/1984 | Best |
| 4,471,163 A | 9/1984 | Donald et al. |
| 4,471,216 A | 9/1984 | Herve |
| 4,484,217 A | 11/1984 | Block et al. |
| 4,494,156 A | 1/1985 | Kadison et al. |
| 4,513,174 A | 4/1985 | Herman |
| 4,523,271 A | 6/1985 | Levien |
| 4,525,599 A | 6/1985 | Curran et al. |
| 4,528,588 A | 7/1985 | Lofberg |
| 4,528,643 A | 7/1985 | Freeny, Jr. |
| 4,529,870 A | 7/1985 | Chaum |
| 4,553,252 A | 11/1985 | Egendorf |
| 4,558,176 A | 12/1985 | Arnold et al. |
| 4,558,413 A | 12/1985 | Schmidt et al. |
| 4,562,305 A | 12/1985 | Gaffney, Jr. |
| 4,562,306 A | 12/1985 | Chou et al. |
| 4,562,495 A | 12/1985 | Bond et al. |
| 4,573,119 A | 2/1986 | Westheimer et al. |
| 4,577,289 A | 3/1986 | Comerford et al. |
| 4,578,530 A | 3/1986 | Zeidler |
| 4,584,639 A | 4/1986 | Hardy |
| 4,584,641 A | 4/1986 | Guglielmino |
| 4,588,991 A | 5/1986 | Atalla |
| 4,589,064 A | 5/1986 | Chiba et al. |
| 4,590,552 A | 5/1986 | Guttag et al. |
| 4,593,183 A | 6/1986 | Fukatsu |
| 4,593,353 A | 6/1986 | Pickholtz |
| 4,593,376 A | 6/1986 | Volk |
| 4,595,950 A | 6/1986 | Lofberg |
| 4,597,058 A | 6/1986 | Izumi et al. |
| 4,598,288 A | 7/1986 | Yarbrough et al. |
| 4,599,489 A | 7/1986 | Cargile |
| 4,609,777 A | 9/1986 | Cargile |
| 4,609,985 A | 9/1986 | Dozier |
| 4,621,321 A | 11/1986 | Boebert et al. |
| 4,621,334 A | 11/1986 | Garcia |
| 4,622,222 A | 11/1986 | Horvath et al. |
| 4,634,807 A | 1/1987 | Chorley et al. |
| 4,644,493 A | 2/1987 | Chandra et al. |
| 4,646,234 A | 2/1987 | Tolman et al. |
| 4,649,515 A | 3/1987 | Thompson et al. |
| 4,652,990 A | 3/1987 | Pailen et al. |
| 4,658,093 A | 4/1987 | Hellman |
| 4,670,857 A | 6/1987 | Rackman |
| 4,672,572 A | 6/1987 | Alsberg |
| 4,672,605 A | 6/1987 | Hustig et al. |
| 4,677,434 A | 6/1987 | Fascenda |
| 4,677,552 A | 6/1987 | Sibley, Jr. |
| 4,680,731 A | 7/1987 | Izumi et al. |
| 4,683,553 A | 7/1987 | Mollier |
| 4,683,968 A | 8/1987 | Appelbaum et al. |
| 4,685,056 A | 8/1987 | Barnsdale, Jr. et al. |
| 4,688,169 A | 8/1987 | Joshi |
| 4,691,350 A | 9/1987 | Kleijne et al. |
| 4,696,034 A | 9/1987 | Wiedemer |
| 4,700,296 A | 10/1987 | Palmer, Jr. et al. |
| 4,701,846 A | 10/1987 | Ikeda et al. |
| 4,712,238 A | 12/1987 | Gilhousen et al. |
| 4,713,753 A | 12/1987 | Boebert et al. |
| 4,727,550 A | 2/1988 | Chang et al. |
| 4,740,890 A | 4/1988 | William |
| 4,747,139 A | 5/1988 | Taaffe |
| 4,748,561 A | 5/1988 | Brown |
| 4,757,533 A | 7/1988 | Allen et al. |
| 4,757,534 A | 7/1988 | Matyas et al. |
| 4,757,914 A | 7/1988 | Roth et al. |
| 4,768,087 A | 8/1988 | Taub et al. |
| 4,780,821 A | 10/1988 | Crossley |
| 4,791,565 A | 12/1988 | Dunham et al. |
| 4,796,181 A | 1/1989 | Wiedemer |
| 4,796,220 A | 1/1989 | Wolfe |
| 4,798,209 A | 1/1989 | Klingenbeck et al. |
| 4,799,156 A | 1/1989 | Shavit et al. |
| 4,807,288 A | 2/1989 | Ugon et al. |
| 4,816,655 A | 3/1989 | Musyck et al. |
| 4,817,140 A | 3/1989 | Chandra et al. |
| 4,823,264 A | 4/1989 | Deming |
| 4,827,508 A | 5/1989 | Shear |
| 4,858,121 A | 8/1989 | Barber et al. |
| 4,864,494 A | 9/1989 | Kobus, Jr. |
| 4,866,769 A | 9/1989 | Karp |
| 4,868,736 A | 9/1989 | Walker |
| 4,868,877 A | 9/1989 | Fischer |
| 4,881,197 A | 11/1989 | Fischer |

| | | | | | |
|---|---|---|---|---|---|
| 4,888,798 A | 12/1989 | Earnest | 5,218,605 A | 6/1993 | Low et al. |
| 4,893,248 A | 1/1990 | Pitts et al. | 5,221,833 A | 6/1993 | Hecht |
| 4,893,332 A | 1/1990 | Brown | 5,222,134 A | 6/1993 | Waite et al. |
| 4,903,296 A | 2/1990 | Chandra et al. | 5,224,160 A | 6/1993 | Paulini et al. |
| 4,907,269 A | 3/1990 | Guillon et al. | 5,224,163 A | 6/1993 | Gasser et al. |
| 4,919,545 A | 4/1990 | Yu | 5,227,797 A | 7/1993 | Murphy |
| 4,924,378 A | 5/1990 | Hershey et al. | 5,235,642 A | 8/1993 | Wobber et al. |
| 4,926,480 A | 5/1990 | Chaum | 5,237,614 A | 8/1993 | Weiss |
| 4,930,073 A | 5/1990 | Cina, Jr. | 5,241,671 A | 8/1993 | Reed et al. |
| 4,937,863 A | 6/1990 | Robert et al. | 5,245,165 A | 9/1993 | Zhang |
| 4,941,175 A | 7/1990 | Enescu et al. | 5,247,575 A | 9/1993 | Sprague et al. |
| 4,949,187 A | 8/1990 | Cohen | 5,251,294 A | 10/1993 | Abelow |
| 4,953,209 A | 8/1990 | Ryder, Sr. et al. | 5,257,369 A | 10/1993 | Skeen et al. |
| 4,962,533 A | 10/1990 | Krueger et al. | 5,260,999 A | 11/1993 | Wyman |
| 4,967,403 A | 10/1990 | Ogawa | 5,263,157 A | 11/1993 | Janis |
| 4,975,647 A | 12/1990 | Downer et al. | 5,263,158 A | 11/1993 | Janis |
| 4,975,878 A | 12/1990 | Boddu et al. | 5,263,165 A | 11/1993 | Janis |
| 4,977,594 A | 12/1990 | Shear | 5,265,164 A | 11/1993 | Matyas et al. |
| 4,995,082 A | 2/1991 | Schnorr | 5,276,735 A | 1/1994 | Boebert et al. |
| 4,999,806 A | 3/1991 | Chernow et al. | 5,276,901 A | 1/1994 | Howell et al. |
| 5,001,752 A | 3/1991 | Fischer | 5,280,479 A | 1/1994 | Mary |
| 5,005,122 A | 4/1991 | Griffin et al. | 5,283,830 A | 2/1994 | Hinsley et al. |
| 5,005,200 A | 4/1991 | Fischer | 5,285,494 A | 2/1994 | Sprecher et al. |
| 5,010,571 A | 4/1991 | Katznelson | 5,287,407 A | 2/1994 | Holmes |
| 5,014,234 A | 5/1991 | Edwards, Jr. | 5,287,408 A | 2/1994 | Samson |
| 5,022,080 A | 6/1991 | Durst et al. | 5,291,598 A | 3/1994 | Grundy |
| 5,023,907 A | 6/1991 | Johnson et al. | 5,301,231 A | 4/1994 | Abraham et al. |
| 5,027,397 A | 6/1991 | Double et al. | 5,301,326 A | 4/1994 | Linnett et al. |
| 5,032,979 A | 7/1991 | Hecht et al. | 5,311,591 A | 5/1994 | Fischer |
| 5,047,928 A | 9/1991 | Wiedemer | 5,315,448 A | 5/1994 | Ryan |
| 5,048,085 A | 9/1991 | Abraham et al. | 5,319,705 A | 6/1994 | Halter et al. |
| 5,050,212 A | 9/1991 | Dyson | 5,319,735 A | 6/1994 | Preuss et al. |
| 5,050,213 A | 9/1991 | Shear | 5,319,785 A | 6/1994 | Thaller |
| 5,051,932 A | 9/1991 | Inoue et al. | 5,325,524 A | 6/1994 | Black et al. |
| 5,058,162 A | 10/1991 | Santon et al. | 5,335,169 A | 8/1994 | Chong |
| 5,065,429 A | 11/1991 | Lang | 5,335,346 A | 8/1994 | Fabbio |
| 5,079,648 A | 1/1992 | Maufe | 5,337,357 A | 8/1994 | Chou et al. |
| 5,091,966 A | 2/1992 | Bloomberg et al. | 5,337,360 A | 8/1994 | Fischer |
| 5,103,392 A | 4/1992 | Mori | 5,339,426 A | 8/1994 | Aoshima |
| 5,103,459 A | 4/1992 | Gilhousen et al. | 5,341,429 A | 8/1994 | Stringer et al. |
| 5,103,476 A | 4/1992 | Waite et al. | 5,343,526 A | 8/1994 | Lassers |
| 5,109,413 A | 4/1992 | Comerford et al. | 5,343,527 A | 8/1994 | Moore |
| 5,111,390 A | 5/1992 | Ketcham | 5,347,579 A | 9/1994 | Blandford |
| 5,113,518 A | 5/1992 | Durst, Jr. et al. | 5,349,642 A | 9/1994 | Kingdon |
| 5,119,493 A | 6/1992 | Janis et al. | 5,351,293 A | 9/1994 | Michener et al. |
| 5,126,936 A | 6/1992 | Champion et al. | 5,354,097 A | 10/1994 | Tel |
| 5,128,525 A | 7/1992 | Stearns et al. | 5,355,474 A | 10/1994 | Thuraisngham et al. |
| 5,129,084 A | 7/1992 | Kelly, Jr. et al. | 5,359,721 A | 10/1994 | Kempf et al. |
| 5,136,643 A | 8/1992 | Fischer | 5,361,359 A | 11/1994 | Tajalli et al. |
| 5,136,646 A | 8/1992 | Haber et al. | 5,365,587 A | 11/1994 | Campbell et al. |
| 5,136,647 A | 8/1992 | Haber et al. | 5,367,621 A | 11/1994 | Cohen et al. |
| 5,136,716 A | 8/1992 | Harvey et al. | 5,369,702 A | 11/1994 | Shanton |
| 5,138,712 A | 8/1992 | Corbin | 5,369,707 A | 11/1994 | Follendore, III |
| 5,146,575 A | 9/1992 | Nolan, Jr. | 5,371,792 A | 12/1994 | Asai et al. |
| 5,148,481 A | 9/1992 | Abraham et al. | 5,373,440 A | 12/1994 | Cohen et al. |
| 5,150,407 A | 9/1992 | Chan | 5,373,561 A | 12/1994 | Haber et al. |
| 5,155,680 A | 10/1992 | Wiedemer | 5,383,113 A | 1/1995 | Kight et al. |
| 5,163,091 A | 11/1992 | Graziano et al. | 5,388,211 A | 2/1995 | Hornbuckle |
| 5,164,988 A | 11/1992 | Matyas et al. | 5,390,247 A | 2/1995 | Fischer |
| 5,168,147 A | 12/1992 | Bloomberg | 5,390,297 A | 2/1995 | Barber et al. |
| 5,185,717 A | 2/1993 | Mori | 5,390,330 A | 2/1995 | Talati |
| 5,187,787 A | 2/1993 | Skeen et al. | 5,392,220 A | 2/1995 | Van den Hamer et al. |
| 5,191,573 A | 3/1993 | Hair | 5,392,390 A | 2/1995 | Crozier |
| 5,199,066 A | 3/1993 | Logan | 5,394,469 A | 2/1995 | Nagel et al. |
| 5,199,074 A | 3/1993 | Thor | 5,408,501 A | 4/1995 | Cornaby |
| 5,201,046 A | 4/1993 | Goldberg et al. | 5,410,598 A | 4/1995 | Shear |
| 5,201,047 A | 4/1993 | Maki et al. | 5,412,717 A | 5/1995 | Fischer |
| 5,204,897 A | 4/1993 | Wyman | 5,418,713 A | 5/1995 | Allen |
| 5,206,951 A | 4/1993 | Khoyi et al. | 5,420,927 A | 5/1995 | Michali |
| 5,208,748 A | 5/1993 | Flores et al. | 5,421,006 A | 5/1995 | Jablon et al. |
| 5,214,700 A | 5/1993 | Pinkas et al. | 5,422,953 A | 6/1995 | Fischer |
| 5,214,702 A | 5/1993 | Fischer | 5,428,606 A | 6/1995 | Moskowitz |
| 5,216,603 A | 6/1993 | Flores et al. | 5,428,685 A | 6/1995 | Kadooka et al. |

| | | | | | |
|---|---|---|---|---|---|
| 5,432,851 A | 7/1995 | Scheidt et al. | 5,638,443 A | 6/1997 | Stefik et al. |
| 5,432,928 A | 7/1995 | Sherman | 5,638,504 A | 6/1997 | Scott et al. |
| 5,432,950 A | 7/1995 | Sibigtroth | 5,640,546 A | 6/1997 | Gopinath et al. |
| 5,438,508 A | 8/1995 | Wyman | 5,644,686 A | 7/1997 | Hekmatpour |
| 5,440,634 A | 8/1995 | Jones et al. | 5,646,997 A | 7/1997 | Barton |
| 5,442,645 A | 8/1995 | Ugon et al. | 5,649,099 A | 7/1997 | Theimer et al. |
| 5,444,779 A | 8/1995 | Daniele | 5,655,077 A | 8/1997 | Jones et al. |
| 5,449,895 A | 9/1995 | Hecht et al. | 5,664,191 A | 9/1997 | Davidson et al. |
| 5,449,896 A | 9/1995 | Hecht et al. | 5,671,279 A | 9/1997 | Elgamal |
| 5,450,490 A | 9/1995 | Jensen et al. | 5,678,170 A | 10/1997 | Grube et al. |
| 5,450,493 A | 9/1995 | Maher | 5,687,236 A | 11/1997 | Moskowitz et al. |
| 5,453,601 A | 9/1995 | Rosen | 5,689,565 A | 11/1997 | Spies et al. |
| 5,453,605 A | 9/1995 | Hecht et al. | 5,689,566 A | 11/1997 | Nguyen |
| 5,455,407 A | 10/1995 | Rosen | 5,689,587 A | 11/1997 | Bender et al. |
| 5,455,861 A | 10/1995 | Faucher et al. | 5,692,047 A | 11/1997 | McManis |
| 5,455,953 A | 10/1995 | Russell | 5,692,180 A | 11/1997 | Lee |
| 5,457,746 A | 10/1995 | Dolphin | 5,692,980 A | 12/1997 | Trotman |
| 5,457,747 A | 10/1995 | Drexler et al. | 5,699,427 A | 12/1997 | Chow et al. |
| 5,458,494 A | 10/1995 | Krohn et al. | 5,701,452 A | 12/1997 | Siefert |
| 5,463,565 A | 10/1995 | Cookson et al. | 5,710,834 A | 1/1998 | Rhoads |
| 5,473,687 A | 12/1995 | Lipscomb et al. | 5,715,314 A | 2/1998 | Payne et al. |
| 5,473,692 A | 12/1995 | Davis | 5,715,403 A | 2/1998 | Stefik |
| 5,479,509 A | 12/1995 | Ugon | 5,717,923 A | 2/1998 | Dedrick |
| 5,485,622 A | 1/1996 | Yamaki | 5,721,788 A | 2/1998 | Powell et al. |
| 5,490,216 A | 2/1996 | Richardson, III | 5,724,424 A | 3/1998 | Gifford |
| 5,491,800 A | 2/1996 | Goldsmith et al. | 5,724,425 A | 3/1998 | Chang et al. |
| 5,497,479 A | 3/1996 | Hornbuckle | 5,732,398 A | 3/1998 | Tagawa |
| 5,497,491 A | 3/1996 | Mitchell et al. | 5,734,719 A | 3/1998 | Tseudosetal |
| 5,499,298 A | 3/1996 | Narasimhalu et al. | 5,740,549 A | 4/1998 | Reilly et al. |
| 5,504,757 A | 4/1996 | Cook et al. | 5,745,569 A | 4/1998 | Moskowitz et al. |
| 5,504,818 A | 4/1996 | Okano | 5,745,604 A | 4/1998 | Rhoads |
| 5,504,837 A | 4/1996 | Griffeth et al. | 5,745,678 A | 4/1998 | Herzberg et al. |
| 5,505,461 A | 4/1996 | Bell et al. | 5,748,763 A | 5/1998 | Rhoads |
| 5,508,913 A | 4/1996 | Yamamoto et al. | 5,748,783 A | 5/1998 | Rhoads |
| 5,509,070 A | 4/1996 | Schull | 5,748,960 A | 5/1998 | Fischer |
| 5,513,261 A | 4/1996 | Maher | 5,754,849 A | 5/1998 | Dyer et al. |
| 5,517,518 A | 5/1996 | Morson et al. | 5,757,914 A | 5/1998 | McManis |
| 5,521,815 A | 5/1996 | Rose, Jr. et al. | 5,758,152 A | 5/1998 | LeTourneau |
| 5,524,933 A | 6/1996 | Kunt et al. | 5,759,101 A | 6/1998 | Von Kohorn |
| 5,530,235 A | 6/1996 | Stefik et al. | 5,765,152 A | 6/1998 | Erickson |
| 5,530,752 A | 6/1996 | Rubin | 5,768,426 A | 6/1998 | Rhoads |
| 5,533,123 A | 7/1996 | Force et al. | 5,774,872 A | 6/1998 | Golden et al. |
| 5,534,855 A | 7/1996 | Shockley et al. | 5,778,385 A | 7/1998 | Pratt |
| 5,534,975 A | 7/1996 | Stefik et al. | 5,787,334 A | 7/1998 | Fardeau et al. |
| 5,535,322 A | 7/1996 | Hecht | 5,802,590 A | 9/1998 | Draves |
| 5,535,329 A | 7/1996 | Hastings | 5,819,263 A | 10/1998 | Bromley et al. |
| 5,537,526 A | 7/1996 | Anderson et al. | 5,826,268 A | 10/1998 | Schaefer et al. |
| 5,539,735 A | 7/1996 | Moskowitz | 5,832,119 A | 11/1998 | Rhoads |
| 5,539,828 A | 7/1996 | Davis | 5,842,173 A | 11/1998 | Strum et al. |
| 5,550,971 A | 8/1996 | Brunner et al. | 5,845,281 A | 12/1998 | Benson et al. |
| 5,553,282 A | 9/1996 | Parrish et al. | 5,878,421 A | 3/1999 | Ferrel et al. |
| 5,557,518 A | 9/1996 | Rosen | 5,892,899 A | 4/1999 | Aucsmith et al. |
| 5,557,798 A | 9/1996 | Skeen et al. | 5,892,900 A | 4/1999 | Ginter et al. |
| 5,559,884 A | 9/1996 | Davidson et al. | 5,896,454 A | 4/1999 | Cookson et al. |
| 5,563,946 A | 10/1996 | Cooper et al. | 5,903,761 A | 5/1999 | Tyma |
| 5,568,552 A | 10/1996 | Davis | 5,910,987 A | 6/1999 | Ginter et al. |
| 5,572,673 A | 11/1996 | Shurts | 5,915,019 A | 6/1999 | Ginter et al. |
| 5,574,962 A | 11/1996 | Fardeau et al. | 5,917,912 A | 6/1999 | Ginter et al. |
| 5,577,209 A | 11/1996 | Boyle et al. | 5,920,861 A | 7/1999 | Hall et al. |
| 5,581,686 A | 12/1996 | Koppolu et al. | 5,930,768 A | 7/1999 | Hooban |
| 5,581,800 A | 12/1996 | Fardeau et al. | 5,940,504 A | 8/1999 | Griswold |
| 5,592,549 A | 1/1997 | Nagel et al. | 5,940,505 A | 8/1999 | Kanamaru |
| 5,603,031 A | 2/1997 | White et al. | 5,943,422 A | 8/1999 | Van Wie et al. |
| 5,606,609 A | 2/1997 | Houser et al. | 5,949,876 A | 9/1999 | Ginter et al. |
| 5,613,004 A | 3/1997 | Cooperman et al. | 5,949,885 A | 9/1999 | Leighton |
| 5,621,797 A | 4/1997 | Rosen | 5,956,408 A | 9/1999 | Arnold |
| 5,625,693 A | 4/1997 | Rohatgi et al. | 5,966,440 A | 10/1999 | Hair |
| 5,629,770 A | 5/1997 | Brassil et al. | 5,966,537 A | 10/1999 | Ravichandran |
| 5,629,980 A | 5/1997 | Stefik et al. | 5,978,484 A | 11/1999 | Apperson et al. |
| 5,633,932 A | 5/1997 | Davis et al. | 5,982,891 A | 11/1999 | Ginter et al. |
| 5,634,012 A | 5/1997 | Stefik et al. | 5,991,876 A | 11/1999 | Johnson et al. |
| 5,636,276 A | 6/1997 | Brugger | 5,996,756 A | 12/1999 | Schmodde et al. |
| 5,636,292 A | 6/1997 | Rhoads | 5,999,949 A | 12/1999 | Crandall |

| | | | | | | |
|---|---|---|---|---|---|---|
| 6,006,328 | A | 12/1999 | Drake | EP | 0 653 695 A2 | 5/1995 |
| 6,009,170 | A | 12/1999 | Sako et al. | EP | 0 668 695 A2 | 8/1995 |
| 6,016,393 | A | 1/2000 | White et al. | EP | 0 668 695 A3 | 8/1995 |
| 6,026,193 | A | 2/2000 | Rhoads | EP | 0 695 985 A1 | 2/1996 |
| 6,044,155 | A | 3/2000 | Thomlinson et al. | EP | 0 696 798 A1 | 2/1996 |
| 6,044,205 | A | 3/2000 | Reed et al. | EP | 0 714 204 A2 | 5/1996 |
| 6,047,374 | A | 4/2000 | Barton | EP | 0 715 243 A1 | 6/1996 |
| 6,055,503 | A | 4/2000 | Horstmann | EP | 0 715 244 A1 | 6/1996 |
| 6,069,647 | A | 5/2000 | Sullivan et al. | EP | 0 715 245 A1 | 6/1996 |
| 6,088,452 | A | 7/2000 | Johnson et al. | EP | 0 715 246 A1 | 6/1996 |
| 6,088,814 | A | 7/2000 | McKenzie et al. | EP | 0 715 247 A1 | 6/1996 |
| 6,102,966 | A | 8/2000 | Tyma | EP | 0 725 376 A2 | 8/1996 |
| 6,112,181 | A | 8/2000 | Shear et al. | EP | 0 749 081 A1 | 12/1996 |
| 6,119,230 | A | 9/2000 | Carter | EP | 0 763 936 A2 | 3/1997 |
| 6,135,646 | A | 10/2000 | Kahn et al. | EP | 0 778 513 A2 | 6/1997 |
| 6,138,119 | A | 10/2000 | Hall et al. | EP | 0 795 873 A2 | 9/1997 |
| 6,157,721 | A | 12/2000 | Shear et al. | EP | 0 800 312 A1 | 10/1997 |
| 6,167,358 | A | 12/2000 | Othmer et al. | EP | 0 913 757 A2 | 5/1999 |
| 6,185,683 | B1 | 2/2001 | Ginter et al. | GB | 2136175 | 9/1984 |
| 6,237,786 | B1 | 5/2001 | Ginter et al. | GB | 2264796 | 9/1993 |
| 6,240,185 | B1 | 5/2001 | Van Wie et al. | GB | 2294348 A | 4/1996 |
| 6,253,193 | B1 | 6/2001 | Ginter et al. | GB | 2295947 A | 6/1996 |
| 6,263,493 | B1 | 7/2001 | Ehrman | JP | 01-068835 | 3/1989 |
| 6,266,654 | B1 | 7/2001 | Schull | WO | WO 85/02310 | 5/1985 |
| 6,292,569 | B1 | 9/2001 | Shear et al. | WO | WO 85/03584 | 8/1985 |
| 6,317,834 | B1 | 11/2001 | Gennaro et al. | WO | WO 90/02382 | 3/1990 |
| 6,351,837 | B1 | 2/2002 | Huang et al. | WO | WO 92/06438 | 4/1992 |
| 6,363,488 | B1 | 3/2002 | Ginter et al. | WO | WO 92/22870 | 12/1992 |
| 6,385,603 | B1 | 5/2002 | Chen et al. | WO | WO 93/01550 | 1/1993 |
| 6,389,402 | B1 | 5/2002 | Ginter et al. | WO | WO 94/01821 | 1/1994 |
| 6,415,041 | B1 | 7/2002 | Oami et al. | WO | WO 94/03859 | 2/1994 |
| 6,427,140 | B1 | 7/2002 | Ginter et al. | WO | WO 94/06103 | 3/1994 |
| 6,449,367 | B2 | 9/2002 | Van Wie et al. | WO | WO 94/16395 | 7/1994 |
| 6,449,377 | B1 | 9/2002 | Rhoads | WO | WO 94/18620 | 8/1994 |
| 6,499,137 | B1 | 12/2002 | Hunt | WO | WO 94/22266 | 9/1994 |
| 6,504,941 | B2 | 1/2003 | Wong | WO | WO 94/27406 | 11/1994 |
| 6,546,505 | B1 | 4/2003 | Swoboda et al. | WO | WO 95/14289 | 5/1995 |
| 6,549,638 | B2 | 4/2003 | Davis et al. | WO | WO 96/00963 | 1/1996 |
| 6,590,995 | B1 | 7/2003 | Schwenk et al. | WO | WO 96/03835 | 2/1996 |
| 6,611,607 | B1 | 8/2003 | Davis et al. | WO | WO 96/05698 | 2/1996 |
| 6,618,484 | B1 | 9/2003 | Van Wei et al. | WO | WO 96/06503 | 2/1996 |
| 6,640,304 | B2 | 10/2003 | Ginter et al. | WO | WO 96/13013 | 5/1996 |
| 6,658,568 | B1 | 12/2003 | Ginter et al. | WO | WO 96/17467 | 6/1996 |
| 6,665,419 | B1 | 12/2003 | Oami | WO | WO 96/21192 | 7/1996 |
| 6,668,325 | B1 | 12/2003 | Collberg et al. | WO | WO 96/24092 | 8/1996 |
| 6,785,399 | B2 | 8/2004 | Fujihara | WO | WO 96/27155 | 9/1996 |
| 6,785,815 | B1 | 8/2004 | Serret-Avila et al. | WO | WO 97/03423 | 1/1997 |
| 6,807,534 | B1 | 10/2004 | Erickson | WO | WO 97/04394 | 2/1997 |
| 6,829,710 | B1 | 12/2004 | Venkatesan et al. | WO | WO 97/07656 | 3/1997 |
| 2001/0042043 | A1 | 11/2001 | Shear et al. | WO | WO 97/22074 | 6/1997 |
| | | | | WO | WO 97/25816 | 7/1997 |
| | | | | WO | WO 97/33216 | 9/1997 |
| | | | | WO | WO 97/43761 | 11/1997 |

FOREIGN PATENT DOCUMENTS

| | | | | |
|---|---|---|---|---|
| AU | A-36816/97 | 2/1997 | WO | WO 97/48203 | 12/1997 |
| AU | A-36840/97 | 2/1997 | WO | WO 98/09209 | 3/1998 |
| AU | A-36840/97 | 2/1998 | WO | WO 98/10381 | 3/1998 |
| DE | 29 43 436 A1 | 10/1979 | WO | WO 98/37481 | 8/1998 |
| EP | 0 084 441 A2 | 7/1983 | WO | WO 98/45768 | 10/1998 |
| EP | 0 128 672 A1 | 12/1984 | WO | WO 99/01815 | 1/1999 |
| EP | 0 180 460 A1 | 5/1986 | WO | WO 99/24928 | 5/1999 |
| EP | 0 367 700 A2 | 5/1990 | WO | WO 99/48296 | 9/1999 |
| EP | 0 370 146 A1 | 5/1990 | WO | WO 99/64973 | 12/1999 |
| EP | 0 398 645 B1 | 11/1990 | WO | WO 00/10286 | 2/2000 |
| EP | 0 399 822 A2 | 11/1990 | WO | WO 00/65493 | 11/2000 |
| EP | 0 421 409 A2 | 4/1991 | WO | WO 00/72112 | 11/2000 |
| EP | 0 456 386 A2 | 11/1991 | WO | WO 00/77596 A1 | 12/2000 |
| EP | 0 469 864 A2 | 2/1992 | WO | WO 00/77597 A1 | 12/2000 |
| EP | 0 469 864 A3 | 2/1992 | WO | WO 01/14953 A1 | 3/2001 |
| EP | 0 565 314 A2 | 10/1993 | | | |
| EP | 0 567 800 A1 | 11/1993 | | | |
| EP | 0 570 123 | 11/1993 | | | |
| EP | 0 593 305 A2 | 4/1994 | | | |
| EP | 0 651 554 A1 | 5/1995 | | | |

OTHER PUBLICATIONS

O'Neil, Joseph; "Teach yourself JAVA"; Oct. 19, 1998; McBraw-Hill Companies, Inc.; Chapter 9.*

Alfred V. Aho, et al., *Compilers: Principles, Techniques, and Tools*, Addison-Wesley, 1986 (book provided).

David Aucsmith, *Tamper Resistant Software: An Implementation*, In Proc. International Workshop on Information Hiding, Lecture Notes in Computer Science, vol. 1174, 1996, pp. 317-333.

David F. Bacon, et al., *Compiler Transformations for High-Performance Computing*, ACM Computing Surveys, vol. 26, No. 4, Dec. 1994, pp. 345-420.

Shimshon Berkovits, et al., *Authentication for Mobile Agents*, Mobile Agents and Security, Giovanni Vigna, Ed., Springer-Verlag, 1998, pp. 114-136.

Dan Boneh, et al., *Collusion Secure Fingerprinting for Digital Data*, Proc. Of Crypto '95, Springer LNCS 963, 1995, pp. 1-15.

David M. Chess, *Security Issues in Mobile Code Systems*, Mobile Agents and Security, Giovanni Vigna, Ed., Springer-Verlag, 1998, pp. 1-14.

Shyam R. Chidamber, et al., *A Metrics Suite for Object Oriented Design*, IEEE Transactions on Software Engineering, vol. 20, No. 6, Jun. 1994, pp. 476-493.

Cristina Cifuentes, et al., *Decompilation of Binary Programs*, Software-Practice and Experience, vol. 25(7), Jul. 1995, pp. 811-829.

Frederick B. Cohen, *Operating System Protection Through Program Evolution*, Computers and Security, vol. 12, No. 6, Oxford, 1993, pp. 565-584.

Christian Collberg, et al., *A Taxonomy of Obfuscating Transformations*, Technical Report 148, Dept. of Computer Science, University of Auckland, Jul. 1997, pp. 1-36.

Christian Collberg, et al., *Breaking Abstractions and Unstructuring Data Structures*, IEEE Computer Society, 1998 Int'l Conference on Computer Languages, May 14-16, 1998, pp. 28-38.

Christian Collberg, et al., *Manufacturing Cheap, Resilient, and Stealthy Opaque Constructs*, In Proc. ACM Principles of Programming Languages, 1998, pp. 184-196.

Christian Collberg, et al., *On the Limits of Software Watermarking*, Technical Report 164, Department of Computer Science, The University of Auckland, Aug. 26, 1998, 14 pages.

Christian Collberg, et al., *Software Watermarking: Models and Dynamic Embeddings*, Department of Computer Science, The University of Auckland, Jan. 1999, 14 pages.

Christian S. Collberg, et al., *Watermarking, Tamper-Proofing, and Obfuscation—Tools for Software Protection*, University of Arizona Computer Science Technical Report 2000-03, Feb. 10, 2000, pp. 1-15.

Jeffrey Adgate Dean, *Whole-Program Optimization of Object-Oriented Languages*, PH.D. Thesis, University of Washington, 1996, 150 pages.

Josep Domingo-Ferrer, *Software Run-Time Protection: A Cryptographic Issue*, Advances in Cryptology—EUROCRYPT 90, May 21-24, 1990, I.B. Damgard, Ed. Lecture Notes in Computer Science; vol. 473, Springer-Verlag, 1991, pp. 474-480.

*EtchDescription: Instrumentation and Optimization of WIN32/Intel Executables*, University of Washington, at http://memsys.cs.washington.edu/memsys/html/description.html (last visited Oct. 21, 1999).

James R. Gosler, *Software Protection: Myth or Reality?*, CRYPTO '85—Advances in Cryptology, Aug. 1985, pp. 140-157.

James R. Gosling, et al., *The Java Language Specification*, Addison-Wesley, 1996 (book provided).

Rick Grehan, *Code Profilers: Choosing a Tool for Analyzing Performance*, at http://www.metrowerks.com (last visited Apr. 28, 1999).

M.H. Halstead, *Elements of Software Science*, Elsevier-North-Holland, 1997 (copy unavailable).

Warren A. Harrison, et al., *A Complexity Measure Based on Nesting Level*, SIGPLAN Notices, Computer Science Department, University of Missouri-Rolla, 16(3), 1981, pp. 63-74.

Sallie Henry, et al., *Software Structure Metrics Based on Information Flow*, IEEE Transactions on Software Engineering, vol. 7, No. 5, Sep. 1981, pp. 510-518.

Amir Herzberg, et al., *Public Protection of Software*, ACM Transactions on Computer Systems, vol. 5, No. 4, Nov. 1987, pp. 371-393.

Fritz Hohl, *Time Limited Blackbox Security: Protection Mobile Agents from Malicious Hosts*, Mobile Agents and Security, Giovanni Vigna, Ed., Lecture Notes in Computer Science; vol. 1419, Springer-Verlag, 1998, pp. 92-113.

Susan Horwitz, et al., *Interprocedural Slicing Using Dependence Graphs*, ACM Transaction on Programming Languages and Systems, vol. 12, No. 1, Jan. 1990, pp. 26-60.

Susan Horwitz, *Precise Flow-Insensitive May-Alias Analysis is NP-Hard*, ACM Transactions on Programming Languages and Systems, vol. 19, No. 1, Jan. 1997, pp. 1-6.

Neil D. Jones, *An Introduction to Partial Evaluation*, ACM Computing Surveys, vol. 28, No. 3, Sep. 1996, pp. 480-503.

Jens Knoop, et al., *Parallelism for Free: Efficient and Optimal Bitvector Analyses for Parallel Programs*, In Proc. of the Workshop on Tools and Algorithms for the Construction and Analysis of Systems, TACAS'95, University of Aaruhs, Denmark, May 19-20, 1995, pp. 1-15.

Donald Knuth, *The Art of Computer Programming*, vol. 1, Addison-Wesley series in Computer Science and Information Processing, 1968, pp. 453-462.

M. LaDue, *HoseMocha*, at http://www.xynyx.demon.nl/java.HoseMocha.java (last visited Jan. 1997).

James R. Larus, et al., *EEL: Machine-Independent Executable Editing*, Proceedings of the 1995 ACM SIGPLAN Conference on Programming Language Design and Implementation, Jun. 18-21, 1995, pp. 291-300.

John R. Levine, *Linkers and Loaders*, Chapter 8 "Loading and Overlays," Morgan Kaufmann, 1999, pp. 167-186.

Douglas Low, *Java Control Flow Obfuscation*, Thesis in Master of Science in Computer Science, University of Auckland, Mar. 19, 1998, 137 pages.

James R. Lyle, et al., *Unravel: A Case Tool to Assist Evaluation of High Integrity Software*, vol. 1: Requirements and Design, vol. 2: Users Manual, Technical Report NISTIR 5691, U.S. Dept. of Commerce, Aug. 1995, available at http://hissa.ncsl.nist.gov/publications/nistir5691/vol1/ (Jul. 13, 1998).

Stavros Macrakis, *Protecting Source Code with ANDF*, OSF Research Institute, Jan. 25, 1993, pp. 1-17.

Thomas J. McCabe, *A Complexity Measure*, IEEE Transactions on Software Engineering, vol. 2, No. 4, Dec. 1976, pp. 308-320.

*Apple's QuickTime Lawsuit*, at http://www.macworld.com/pages/june.95/News.849.html and may.95/News.705.html (May-Jun. 1995).

Alfred J. Menezes, et al., *Handbook of Applied Cryptography*, Chapter 6 "Stream Ciphers," CRC Press, 1997, pp. 191-383.

John C. Munson, et al., *Measurement of Data Structure Complexity*, Journal of Systems Software, vol. 20, 1993, pp. 217-225.

William F. Opdyke, et al., *Creating Abstract Superclasses by Refactoring*, Proceedings of the 21st Annual Conference on Computer Science, Kwasny and Buck Editors, New York Feb. 1993, 5 pages.

Enrique I. Oviedo, *Control Flow, Data Flow, and Program Complexity*, Proceedings of IEEE COMPSAC, Oct. 27-31, 1980, pp. 146-152.

Jens Palsberg, et al., *Experience with Software Watermakring*, Purdue University, Jun. 19, 2000, pp. 1-14.

Todd A. Proebsting, et al., *Toba: Java for Applications—A Way Ahead of Time (WAT) Complier*, Proceedings of the Third Conference on Object-Oriented Technologies and Systems (COOTS), 1997, pp. 1-13.

Gang Qu, et al., *Analysis of Watermarking Techniques for Graph Coloring Problem*, Computer Science Department, University of California, Los Angeles, 1998, 4 pages.

G. Rmalingam, *The Undecidability of Aliasing*, ACM Transactions on Programming Languages and Systems, vol. 16, No. 5, Sep. 1994, pp. 1467-1471.

Ted Romer, et al., *Instrumentation and Optimization of Win32/Intel Executables Using Etch*, Proceedings of the Usenix NT Conference, 1997, 7 pages.

Spencer Rugaber, et al., *The Interleaving Problem in Program Understanding*, College of Computing Georgia Institute of Technology, 2d Working Conference on Reverse Engineering, Toronto, Jul. 15, 1995, pp. 166-175.

Pamela Samuelson, *Reverse-Engineering Someone Else's Software: Is it Legal?*, IEEE Software, Jan. 1990, pp. 90-96.
Tomas Sander, et al., *On Software Protection Via Function Hiding*, International Computer Science Institute, 1998, pp. 1-12.
Tomas Sander, et al., *Protecting Mobile Agents Against Malicious Hosts*, Mobile Agent Security, Lecture Notes, 1419, G.Vigna, Ed., Springer-Verlag, 1998, pp. 1-16.
Tomas Sander, et al., *Towards Mobile Cryptography*, IEEE Proceedings of Security and Privacy, May 3-6, 1998, 10 pages.
Antero Taivalsaari, *On the Notion of Inheritance*, ACM Computing Surveys, vol. 28, No. 3, Sep. 1996, pp. 438-479.
Frank Tip, *A Survey of Program Slicing Techniques*, Journal of Programming Languages, vol. 3, No. 3, Sep. 1995, pp. 121-189.
P. Tyma, *Turn Your Java Into Rocket Fuel*, at http://www.preEmptive.com.
H. van Vliet, *Crema—The Java Obfuscator* http://web.inter.nl.net.users/H.P.van.Vliet/crema.html, Jan. 1996.
H. van Vliet, *Mocha—The Java Decompiler*, http://web.inter.nl.net/users/H.P.van.Vliet/mocha.html, Jan. 1996.
William M. Waite, et al., *Compiler Construction*, Springer-Verlag, 1984, pp. 329-332.
Chenxi Wang, et al., *Software Tamper Resistance: Obstructing Static Analysis of Programs*, Technical Report CS-2000-12, Department of Computer Science, University of Virginia, May 12, 2000, pp. 1-18.
Uwe G. Whilhelm, *Cryptographically Protected Objects*, Proc. Of RenPar'97, 1997, pp. 1-4.
Linda Mary Wills, *Automated Program Recognition: A Feasibility Demonstration*, The Artificial Intelligence Laboratory, Massachusetts Institute of Technology, 45(1-2), Sep. 1990, pp. 113-171.
Michael Wolfe, *High Performance Compilers for Parallel Computing*, Addison-Wesley, 1996 (book provided).
Xiaolan Zhang, et al., *System Support for Automatic Profiling and Optimization*, The Proceedings of the 16th Symposium on Operating Systems Principles, Oct. 1997, pp. 1-14.
Neil Aggarawal, "ObfuscatePro," JAAM Consulting, Inc., 1999, http://www.jammco.../com/jammconsulting.servlet.jammservlet?pageIDp32 obfuscatepropage, 2 pages.
Joesph A. Bank, "Java Security," Jan. 25, 2002 http://swissnet.ai.mit.edu/~jbank/javapaper/javapaper.html, 11 pages.
David R. Chase, et al., "Analysis of Pointers and Structures," Proceedings of the ACM, Sigplan Conference on Programming Language Design and Implementation, 1990, pp. 296-310.
Brad Chen, "Instrumentation and Optimization of Win32/Intel Executables Using Etch," Usenix Windoes NT Workshop, 1997, 7 pages.
Frederick B. Cohen, "Operating System Protection Through Program Evolution," 1992, http://all.net/books/IP/evolve.html.
Alain Deutsch, "Interprocedural May-Alias Analysis for Pointers: Beyond k-limiting," Proceedings of the ACM, SIGPLAN 1994 Conference on Programming Language Design and Implementation (PLDI), Jun. 20-24, 1994, pp. 230-241.
Nick Eastridge, "Jshrink-Remove Symbolic Info From Class," Newsgroup: comp.lang.java.announce, Jun. 7, 1997, 1 page.
Rakesh Ghiya, et al., "Is it a Tree, a DAG, or Cyclig Graph? A shape Analysis for Heap-Directed Pointers in C," ACM Press, Conference Record of POPL 1996: The 23rd ACM SIGPLAN-SIGACT Symposium on Principles of Programming Languages, Jan. 21-24, 1996, pp. 1-15.
John Gorden, "C Obfuscator," Newsgroup: comp.lang.c, Jul. 25, 1990, 21 pages.
Laurie J. Hendren, et al., "Parallelizing Programs with Recursive Data Structures," IEEE Transactions on Parallel and Distributed Systems, vol. 1, No. 1, Jan. 1990, pp. 35-47.
Cheng-Hsueh A. Hsieh, et al., "Java Bytecode to Native Code Translation: The Caffeine Prototype and Preliminary Results," Proceedings of the 29th Annual IEEE/ACM International Symposium on Microarchitecture, 1996, pp. 90-97.
Cheng-Hsueh A. Hsieh, et al., "Optimizing NET Compilers for Improved Java Performance," IEEE Computer Society, 1997, pp. 67-75.
Yuuji Ichisugi, "Watermark for Software and its Insertion, Attacking, Evaluation and Implementation Methods," (in Japanese), Summer Symposium on Programming, Jul. 1997, pp. 57-64.

Rex Jaeschke, "Encrypting C Source for Distribution," Journal of C Language Translation, vol. 2, No. 1, 1990, pp. 71-80, http://jclt.iecc.com.
Benji Jasik, "SourceAgain, the Professional's Java Decompiler," Newsgroup: compl.lang.java.programmer, Oct. 2, 1997, http://www.ahpah.com/sourceagain/sourceagain.professional.html, 2 pages.
Eron Jokippi, "Jobe—The Java Obfuscator," Newsgroup: comp.lang.java.announce, Jan. 14, 1997, http://www.meurrens.org/ip-links/java/codeengineering/jobe-doc.html, 3 pages.
Sam Kho, "Graphical Class File Browser," Newsgroup: comp.lang.java.announce, Dec. 4, 1996, 1 page.
Svet Kovich, "Java Obfuscator, Unobfuscator," Newsgroup: compl.lang.java.announce, Dec. 25, 1997, 1 page.
Mark D. LaDue, "Hosemocha.Java," Mar. 20, 2002, http://www.cigital.com/hostile-applets/hosemocha.java, 3 pages.
Hongying Lai, "A Comparative Study of Java Obfuscators Available on the Internet," 415.780 Project Report, Computer Science Department, University of Auckland, Feb. 22, 2001, 115 pages, http://www.cs.auckland.ac.nz/~cthombor/Student/hlai.
Don Libes, "Obfuscated C and Other Mysteries," John Wiley & Sons, Inc., 1993, 413 pages.
Tim Lindholm, et al., "The Java Virtual Machine Specification," Jan. 25, 2002, http://java.sun.com/docs/books/vmspec/html/vmspectoc.doc.html, 5 pages.
Douglas Low, "Protecting Java Code Via Code Obfuscation," ACM Crossroads, 1998, 6 pages, http://www.acm.org/crossroads/xrd4-3/codeob.html.
Stavros Macrakis, "Protecting Source Code with ANDF," Jan. 25, 1993, pp. 1-17.
Qusay H. Mahmoud, "Java Tip 22: Protect your Bytecodes from Reverse Engineering/Decompilation," JavaWorld, 1997, 4 pages, http://www.javaworld.com/javatips/jw-javatip22.html.
Masahiro Mambo, et al., "A Tentative Approach to Constructing Tamper-Resistant Software," Proc. 1997, New Security Workshop, ACM pp. 23-33.
Benoit Marchal, et al., "Java Decompilation and Reverse Engineering," Parts 1 and 2, Digital Cat's Java Resource Center, 7 pages, www.google.com.
John J. Marciniak, "Encyclopedia of Software Engineering," John Wiley & Sons, Inc., 1994 ISBN 0-471-54004-8.
Bill McKeeman, "Journal of C. Language Translation," 1991, http://gorillaman.com/mckeeman/writings/c_flat.html, 31 pages.
Sape Mullender, "Distributed Systems," Addison-Wesley, 2nd Edition, 1993, ISBN 0-201-62427-3.
Godfrey Nolan, "Decompile Once, Run Anywhere," and Hanpeter van Vliet, "A Tercentennial," Web Techniques Magazine, vol. 2, Issue 9, Sep. 1997, 6 pages.
Landon Curt Noll, et al., "The International Obfuscated C Code Contest," 2002, 3 pages, www.au.ioccc.org.
Todd A. Probesting, "A Robust Java-to-C Translation System," 2 pages.
Todd A. Probesting, et al., "Krakotoa: Decompilation in Java, Does (Bytecode Reveal Source?)," Department of Computer Science, The University of Arizona, 1983, 13 pages.
Todd A. Probesting, "Optimizing an ANSI C Interpreter with Superoperators," Symposium on Principles of Programming Languages, 1995, pp. 322-332.
Robert Raud, "Zipping and Encrupting Utility," Newsgroup: comp.lang.java.announce, Jun. 23, 1997, 1 page.
R.L. Rivest, et al., "A Method for Obtaining Digital Signatures and Public-key Cryptosystems," Communications of the ACM, Feb. 1978, vol. 21, No. 2, pp. 120-126.
Uwe Schoning, "Complexity Cores and Hard Problem Instances," Lecture Notes in Computer Science, Springer-Verlag, 1987, pp. 232-240.
Jens Schweikhardt, "Looking for Shround/Obfus," Newsgroup: comp.lang.c, Oct. 9, 1997, 1 page.
Bjarne Steensgaard, "Points-to Analysis in Almost Linear Time," ACM Press, POPL 1996: ACM SIGPLAN-SIGACT Symposium on Principles of Programming Languages, Jan. 21-24, 1996, pp. 32-41.
Paul A. Suhler, et al., "Software Authorization Systems," IEEE Software, 1986, pp. 34-41.

Amitabh Srivastava, et al., "Atom: A System for Building Customized Program Analysis Tools," WRL Research Report 94/2, Mar. 1994, 23 pages.

K.B. Sriram, "Obfuscator," 1996, http://linux.jinr.ru/usoft/www/www/_blackdown.org/kbs/hashjava.html, 5 pages.

Chenxi Wang, et al., "Software Tamper Resistance: Obstructing Static Analysis of Programs," Department of Computer Science, University of Virginia, pp. 1-18.

Mark Welsh, "RetroGuard, Bytecode Obfuscator—Test," Newsgroup: alt.test.test, Jul. 11, 1998, 1 page.

Linda Mary Wills, "Automated Program Recognition: A Feasability Demonstration," Artificial Intelligence, 1990, pp. 113-171.

"Call for Papers, Workshop on Information Hiding," Portland Oregon, Apr. 15-17, 1998, http://www/cl.cam.ac.uk/users/rjal4/ihws.html, 1 page.

"Crema, A Little Cloud In Your Java," Mar. 20, 2002,http://www.meurrens.org/ip-links/java/codeengineering/crema/index.html, 3 pages.

"CubergraphiX," Feb. 27, 2002, http://vgr.com/cybergfx/boards.html, 4 pages.

"EtchDescription Instrumentation and Optimization of Win32/Intel Executables," Oct. 21, 2000, 5 pages.

"Fooling Disassemblers (Protecting Applications Against Disassembly)," Feb. 27, 2002, http://www.woodmann.com/fravia/snatfo.html, 3 pages.

Jars Automatic Resource Listing, search for "obfuscator," May 31, 2002, 12 pages.

"JavaBeans," Sun Microsystems, Jul. 24, 1997, 114 pages.

"Java Code Engineering & Reverse Engineering," Mar. 20, 2002, http://www.meurrens.org/ip-links/java/codeengineering/decompl.html, 11 pages.

"Java Obfuscator, Java Optimizer, Java Shrinker," Mar. 20, 2002, http://www.preemptive.com/tools/index.html, 4 pages.

"Java Security: Present and Near Future," IEEE Micro, 1997, pp. 14-19.

"Jamm Consulting," Dec. 28, 2000, http://www.jammconsulting.com/servlets/com.jammconsulting.servlet.jammservlet/productspage, 20 pages.

"JBuilder," Borland, Jan. 25, 2002, http:://www.borland.com/jbuilder/index.html, 17 pages.

"Jshrink: Java Shrinker and Obfuscator," Eastridge Technology, Dec. 28, 2000, http://www.e-t.com/ishrink.html, 2 pages.

"Keep your code under cover with J.Cloak!," Dec. 28, 2000, http://www.force5.com/jcloak/projectjcloak.html, 17 pages.

"Kimera Dissassembler," Mar. 20, 2002, http://www.-kimera.cs.washington.edu/disassembler.html, 1 page.

"Loading and Overlays," Feb. 27, 2002, http://www.iecc.com/linker/linker08.html, 12 pages.

"Microsoft VisualJ++," Mar. 28, 2002, http://msdn.microsoft.com/visualj/prodinfo/datasheet/default.asp, 4 pages.

"Mocha, the Java Decompiler," Mar. 20, 2002, http://www.brouhaha.com/~eric/computers/mocha.html, 3 pages.

"PreEmptive Solutions—Advanced Java ™ Obfuscation, Optimization, and Size Reduction," Dec. 28, 2000, http://www.preemptive.com, 6 pages.

"Programming Languages for the Java Vitrual Machine," Mar. 28, 2002, http://grunge.cs.tu-berlin.de/~tolk/vmlanguages.html, pp. 1-18.

"REC—Reverse Engineering Compiler User's Manual," Mar. 20, 2002, http://www.backerstreet.com/rec/recman.html, 11 pages.

"Retrologic—Platform Neutral Solutions," Retroguard, Dec. 28, 2000, http://retrologic.com/main.html, 24 pages.

"SourceGuard 4.0," Dec. 28, 2000, http://www.4thpass.com/sourceguard, 53 pages.

"The World's Premier Browser, Email & Address Book Suite," Netscape Navigator 4, Mar. 28, 2002, http://home.netscape.com/browsers/4/index.html?cp+dowpod4x, 2 pages.

"Vega Technologies," Dec. 28, 2000, http://vegatech.net/jzipper, 5 pages.

"Visual Café for Java Professional Development Edition," Mar. 28, 2002, http://www.nsal.com/html/symantec_visual_café_pro.html, 2 pages.

"Welcome to Cloakware," Dec. 29, 2000, http://www.cloakware.com. 18 pages.

"Welcome to the Journal of C Language Translation," Jan. 25, 2002, http://jclt.iecc.com, 1 page.

"WingDis User's Guide by Wingsoft," Dec. 28, 2000, http://www.singsoft.com/wingdis.man.html, 3 pages.

"Zelix KlassMaster Java Obfuscator Change history," 2002, 7 pages, http://www.zelix.com/klassmaster.

"Zelix KlassMaster Java Obfuscator—Java Flow Obfuscation," 2001, 2 pages, http://www.zelix.com/klassmaster.

"Zelix KlassMaster," Dec. 28, 2000, http://www.zelix.com/klassmaster, 12 pages.

A Brief History of the Green Project, viewed on Mar. 12, 2002 at <http://java.sun.com/people/jag/green/index.html> pp. 1-2.

A Guide to Understanding Security Modeling in Trusted Systems, National Security Agency, Oct. 1992, 122 pages.

A Publication of the Electronic Frontier Foundation, EFFector Online, vol. 6, No. 6, 8 pages, Dec. 6, 1993.

A2b's Recent Press Coverage, 1998.

Abadi, M. et al., "Authentication and Delegation with Smart-cards," Technical Report 67, DEC Systems Research Center, Oct. 1990, available at <http://citeseer.nj.nec.com/article/abadi92authentication.html>, 22 pages.

Abadi, M., et al., "A Calculus for Access Control in Distributed Systems", Digital Equipment Corporation, Feb. 28, 1991, revised Aug. 28, 1991.

About the Digital Notary Service, Surety Technologies, May 1994-5, 6 pages.

Abrams, Marshall D, "Renewed Understanding of Access Control Policies", Proceedings of the 16th Computing Natioal Security Conference, 1993.

Access Control and Copyright Protection for Images Security Technology for Graphics and Communication Systems—RACE M1005: ACCOPI, webpage, Security Projects at Fraunhofer 1GD, 2002.

Achievements Archive, www.imprimatur.net/ web pages.

Aharonian, G., "Software Patents—Relative Comparison of EPO/PTO/JPO Software Searching Capabilities," Source Translation & Optimization.

An Introduction to Safety and Security in Telescript, (undated), 8 pages.

Anderson, R., "Why Cryptosystems Fail," University Computer Laboratory, Cambridge, Massachusetts, (undated), pp. 1-34.

Antonelli et al, "Access Control in a Workstation-Based Distributed Computing Environment," CITI Technical Report 90-2, Jul. 17, 1990.

Applications Requirements for Innovative Video Programming: How to Foster (or Cripple) Program Development Opportunities for Interactive Video Programs Delivered on Optical Media: A Challenge for the Introduction of DVD (Digital Video Disc), Sheraton.

Argent Information, Q&A Sheet, Document from the Internet: <http://www.digital-watermark.com/>, Copyright 1995, The DICE Company, (last modified Jun. 16, 1996), 7 pages.

Arms, W.Y., "Key Concepts in the Architecture of the Digital Library," D-Lib Magazine, Jul. 1995.

Arneke, D. et al., "AT&T Encryption System Projects Information Services," (News Release), Jan. 9, 1995, 1 page.

Atkins, D., et al., "The Magic Words are Squeamish Ossifrage," (undated), 15 pages.

Atkinson, R., "Security Architecture for the Internet Protocol," Network Working Group RFC 1825, Aug. 1995.

Aucsmith, D., et al., "Common Data Security Architecture," Intel Architecture Lab, Presentation Material, Jan. 22, 1996, pp. 1-16.

Authentification dans les environnements de traitement distributes, Information Systems Aduit and Control Association-Montreal Chapter, viewed on Mar. 25, 2002 at <http:www.apvcsi-montreal.ca/en/publications/contact133.html> pp. 1-15.

Avery, et al., "Recommender Systems for Evaluating Computer Messages," Communications of the ACM, Mar. 1997, pp. 88-89.

Background on the Administration's Telecommunications Policy Reform Initiative, News Release, The White House, Office of the President, Jan. 11, 1994, 7 pages.

Baggett, C., "Cable's Emerging Role in the Information Superhighway," Cable Labs, (undated), 13 slides.

Baker, R.H., The Computer Security Handbook, Tab Books, Inc., 1985.

Balbanovic, et al., Content-based, Collaborative Recommendation, Communications of the ACM, Mar. 1997, pp. 66-72.

Barassi, T.S., "The Cybernotary: Public Key Registration and Certification and Authentication of International Legal Transactions," (undated), 4 pages.

Barnes, H., memo to Henry LaMuth, subject: George Gilder articles, May 31, 1994, 2 pages.

Bart, D., "Comments in the Matter of Public Hearing and Request for Comments on the International Aspects of the National Information Infrastructure," Before the Department of Commerce, Aug. 12, 1994, 17 pages.

Bartock, P.F., et al., "Guide to Securing Microsoft Windows NT Networks," National Security Agency, Sep. 18, 2001, pp. 1-132.

Baum, M., "Worldwide Electronic Commerce: Law, Policy and Controls Conference," (program details) Nov. 11, 1993, 18 pages.

Bellare, M., "iKP-A Family of Secure Electronic Payment Protocols," Apr. 16, 1995, pp. 1-19.

Bell-Labs Secure Technologies, "Information Vending Encryption System (IVES)™," Lucent Technologies, May 31, 2002, pp. 1-16.

Bellovin, S.M., "Encrypted Key Exchange: Password-Based Protocols Secure Against Dictionary Attacks," Proceedings of the IEEE Symposium on Research in Security and Privacy, Oakland, California, May 1992, 13 pages.

Bellovin, S.M., "There Be Dragons," AT&T Bell Laboratories, Aug. 15, 1992, 16 pages.

Bender et al. "Techniques for Data Hiding," IBM Systems Journal, vol. 35, Nos. 3&4, 1996.

Berghal et al., "Protecting Ownership Rights Through Digital Watermarking," IEEE Computing, vol. 29, No. 7, Jul. 1996.

Berners-Lee, T.J., et al., "Networked Information Services: The World-Wide Web," Computer Networks and ISDN Systems, 1992, pp. 454-459.

Bernstein et al., "Copyrights, Distribution Chains, Integrity, and Privacy: The Need for a Standards-Based Solution," Electronic Publishing Resources.

Bertino, Elisa, "Data Hiding and Security in Object-Oriented Databases," Dipartimento di Matematica, Universita di Genova, IEEE, 1992, pp. 338-347.

Best, R.M., "Preventing Software Piracy With Crypto-Microprocessors," Digest of Papers, VLSI: New Architectural Horizons, Feb. 1980, pp. 466-469.

Bickel, R., et al., "Guide to Securing Microsoft Windows XP," National Security Agency, Oct. 30, 2002, pp. 1-129.

Birrell, Andrew, D., et al., "A Global Authentication Service Without Global Trust," Proceedings of the IEEE Symposium on Security and Privacy, Oakland, California, Apr. 1986, pp. 1-11.

Bisbey II, R.L. et al., "Encapsulation: An Approach to Operating System Security," (USC/Information Science Institute, Marina Del Rey, CA), Oct. 1973, pp. 666-675.

Bishop, M., "Anatomy of a Proctive Password Changer," Department of Mathematics and Computer Science, Dartmouth College, (undated), 15 pages.

Bishop, M., "Privacy-Enhanced Electronic Mail," Privacy and Security research Group, IAB.

Blaze, M. et al., "Decentralized Trust Management," Proc. IEEE Conference on Security and Privacy, 1996, pp. 164-173.

Blaze, M., "A Cryptographic File System for Unix," pre-print of paper for First ACM Conference on Computer and Communications Security, Fiarfax, Virginia, Nov. 3-5, 1993, pp. 1-8.

Blaze, Matt, "Key Management in an Encrypting File System," Proc. Summer '94 USENIX Tech. Conference, Boston, MA, Jun. 1994, available at <http://www.usenix.org/publications/libratry/proceedings/bos94/full_papers/blaze.asp>, pp. 1-12.

Blaze, Matt, et al., "The Architecture and Implementaiton of Network Layer Security Under Unix", Columbia University and AT&T Bell Laboratories, 1994.

Blom, R. et al., "Encryption Methods in Data Networks," Ericsson Technics, No. 2, Stockholm, Sweden, 1978, 17 pages.

Boisson, Jean-Francois, "1-Business Perspectives and Requirements, 2-The CITED Project: Keys and Knowledge," CITED 5469.

Boisson, Jean-Francois, "How to CITEDise Application: Guidelines and Examples," CITED 5469.

Boisson, Jean-Francois, "Management of Intellectual Property Rights in the Electronic Commerce: Textile Design Sales and Other Similar Initiatives," EURITIS.

Boisson, Jean-Francois, "Software Components; Deliverable Trial Offer," CITED 5469.

Boly, J.P., et al., "The ESPRIT Project CAFÉ: High Security Digital Payment Systems," ESCORICS 94, European Symposium on Research Computer Security, Springer-Verlas Berlin, 1994, pp. 217-230.

Boone, J.V.,et al., "The Start of Digital Revolution: SIGSALY Secure Digital Voice Communications in World War II," Dec. 10, 2002.

Borenstein, N., "MIME Extensions for Mail-Enabled Applications: Application/Safe-Tel and Multipart/Emabled-Mail," Nov. 1993, 24 pages.

Born, E, et al., "Discretionary Access Control by Means of Usage Conditions," Computers & Security, vol. 13, No. 5, 1994, pp. 437-450.

Bos et al., "SmartCash: A Practical electronic payment System," Center for Mathematics and Computer Science, Report CS-R9035.

Brands, S., "Untraceable Off-line Cash in Wallets with Observers," CWI, (undated), 17 pages.

Brassil et al., "Electronic Marking and Identification Techniques to Discourage Document Copying," AT&T Bell Laboratories, Proc. Infocom 94, 1994.

Breon, R., et al., "Microsoft Office 97 Executable Content Security Risks and Countermeasures," National Security Agency, Dec. 20, 1999, pp. 1-44.

Brickell, E.F., et al., "The SKIPJACK Algorithm," Jul. 28, 1993, pp. 1-7.

Brin, Sergey, et al., "Copy Detection Mechanism for Digital Documents", Stanford University.

Brockschmidt, Kraig, "A Primer on Designing Custom Controls," Microsoft Systems Journal, Mar./Apr. 1992, pp. 87-101.

Brockschmidt, Kraig, "Implementing OLE 2.0, Part III: Uniform Data Transfer with Data Objects," Microsoft Systems Journal, Dec. 1993, pp. 47-77.

Brockschmidt, Kraig, "Introducing OLE 2.0, Part 1: Windows Objects and the Component Object Model," Microsoft Systems Journal, Aug. 1993, pp. 15-23.

Brockschmidt, Kraig, "OLE 2.0 Part II: Implementing a Simple Windows Object Using Either C or C++," Microsoft Systems Journal, Oct. 1993, pp. 45-62.

Brockschmidt, Kraig, Inside OLE 2, Microsoft Press Programming Series, 1994.

Brown, C.W., "Security for Minicomputers and Microcomputers," (undated), pp. 285-298.

Brown, Patrick W., "Digital Signatures: Can They Be Accepted as Legal Signatures in EDI?," 1st Conference on Computer and Communication Security, Nov. 1993, pp. 86-92.

Brumm, P., et al., 80386/80486 Assembly Language Programming, Windcrest/McGraw-Hill, 1993.

Bruner, R.E., "Power Agent, NetBot Help Advertisers Reach Internet Shoppers," Aug. 1997, 2 pages.

Brunnestein et al., "Intellectual Property Rights and new Technologies," Proceedings of the KnowRight '95 Conference, Aug. 1995.

Bureau Van Dijk, Management Report for Task 4.5: Feasibility Study of the Cited Agency, 1992-1993.

Bureau Van Dijk, CITED: Preparation of the CITED Model Functional Requirements Specifications; Discussion Paper (Revision 1), Jan. 16, 1991.

Bureau Van Dijk, CITED: Preparation of the CITED Model Functional Requirements Specifications; Reports of the Interviews with Five CITED Partners, (Partners: Sagem, Telesystemes, NTE, Elsevier, Oxford University Press), Apr. 5, 1991.

Bureau Van Dijk, Gestion Des Contrats; 497C.C.C.E.: Cited (Suite), Feb. 1993.

Byte.com, "Speaking the Same Language," May 1994, pp. 1-2.

Cabell, D., et al., "Software Protection," May 1985, pp. 35-37.

Cable Television and America's Telecommunications Infrastructure, (National Cable Television Association, Washington, D.C.,), Apr. 1993, 19 pages.

Calas, C., "Distributed File System Over a Multilevel Secure Architecture Problems and Solutions," Computer Security, ESCORISC 94, Brighton, United Kingdon, Nov. 7-9, 1994, pp. 281-297.

CardTech/SecurTech 94 Conference Proceedings, "Building Foundations for Innovation." CardTech/SecurTech, Inc., Apr. 1994, 1,031 pages.

Caruso, D., "Technology, Digital Commerce: 2 Plans for Watermarks, Which Can Bind Proof of Authorship to Electronic Works," N.Y. Times, Aug. 7, 1995, p. D5.

Case, J., "A Simple Network Management Protocol (SNMP)," Network Working Group, May 1990, pp. 1-21.

Castano, S., et al., "Database Security," Addison-Wesley & Acm Press, 1995.

CGI Common Gateway Interface, Document from the Internet cgi@ncsa.uiuc.edu, 1996, 1 page.

Champine, G., MIT Project Athena: A Model for Distributed Campus Computing, Digital Equipment Corporation, 1991, 22 introductory pages, Chapter 1 (pp. 3-18); Chapter 2 (pp. 19-33); Chapter 3, (pp. 37-68); Chapter 4 (pp. 69-75); Chapter 5 (pp. 79-107); C.

Chase, Chevy, M.D., "DiscStore", Electronic Publishing Resources, 1991.

Chaum, D. et al. "Wallet databases with observers," Ernest F. Brickell, editor, Advances in Cryptology—CRYPTO '92, 12th Annual International Cryptology Conference, Santa Barbara, CA, Aug. 16-20, 1992, Proceedings, pp. 89-105.

Chaum, David L., "Achieving electronic Privary," Scientific American, Aug. 1992, 6 pages.

Chaum, David L., "Privacy and Social Protection in Electronic Payment Systems" Chapter 12, The Future of Money in the Information Age.

Chaum, David L., "Security Without Information Card Computers to Make Big Brother Obsolete," Communications of the ACM, vol. 28., No. 10, Oct. 1985, pp. 1-24.

Chaum, David L, "Smart Card 2000," Selected Papers from the Second International Smart Card 2000 Conference, Oct. 4-6, 1989.

Chaum, David L., "Untraceable Electronic Cash," Extended Abstract, Center for Mathematics and Computer Science, 1988, pp. 319-327.

Chaum, David L., et al., "Implementing Capability-Based Protection Using Encryption," College of Engineering, University of California, Berkeley, Jul. 17, 1978, 12 pages.

Chor et al., "Tracing Traitors," Crypto 94, 1994, p. 257.

Choudhury, A.K., et al., "Copyright Protection for Electronic Publishing Over Computer Networks," AT&T Bell Laboratories, Murray Hill, N.J., submitted to IEEE Network Magazine, Jun. 1994, pp. 1-17.

Choy, D.M., et al., "A Digital Library System for Periodicals Distribution", May 1996.

Cina Jr. et al., "ABYSS: A Basic Yorktown Security System PC Software Asset Protection Concepts," IBM Research Report No. RC 12401, IBM Thomas J. Watson Research Center, Dec. 18, 1986.

CITED: Copyright in Transmitted Electronic Documents, Special Interest Group, CITED Meeting, Heathrow, Sep. 22, 1993.

CITED: Final Report: A Guide to CITED Documentation, ESPIRIT, Project 5469, ISBN 0-7123-2115-2, The CITED Consortium, Sep. 1994.

Clark, Paul C., et al., "BITS: A Smartcard Protected Operating System," Communications of the ACM, vol. 37, No. 11, Nov. 1994, pp. 66-70 & 94.

Clark, T., "Ad Service Gives Cash Back," <www.news.com/News/Item/0,4,13050,00.html> (visited Aug. 4, 1997), 2 pages.

Clarke et al., "Cryptography Issues in Plain Text," Privacy Law and Policy Reporter, 1996.

Coad, Peter, "Object-Oriented Patterns," Communications of the ACM, vol. 35, No. 9, Sep. 1992, pp. 152-159.

Codercard, Basic Coder Subsystem, Interstate Electronics Corp., Anaheim, CA, (undated), 4 pages.

Cohen, F.B., Protection and Security on the Information Superhighway, John Wiley & Sons, Inc., 1995.

Communications of the ACM, Intelligent Agents, vol. 37, No. 7, Jul. 1994, 170 pages.

Communications of the ACM, vol. 39, No. 6, Jun. 1996, 134 pages.

Competitive Analysis AT&T/a2b music, Jun. 16, 1998.

Computer Systems Policy Project (CSSP), Perspectives on the National Information Infrastructure: Ensuring Interoperability, Feb. 1994, 5 slides.

Constructing a High Assurance Mail Guard, Secure Computing, 1994, pp. 1-10.

Cook, S., "Net Results," PC World, Dec. 1985, pp. 270-328.

Copyright Ownership Projection in Computer-Assisted Training, COPICAT—8195, ESPRIT, Dec. 1993.

CopySmart—20517: "CITED Based Multi-media IPR Management on Cost Effective Smart Device," European Information Technology for Information Science, start date Dec. 1, 1995.

CopySmart (CSM) suit, European Information technology for Information Science.

Corbato, F.J., et al., "Introduction and Overview of the Multics System," viewed on Nov. 13, 2001 at <http://www.multicians.org/fjcc1.html> pp. 1-18.

Cornish, Graham, "Copyright Management of Document Supply in an Electronic Age," The CITED™ Solution, Interlending & Document Supply, vol. 21, No. 2, 1993, pp. 13-20.

Cousins, Steve B. et al., "InterPay: Managing Multiple Payment Mechanisms in Digital Libraries."

Coutrot, Francois, et al., "A Single FConditional Access System for Satellite-Cable and Terrestrial TV", IEEE Transactions on Consumer Electronics, vol. 35, No. 3, Aug. 1989.

Cox, B., "Superdistribution," Wired, Sep. 1994, 2 pages.

Cox, Benjamin et al., "NetBill Security and Transaction Protocol," Carnegie Mellon University.

Cox, Brad, "What if there is a Silver Bullet and the competition gets it first?" Journal of Object-Oriented Programming, Jun. 1992, available at <http://www.virtualschool.edu/cox/CoxWhatIfSilverBullet.html>, pp. 1-5.

CREANET—Creative Rights European Agency NETwork—Project Profile, Information Society Technologies, Feb. 18, 2000.

Crocker et al., "MIME Object Security Services," Network Working Group RFC 1848, Oct. 1995.

Cryptographic API Specification, Version 0.6, Microsoft, Mar. 1995.

Cryptolope Containers Technology: A White Paper, IBM InfoMarket Business Development Group.

Cunningham, D. et al., "AT&T, VLSI Technology Join To Improve Info Highway Security," (News Release) Jan. 31, 1995, 3 pages.

CUPID Protocols and Services (Version 1): "An Architectural Overview," Nov. 1992, available at <http://www.cni.org/projects/CUPID>, 25 pages, Nov. 20, 1997.

Curry, D.A., UNIX System Security: A Guide for Users and System Administrators, Addison-Wesley Publishing Company, Inc., 1992.

Curry, David A., "Improving the Security of Your Unix System," Final Report Apr. 1990, pp. 1-74.

Custer, H. "Inside Windows NT," Microsoft Press, Redmond WA, 1993.

Custer, H., Inside the Windows NT File System, Microsoft Press, 1994.

Cybenko, G, et al., "Cognitive Hacking: A Battle for the Mind," Computer, Aug. 2002, 0018-9162/02â2002 IEEE, pp. 50-56.

Data Network and Open System Communications, Directory: Information Technology—Open Systems Interconnection—The Directory: Overview of Concepts, Models, and Services, ITU-T Recommendation X.500, International Telecommunication Union, Nov. 1993.

Data Widgets 2.0: Programmer's Guide, Sheridan Software Systems, Inc., 1993-1995.

Date, C.J., "An Introduction to Database Systems," 4th Ed., vol. 1, Addison-Wesley Publishing Company, 1987.

Davies, D. et al., Security for Computer Networks, 2nd ed., John Wiley & Sons, 1989, 22 introductory pages and pp. 1-377.

Davin, J., et al., "SNMP Administrative Model," Network Working Group, Jul. 1992, pp. 1-22.

Davis, D., et al., "Network Security via Private-Key Certificates," MIT Project Athena, (undated), pp. 1-4.

DEC Technology at Work, Distributed Computing Environment, http://www.opengroup.org/tech/dce/tech/tech.htm, Nov. 7, 2000, pp. 1-3.

Deering, S.E., "Host Extensionf for IP Multicasting," Network Working Group, RFC 1112, Aug. 1989.

Deliverable D3: Specification of the Infrastructure and Explanation of Trust and Confidence Building Solutions, ver. 0.1, Telenet, Jul. 18, 2000.

Dempsey L. et al., "The Warwick Metadata Workshop: A Framework for the Deployment of Resource Description," D-Lib Magazine, Jul. 15, 1996, 8 pages.

Denning, A., OLE Controls Inside Out, Microsoft Press, 1995.

Denning, Dorothy E.R., "Secure Personal Computing in an Insecure Network," Communications of the ACM, Aug. 1979, vol. 22, No. 8, pp. 476-482.

Denning, Dorothy E.R., Cryptography and Data Security, Addison-Wesley Publishing Company, 1982, Reprinted with corrections, Jan. 1983.

Denning, Dorothy E.R., et al., "Data Security," 11 Computing Surveys, No. 3, Sep. 1979, pp. 227-249.

Denning, P.J., Computer Under Attack: Intruders, Worms, and Viruses, ACM Press, 1990.

Department of Defense Computer Security Center, "Department of Defense Password Management Guideline," Department of Defense Computer Security Center, Apr. 12, 1985, pp. 1-34.

Department of Defense Standard, "Department of Defense Trusted Computer System Evaluation Criteria," Dec. 1985, pp. 1-72.

Deutsch, P., "GZIP File Format Specification Version 4.3," Network Working Group, May 1996, pp. 12.

Diffie, Whitfield, "Authentication and Authenticated Key Exchanges", Sun Microsystems and Bell-Northern Research, Mar. 6, 1992.

Diffie, Whitfield, "The First Ten Years of Public-Key Cryptography", Proceedings of the IEEE, vol. 76, No. 5, May 1988.

Diffie, Whitfield, et al., "New Directions in Cryptography," IEEE Transactions on Information Theory, vol. 22, No. 6, Nov. 1976, pp. 644-651.

Diffie, Whitfield, et al., "Privacy and Authentication: An Introduction to Cryptography," Proceedings of the IEEE, vol. 67, No. 3, Mar. 1979, pp. 397-427.

Diffie, Whitfield, et al., Privacy on the Line: The Politics of Wiretapping and Encryption, Massachusetts Institute of Technology, 1998.

Digital Broadband Delivery System, Phase 1.0, System Overview, Revision 1.0, Scientific Atlanta, 1997.

Digital Rights Enforcement and Management: Super Distribution of Cryptolopes, IBM.

DiLascia, Paul, "OLE Made Almost Easy: Creating Containers and Servers Using MFC 2.5," Microsoft Systems Journal, Apr. 1994, pp. 13-33.

DiscStore (Electronic Publishing Resources, Chevy Chase, MD, 1991, 3 pages.

Doster et al., "Third-Party Authentication in the Institutional File System," Center for Information Technology Integration.

Dougherty, D., et al., The Moasic Handbook for the X Window System, O'Reilly & Associates, 1994.

Downs, D.D., et al., "Issues in Discretionary Access Control," Proceedings of the 1985 Symposium on Security and Privacy, Apr. 22-24, 1985, Oakland, California, pp. 208-218.

DSP56000/DSP56001 Digital Signal Processor User's Manual, (Motorola), 1990, p. 2-2.

Dukach, S., "SNPP: A Simple Network Payment Protocol," MIT Laboratory for Computer Science, (undated), 7 pages.

Dusse, S.R. et al., "A Cryptographic Library for the Motorola 56000," Advances in Cryptology-Proceedings of Eurocrypt 90 (I.M. Damgard, ed., Springer-Verlag), 1991, pp. 230-244.

Dyson, E., "Intellectual Value," WIRED Magazine, Jul. 1995, pp. 136-141 and 182-184.

Eastlake III, D., "Physical Link Security Type of Service," Network Working Group RFC 1455, May 1993.

Eastlake III, D., et al., "Randomness Recommendations for Security," Network Working Group RFC 1750, Dec. 1994.

EFT Network Data Book; 1993 Edition, Bank Network News, vol. 11, No. 13, Nov. 1992.

EIA and TIA White Paper on National Information Infrastructure, The Electronic Industries Association and the Telecommunications Industry Association, Washington, D.C., (undated), 27 pages.

Eizenberg, G., "Contribution of Information Technology Security to Intellectual Property Protection," CERT-DERI.

Electronic Currency Requirements, XIWT (Cross Industry Working Group), (undated), 16 pages.

Electronic Reverse Copyright Management System (ERCOMS), International Institute for Electronic Library Research, website updated by Ramsden, Anne, Jul. 22, 1996.

Ellison, C. et al., "SPKI Certificate Theory," Internet Engineering Task Force (IETF) RFC 2693, Sep. 1999, 38 pages, available at http://www.ietf.org/rfc/rfc26939.txt?number=2693.

Email from Chris Drost-Hansen re press release: "AT&T Launches A2B Music Trial for Delivering Songs Over the Internet," Business Wire, Nov. 3, 1997.

Email from Edmond Kouka to Jean-Francois Boisson re TELENET TELEtraining platform—Bogdan Lutkiewicz, Poland, Gdansk, Mar. 4, 2001.

Enterpirse Solutions Announces RSA Mail, RSA Security News, viewed at <http://rsasecurity.com/news/pr/940112-2.html.>, dated Jan. 12, 1994, pp. 1-2.

Epstein, J., "A Trusted X Window System Server for Trusted Mach," Usenix Association Proceedings, Mach Workshop, Oct. 4-5, 1990, Burlington, Vermont, pp. 141-155.

Erickson, John S., "A Copyright Management System for Networke Interactive Multimedia", Proceedings of the 1995 Dartmouth Institute for Advanced Graduate Studies, 1995.

Erickson, John S., "Rights Management Through Enhanced Attribution", Presented at INET 96 Proceedings, Jun. 1996.

ESPRIT Project 20517—CopySmart CITED based multi-media IPR management on cost effective smart device, Summaries of Projects (FP III/IV)—Part I, European Information technology for Information Science, Oct. 1998.

ESPRIT Project 20676—IMPRIMATUR—Intellectual Multimedia Property Rights Model and Terminology for Universal Reference, IMPRIMATUR Consortium, Oct. 1998.

ESPRIT Project 22226—MUSE—Developing Standardized Digital media Management, Signaling and encryption Systems for the European Music Sector, International Federation of the Phonographic Industry, Oct. 1998.

ESPRIT Project 24378—MENHIR European Multimedia Network of High Quality Image Registration, Museums On Line, Feb. 1, 1997.

ESPRIT Project 5469: Contract Amendment No. 2; Commission of the European Communities, Sep. 16, 1993.

Europe and The Global Information Society Recommendations to the European Council, Bamgemann Report, www.medicif.org web pages, Global Information Society, May 1994.

Everett, David B., "Smart Card Tutorial-Part 1," Sep. 1992.

Farmer, D., "The COPS Security C hecker System," Jul. 10, 1992.

Federal Criteria for Information Technology Security, vol. II, Version 1.0, National Institute of Standards and Technology and National Security Agency, Dec. 1992, 270 pages.

Feistel, H., "Cryptographic Coding for Data-Bank Privacy," IBM document RC 2827, Mar. 18, 1970.

Ferraiolo, D., et al., "Role-Based Access Control," Reprinted from the Proceedings of the 15th National Computer Security Conference, 1992, pp. 1-11.

Financial Transaction Card Originated Messages—Interchange Message Specifications—Part 2: Application and registration Procedures for Institution Identification Codes (IIC), ISO 8583-2, Jul. 1, 1998.

Financial Transaction Card Originated Messages—Interchange Message Specifications—Part 3: Maintenance Procedures for Codes, ISO 8583-3, Jul. 1, 1998.

Fine, T.,et al, "Assuring Distributed Trusted Mach," Secure Computing Corporation, 1993, 13 pages.

Finin et al., "A Language and Protocol to Support Intelligent Agent Interoperability," Proceedings of the CE & CALS, Washington '92 Conference, Apr. 1992.

First CII Honeywell Bull International Symposium on Computer Security and Confidentiality, Conference Text, Jan. 26-28, 1981, 21 pages.

Forcht, K.A., Computer Security Management, Boyd & Fraser Publishing Company, 1994.

Forum on Risks to the Public in Computers and Related Systems, The Risk Digest, vol. 15; Issue 39, Jan. 21, 1994, pp. 1-12.

Forum on Technology-Based Intellectual Property Management—Electronic Commerce for Content, IMA INtellectual Property Proceedings, vol. 2, Jun. 1996.

Framework for National information Infrastructure Services, Draft, U.S. Department of Commerce, Jul. 1994, 157 pages.

Framework for National Information Infrastructure Services, NIST, Jul. 1994, 12 Slides.

Franklin, M., et al., "An Overview of Secure Distribution Computing," Mar. 24, 1992, pp. 1-46.

Franz, M., "Technological Steps Toward a Software Component Industry," Institut fur Computersysteme, Zurich, Switzerland, (undated), 23 pages.

Frederick, Keith, P., "Certification and Accreditation Approach", Air Force Cryptologic Support Center (OL-FP).

FreeBSD System Manager's Manual "LDCONFIG", Oct. 3, 1993.

Fuchsberger et al., "Public-key Cryptography on Smart Cards," Information Security Group.

Fugini, M.G., et al., "Authorization and Access Control in the Office-Net System," Computer Security in the Age of Information, 1989, pp. 147-162.

Fugini, M.G., et al., "Security Management in Office Information Systems," Computer Security: A Global Challenge, 1984, pp. 487-498.

Galvin, J., et al., "Security Protocols for version 2 of the Simple Network Management Protocol (SNMPv2)," Network Working Group RFC 1446, Apr. 1993.

Galvin, J., et al., "SNMP Security Protocols," Network Working Group, Jul. 1992, pp. 1-26.

Gamble, Todd, "Implementing Execution Controls in Unix," Usenix Association Proceedings of the Seventh Systems Administration Conference, Nov. 1-5, 1993, Monterey, California, pp. 237-242.

Garcia, D.L., "Science, Space and Technology, Hearing before Subcommittee on Technology, Environment, and Aviation," May 26, 1994, pp. 97-108.

Garfinkel, Simon, et al., Practical Unix Security, O'Reilly & Associates, Inc., 1991.

Garfinkel, Simon, PGP: Pretty Good Privacy, O'Reilly & Associates, Inc., (undated).

Gasser, M., et al., "The Digital Distributed System Security Architecture," Reprint from the Proceedings of 1989 National Computer Security Conference, 1989, pp. 1-13.

Gaster, J. L., "Authors' Rights and Neighboring Rights in the Information Society," DG XV/E/4, European Commission.

Gemplus, Mcos: Multi Application Chip Operating System—Introduction, Gemplus Card International, 1990.

General Magic Picks RSA, RSA Security News, viewed at <http://rsasecurity.com/news/pr/9401112-3.html.>, dated Jan. 12, 1994, pp. 1-2.

Gifford, D.K., "Cryptographic Sealing for Information Secrecy and Authentication," Communications of the ACM, vol. 25, No. 4, Apr. 1982, pp. 274-286.

Gifford, D.K., et al., "The Cirrus Banking Network," Communications of the ACM, vol. 28, No. 4, Aug. 1985, pp. 798-807.

Gilde, R., "DAT-Heads: Frequently Asked Questions," 1991, Release 3.1, Sep. 2, 1992.

Gircys, G.R., Understanding and Using COFF, O'Reilly & Associates, Inc., Nov. 1988.

Glatzer, H., "The Promise of LANs MIS Back in Control," Software News, Mar. 1985, pp. 51-58.

Gleick, J., "Dead as a Dollar," The New York Times Magazine, Jun. 16, 1996, Sect. 6, pp. 26-30, 35, 42, 50, 54.

Gligor, V.D., et al., "Object Migration and Authentication," IEEE Transactions on Software Engineering, vol. SE-5, No. 6, Nov. 1979, pp. 607-611.

Gong, Li, "A Secure Identity-Based Capability System," University of Cambridge Computer Laboratory, Jan. 1989, pp. 1-15.

Gong, Li, et al., "Signing, Sealing and Guarding Java Objects," Mobile Agents and Security, G. Vigna, editor, Springer-Verlag, 1998, vol. 1419 of LNCS, pp. 206-216.

Gosling, J., "Oak Intermediate Bytecodes," 1995, 5 pages.

Gozani et al., "GAFFES: The Design of a Globally Distributed File System," Report No. UCB/CSD 87/361; Computer Science Division (EECS), U.C. Berkley, Jun. 1997.

Greenwald et al., "The Distributed Compartment Model for resource management and Access Control," Technical report No. TR94-035, The University of Florida, Oct. 1994.

Greguras, F., "Softic Symposium '95, Copyright Clearances and Moral Rights," Dec. 11, 1995, 3 pages.

Griswold, Gary N., "A Method for Protecting Copyright on Networks", IMA Intellectual Property Proceedings, vol. 1, Issue 1, Jan. 1994.

Gruber, R., et al., "Disconnected Operation in the Thor Object-Oriented Database System," Laboratory of Computer Science, Massachusetts Institute of Technology, (undated), pp. 1-6.

Guide to the Secure Configuration and Administration of Microsoft Exchange 5.x®, National Security Agency, Jun. 20, 2002, pp. 1-58.

Guillou, L.C., "Smart Cards ad Conditional Access," Advances in Cryptography—Proceedings of EuroCrypt 84 (T. Beth et al, Ed., Springer-Veriag), 1985, pp. 480-490.

Haar, S.V., Document from the Internet: "PowerAgent Launches Commercial Service," Interactive Week, Aug. 4, 1997, 1 page.

Halfhill, Tom R., et al., "Agents on the Loose," Byte.com, Feb. 1994, pp. 1-2.

Halfhill, Tom R., et al., "Just Like Magic?," Byte.com, Feb. 12, 1994, pp. 1-5.

Haller, N., "The S/KEY One-Time Password System," Network Working Group RFC 1760, Feb. 1995.

Handwritten note re: GVS and AJL, Mar. 2, 1994.

Hansen, S.E., et al., "Automated System Monitoring and Notification with Swatch," Proceedings of the 1993 LISA, Monterey, California, Nov. 1-5, 1993, pp. 101-108.

Hardjono, Thomas, "Record Encryption in Distributed Databases," Department of Computer Science, University of New South Wales, Jan. 1990, pp. 386-395.

Hardy, N., "The Keykos Architecture," Eighth Edition, Dec. 1990, pp. 1-8.

Harman, H., Modern Factor Analysis, Third Edition Revised, University of Chicago Press, Chicago and London, 1976.

Harn, Lein, et al., "A Software Authentication System for the Prevention of Computer Viruses," ACM, 1992, pp. 447-450.

Harris, J., et al., "Bento Specification," Apple Computer, Inc., Jul. 15, 1993, 106 pages.

Harty, K., et al., "Case Study: The VISA Transaction Processing System," May 30, 1988, pp. 1-23.

Hauser, Ralf C., et al., "LTTP Protection—A Pragmatic Approach to Licenseing", Institut fur Informatik, Universitat Zurich, Jan. 13, 1994.

Hauser, Ralf, "Control Information Distribution and Access," Dissertation Der Wirtschaftswissenschaftlichen Fakultat Der Universitat Zurich, May 31, 1995.

Hauser, Ralf, C., "Does Licensing Require New Access Control Techniques?," Institut fur Informatik, Universitat Zurich, Aug. 12, 1993, 9 pages.

Hawk, H.S., "RSA & General Magic," email to Good Guys, Jan. 6, 1994, 1 page.

Hearst, M.A., "Interfaces for Searching the Web," Scientific American, Mar. 1997, pp. 68-72.

Herzberg, Amir, et al., "On Software Protection", Proceedings of the 4th Jerusalem Conference on Information Technology (JCIT), IEE Computer Society Proes., Apr. 1984.

Hewlett-Packard Chooses RSA, RSA Security News, viewed at <http://rsasecurity.com/news/pr/940112-5.html.>, dated Jan. 12, 1994, pp. 1-2.

Hickman, Kipp, E.B., SSL 2.0 Protocol Specification.

Hilgraeve Ships Secure Version of HyperACCESS/5, RSA Security News, viewed at <http://rsasecurity.com/news/pr/940112-8.html.>, dated Jan. 12, 1994, pp. 1-2.

Hill, William et al., "Edit Wear and Rear Wear," Computer Graphics and Interactive Media Research Group, ACM; May 3-7, 1992.

Hill, William et al., "History-Enriched Digital Objects," Computer Graphics and Interactive Media Research Group; Bell Communications Research, 1993.

History of Computer Security: Early Computer Security Papers, Part 1, National Institute of Standards and Technology, Sep. 4, 2002, viewed at <http://csrc.nist.gov/publications/history/index.html> pp. 1-27.

Hoffman, L.J., Modern Methods for Computer Security and Privacy, Prentice-Hall, Inc., 1977.

Hofmann, L.J., "Interfacing the NII to User Homes," Consumer Electronic Bus. Committee, NIST, Jul. 1994, 14 slides.

Holsinger, E., How Music and Computers Work, Ziff-Davis Press, 1994.

Holt, S. "Start-Up Promises User Confidentiality in Web Marketing Service," InfoWorld Electric News, updated Aug. 13, 1997, 2 pages.

Holzner, S., Heavy Metal OLE 2.0 Programming, IDG Books Worldwide, Inc., 1994.

Honeyman, P., "Digest of the First UNSENIX Workshop on Electronic Commerce (EC 95)," Jul. 1995.

Horster, P., Communications and Multimedia Security II, Chapman & Hall, 1996.

HotJava TM: The Security Story, (undated) 4 pages.

How Can I Put an Access Counter on My Home Page?, World Wide Web FAQ, 1996, 1 page.

Hsiao, D., et al., Computer Security, Academic Press, Inc., 1979.

Hutt, A.E., et al., Computer Security Handbook Second Edition, Macmillan Publishing Company, 1988, pp. 201-217.

IBM Cryptolope Technology-Executive Summary, IBM, viewed on Mar. 13, 2002 at <http://www-3.ibm.com/software/security/cryptolope.about.html> pp. 1-3.

Identification Cards-Financial Transaction Cards, ISO 7813, 1987.

IISP Break Out Session Report for Group No. 3, Standards Development and Tracking System, (undated), 13 pages.

Imprimatur News, imprimatur, Dec. 1998.

Information Infrastructure Standards Panel: NII "The Information Superhighway," NationsBank—HGDeal—ASC X9, (undated), 15 pages.

Intellectual Property and the National Information Infrastructure, a Preliminary Draft of the Report of the Working Group on Intellectual Property Rights, Green paper, Jul. 1994, 141 pages.

Interchange Message Specification for Debit and Credit Card Message Exchange Among Financial Institutions, American National Standard, Accredited Standards Committee X9-Financial Services Committee, ANSI X9.2-1988, American Bankers Association, May 16, 11, International Infrastructure Standards Panel, "IISP Need #31-Containers or Secure Packaging," Electronic Publishing Research, Sep. 18, 1995, pp. 1-3.

International Infrastructure Standards Panel, "IISP Need #32-Authentication of Content," Electronic Publishing Research, Sep. 18, 1995, pp. 1-3.

International Infrastructural Standards Panel, "IISP Need #33-Control Enforcement," Electronic Publishing Research, Sep. 18, 1995, pp. 1-3.

International Infrastructure Standards Panel, "IISP Need #34-Billing and Payment," Electronic Publishing Research, Sep. 18, 1995, pp. 1-3.

International Infrastructure Standards Panel, "IISP Need #35-Reporting," Electronic Publishing Research, Sep. 18, 1995, pp. 1-3.

Internet Billing Server, Carnegie Mellon University, Prototype Scope Document, INI Tech Report, Oct. 14, 1993, pp. 1-29.

Introducing . . . The Workflow CD-ROM Sampler, Creative Networks, MCI Mail: Creative Networks, Inc., (undated), 2 pages.

Introduction to Smart Cards v. 1.0, Gemplus Card International, Mar. 21, 1991.

Invoice? What's an Invoice?, Business week, Jun. 10, 1996, pp. 110-112.

Ioannidis, J. et al., "The Architecture and Implementation of Network-Layer Security Under Unix," Fourth USENIX Security Symposium Proceedings (Oct.), USENIX, Berkeley, Calif. 1993, 11 pages.

iOpener, Registered Trademark of National Semiconductor Corporation, Registration date Oct. 4, 1994, 1 page.

iOpener, U.S. Patent and Trademark Prosecution History for National Semiconductor Corporation, Registration date, Oct. 4, 1994, 27 pages, TULIP Final Report.

iPower Technology, National Semiconductor, (undated), 11 pages.

iPower's Data Security Approach, RSA Security News, viewed at <http://rsasecurity.com/news/pr/940112-10.html>, dated Jan. 12, 1994.

Is Advertising Really Dead?, Wired 2.02, Part 2, 1994, 4 pages.

Jaeger, T., et al., "Support for the File System Security Requirements of Computational E-Mail Systems," Nov. 1994, ACM 0-89791-732-4/94/0011, 9 pages.

JAVASOFT, Frequently Asked Questions-Applet Security, Jun. 7, 1996, 7 pages.

Jiang, J.J. et al., "A Concept-based Approach to Retrieval from an Electronic Industrial Directory," International Journal of Electronic Commence, vol. 1, No. 1 (Fall 1996) pp. 51-72.

Johnson, H.L., et al., "A Secure Distributed Capability Based System," ACM, 1985, pp. 392-402.

Johnson, R., "Info on Telescript," 1994 Software Agents List Archieve, Dec. 6, 1994, pp. 1-4.

Jones et al., "Credentials for Privacy and Interoperation," University of Illinois at Urbana-Champaign.

Jones, D., Document from the Internet: "Top Tech Stories, PowerAgent Introduces First Internet 'Informediary' to Empower and Protect Consumers," (updated Aug. 13, 1997) 3 pages.

JUKEBOX—Music Across Borders, LIB-Jukebox/4-1049.

Kahn, D., The Codebreakers: The Story of Secret Writing, The Macmillan Company, 1967.

Kahn, R., et al., A Framework for Distgributed Digital Object Services, Corporation for National Research Initiatives, May 13, 1995.

Kaliski, Jr., et al. "A Layman's Guide to a Subset of ASN.1, BER, and DER", RSA Laborato4ries Technical Note, 1991, Revised Nov. 1, 1993.

Kamens, J.I., "Retrofitting Network Security to Third-Party Applications-The SecureBase Experience," Symposium Proceedings, Unix Security IV, Oct. 4-6, 1993, Santa Clara, California, pp. 41-57.

Kaner, Cem et al., Testing Computer Software, Second Edition, Van Nostrand Reinhold, 1988.

Kaplan, M., "IBM Cryptolopes, Super Distribution and Digital Rights Management," viewed at < <http://www.research.ibm.com/people/k/kaplan/cryptolope-docs/crypap.html>on Dec. 30, 1996, pp. 1-10.

Karger, P.A., et al., "A VMM Security Kernel for the VAX Architecture," CH2884-5/90/0000/0002, IEEE 1990, pp. 2-19.

Karger, P.A., et al., "Multics Security Evaluation: Vulnerability Analysis," HQ Electronic Systems Division, Hanscom AFB, Technical Report 19, Jun. 1974, 14 pages.

Kastenholz, F., "The Definitions of Managed Objects for the Security Protocols of the Point-to-Point Protocol," Network Working Group RFC 1472, Jun. 1993.

Katzan, Harry, Jr., Computer Data Security, Litton Educational Publishing Company, 1973.

Keefe, T.F., et al., "Prototyping the SODA Security Model," Department of Computer Science, University of Minnesota, 1990, pp. 211-235.

Kelly, K., "E-Money," Whole earth Review, Summer 1993, pp. 40-59.

Kelman, Alistair, "Electronic Copyright Management: Possibilities and Problems", Scientists for Labor Presentation, Nov. 14, 1996.

Kelter, U., "Discretionary Access Controls in a High-Performance Object Management System," 1991 IEEE Computer Society Symposium on Research in Security and Privacy, May 20-22, 1991, Oakland, California, pp. 288-299.

Kelter, U., et al., "Type Level Access Controls for Distributed Structurally Object-Oriented Database Systems," Computer Security, ESCORICS 92, Second European Symposium on Research in Computer Security, Toulouse, France, Nov. 23-25, 1992, pp. 21-40.

Kent, S. T., "Protecting Externally Supplied in Small Computers," (MIT/LCS/TR-255) Sep. 1980, 254 pages.

Kent, S., et al., "Privacy Enhancement for Internet Electronic Mail: Part II—Certificate-Based Kay Management," Network Working Group, Aug. 1989, pp. 1-22.

Kent, S.T., "U.S. Department of Defense Security Options for the Internet Protocol," Network Working Group RFC 1108, Nov. 1991.

Ketchpel, Steve P., et al., "Shopping Models: A Flexible Architecture for Information Commerce", Stanford University.

Key Cryptolope Components, IBM, viewd on Mar. 13, 2002 at <http://www-3.ibm.com/software/security/cryptolope.about.html> pp. 1-2.

Key Management (retail)—Part I : Introduction to Kay Management; Part II: Key Management Techniques for Symmetric Ciphers, ISO 11568-1 and -2, Dec. 1, 1994.

Key Management Using ANSI X9.17, Federal Information Processing Standards Publication 171, U.S. Department of Commerce, Apr. 1992.

KeyKOS Principles of Operation, Key Logic document KL002-04, 1985, Fourth Edition, Jan. 1987.

Kim, G.H., et al., "Experiments with Tripwire: Using Integrity Checkers for Intrusion Detection," Purdue Technical Report CSD-TR-94-012, Feb. 21, 1994.

Kim, G.H., et al., "The Design and Implementation of Tripwire: A File System Integrity Checker," Nov. 19, 1993.

Kim, L., et al., "Novell Cuisine," Proceedings of the ACM SIGUCCS User Services Conference XIX, Nov. 3-6, 1991, Seattle, Washinton, pp. 183-184.

Kim, W., et al., "Features of the ORION Object-Oriented Database System," 1989, pp. 251-282.

Kim, W., et al., "Object-Oriented Concepts, Databases, and Applications," ACM Press, 1989.

Klemond, P., "Investigating Object Linking and Embedding, Part II: Adding Server Support," Microsoft Systems Journal, May/Jun. 1992, pp. 87-94.

Klemond, P., "Taking the Bull by the Horns: Investigating Object Linking and Embedding, Part I," Microsoft Systems Journal, Mar./Apr. 1992, pp. 19-38.

Kluepfel, H.M., "Securing a Global Village and its Resources: Baseline Security for Interconnected Signaling System #7, Telecommunications Networks," 1993, pp. 195-212.

Koenig, A. "Automatic Software Distribution," Usenix Association Software Tools Users Group, Summer Conference, Salt Lake City, Jun. 12-15, 1984, pp. 312-322.

Kohl, J.T., et al., "The Evolution of the Kerberos Authentication Service," Digital Equipment Corporation, 1991, pp. 1-15.

Kohl, J.T., et al., "The Kerberos Network Authentication Service (V 5)," Network Working Group Request for Comments RFC-1510, Sep. 1993, pp. 1-104.

Kohl, U., et al., "Safeguarding Digital Library Contents and Users," IBM research Division, D-Lib magazine, Sep. 1997.

Konheim, Alan, G., et al.,Cryptography: A Primer, John Wiley & Sons, Inc., 1981.

Krajewski, Jr. M., "Applicability of Smart Cards to Network User Authentication," Computing Systems, vol. 7, No. 1, Winter 1994, pp. 75-89.

Krajeswki, Jr., M., "Smart Card Augmentation of Kerberos,". The Mitre Corporation, (undated), 6 pages.

Krajewski, Jr., M., et al., "Concept for a Smart Card Kerberos," The Mitre Corporation, (undated), 7 pages.

Kramer, M., "Strength in Numbers," PC Week, Jul. 22, 1986, pp. 57-58.

Kreutzer, A.N., "An On-Line System for Controlling and Monitoring Software Usage in a Microcomputer Laboratory," SIGUCCS Newsletter, vol. 18, No. 2, 1998, pp. 29-32.

Kristol, D.M., et al., "Anonymous Internet Mercentile Protocol," AT&T Bell Laboratories, Mar. 17, 1994, pp. 1-16.

Krol, E., The Whole Internet User's Guide and Catalog, 2nd. Ed., O' Reilly & Associates, Inc., 1992.

Kurak, C., et al., "A Cautionary Note On Image Downgrading," Proceedings of the 1992 Computer Security Applications Conference, San Antonio, TX, Dec. 1992, 7 pages.

Lacy, Jack, et al., "Music on the Internet and the Intellectual Property Protection Problem".

Lagoze et al., "A Design for Inter-Operable Secure Object Stores (ISOS)," Cornell University, NCSA, CNRI, Nov. 1995.

Lagoze, C., "The Warwick Framework, A Container Architecture for Diverse Sets of Metadata," D-Lib Magazine, Jul./Aug. 1996, 7 pages.

Lagoze, Carl, "A Secure Repository Design for Digital Libraries", D-Lib Magazine, Dec. 1995.

LaLonde Wilf, R., et al., Inside Smalltalk: vol. 1, Prentice-Hall, Inc., 1990.

Lampson, B.W., "A Note on the Confinement Problem," Communications of the ACM, Oct. 1973, pp. 1-5.

Lampson, B.W., "Computer Security," Digital Equipment Corporation, 1991, pp. 1-54.

Lampson, Butler, et al., "Authentication in Distributed Systems: Theory and Practice," ACM Trans. Computer Systems, vol. 10, No. 4, Nov. 1992, 46 pages.

Landwehr, C.E, et al., "A Taxonomy of Computer Program Security Flaws," ACM Computer Surveys, vol. 26, No. 3, Sep. 1994, pp. 211-254.

Landwehr, C.E., "Formal Models for Computer Security," Computer Surveys, vol. 13, No. 3, Sep. 1981, pp. 247-278.

Langelaar, G.C., "Overview of Protection Methods in Existing TV and Storage Devices," SMS-TUD-609-1, Final Ver. 1,2, Feb. 26, 1996.

Lanza, M., "George Gilder's Fifth Article-Digital Darkhouse—Newspapers," Feb. 21, 1994, 2 pages.

Leary, P., "Are There Ciphers in Shakespeare?," 1995, pp. 1-18.

Lehman, B., "Intellectual Property and the National Information Infrastructure, A Preliminary Draft of the Report of the Working Group on Intellectual Property Rights," Jul. 1994, 4 introductory pages and pp. 1-141.

Leiss, E., "On Authorization System with Grantor-Controlled Propagation on Privileges," Compcon 83, Feb. 28-Mar. 3, 1983, San Francisco, California, pp. 499-502.

Lesk, M., "Digital Libraries Meet Electronic Commerce: On-Screen Intellectual Property," Dec. 15, 1998.

Levine, P.H., et al., "Network License Server," Apollo, Oct. 1987, pp. 1-19.

Levy, S., "E-Money, That's What I Want," WIRED, Issue 2.12, Dec. 1994, 10 pages.

Lewontin, S., et al., "The DCE Web Project: Providing Authorization and Other Distributed Services to the World Wide Web," Feb. 22, 2002.

Lin, P., "The Encapsulated Security Services Interface (ESSI)," Computer Security (A-37), 1993, pp. 119-135.

Linn, J., "Privacy Enhancement for Internet Electronic Mail: Part I—Message Encipherment and Authentication Procedures," Network Working Group, Aug. 1989, pp. 1-30.

Lipson, S., "Little Black Box 'Blocks' Illicit Software Copying," Stamford Advocate, Sep. 14, 1987, pp. E1-E2.

List of Articles, <www.chaum.com/articles/lift-of-articles.htm>, as on Aug. 23, 2002, 4 pages.

Lockhart, Jr., H.W., OSF DCE Guide to Developing Distributed Applications, McGraw-Hill, Inc., 1994.

Lord et al., "Access Management in Multi-Administration Networks," IEE 2nd International Conference on Secure Communication Systems, 1986.

Low, S.H. et al., "Anonymous Credit Cards," AT&T Bell Laboratories, Proceedings of the 2nd ACM Conference on Computer and Communication Security, Fairfax, VA, Nov. 2-4, 1994, 10 pages.

Low, S.H. et al., "Document Marking and Identification Using both Line and Word Shifting," AT&T Bell Laboratories, Murray Hill, NJ, Jul. 29, 1994, 22 pages.

Lunt, Teresa, "Multilevel Security for Object-Oriented Database Systems," SRI International Computer Science Laboratory, 1990, pp. 199-209.

Lynch, C., "Searching the Internet," Scientific American, Mar. 1997, pp. 52-56.

Mach Books, viewed on Feb. 6, 2002 at http://www2.cs.cmu/edu/afs/cs/project/mach/public/www/doc/books.html., pp. 1-3.

Maclachian, M., Document from the Internet: "PowerAgent Debuts Spam-Free Marketing," TechWire, Aug. 13, 1997, 3 pages.

Manager's Guide to MPE/iX Security, Herwlett-Packard Company, Apr. 1994.

Mann, C.C., "Homeland Insecurity," Sep. 2002.

Mathy, Laurent, "Features of the ACCOPI Multimedia Transport Service", Lecture Notes in Computer Science, No. 1045, Proc. of European Workshop IDMS' 96, Mar. 1996.

Maude, T., et al., "Hardware Protection Against Software Piracy," Communications of the ACM, vol. 27, No. 9, Sep. 1984, pp. 951-959.

Maxemchuk, N.F., "Electronic Document Distribution," AT&T Bell Laboratories, Murry Hill, NJ, (undated), 11 pages.

McCloghrie, K., et al., "Definitions of Managed Objects for Administration of SNMP Parties," Network Working Group, Jul. 1992, pp. 1-17.

McCloghrie, K., et al., "Management Information Base for Network Management of TCP/IP-based Internets," Network Working Group, RFC 1156 (May 1990).

McCollum, C.J., et al., "Beyond the Pale of MAC and DAC-Defining New Forms of Access Control,", Unisys Defense Systems, 1990, pp. 190-200.

McGraw, G., et al., Java Security, John Wiley & Sons, Inc., 1997.

Medvinsky, G., et al., "NetCash: A Design for Practical Electronic Currency on the Internet," 1st Conference on Computer and Communication Security, Nov. 1993, pp. 102-106.

Merkle, Ralph C., "Protocols for Public Key Cryptosystems," IEEE, 1980.

Merkle, Ralph C., "Secure Communications Over Insecure Channels," Communications of the ACM, vol. 21, No. 4, Apr. 1978, pp. 294-296.

Meyer, C.H., et al., Cryptography: A New Dimension in Computer Data Security, John Wiley & Sons, Inc., 1982.

Micro Card, Micro Card Technologies, Inc., Dallas, TX, (undated), 4 pages.

Microsoft Authenticode Technology, Microsoft Corporation, Oct. 1996.

Milbrandt, E., Document from the Internet: "Steganography Info and Archive," 1996, 2 pages.

Millen, J.K., et al., "Security for Object-Oriented Database Systems," Proceedings of the 1992 IEEE Computer Society Symposium on Research in Security and Privacy, May 4-6, 1992, Oakland, California, pp. 260-272.

Miller, S.P., et al., "Kerberos Authentication and Authorization System," Massachusetts Institute of Technology, Oct. 27, 1998, pp. 1-36.

Minear, S.E., "Providing Policy Control Over Object Operations in a Mach Based System," Secure Computing Corporation, Apr. 28, 1995, 15 pages.

Miscellaneous letter from Goerges Van Slype at Bureau Van Dijik, Feb. 28, 1994.

Miscellaneous Letters from Georges Van Slype at Bureau Van Dijk, Apr. 19, 1994, Apr. 18, 1994, Apr. 11, 1994, Apr. 6, 1994.

Miscellaneous Letters from Georges Van Slype at Bureau Van Dijk, Feb. 13, 1995 and Nov. 2, 1994.

Miscellaneous Letters from Georges Van Slype at Bureau Van Dijk, Feb. 9, 1994, Jan. 27, 1994, Jan. 19, 1994, Jan. 12, 1994, Dec. 22, 1993, Nov. 30, 1993, Nov. 22, 1993, Dec. 6, 1993, Nov. 16, 1993, Oct. 15, 1993, Oct. 7, 1993, Oct. 4, 1993, Sep. 20, 1993,,.

Miscellaneous Letters from Georges Van Slype at Bureau Van Dijk, Mar. 30, 1994, Mar. 24, 1994, Feb. 10, 1994.

Miscellaneous Letters from Georges Van Slype at Bureau Van Dijk, Mar. 30, 1995.

Miscellaneous Letters from Geogres Van Slype at Bureau Van Dijk, Sep. 12, 1994, May 11, 1994, May 10, 1994, May 6, 1994, May 4, 1994, Apr. 21, 1994, Apr. 20, 1994.

Moens, Jan, "Case of Application of the Generic CITED Model to the CITDisation of a Directory Database on CD-ROM, Ver. 2.0, " ESPIRIT II, Project 5469, The CITED Consortium, Nov. 30, 1992.

Moens, Jan, "Report on the Users Requirements, Ver. 1.0, " ESPIRIT II, Project 5469, The CITED Consortium, Nov. 27, 1991.

Moffett, Jonathan D., "Delegation of Authority Using Domain-Based Access Rules," thesis Imperial College of Science, Technology & Medicine, University of London, Jul. 1990.

Moffett, Jonathan D., "Specification of Management Policies and Discretionay Access Control," Department of Computer Science, University of York, Jun. 28, 1994, pp. 1-28.

Moffett, Jonathan D., et al., "An Introduction to Security Distributed Systems," Department of Computer Science, University of York, England, Aug. 1993, pp. 1-14.

Moffett, Jonathan D., et al., "Policy Hierarchies for Distributed Systems Management," IEEE JSAC Special Issue on Network Management, vol. 11, No. 9, Dec. 1993, pp. 1-4.

Moffett, Jonathan D., et al., "Specifying Discretionary Access Control Policy for Distributed Systems," Computer Communications, vol. 13, No. 9, Nov. 1990, pp. 1-17.

Moffettt, Jonathan D., et al., "The Representation of Policies as System Objects," Proceedings of the Conference on Organizational Computer Systems (COCS '91), Atlanta, Georgia, Nov. 5-8, 1991, 16 pages.

Montini, G, et al., "Access Control Models and Office Structures," Computer Security: A Global Challenge, 1984, pp. 473-485.

Mori, R. et al., "Superdistribution: The Concept and the Architecture," The Transactions of the EIEICE, V, E73, No. 7, Tokyo, Japan, Jul. 1990, pp. 1133-1146.

Mossberg, W.S., "Personal Technology, Threats to Privacy On-Line Become More Worrisome," The Wall Street Journal, Oct. 24, 1996, 2 pages.

Motorola MC68030 Enhanced 32-bit Microprocessor User's Manual, 2nd Ed., Prentice-Hall, 1989.

MSDN-INF: LAN Manager 2.1 Server Autotuning (Part2), PSS ID No. 080078, Microsoft, Feb. 1993.

MSDN-Licence Service Application Programming Interface, API Specification v1.02, Microsoft, Jan. 1993.

Muftic, Sead, Security Mechanisms for Computer Networks, Ellis Horwood Limited, 1989.

Multics, Home; viewed on Nov. 12, 2001, at <http://www.multicians.org> pp. 1-3.

Multimedia Mixed Object Envelopes Supporting a Graduated Fee Scheme Via Encryption, IBM Technical Disclosure Bulletin, vol. 37, No. 3, Mar. 1, 1994, pp. 413-417.

Multimedia System Services Ver. 1.0, Hewlett-POackard, IBM, & SunSoft, 1993.

National Semiconductor and EPR Partner for Information Metering/Data Security Cards, Press Release, (Mar. 4, 1994), 4 pages.

Needham, R.M., "Ading Capability Access to Conventional File Servers," Xerox Palo Alto Research Center, (undated), pp. 3-4.

Negroponte, N., "Electronic World of Mouth," WIRED, Oct. 1996, p. 218.

Negroponte, N., "Some Thoughts on Likely and Expected Communications Scenarios: A Rebuttal," Telecommunications, Jan. 1993, pp. 41-42.

Neuman B.C.,et al. "Kerberos: An Authentication Service for Computer Networks," IEEE Communications magazine, Sep. 1994.

Neuman, B.C., "Proxy-Based Authorization and Accounting for Distributed Systems," Information Sciences Institute, University of Southern California, 1993, pp. 283-291.

Neumann, P.G. et al., "A Provably Secure Operating System: The System, Its Applications, and Proofs," Computer Science Laboratory Report CSL-116, Second Edition SRI International, Jun. 1980, 381 pages.

New Products, Systems and Services, AT&T Technology, vol. 9, No. 4, (undated), pp. 16-19.

News from The Document Company XEROX, Xerox Announces Software Kit for Creating 'Working Documents' with Dataglyphs, Nov. 6, 1995, 13 pages.

Nguyen, Thanh et al., "Guidelines for Validation of a CITED System," CITED 5469, SA-21-40-003, Jul. 4, 1994.

NII, Architecture Requirements, XIWT, (undated), 38 pages.

NSA Korean War 1950-1953 Commemoration, History Papers, National Security Agency, http://www.nsa.gov/korea/papers.htm, pp. 1-2.

O'Connor, MaryAnn, "New Distribution Option for Electronic Publishers," Information Access Co., Mar. 1994, pp. 1-6.

OLE 2.0 Draft Content: Object Linking & embedding, Microsoft, Jun. 5, 1991.

Olivier, M.S. et al., "A Taxonomy for Secure Object-oriented Databases," ACM Transactions on Database Systems, vol. 19, No. 1, Mar. 1994, pp. 3-46.

Olivier, M.S. et al., "DISCO: A Discretionary Security Model for Object-oriented Databases," in GG Gable and WJ Caelli, Eds., IT Security: The Need for International Cooperation, pp. 345-357, Elsevier Science Publishers B.V. (North Holland), 1992, 14 pagee.

Olivier, M.S. et al., "Secure Object-oriented Databases," PH.D. Thesis, Rand Afrikaans University, Johannesburg, Dec. 1991, pp. i to xiv and 1-183.

Olivier, M.S., "A Multilevel Secure Federated Database," Database Security, VIII (A-60), 1994, pp. 183-198.

Olivier, M.S., et al., "Building a Secure Database using Self-protecting Objects," Computers & Security, vol. 11, No. 3, 259-271, 1992.
Olson, M.S., et al., "Concurrent Access Licensing," vol. 6, No. 9, Unix Review, 1988, pp. 67-74.
OMG Security Working Group, "OMG White Paper on Security," OMG Security Working Group, Apr. 1994, pp. 1-24.
OOPSLA 1993: Addendum to the Proceedings, "Security for Object-Oriented Systems," Sep. 26-Oct. 1, 1993, pp. 77-78.
Open System Environment Architectural Framework for National Information Infrastructure Services and Standards, in Support of National Class Distributed Systems, Distributed System Engineering Program Sponsor Group, Draft 1.0, Aug. 5, 1994, 34 pages.
Open Systems Interconnection: Security Architecture, ISO 7498/1, 1988.
Open Systems Interconnection: Security Architecture, ISO 7498/2, 1988.
OpenDoc vs. Ole 2.0: Superior by Design, IBM, Jan. 1994, pp. 1-4.
Orfali, R., et al., The Essential Distributed Objects Survival Guide, John Wiley & Sons, Inc., 1996.
Organick, E.I., The Multics System: An Examination of Its Structure, MIT Press, 1972.
OSF DCE Administration Guide-Core Components, Open Software Foundation, PTR Prentice Hall, 1993.
Paepcke, Andreas, "Summary of Stanford's Digital Library Testbed and Status," Stanford University, D-Lib Magazine, Jul. 1996.
Paradinas, Pierre et al., "New Directions for Integrated Circuit Cards Operating Systems."
Park, J.S., AS/400 Security in a Client/Server Environment, John Wiley & Sons, Inc., 1995.
Payment Systems; Strategic Choices for the Future, Hitatchi Research Institute; Institue of Advanced Business Systems, Hitachi, Ltd., 1993.
Pelton, J.N., "Why Nicholas Negroponte is Wrong About the Future of Telecommunications," Telecommunications, Jan. 1993, pp. 35-40.
Perlman, Bill, "A Working Anti-Taping System for Cable Pay-Per-View," IEEE Trans. On Consumer Electronics, vol. 35, No. 3, Aug. 1989.
Personal Identification Number (PIN) management and security—Part I: Basic Principles and Requirements for online PIN Handling in ATM and POS Systems; & -2 Approved Algorithms(s) for PIN Encipherment, ISO 9564-1 & -2, (Apr. 15, 2002 & Dec. 15, 1991.
Pethia et al., "Guidelines for the Secure Operation of the Internet," Network Working Group, RFC 1281, No. 1991.
Picciotto, J., et al., "Extended Labeling Policies for Enhanced Application Support," Computers & Security, vol. 13, No. 7, 1994, pp. 587-599.
Pietreck, M., Windows Internals: The Implementation of the Windows Operation Environment, Addison-Wesley, 1993.
Pijenborg, Mari F.J., "Auteursrecht En De Digitale Bibliotheek," 195 Open, Jan. 1995.
Pijenborg, Mari F.J., "CITED Final Report," Elsevier Science B.V., Apr. 1994.
PKCS #1: RSA Encryption Standard, RSA Laboratories Technical Note, Ver. 1.5, revised Nov. 1, 1993.
PKCS #10: Certification Request Syntax Stanard, An RSA Laboratories Technical Note, Ver. 1.0, Nov. 1, 1993.
PKCS #11: Cryptographic Token Interface Standard, An RSA Laboratories Technical Note, Ver. 2.0, Apr. 15, 1997.
PKCS #12 v 1.0: Personal Information Exchange Syntax , RSA Laboratories, Jun. 24, 1999.
PKCS #13: Elliptic Curve Cryptography Standard, RSA Security, Jan. 12, 1998.
PKCS #15 v 1.0: Cryptographic Token Information Format Standard, RSA Laboratories, Apr. 23, 1999.
PKCS #3: Duffie-Hellman Key-Agreement Standard, RSA Laboratories Technical Note, Ver. 1.4, revised Nov. 1, 1993.
PKCS #5: Password-Based Encryption Standard, An RSA Laboratories Technical Note, Ver. 1.5, 1991-1993, Revised Nov. 1, 1993.
PKCS #6: Extended-Certificate Syntax Standard, RSA Laboratories Technical Note, Ver. 1.5, revised Nov. 1, 1993.
PKCS #8: Private-Key Information Syntax Standard, An RSA Laboratories Technical Note, Ver 1.2, 1991-1993, Revised Nov. 1, 1993.
PKCS #9: Selected Attribute Types, RSA Laboratories Technical Note, Ver. 1.1, revised Nov. 1, 1993.
Polk, T.W., "Approximating Clark-Wilson "Access Triples" with Basic UNIX Controls," Symposium Proceedings, Unix Security IV, Oct. 4-6, 1993, Santa Clara, California, pp. 145-154.
Popek, Gerald, J., et al., "Encryption and Secure Computer Networks," Computing Surveys, vol. 11, No. 4, Dec. 1979, pp. 331-356.
Portland Software's Ziplock, Internet Information, Copyright Portland Software 1995-1996, 11 pages.
Premenos Announces Templar 2.0—Next Generation Software for Secure Internet EDI, Jan. 17, 1996, 1 page.
Press, Jim, "Secure Transfer of Identity and Privilege Attributes in an Open Systems Environment," Computers & Security, vol. 10, No. 2, 1991, pp. 117-127.
Press, Jim, et al, "A New Approach to Crytographic Facility Design", ICL Mid-Range Systems Division Reading, Berks, UK.
Privacy and the NII : Safeguarding Telecommunications—Related Personal Infrmation, U.S. Dept. of Commerce, Oct. 1995.
Proceedings: Technological Strategies for Protecting Intellectual Property in the Networked Multimedia Environment, 1994, Coalition for Networked Information, Interactive Multimedia Association, John F. Kennedy School of Government, Journal of the Inte.
Proper Use of Consumer Information on the Internet, White Paper, Power Agent Inc., Menlo Park, CA, Jun. 1997, 9 pages.
Protecting Electronically Published Properties, Increasing Publishing Profits, Electronic Publishing Resources Inc., Chevy Chase, Maryland, 1991, 17 pages.
Purdy, G.B., et al., "A Software Protection Scheme," Proceedings of the 1982 Symposium on Security and Privacy, Apr. 26-28, 1982, Oakland California, pp. 99-103.
R01—Solving Critical Electronics Publishing Problems, Personal Library Software, 1987 or 1988, 4 pages.
R01, Personal Library Software, 1987 or 1988.
Rankine, G., "THOMAS—A Complete Single-Chip RSA Device," Advances in Cryptography, Proceedings of CRYPTO 86, (A.M. Odiyzko Ed., Springer-Verlag) 1987, pp. 480-487.
Rashid, R.F., CMU Computer Science: A 25th Anniversary Commemorative, Addison-Welsley Publishing Company, 1991.
Reali, Patti, "Copy Protection: The answer to pay per view's Prayers?," TVRO Dealer, Dec. 1994.
Reiher, et al., "Truffles—A Secure Service for Widespread File Sharing," UCLA, Trusted Information Systems.
Reiher, et al., "Truffles—Secure File Sharing With minimal system Administrator Intervention," UCLA, Trusted Information Systems.
Reilly, A.K., "Input to the 'International Telecommunications Hearing,' Panel 1: Component Technologies of the NII/GII," Standards Committee T1-Telecommunications (undated), 14 pages.
Request for Technology: Multimedia System Services, Ver. 2.0, Interactive Multimedia Association Compatibility Project, Nov. 9, 1992.
Request for Technology: Multimedia System Services, Draft, Ver. 1.1, Interactive Multimedia Association Compatibility Project, Oct. 16, 1992.
Requirements for the Software License Management System, System Management Work Group, Rev. 3, Unix International, Jul. 23, 1992.
Rescorla, E., et al., "The Secure HyperText Transfer Protocol," Enterprise Integration Technoloigies, Jun. 1994, pp. 1-23.
Resnick, P., "Filtering Information on the Internet," Scientific American, Mar. 1997, pp. 62-64.
Resnick, P., et al., "Recommender Systems," Communications of the ACM, vol. 40, No. 3, Mar. 1997, pp. 56-58.
Richardson, D.W., Electronic Money: Evolution of an Electronic Funds-Transfer System, The MIT Press, 1970.
Rindfrey J., "Security in the World Wide Web," Fraunhofer Institute for Computer Graphics, Dec. 1996.
Rindfrey, Jochen, "Towards an Equitable System for Access Control and Copyright Protection in Broadcast Image Services; The Equicrypt Approach," Fraunhofer Institute for Computer Graphics.
Rivest, Ronald L., "The MD5 Message-Digest Algorithm," Network Working Group, Apr. 1992, pp. 1-21.
Rivest, Ronald L., et al., "SDSI—A Simple Distributed Security Infrastructure", MIT and Microsoft Corporation, Apr. 30, 1996.

Roberts, R., et al., Compute!'s Computer Security, Compute! Publications, Inc., 1989.

Robinson et al., "Encoding Header Field for Internet Messages," Network Working Group RPC 1154, Apr. 1990.

Rose et al., "Structure and Identification of management Information for TCP/IP-based Internets," Network Working Group RFC 1155, May 1990.

Rose, L., Cyberspace and the Legal Matrix: Laws or Confusion?, 1991, pp. 43-52.

Rosenberry, W., et al., "Distributing Applications Across DCE and Windows NT," 1993.

Rosenberry, W., et al., Understanding DCE, O'Reilly & Associates, Inc., 1992.

Rosenthal, Doug, "EINet: A secure, Open Network for Electronic Commerce", IEEE, 1994.

Rosenthal, S., "Interactive Network: Viewers Get Involved," New Media, Dec. 1992, pp. 30-31.

Rosenthal, S., "Interactive TV: The Gold Rush is on," New Media, Dec. 1992, pp. 27-29.

Rosenthal, S., "Mega Channels," New Media, Sep. 1993, pp. 36-46.

Ross, P.E., "Cops versus robbers in cyberspace," Forbes, Sep. 9, 1996.

Rothstein, E., "Technology Connections, Making The Internet Come To You Through 'Push' Technology," N.Y. Times, Jan. 20, 1997, p. D5.

Rouaix, F., "A Web Navigator with Applets in Caml," INRIA.

Rozenblit, Moshe, "Secure Software Distribution", IEEE 0-7803-1811-0/94, 1994.

RSA Enters Wireless Arena, RSA Security News, viewed at <http://rsasecurity.com/news/pr/940112-6.html>, dated Jan. 12, 1994, pp. 1-2.

RSA Security; News; <http://rsasecurity.com/news/pr/9401.html.>, dated Jan. 12, 1994, pp. 1-2.

RSA'Developer's Suite for Secure Electronic transactions (SET), S/PAY, RSA Data Security, Inc., 1997.

Rubin et al., "Formal Methods for he Analysis of Authentication Protocols CITI Technical Report 93-7," Center for Information Technology Integration, Nov. 8, 1993.

Rubin et al., "Long Running Jobs in an Authenticated Environment," CITI Technical Report 93-1, Center for Information Technology Integration, Mar. 1993.

Rubin, A.D., "Trusted Distributed of Software Over the Internet," Bellcore, 1995, pp. 1-9.

Rucker, et al., "Personalized Navigation for the Web," Communications of the ACM, pp. 73-75, Mar. 1997.

Rushby, J.M., "Design and Verification of Secure Systems," ACM, 1981, pp. 12-21.

Russell, D., et al., Computer Security Basics, O' Reilly & Associates, Inc., 1991.

Russell, S., "Paradigms for Verification of Authorization at Source of Electronic Documents in an Integrated Environment," Computers & Security, vol. 12, No. 6, 1993, pp. 542-549.

Russell, S., "Planning for the EDI of Tomorrow Using Electronic Document Authorization," Computer Security (A-37), 1993, pp. 243-251.

Rutkowski, K., "PowerAgent Introduces First Internet 'Informediary' to Empower and Protect Consumers," Tech Talk News Story, Aug. 4, 1997, 1 page.

Sager, I., "Bits & Bytes," Business Week, Sep. 23, 1996, p. 142E.

Sag's durch die Blume, (undated), 5 pages http://123.koehntopp.de/marit/publikationen/steganographie/index.

Sammer et al., "New Tools for the Internet," Jeanneum Research, Graz University of Technology.

Sandhu, Ravi S., "The Typed Access Matrix Model," Proceedings of the IEEE Symposium on Security and Privacy, Oakland California, May 4-6, 1992, pp. 122-136.

Sandhu, Ravi S., et al., "A Secure Kernelized Architecture for Multilevel Object-Oriented Databases," Proceedings of the IEEE Computer Security Foundations Workshop IV, Jun. 1991, Franconia, NH, pp. 139-152.

Sandhu, Ravi S., et al., "Data and Database Security and Controls," Handbook of Information Security Management, Auerbach Publishers, 1993, pp. 1-37.

Sandhu, Ravi, S., et al., "Implementation Considerations for the Typed Access Matrix Model in a Distributed Environment," Proceedings of the 15th NIST-SCSC National Computer Security Conference, Baltimore, Maryland, Oct. 1992, pp. 221-235.

Saydjari, O.S., et al., "LOCK Trek: Navigating Unchartered Space," National Computer security Centre, 1989, pp. 167-175.

Schaumüeller-Bichl, I. et al., "A Method of Software Protection Based on the Use of Smart Cards and Cryptographic Techniques," Advances in Cryptography, Proceedings of EUROCRYPT 84, Apr. 9-11, 1984, 9 pages.

Schaumüler-Bichl, S., "IC-Cards in High-Security Applications," Voest-Alpine AG, (undated), pp. 177-199.

Scherwin, Rich, Pay-per-view Web content Feb. 1997; PC Computing, vol. 10, No. 2, p. 288(1) Dialog copy, 1 page.

Schill, A.B., et al., "DC++: Distributed Object-Oriented System Support on top of OSF DCE," 1993.

Schill, A.B., et al., "DCE-The OSF Distributed Computing Environment Client Server Model and Beyond," Oct. 1993.

Schill, A.B., et al., "Mobility Aware Multimedia X. 400 e-mail: A Sample Application Based on a Support Platform for Distributed Mobile Computing," Dresden University of Technology, Faculty of Computer Science, (undated), pp. 1-7.

Scholssstein, S., "America: The G7's Comeback Kid, International Economy," Jun./Jul. 1993, 5 pages.

Schneier, B., "Description of New Variable-Length Key, 64-bit block cipher (Blowfish)," Fast Software Encryption, Cambridge Security Workshop Proceedings, 1994.

Schneiner, Bruce, Applied Cryptography: Protocols, Algorithms, and Source Code in C, John Wiley & Sons, Inc., 1994.

Schulze, Dr., J., "Case of Application of the Generic CITED Model to the CITEDisation in the Software Distribution Process," ESPIRIT II, Project, Jan. 12, 1993.

Schurmann, J., "Pattern Classification, a Unified View of Statistical and Neural Approaches," John Wiley & Sons, Inc., 1996.

Schutzer, D., "A Need for a Common Infrastructure: Digital Libraries and Electronic Commerce," Citibank, D-Lib Magazine, Apr. 1996.

Sebes, E.J., "Overview of the Architecture of Distributed Trusted Mach," (undated), pp. 1-10.

Sebes, E.J., et al., "The Architecture of Triad: A Distributed, Real-Time, Trusted System," (undated), pp. 1-12.

Sebes, E.J., et al., "The Triad System: The Design of a Distributed, Real-Time, Trusted System," (undated), pp. 1-12.

Secure Cryptographic Devices (retail)—Part I: Concepts, Requirements and Evaluation Methods, ISO 13491-1, Jun. 15, 1998.

Secure Electronic Transactions; Mastercard and Visa+ C345.

Security Enhanced LINUX, National Security Agency, http://www.nsa.gov/selinus/, pp. 1-2.

Security in KayKOS.

Security Requirements for Cryptographic Modules, U.S. Department of Commerce (NIST), Jan. 11, 1994, pp. 1-53.

Serving the Community: A Public Interest Vision of the National Information Infrastructure, Computer Professionals for Social Responsibility, Executive Summary, Oct. 1993, 6 introductory pages, pp. 1-20 and Bibliography (pp. 21-23).

Shaffer, S.L., et al., Network Security, Academic Press, Inc., 1994.

Shear, Victor, "Solutuons for CD-ROM Pricing and Data Security Problems," CD ROM Yearbook 1988-1989 (Microsoft Press 1988 or 1989) pp. 530-533.

Shirley, J., "Guide to Writing DCE Applications," 1st Ed. 1992.

Shirley, J., et al., "Guide to Writing DCE Applications," 2nd Ed. 1994.

Short, K.L., Microprocessors and Programmed Logic, Prentice-Hall, Inc., 1981.

Sibert, Olin, et al. "Digibox: A Self-Protecting Container for Information Commerce," Proceedings of the First USENIX Workshop on Electronic Commerce, New York, NY, Jul. 1995, pp. 1-13.

Silbert, Olin, et al., "Securing the Content, Not the Wire, for Information Commerce," InterTrust Technologies Corporation, 1996, 12 pages.

Silbert, Olin, et al., "The Intel 80×86 Processor Architecture: Pitfalls for Secure Systems," (undated), 12 pages.

Sigsaly Security Digital Voice Communications in World War II, National Security Agency, http://www.nsa.gov/wwii/papers/sigsaly.htm, Oct. 13, 2000, pp. 1-2.

Simon et al., "Digital Images Protection Management in a Broadcast Framework: Overview/TALISMAN Solution," Thomson-CSF, RTBF, ART3000, UCL.

Sirbu et al., "NetBill: An Internet Commrece System Optimized for Network Delivered Services," Carnegie Mellon University.

Siuda, K., "Security Services in Telecommunications Networks," Seminar: Mapping New Applications Onto New Technologies, edited by B. Plattner and P. Gunzburger; Zurich, Mar. 8-10, 1988, pp. 45-52.

Smart Card 1993 Conference Proceedings, "Day 1: Communications and Marketing Systems & Market Overview," Lowndes Exhibition Organisers, Ltd., 1993, pp. 1-79.

Smart Card Technology International: The Global Journal of Advanced Card Technology, Global Projects Group, undated, pp. 1-151.

Smith, Mary Grace, et al., "A New Set of Rules for Information Commerce: Rights-Protection Technologies and Personalized-Information Commerce Will Affect All Knowledge Workers," CommunicationsWeek, Nov. 6, 1995.

Smith, S. et al., "Signed Vector Timestamps: A Secure Protocols for Partial Order Time," CMU-93-116, School of Computer Science Carnegie Mellon University, Pittsburgh, Pennsylvania, Oct. 1991; version of Feb. 1993, 15 pages.

Solomon, A., PC Viruses: Detection, Analysis and Cure, Springer-Verlag, (undated).

Solomon, Daniel, J., "Processing Multilevel Secure Objects," Proceedings of the 1981 Symposium on Security and Privacy, Apr. 27-29, 1981, Oakland, California, pp. 56-61.

Specification for Financial Message Exchange Between Card Acceptor and Acquirer, X9.15, American National Standard, American Banker's Association, 1990.

SSL 2.0 Protocol Specification, viewed at http://home.netscape.com/eng/security/SSL.2html., Jan. 23, 2003.

St. Johns, M., "Draft Revised IP Security Option", Network Working Group, RFC, 1038, Jan. 1998.

Stallings, W., Cryptograpy and Network Security: Principles and Practice, Prentice-Hall, Inc., 1999.

STARFISH State of the Art Financial Services for the in Habitants of Isolated Areas—Project Profile, Information Society technologies, time schedule, Jan. 21, 2000—Jun. 30, 2002.

Stefik, M., "Chapter 7, Classification," Introduction to Knowledge Systems, Morgan Kaufmann Publishers, Inc., 1995, pp. 543-607.

Stefik, M., "Letting Loose the Light: Igniting Commerce in Electronic Publication," Internet Dreams: Archetypes, Myths, and Metaphors. Massachusetts Institute of Technology, 1996, pp. 219-253.

Stefik, M., "Letting Loose the Light: Igniting Commerce in Electronic Publication," Xerox PARC, Palo Alto, CA, 1994-1995, 35 pages.

Stefik, M., "Trusted Systems," Scientific American, Mar. 1997, pp. 78-81.

Stephenson, T., "The Info Infrastructure Initiative: Data Super Highways and You," Advanced Imaging, May 1993, pp. 73-74.

Stepney et al., "Formal specification of an Access Control System," Software-Practice and Experience, vol. 17, No. 9, 1987.

Sterling, B., "Literary Freeware: Not for Commercial Use," Computers, Freedom and Private Conference IV, Chicago, IL, Mar. 26, 1994, pp. 51-55.

Strack, Hermann, "Extended Access Control in UNIX System V-ACLs and Context," Usenix Association, Proceedings of the Unix Security II Workshop, Aug. 27-28, 1990, Portland, Oregon, pp. 87-101.

Struif, B., "The Use of Chipcards for Electronic Signatures and Encryption," Proceedings for the 1989 Conference on VLSI and Computer Peripherals, IEEE Computer Society Press, 1989, pp. 4-155-4-158.

Stubblebine, S.G., "Security Services for Multimedia Conferencing," Proceedings of the 16th National Computer Security Conference, Baltimore, Maryland, Sep. 20-23, 1993, pp. 1-5.

Swedlow, Tracy, "2000: Interactive Enhanced Television: A Historical and Critical Perspective," Interactive TV Today.

Talisman: Tracing Authors' Rights by Labeling Image Services and Monitoring Access Network, ACTS, Swiss Partification in European Research Programs, Sep. 1, 1995, Aug. 31, 1998.

Tanenbaum, A.S., et al., "Amoeba System," Communications of the ACM, vol. 33, No. 12, Dec. 1990.

Tanenbaum, A.S., et al., "Distributed Operating Systems," Computing Surveys, vol. 17, No. 4, Dec. 1985, pp. 419-470.

Tanenbaum, A.S., et al., "Experiences with the Amoeba Distributed Operating System" Vrije Universiteit and Centrun voor Wiskunde en Informatica, 1990.

Tanenbaum, A.s., et al., "The Amoeba Distributed Operating System," 1990.

Tanenbaum, A.S., et al., "The Amoeba Distributed Operating-A Status Report," 1991.

Tanenbaum, A.S., et al., "Using Sparse Capabilities in a Distributed Operating System," Vrije Universiteit and Centre for Mathematics and Computer Science...

Tanenbaum, A.S., Modern Operating Systems, Prentice-Hall, Inc., 1992.

Tanenbaum, A.s., Operating Systems: Design and Implementation, Prentice-Hall, Inc., 1987.

Tardo et al., "Mobile Agent Security and Telescript," General Magic, Inc.

Technical Description: Pay-Per-View Copy Protection, Macrovision, Jun. 1994.

Technical Rationale Behind CSC-STD-003-85: Computer Security Requirements, http://www.radium.ncsc.mil/tpep/library/rainbow/CSC-STD-004-85.html, Jun. 25, 1985, pp. 1-40.

Technical Strategies for Protecting Intellectual Property in the Networked Multimedia Environment, IMA Intellectual Property Proceedings, vol. I, Issue 1, Jan. 1994.

TELENET TELEtraining Platform (on NETworks)—Project Profile, Information Society Technologies, time schedule, Mar. 6, 2000-Mar. 30, 2000.

Telescript Security, BYTE.com, Oct. 1994.

Templar Overview: Premenos, undated, 4 pages.

Templar Software and Services, Secure, Reliable, Standards-Based EDI Over the Internet, undated, 1 page.

The 1:1 Future of the Electronic Marketplace: Return to a Hunting and Gathering Society, (undated), 2 pages.

The Admide Products, web page.

The Benefit of ROI for database Protection and Usage Based Billing, Personal Library Software, 1987 or 1988, 5 pages.

The First USENIX Workshop on Electronic Commerce Proceedings, New York, New York, Jul. 11-12, 1995, Usenix Association.

The Future of Cited: A Feasibility Study, ESPIRIT II, Project 5469, CITED Project Review, Apr. 15, 1994.

The New Alexandria No. 1, Alexandria Institute, Jul.-Aug. 1986, 12 pages.

The PowerTV White Paper, powertv.com website, Oct. 11, 1996.

The Risks Digest, "Forum on Risks to the Public in Computers and Related Systems," vol. 15; Issue 39, Jan. 21, 1994, pp. 1-12.

The Risks Digest, "Forum on Risks to the Public in Computers and Related Systems," vol. 15; Issue 47, Feb. 9, 1994, pp. 1-12.

The Standard Business:Time for Change, European Commission DG111 Espirit Project 5th Consensus Forum, Nov. 3-4, 1998.

Think C: Object-Oriented Programming Manual, Symantec Corporation, 1989.

Think Pascal: The Fastest Way to Finished Software, Symantec Corporation, 1990, pp. 93-123.

Thomas, R.K., et al., "Implementing the Message Filter Object-Oriented Security Model without Trusted Subjects," Proceedings of the IFIP Workshop on Database Security, Aug. 19-21, 1992, Vancouver, Canada, 21 pages.

Thompson, Victoria P., et al., "A Concept for Certification of an Army MLS Management Information System", Proceedings of the 16th National Computer Security Conference, Sep. 20-23, 1993.

Thor, "A Distributed Object-Oriented Database System," MIT.

Thuraisingham, M.B., "Mandatory Security in Object-Oriented Database Systems," OOPSLA '89 Proceedings, Oct. 1-6, 1989, pp. 203-210.

Thuraisingham, M.B., et al., "Parallel Processing and Trusted Database Management Systems," ACM,1993.

Ting, T.C., et al., "Requirements, Capabilities and Functionalities of User Role Based Security for an Object-Oriented Design Model," Database Security, V: Status and Prospectus, 1992, pp. 275-297.

Tirkel, A.Z. et al., "Electronic Water Mark," (undated), 5 pages.

Toohey, J., Using OLE 2.X in Application Development, Que Corporation, 1994.

Townsend, J.E., "NIST on Internet Security," Mar. 22, 1994, pp. 1-15.

Transformer Rules Strategy for Software Distribution Mechanism-Support Products, IBM Technical Disclosure Bulletin, vol. 37, No. 48, Apr. 1994, pp. 523-525.

Trusted Unix Working Group (TRUSIX) Rationale for Selecting Access Control List Features for the UNIX (R) System, National Computer Security Center, Aug. 18, 1989.

Tuck, Bill, "Electronic Copyright Management Systems: Final Report of a Scoping Study for Elib," Jul. 1996.

TULIP Final Report, ISBN 0-444-82540-1, 1991, revised Sep. 18, 1996.

Tygar, J.D. et al., "Dyad: A System for Using Physically Secure Coprocessors," School of Computer Science, Carnegie Mellon University, Pittsburgh, PA, May 1991, 121-152 pages.

Tygar, J.D., et al., "Strongbox: A System for Self Securing Programs," CMU Computer Science: 25th Anniversary Commemorative, R. Rashid (ed.) Addison-Wesley, 1991, pp. 163-197.

Tygar, J.d., et al., "Cryptography: It's Not Just for Electronic Mail Anymore," CMU-CS-93-107, School of Computer Science Carnegie Mellon University, Pittsburgh, PA, Mar. 1, 1993, pp. 1-21.

Uhler, Stephen A., "PhoneStation, Moving the Telephone onto the Virtual Desktop," 1993 Winter USENIX, San Diego, California, Jan. 25-29, 1993, pp. 131-140.

UniverCD: The InterActive, Online Library of Product Information From Cisco Systems, Cisco Systems 1993.

Unix System v. Release 3.2. Programmer's Guide. vol. II, AT&T, Prentice Hall, 1989.

Valovic, T., "The Role of Computer Networking in the Emerging Virtual Marketplace," Telecommunications, (undated), 6 pages.

van Gilluwe, F., The Undocumented PC: A Programmer's Guide to I/O, Cpus, and Fixed Memory Areas, Addison-Wesley Publishing Company, 1994.

van Schyndel, R.G., et al., "A Digital Watermark," (undated), 3 pages.

Van Slype, Georges et al, "The Future of CITED; a Feasibility Study," ESPRIT II, Project 5469, The CITED Consortium, Nov. 15, 1993.

Van Slype, Georges et al., "Natural Language Version of the Generic CITED Model, Ver. 4.2, vol. I: Presentation of the Generic Model," ESPRIT II, Project 5469, The CITED Consortium, May 8, 1995.

Van Slype, Georges et al., "The Future of CITED: A Feasibility Study, Ver. 1.0, vol. II: Full Report," ESPRIT II, Project 5469, The CITED Consortium, Feb. 28, 1994.

Van Slype, Georges, "Draft CITED Interchange Formats, Ver. 1.0" ESPRIT II, Project 5469, the CITED Consortium, Jan. 28, 1994.

Van Slype, Georges, "Knowledge Economy Future Trends," CITED 5469.

Van Slype, Georges, "Natural Language Version of the generic CITED model vol. I: Presentation of the generic model, ver. 3.0", and "vol. II: CITED usage monitoring system design for computer based applications, ver. 1.0" Project 54659, The CITED Consortiuum.

Van Slype, Georges, "Natural Language Version of the Generic CITED Model, Ver. 2.1, vol. II ECMS (Electric Copyright Management System) Design for Computer Based Applications," ESPIRIT II, Project 5469, The CITED Consortium, May 8, 1995.

Van Slype, Georges, "PL4 RACE/ACCOPI Workshop on Conditional Access and Copyright Protection," ESPRIT II, Project 5469, Presentation of the CITED, Nov. 9, 1994.

Van Slype, Georges, "PL14 RACE/ACCOPI Workshop on Conditional Access and Copyright Protection," ESPRIT II, Project 5469, The CITED Consortium, Nov. 9, 1994.

Van Slype, Georges, "The CITED Approach, Ver. 4.0," ESPRIT II, Project 5469, The CITED Consortium, Apr. 20, 1994.

Van Slype, Georges, "The Future of CITED: A Feasibility Study, Ver. 1.0, vol. I: Summary Report and and Recommendations," ESPRIT II, Project 5469, The CITED Consortium, Feb. 28, 1994.

Van Slype, Georges, "The Future of CITED: A Feasibility Study, Ver. 1.1, vol. I: Summary Report and Recommendations," ESPRIT II, Project 5469, The CITED Consortium, Mar. 28, 1994.

Van Slype, Georges, "The Future of CITED: A Feasibility Study, Ver. 1.1, vol. III: Draft CITED Interchange Formats," ESPRIT II, Project 5469, The CITED Consortium, Feb. 28, 1994.

Vickers Benzel, T.C., et al., "Identification of Subjects and Objects in a Trusted Extensible Client Server Architecture," (undated), pp. 1-17.

Vittal, J., "Active Message Processing: Messages as Messengers," Bolt, Beranek and Mewman, Inc., 1980, pp. 175-195.

Voight, J., "Beyond the Banner," Wired, Dec. 1996, 6 pages.

Voydock, V.L., et al., "Security Mechanism in High-Level Network Protocols," Computing Surveys, vol. 15, No. 2, Jun. 1983, pp. 135-171.

Wagner, N. "Fingerprinting," Drexel University, IEEE Symp. On Info. and Privacy, Apr. 1993.

Walker, Bruce, J., et al., Computer Security and Protection Structures, Dowden, Hutchinson, & Ross, Inc., 1977.

Walker, S., "Notes from RSA Data Security Conference," Jan. 18, 1994, pp. 1-3.

Ware, W., Chairman RAND Corporation "Panel: The InterTrust Commerce Architecture," 1997, 6 pages.

Wayner, P., "Agents Away," Byte.com, May 1994, pp. 1-9.

Wayner, Peter, Digital Copyright Protection, Academic Press, 1997.

Weadon, P.D., "The SIGSALY Story," Dec. 10, 2002.

Weber, Robert, "Digital Rights Management Technologies," A Report to the International Federation of Reproduction Rights Organisations, Northeast Consulting Resources, Inc., Oct. 1995, 49 pages.

Weber, Robert, "Metering Technologies for Digital Intellectual Property," A Report to the International Federation of Reproduction Rights Organisations (Boston, MA), International Federation of Reproduction on Rights Organisations, Northeast Consulting Reesources, Inc., Oct. 1994, 29 pages.

Weder, A., "Life on the Infohighway," INSITE, (undated), pp. 23-25.

Weingart, S.H., "Physical Security for the ABYSS System," (IBM Thomas J. Watson Research Center, Yorktown Heights, NY), 1987, pp. 52-58.

Weitzner, D.J., "A Statement on EFF's Open Platform Campaign as of November," 1993, 3 pages.

Wells, Rob, Odyssey of Plastic Purchase; 20-Second Round Trip, Associated Press, Dec. 1993.

Wepin Store, Stenography (Hidden Writing), Common Law, 1995, 1 page.

What is Firefly?, <www.ffly.com,> Firefly Network, Inc., Firefly revision: 41.4, Copyright 1995, 1996, 1 page.

What the Experts Are Reporting on PowerAgent, PowerAgent Press Releases, Aug. 13, 1997, 6 pages.

What the Experts are Reporting on PowerAgent, PowerAgent Press Releases, Aug. 4, 1997, 5 pages.

White Paper: The Future of Electronic Commerce, A Supplement to Midrange Systems, Premeons Corp. Document from Internet: <webmaster@premeons.com>, Aug. 1995, 4 pages.

White, J.E., "Telescript Technology: The Foundation for the Electronic Marketplace," General Magic, 1994.

White, James E., "Telescript: The Foundation for the Electronic Marketplace", Ver. 5.0, General Magic, Inc., Nov. 30, 1993, pp. 1-13.

White, S.R., et al., "ABYSS: A Trusted Architecture for Software Protection," (IBM Thomas J. Whatson Research Center, Yorktown Heights, NY), 1987, pp. 38-50.

White, Steve R., et al., "ABYSS: An Architecture for Software Protection", IEEE Transactions on Software Engineering, vol. 16, No. 6, Jun. 1990.

Willett, S., "Metered PCs: Is Your System Watching You?, Wave Systems Beta Tests New Techology," IDG Communications, Inc., May 2, 1994, pp. 1-6.

Williams, S., "An MSJ Interview with Microsoft's Chief Architect of OLE, Tony Williams," Microsoft Systems Journal, Oct. 1993, pp. 55-66.

Williams, Tony, "Microsoft Object Strategy", Microsoft PowerPoint Presentation, 1990.

Winslet et al., "Formal Query Languages for Secure Relational Databases," ACM Transactions on Database Systems, vol. 19, No. 4, Dec. 1994.

Wobber, Edward, et al., "Authentication in the Taos Operating System", Digital Equipment Corporation, Dec. 10, 1993, 68 pages.

Wong, R., et al., "The SIDOS System: A Secure Distributed Operating System Prototpye," Odyssey Research Associates, Oct. 1989, pp. 172-183.

Woo, Thomas, Y.C., et al., "A Framework for Distributed Authorization," Proceedings of the 1st Conference Computer and Communication Security, Nov. 1993, pp. 112-118.

Wood, P.H., et al., UNIX System Security, Pipline Associates, Inc., 1985.

Working with Windows Objects, Microsoft Press, OLE 2 Programmer's Reference; vol. 1, 1994.

XIWT Cross Industry Working Team, Jul. 1994, 5 pages.

Yee, B., "Using Secure Coprocessors," CMU-CS-94-149, School of Computer Science, Carnegie Mellon University, Pittsburgh, PA, 1994, 94 pages.

Yee, B., et al., "Secure Coprocessors in Electronic Commerce Applications," Proceedings of the First Usenix Workshop on Electronic Commerce, New York, New York, Jul. 1995, 16 pages.

Yellin, F., Document from the Internet: "Low Level Security in Java," Sun Microsystems, 1996, 8 pages.

Young, W.D., "Verifiable Computer Security and Hardware: Issues," Technical Report, Computational Logic Inc., Sep. 1991, 43 pages.

Zeleznick, M.P., "Security Design in Distributed Computing Applications," Department of Computer Science, University of Utah, Dec. 1993, 16 pages.

Zelnick, Nate, "Keeping Business Safe on the Internet," PC Magazine, Apr. 25, 1995, pp. 1-2.

Zurko, M.E., "Panels at the 1997 IEEE Symposium on Security and Privacy," Oakland, CA, May 1997, 12 pages.

Collberg, Christian S., et al., "Obfuscation Techniques for Enhancing Software Security," U.S. Appl. No. 09/095,346, filed Jun. 9, 1998, 135 pages.

Office Action dated Oct. 2, 2001, for U.S. Appl. No. 09/095,346, filed Jun. 9, 1998, 54 pages.

Horne, William G., et al., "Systems and Methods for Watermarking Software and Other Media," U.S. Appl. No. 09/629,807, filed Jul. 31, 2000, 138 pages.

Office Action dated Feb. 24, 2004, for U.S. Appl. No. 09/629,807, filed Jul. 31, 2000, 41 pages.

Office Action dated Jan. 27, 2005, for U.S. Appl. No. 09/629,807, filed Jul. 31, 2000, 26 pages.

US 5,748,741, 05/1998, Johnson et al. (withdrawn)*

* cited by examiner

```
#ifndef CODESPACE_H
#define CODESPACE_H

// A CodeSpace makes it possible to dynamically allocate space in code section.

int const CodeSpaceBlockSize = 4; // Must be greater than sizeof(void*).

#define CodeSpaceUnregistered 0
#define CodeSpaceRegistered 1
define DataSpace 2 class CodeSpace {
public:
        CodeSpace();

void *alloc(int bytes);
        // Allocates "bytes" number of chars.
        // (If no code-space is available, calls malloc for data-space.)

void dealloc(void *block);
        // Deallocates "block" allocated using "alloc".

inline void create() {
                // Creates space at the point of call and registers it.

char *space;
                _asm {
                        push eax
                        lea eax, start
                        mov space, eax
                        pop eax
                        jmp end
                        start:
                                _emit CodeSpaceUnregistered
                                // Create space of CodeSpaceBlockSize.
                                nop
                                nop
                                nop
                                nop
                        end:
                }
                if (*space==CodeSpaceUnregistered) Register(space);
        } private:
        void *freeBlockList;
        // Linked list of free blocks, inlined in the blocks.

void Register(char *space);
        // Adds "space" in freeBlockList.
};

#endif /* CODESPACE_H */
```

```
#include "codespace.h"
#include <stdlib.h>
#include <malloc.h>

CodeSpace::CodeSpace() {
        freeBlockList = 0;
} void CodeSpace::Register(char *space) {
        *space = CodeSpaceRegistered;
        void *block = space+1;
        // Add block in front of freeBlockList.
        *(void **) block = freeBlockList;
        freeBlockList = block;
} void *CodeSpace::alloc(int bytes) {
        if (bytes > CodeSpaceBlockSize || freeBlockList == 0) {
                // Fall back to malloc.
                char *space = (char *) malloc(bytes+1);
                if (space==0) return 0; // malloc failed
                *space = DataSpace;
                return (void *)(space+1);
        }
        // Return the block from the front of the list.
        void *block = freeBlockList;
        freeBlockList = *(void **)block;
        return block;
} void CodeSpace::dealloc(void *block) {
        char *space = ((char *)block)-1;
        if (*space == DataSpace) {
                free(space);
                return;
        }
        *(void **) block = freeBlockList;
        freeBlockList = block;
}
```

Fig. 8B

```
#include <stdio.h>
#include "codespace.h"

CodeSpace cs;

void main() {

// Create some blocks
830        cs.create();
           cs.create();

int size = CodeSpaceBlockSize;
832    void *b1 = cs.alloc(size);        // allocate code-space
834    void *b2 = cs.alloc(size+1);      // allocate using malloc
836    void *b3 = cs.alloc(size-1);      // allocate code-space
838    void *b4 = cs.alloc(size);        // allocate using malloc 840    cs.dealloc(b1);

842    void *b6 = cs.alloc(size);        // allocate code-space

//# SOFTWARE SELF-DEFENSE SYSTEMS AND METHODS

RELATED APPLICATIONS

This application claims priority from U.S. Provisional Patent Application Ser. No. 60/146,419, entitled "Software Self-Defense Systems and Methods," filed Jul. 29, 1999, and is related to commonly-assigned U.S. patent application Ser. No. 09/629,807, entitled "Systems and Methods for Watermarking Software and Other Media," filed Jul. 31, 2000 ("the Software Watermarking application"), each of which is hereby incorporated in its entirety by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the enhancement of software security. More particularly, the present invention relates to systems and methods for enabling software to detect and/or resist tampering, interpretation, decoding, reverse engineering, and/or other forms of attack.

BACKGROUND OF THE INVENTION

Advances in microelectronics and networking technology have enabled the development of increasingly complex computer systems. The software that controls these systems or operates thereon has also become exceedingly complex and costly to develop. As a result, companies will often wish to protect their software from reverse-engineering by competitors, from copying by pirates, or from tampering by persons attempting to undermine the integrity of the software's operation. While copyright law and patent law provide some level of protection, in many instances these legal protections are insufficient. What is needed are technical systems and methods for shielding the operational details of a piece of software from the view of others, and for resisting attempts to compromise the integrity of the software's operation. Yet due to the way software is often deployed, these are difficult tasks. For example, application software is often installed on a consumer's computer system, which is typically remote from the software developer's system. The consumer's system may thus provide an environment in which an attacker can analyze and modify the software with relative ease and with little risk of detection. Accordingly, systems and methods are also needed for protecting the secrecy and integrity of software when it is run in potentially hostile environments.

SUMMARY OF THE INVENTION

Systems and methods for protecting software programs and data from unauthorized analysis, attack, and/or modification are described herein. It should be appreciated that the present invention can be implemented in numerous ways, including as a process, an apparatus, a system, a device, a method, or a computer readable medium. Several inventive embodiments of the present invention are described below.

In one embodiment, a system for obfuscating computer code is provided. The system includes a memory unit containing a binary code modification tool, a program module that includes a variety of routines for applying obfuscation transformations to computer code, and a computer program operable to associate or link the binary code modification tool with the program module to yield an obfuscation program. The system also includes a processor for executing the obfuscation program and other programs stored in the memory unit. When executed, the obfuscation program is operable to accept computer code as input, and to perform obfuscating transformations on the computer code, the obfuscating transformations tending to render the computer code more resistant to reverse engineering, decompilation, and/or other attacks.

In another embodiment, a method for obfuscating a computer program is described. The method includes the step of linking a binary code modification tool with a program module containing code for performing a variety of obfuscation transformations. The linked program is able to accept a target program as input, and to apply obfuscation transformations to the target program to yield an obfuscated version of the target program.

In yet another embodiment, a system is disclosed for protecting a computer program from unauthorized modification and analysis. The system includes means for obfuscating the computer program, means for incorporating one or more tamper-resistance mechanisms into the computer program, and means for watermarking the computer program. The computer program can be obfuscated by applying a variety of transformations that are designed to make the computer program more difficult to understand, modify, and/or reuse. The obfuscation transformations include techniques for obfuscating the computer program's local structure, control graph, and/or data structures, and include techniques that exploit concurrency and non-determinism. Tamper-resistance mechanisms can be used to determine whether the computer program is connected to a debugger or has code or data that have been modified. Robust records of whether tampering has been detected can be maintained. In addition, detected tampering can be reported to an external agent, and/or can trigger the intentional destruction or modification of sensitive information, or the termination of program execution. In one embodiment, a response to detected tampering is intentionally delayed from the time that tampering was detected.

In yet another embodiment, a collection of macros and a binary image postprocessor are used to add watermarks to the computer program, to implement tamper-resistance mechanisms, and/or to implement other self-defensive mechanisms. The macros are inserted into the computer program. The computer program may then be compiled or subjected to other transformations. The binary image postprocessor locates the distinctive patterns or "primers" that the macros create in the computer program. The binary image postprocessor then adds watermarks, code for performing tamper-resistance measures, and/or other code or data into the spaces reserved by the primers.

In another embodiment, the invention provides a technique for compensating for tampering with the clock on the platform on which a computer program is executed. A signed time offset is used to relate the platform's clock to a clock maintained by an external agent. The time offset is stored with the computer program, and when the computer program is executed the time offset is added to time measurements obtained from the platform's clock. The time offset is updated when the computer program communicates with the external agent.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 8A, 8B, 8C, 8D, and 8E illustrate a module for creating spaces in executable code and for making them available for data and/or instructions.

DETAILED DESCRIPTION

Figure 1:
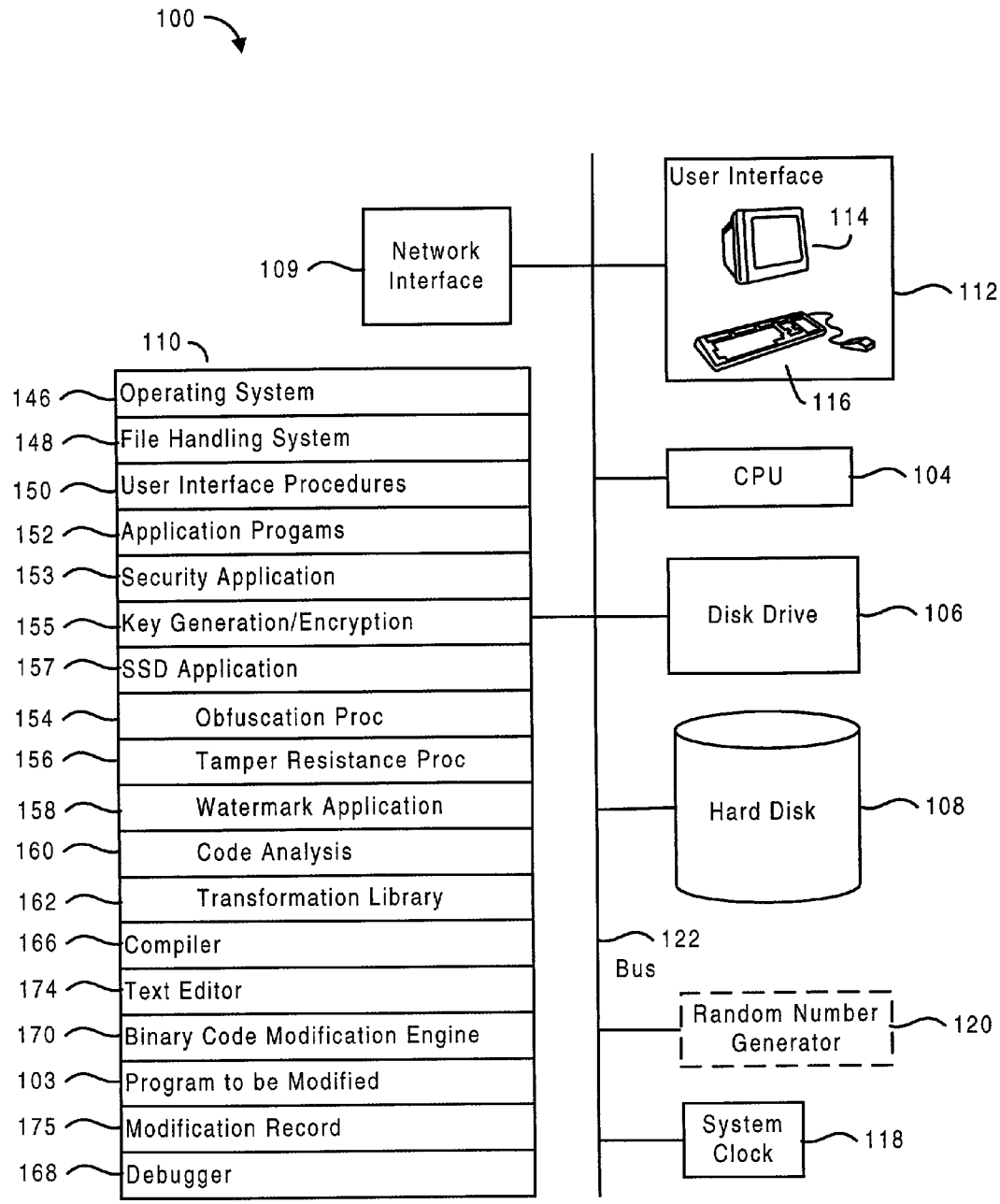
FIG. 1 illustrates a system for practicing an embodiment of the present invention.

A detailed description of the present invention is provided below. While the invention is described in conjunction with several embodiments, it should be understood that the invention is not limited to any one embodiment. On the contrary, the scope of the invention is limited only by the appended claims, and the invention encompasses numerous alternatives, modifications and equivalents. Although numerous specific details are set forth in the following description in order to provide a thorough understanding of the present invention, it should be understood that the present invention may be practiced according to the claims without some or all of these details. Moreover, for purposes of clarity, certain technical material that is known in the fields related to the invention has not been described in detail in order to avoid unnecessarily obscuring the invention.

The following U.S. patents and applications, each of which is assigned to the assignee of the current application, are hereby incorporated in their entirety by reference: Ginter et al., "Systems and Methods for Secure Transaction Management and Electronic Rights Protection," U.S. Pat. No. 5,915,019, issued Jun. 22, 1999 ("the Ginter '019 patent"); Ginter et al., "Trusted Infrastructure Support Systems, Methods and Techniques for Secure Electronic Commerce, Electronic Transactions, Commerce Process Control Automation, Distributed Computing, and Rights Management," U.S. patent application Ser. No. 08/699,712, filed Aug. 12, 1996 ("the Ginter '712 application"); Van Wie et al., "Steganographic Techniques for Securely Delivering Electronic Digital Rights Management Control Information Over Insecure Communications Channels," U.S. Pat. No. 5,943,422, issued Aug. 24, 1999 ("the Van Wie '422 patent"); Ginter et al., "Systems and Methods for Secure Transaction Management and Electronic Rights Protection," U.S. Pat. No. 5,892,900, issued Apr. 6, 1999 ("the Ginter '900 patent"); Shear et al., "Systems and Methods Using Cryptography to Protect Secure Computing Environments," U.S. patent application Ser. No. 08/689,754, filed Aug. 12, 1996 ("the Shear '754 application"); Maheshwari et al., "Trusted Storage Systems and Methods," U.S. patent application Ser. No. 09/617,148, filed Jul. 17, 2000 ("the Maheshwari application"); Sibert, "Systems and Methods for Using Cryptography to Protect Secure and Insecure Computing Environments," U.S. patent application Ser. No. 09/628,692, filed Jul. 28, 2000 ("the Sibert application"); Shear et al., "Cryptographic Methods, Apparatus & Systems for Storage Media Electronic Rights Management in Closed & Connected Appliances," U.S. patent application Ser. No. 08/848,077, filed May 15, 1997 ("the Shear '077 application"); Collberg et al., "Obfuscation Techniques for Enhancing Software Security," U.S. patent application Ser. No. 09/095,346, filed Jun. 9, 1998 ("the Collberg application"); and Shear, "Database Usage Metering and Protection System and Method," U.S. Pat. No. 4,827,508, issued May 2, 1989 ("the Shear '508 patent").

Broadly speaking, software self-defense is the art of preparing self-defensive programs (SDPs). Because SDPs are intended for execution in hostile environments, they contain various software self-defense measures or mechanisms designed to prevent, detect, and/or report attacks. While software self-defense mechanisms generally do not provide the same level of protection as the physical security of tamper-resistant hardware, software self-defense mechanisms can significantly increase the difficulty of attacks and reduce their probability of success, especially when several software self-defense mechanisms are used together. The appropriate combination of software self-defense mechanisms for a particular application will depend on the nature of the anticipated attacks, the value of the application, the value of the services provided or protected by the application, and/or the hardware environment in which the application is executed.

A variety of novel software self-defense mechanisms are described below. These mechanisms—such as obfuscation, tamper resistance, and watermarking—typically involve the transformation of an original software program into an "equivalent" software program. Equivalence is not an absolute notion; it has different meanings in different contexts and may be useful for different purposes. In the context of SDPs, however, two object programs are generally considered equivalent if they could have been produced from the same program source code by correct compilers, or if they differ in a manner that would nevertheless be acceptable in compiler output. Accordingly, a transformed program need not be identical to the original program to be considered equivalent, and will generally have some observable differences when executed on a computer. For example, different values may be stored in particular RAM locations, execution times may be different, and/or different results may be computed.

However, while various aspects of the computer program may be altered by the transformations, if software self-defense mechanisms are to be useful, certain aspects of the computer program must remain substantially invariant. Which aspects of the computer program must not be varied depends on the use to which the computer program will be put. Thus, while strong forms of equivalence are preferred, and indeed necessary in certain instances, in other instances weaker forms of program equivalence will suffice. For example, if a program includes code that receives two inputs, processes them, and generates an output, versions of the program can be watermarked by altering the results of the algorithm. In a first instance, inputs 2 and 2 may yield 4, in a second instance, 2 and 2 may yield 5, and in a third instance, 2 and 2 may yield 6. Under a strict "functional equality" definition of equivalence, and where such equality is necessary, these programs would not be equivalent, as they produce different results for the same input. However, in those instances where one is only interested in whether the result is a positive or a negative number, such programs could be considered equivalent. As yet another example of the relative nature of equivalence, the manner in which numbers are rounded may be significant in some instances, but insignificant in others.

FIG. 1 illustrates a system 100, such as a workstation or personal computer, for practicing the present invention. As shown in FIG. 1, system 100 might include some or all of the following:

- a central processing unit (CPU) 104;
- a magnetic and/or optical disk drive 106 for reading from and/or writing to diskettes, CDs, or other storage media;
- a non-volatile storage unit 108, such as a hard disk drive, for storing data and program files;
- a network interface 109 for connecting computer system 100 to a network such as the Internet;
- a system memory unit 110, preferably including both high-speed random access memory (RAM) and read only memory (ROM), for storing, e.g., system control programs, data, and application programs loaded from disk drive 106, storage unit 108, and/or network interface 109, such programs including programs incorporating computer code that implements or embodies aspects of the present invention;
- a user interface 112, including a display 114 and one or more input devices 116;
- a system clock 118;
- an optional random number generator 120; and
- one or more internal buses 122 for interconnecting the aforementioned elements of the system.

The operation of system 100 is controlled primarily by programs stored in system memory 110 (e.g., RAM) and executed by CPU 104. These programs could include:

- an operating system 146;
- a file handling system 148;
- a set of user interface procedures 150, for handling input from user interface 112 and for displaying output to the user on display 114;
- one or more application programs 152;
- a security module 153 for securely transmitting and receiving data to and from network interface 109, display 114, and/or disk drives 106 and 108;
- a binary code modification engine 170, described in more detail below, for locating and identifying individual instructions, data, symbol tables, and other elements of a target program 103, and for modifying and/or rearranging these elements;
- a software self-defense control program 157, described in more detail below, including without limitation procedures or modules 154 for applying the obfuscation transformations described herein to a target program 103; procedures or modules 156 for adding tamper resistance measures to target program 103; and/or procedures or modules 158 for applying watermarks to target program 103;
- software 155 for generating cryptographic keys and/or for performing encryption and decryption, hashing, and/or other cryptographic operations;
- one or more compilers 166 for translating source code files into object code files;
- a debugger 168;
- an optional decompiler (not shown); and a program and/or text editor 174 for creating and/or modifying program or data files.

It should be appreciated that while FIG. 1 sets forth an exemplary system for practicing embodiments of the present invention, other systems with different architectures and different configurations of subsystems could also be used. For example, embodiments of the present invention can be practiced using only a limited subset of the components shown in FIG. 1. Moreover, while FIG. 1 has been described in the context of a system for performing obfuscation and other self-defensive transformations on a target program 103, it will be appreciated that the architecture shown in FIG. 1 is also generally representative of the type of system on which the obfuscated target program will ultimately run. Accordingly, it should be understood that the system shown in FIG. 1 is intended to be illustrative and not limiting.

Various software self-defense tools and mechanisms will now be described.

1. Program Obfuscation

Generally speaking, "obfuscation" refers to a class of software self-defense techniques that produce transformed programs that are more difficult to understand, modify, and/or reuse than the original programs from which the transformed programs were derived. Because attempts to attack or otherwise tamper with a program will generally require an understanding of the program's functionality, such defensive mechanisms are clearly advantageous. While an obfuscated program may demonstrate different space and time behavior than the original program from which it was derived, the obfuscated program will typically be functionally equivalent to the original program in many respects, and will also typically be expressed in the same format.

Nearly all software programs can be obfuscated, including, for example, binary program images such as Microsoft® Windows® executables; byte-code images such as Java™ class files; intermediate code forms produced by compilers; assembly language programs; source code representations; and various other program representations. Additional information on obfuscation can be found in the Collberg application, which was previously incorporated by reference herein.

As mentioned, the job of an attacker is ultimately to understand the function and/or structure of an obfuscated program and to exploit that understanding to his or her advantage. Because few obfuscation transformations or mechanisms are effective against all forms of attack, effective obfuscation often requires a combination of transformations.

Obfuscating transformations generally fall into one or more of the following categories: (a) those that add complexity, (b) those that remove structure, (c) those that remove useful information, and (d) those that add disinformation. While increasing the space and time costs of a program, a transformation that adds complexity or removes structure will typically make both static and dynamic analysis of the program more difficult, while rendering manual analysis more time-consuming and automated analysis less precise. Similarly, the removal of useful information, such as symbol tables, leaves the attacker with less to work from; while the addition of disinformation, such as misleading symbol tables, can cause an attacker to make incorrect assumptions.

Although obfuscating transformations can be applied manually as well as automatically in accordance with the principles of the present invention, the automatic application of obfuscating transformations is generally preferable because in most instances such transformations should be applied pervasively and repeatedly to increase their effectiveness. In addition, manual transformations often leave the author with a program that is less understandable and maintainable.

1.1. Obfuscation Tools

A variety of tools and techniques can be used to perform obfuscating transformations on a target computer program. Several exemplary tools and techniques are described below; however, it will be appreciated that any suitable combination of tools or techniques could be used to implement the obfuscation (and other) transformations described herein. Moreover, it will be appreciated that while the tools and techniques presented in this section can be advantageously used to obfuscate a piece of software, these techniques can also be used to implement the other software self-defensive mechanisms described herein.

As previously noted in connection with FIG. 1, in one embodiment a software self-defense control program is used to perform automatic obfuscation transformations on target programs 103. Software self-defense control program 157 can be formed by linking a library of obfuscation procedures 162 with a binary modification tool 170. The resulting program 157 can thus make advantageous use of the binary modification tool's ability to read and manipulate a target program's binary image in order to perform the transformations specified by library module 162.

Illustrative examples of well-known binary modification tools include the technologies underlying the Purify memory-use tracing tool, a product of Rational Software Corp. (formerly Pure Atria Software) of 18880 Homestead Road, Cupertino, California; the TracePoint framework for binary instrumentation of programs for test coverage and performance measurement (a product of TracePoint Technology Inc. that is believed to no longer be marketed); the Etch program performance optimization and evaluation system developed at the University of Washington, Box 352350, Seattle, Wash. (see also http://memsys.cs.washington.edu/memsys/html/etch.html, and Romer et al., "Instrumentation and Optimization of Win32/Intel Executables Using Etch," Proceedings of the Usenix NT Conference (1997), which is hereby incorporated by reference in its entirety); and EEL, a research project for manipulating SPARC architecture programs conducted by James Larus at the University of Washington (see Larus et al., "EEL: Machine-Independent Executable Editing," Proceedings of the 1995 ACM SIGPLAN Conference on Programming Languages Design and Implementation (June 1995)).

Binary modification tools typically can—or can with straightforward modification—provide some or all of the following capabilities:

the ability to locate and identify individual instructions, data, symbol tables, and other program elements, and to communicate this information to the software modules responsible for modifying the program;

the ability to perform control flow analysis to separate programs from data in non-tagged architectures;

the ability to identify basic blocks, extended basic blocks, or other units of code execution—a basic block generally being a sequence of instructions having a single point of entrance and a single point of exit, see, e.g., Waite and Goos, *Compiler Construction*, page 329 et seq. (Springer-Verlag, 1984), which is hereby incorporated by reference;

the ability to identify procedures or other sequences of instructions that are the target of a subroutine or function call;

the ability to insert instructions before and/or after other identified instructions, and to ensure that other instructions are appropriately relocated and updated so that the modified program functions correctly;

the ability to rewrite and/or modify existing instructions in the program;

the ability to insert new functions and procedures, including ones of non-trivial complexity (e.g., mapping functions);

the ability to update symbol information, for example, to regenerate the mapping between symbols and lines of source code in a modified program; and the ability to update other program sections, such as the relocation information.

As described below, the capabilities of a binary modification engine can be advantageously used in concert with other tools to implement software self-defense techniques.

Figure 2:
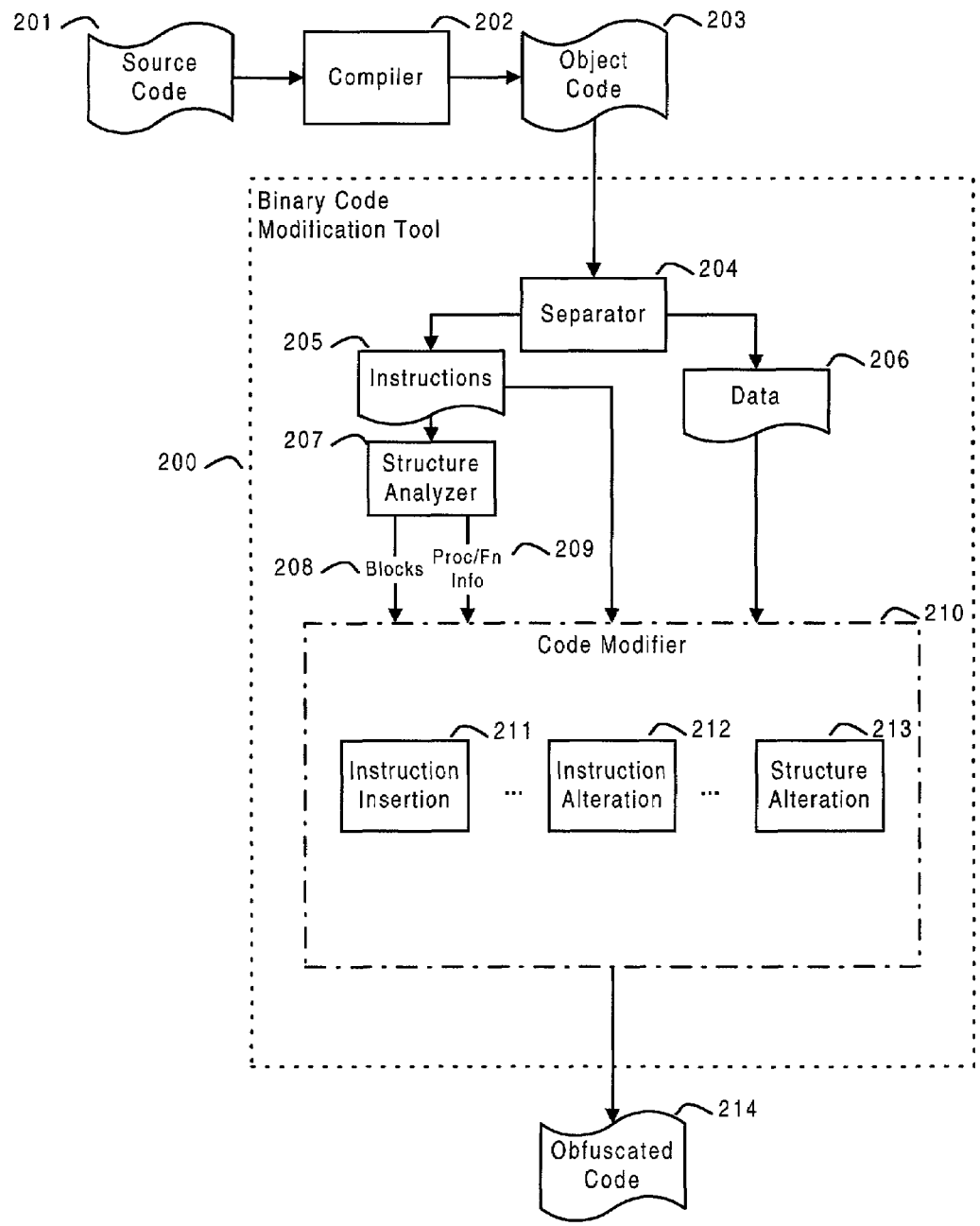
FIG. 2 illustrates the functionality and operation of a binary program modification tool in accordance with one embodiment of the present invention.

FIG. 2 provides a more detailed illustration of the functionality and operation of a binary modification tool 200 in accordance with an embodiment of the present invention. As shown in FIG. 2, source code 201 is passed through compiler 202 to yield object code 203. Object code 203 typically includes both instructions and data. Binary code modification tool 200 receives object code 203 and sends code 203 to separator 204, which separates object code 203 into instructions 205 and data 206. Instructions 205 are sent to structure analyzer 207, which separates the instructions into basic blocks 208 and identifies procedures and functions 209. Obfuscation occurs in code modifier 210, which takes instructions 205, data 206, basic block information 208, and procedure/function information 209, and performs a variety of transformations, including, for example, instruction insertion 211, instruction alteration 212, structure alteration 213, and/or any other suitable transformations.

It is to be understood that FIG. 2 illustrates merely one embodiment of a binary modification tool 200. Binary modification tool 200 may perform additional analyses and/or transformations, and may perform the steps shown in FIG. 2 in a different order or in an iterative fashion. In addition, while in one embodiment binary modification tool 200 is implemented as a software tool, it should be understood that any suitable implementation of binary modification tool 200 could be used, including without limitation, implementations as a suite of tools, a combination of hardware and/or software processes occurring at different times and/or on different computers, or any other suitable implementation.

For example, instead of analyzing and operating upon the output of compiler 202, a code modification tool can be integrated within compiler 202. In this embodiment, compiler 202 may include a mode switch allowing compiler 202 to be switched into a mode in which it applies software self-defense techniques to yield obfuscated object code. In another illustrative embodiment, the functionality of a code modification tool is only partially integrated with compiler 202. In this embodiment, compiler 202 is enhanced to generate "hints" for applying program modifications. The hints can act as substitutes for the output of the relatively complex code analysis process performed by binary modification tool 200, so that only the relatively simple modification process needs to be performed by a post-compilation tool. In one embodiment, the hints identify instructions, data, blocks, procedures, and/or functions, thus obviating the need for, e.g., separator 204 and structure analyzer 207. In a somewhat more complex embodiment, compiler 202 includes the ability to generate hints that identify variable locations and references, thus permitting them to be re-mapped by a post-compilation modification tool—for example, by exchanging locations of two stack variables, then updating all instructions that refer to those variables accordingly. In yet another embodiment, hints are derived from the conventional symbolic debugging information that compilers typically place in binary images (such as the locations of variables, procedures, and the like). Thus, compiler 202 can apply software self-defense techniques directly (e.g., as part of code generation), or can generate information that can be used to implement self-defense techniques subsequent to compilation (e.g., by a linker, a software self-defense tool such as binary program modification tool 200, or other post-processing tools or manual processes). For example, in one embodiment the user of a binary program modification tool 200 could instruct it to perform a particular type of obfuscation, or to apply an obfuscation technique with a particular level of strength, to functions with specified names, or to code that refers to specific variables, or for other specialized purposes; in such a case, tool 200 could be guided by the symbolic name information produced by compiler 202.

As noted above, compiler integration advantageously obviates the need for some of the complex analysis and decompilation performed by a post-compilation modification tool, since a compiler typically understands where instructions are in the code, how the basic blocks are structured, and so forth. Integration is also advantageous in that a compiler can be more sophisticated about the nature of the software self-defense techniques it employs, and can be used to apply global software self-defense techniques at effectively the same time as more localized software self-defense techniques. For example, a compiler can randomly rearrange the order in which variables are allocated to stack frames or static storage. Such a technique materially improves the resistance to a comparison of different versions of the program, but can be impractical to implement with a post-compilation tool.

Compiler integration also has some relative disadvantages. For example, compilation can be expensive. Building a one-megabyte binary image from source code might take several hours, whereas analyzing the source code and applying software self-defense mechanisms might take only a few minutes. Thus, compiler integration can make it more expensive to generate many differently-obfuscated versions of a program. In addition, compilers are often relatively complex. The practical difficulties of adding another function to an already-complex program may, for some applications, merit the use of a separate tool. Compilers are also many and varied. Thus, while integration with a given compiler may be useful for producing obfuscated code of the type produced by that compiler, it may be unable to produce obfuscated code of the type produced by other compilers.

One of skill in the art will understand that while software self-defense techniques can be advantageously applied to binary or object programs through the use of, e.g., binary modification tools, these techniques can also be applied to programs in symbolic languages, including without limitation assembly language, C, C++, FORTRAN, Java, and Visual Basic, to name just a few examples. For example, to apply software self-defense techniques directly to an assembly language program, an assembler could be created or modified to incorporate software self-defense techniques, or a modification tool could be built that operates on assembly code. For example, binary modification tool 200 could be modified to accept assembly code instead of object code 203, while maintaining the basic functionality shown in FIG. 2.

If the assembly language is output from a compiler, an assembler capable of creating corresponding machine code can be constructed with relative ease, since such an assembler is typically more straightforward than a general-purpose assembler, as the assembly language code produced by a compiler is typically very constrained (e.g., it typically does not contain macros, header files, or very many symbolic definitions) and more easily processed than programmer-produced assembly language code. Compiler-generated assembly code also typically contains information such as branch labels and function names that enable the relatively straightforward identification of basic block, function, and procedure locations. Thus, as with the forms of partial compiler integration discussed above, the integration of software self-defense techniques into a symbolic language processor, such as an assembler, can eliminate the need to perform complex analysis to locate instructions, blocks, and functions, as this type of information is typically already provided by the compiler and/or symbolic language processor. Moreover, this technique is, to a significant extent, compiler-independent, and thus enables output from different compilers to be processed by the same tool.

Software self-defense techniques, and especially those that deal with the location of stack data and static data, can also be applied by a source code preprocessor that rearranges the order of data declarations and structure/class members in source code 201. With reference to FIG. 2, such a source code preprocessor may, for example, be applied to source code 201 before it reaches compiler 202, or, alternatively, may be integrated with compiler 202. Although the use of a source code preprocessor can be somewhat expensive (since, e.g., differently-obfuscated versions of a program will need to be compiled separately), it can provide a material benefit by making object code for data references differ from one version of a program to another without having to add valueless instructions. Such preprocessor-based obfuscation techniques will generally work well for structure and class declarations. These techniques also work well for, e.g., conventional C programs, in which all variables in a function are typically declared at the beginning, and can therefore be easily rearranged. Preprocessor-based techniques can be applied independently of build tools, both in terms of how many different versions are created and in terms of which particular source code warrants multiple versions. Moreover, preprocessor-based techniques are typically compiler-independent, and thus do not require access to the compiler's source code. Although preprocessor techniques are somewhat more likely to exercise latent program flaws (since they change the program's references to dynamic data), preprocessor-based techniques have the advantage of generating meaningful symbol tables, thus making it easier to debug different program versions (at least before a post-build tool is applied). Techniques such as self-validation, automated cryptography, obscuring symbol tables by renaming variables, and concealing external calls can also be effectively supported in a preprocessor context, particularly in combination with a post-build tool.

Thus, it should be appreciated that there are many different ways to implement the obfuscation techniques described herein.

A variety of obfuscation techniques will now be presented.

1.2. Overview of Attack-Specific Techniques

Obfuscation techniques that are directed at specific types of attacks can be particularly effective in hindering deobfuscation. Illustrative types of attacks, listed in approximately increasing order of difficulty, include:

1. Scanning a program's static code and symbol table, looking for strings or instructions that are likely to be important;
2. Disassembling a program's code and trying to understand it;
3. Running code under a debugger, setting breakpoints, single-stepping, and examining memory and registers.

The present invention provides systems and methods for countering some or all of these specific threats. For example, as described in detail below, an attack of the first type can be defended against by encrypting the program's code, and/or by eliminating the symbol table information from the binary or replacing it with disinformation.

The second attack can be defended against by, e.g., ensuring that the code (and the start-up portion in particular) includes hand-crafted segments that result in computed branches, or returns that do not match calls. The code should be self-modifying (e.g., it should overwrite itself as soon as it has been executed) and branch-rich, and preferably should include easily-discovered code that appears to be startup code but whose primary purpose is to provide disinformation. An array of carefully chosen keys and a loop such as: (a) decrypt region of memory, (b) branch to it, and (c) repeat unless the decrypted region is branched outside, can also be included.

To combat the third type of attack, code sequences can be crafted that function differently (e.g., branch to a different place) when a breakpoint is set, or when single-stepping is attempted. Because certain debuggers are detectable, either directly or by obtaining information from the operating system, the program can also be configured to determine if a debugger is running, and, if so, to take defensive action. Yet another line of defense is to use the real-time clock to ensure that key instruction sequences are executed in very short periods of time. In so doing, it may be necessary to disable interrupts to keep the program from failing due to normal time-sharing. However, depending upon the circumstances, it is generally acceptable to simply loop until an instruction sequence is executed within a predetermined amount of time, although preferably the loop should not be so tight that it is easy to recognize. Another defense is to periodically compare a location in the code with a location on disk (e.g., in the operating system registry), and to increment both if they agree. In yet other instances, the third type of attack may be defended against by detecting differences in caching or other hardware-dependent behavior exhibited by debugger-controlled code.

To facilitate a more detailed description of the present invention, novel obfuscation techniques are separated below into the following general categories: local obfuscation, control graph obfuscation, obfuscation through concurrency, data structure obfuscation, and optimization obfuscation. It will be appreciated, however, that any given obfuscation technique may fit into more than one category.

1.3. Local Obfuscation

"Local obfuscation" refers generally to obfuscation that can be safely applied without performing substantial global analysis of the SDP. The following sections describe a variety of local obfuscation techniques.

Local obfuscation can be performed manually and/or automatically using any suitable code-modification tool. Many of the local obfuscation techniques set forth below are described in terms of modifying the binary object code of a program through the use of a general-purpose binary program modification engine and a set of related processing programs developed for obfuscation. However, one of ordinary skill in the art will appreciate that the present invention does not require use of a general-purpose binary modification engine, and that the described techniques are readily-applicable to code other than binary or object code. It should also be noted that while many of the examples set forth herein are in the context of the Intel® 80×86 instruction set and the Windows® 95, Windows 98, and/or Windows NT operating systems, the techniques set forth herein are readily adaptable to other contexts, instruction sets, and/or operating systems. For example, many of the techniques set forth herein involve control transfers and/or computations for which other architectures have close or direct equivalents. Thus, one of ordinary skill in the art will understand that while their effectiveness may vary somewhat, many of the techniques described in this section and throughout the specification are readily applicable across a broad range of architectures and/or operating systems, including without limitation Power PC, ARM, MIPs, SPARC, Itanium, the Motorola 68000 family, and M*COR.

1.3.1. Local Obfuscation Techniques

Program customization, micro-obfuscation, and other techniques can be used separately or in combination to construct different versions or instances of a single program and/or to make it difficult to locally understand small portions of code. For purposes of discussion, these techniques can be grouped as follows:

1. Techniques that discourage pattern-matching. These techniques focus on constructing different instances of a program that behave equivalently, but that cannot be easily compared or searched for recognizable patterns, thus making it difficult to use knowledge gained from attacking one instance of a program to attack other instances (e.g., by using an automatic tool to "patch" a modified piece of code from one program instance onto the same location in another program instance).
2. Techniques that confuse static analysis. These techniques focus on making automated (or even manual) static analysis of the binary code difficult, preferably at both the instruction level and the program level, thus discouraging the use of disassemblers or other program analysis tools.
3. Techniques that discourage dynamic analysis. These techniques focus on making dynamic analysis of the code more difficult by confusing what debuggers and/or related tools see at runtime. Some techniques that confuse disassemblers will also fit in this category.
4. Techniques that supply disinformation. These techniques focus on supplying "information" that will mislead attackers about the nature of the code.
5. Techniques that apply more complex transformations. These techniques typically require more complex analysis than those set forth above.

Additional aspects of these categories, and the techniques that fall within them, are described below. It should be kept in mind that these categories are being used to organize the discussion of obfuscation techniques. The categories are not rigid, and it should be appreciated that some techniques fit within more than one category.

1.3.1.1. Discourage Pattern Matching

This category of techniques generally involves rearranging and/or substituting instructions or data in the program without changing the program's function, thus making it difficult to compare two instances of the program and/or to attack one instance of a program using a patch that was successful in attacking another instance of the program. These techniques can be used to supplement many of the control graph obfuscation techniques described below, since debuggers and attackers often assume that related code (e.g., the body of a function) appears close together in memory.

1.3.1.1.1. Rearrange Basic Blocks

This method of discouraging pattern matching involves locating basic blocks in an analysis pass and reordering some or all of these basic blocks pseudo-randomly. The analysis pass may be performed, for example, using structure analyzer 207 of binary modification tool 200.

Figure 3:
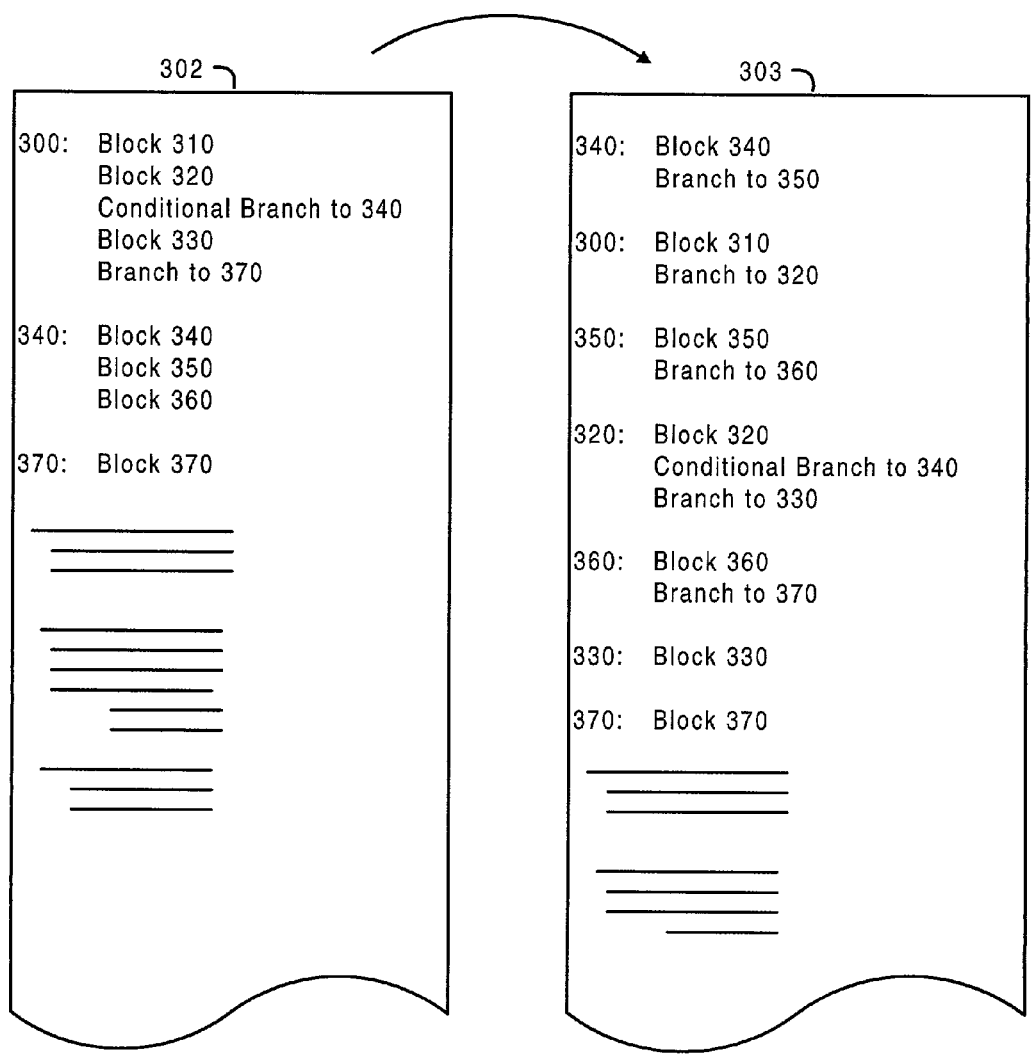
FIG. 3 illustrates a block rearrangement technique in accordance with the principles of the present invention.

FIG. 3 illustrates an application of block rearrangement to a group of basic blocks 310-360 that form part of a program sequence 302, with entry point 300 and exit 370. Program sequence 302 may, for example, be produced by a compiler. Sequence 303 shows these blocks after one possible rearrangement.

As shown in FIG. 3, each block from sequence 302 is represented by a corresponding block in rearranged sequence 303. It is readily apparent that sequence 303 has the same effect as sequence 302, since the unconditional branches allow the blocks in sequence 303 to be executed in an order that is different from their order in memory. It will be appreciated that such a rearrangement can be performed manually, or by using any suitable tool, including without limitation a binary code modification tool 200.

A block rearrangement such as that shown in FIG. 3 is typically sufficient to defeat an attempt to compare two versions of the program and/or to use an address-based patch. Block rearrangement is also advantageous when used in conjunction with other obfuscation techniques, since by destroying program locality, block rearrangement makes it more difficult to reverse other transformations.

1.3.1.1.2. Split Basic Blocks

Another technique for discouraging pattern matching is to insert branches into basic blocks, preferably in a random or quasi-random fashion, and to rearrange the resulting block-parts. This insertion and rearrangement may be done transparently by, e.g., the rearrangement function of a binary modification engine, and typically does not require explicit instruction insertion. In one embodiment, conditional and unconditional branches can be used, with instructions added to force the conditional branches to occur.

An advantage of this technique is that it can be used to split basic blocks into arbitrarily small parts, thus obscuring the code's flow of control. In addition, splitting long blocks makes it more difficult to locate particular code sequences (sometimes referred to as "code signatures"). However, since signatures can often be quite short (e.g., values of constants and addresses), other techniques can be advantageously employed to further complicate signature detection—such as techniques involving the insertion of null effect instructions or rewriting to obscure operand offsets, as described in more detail below.

Figure 4:
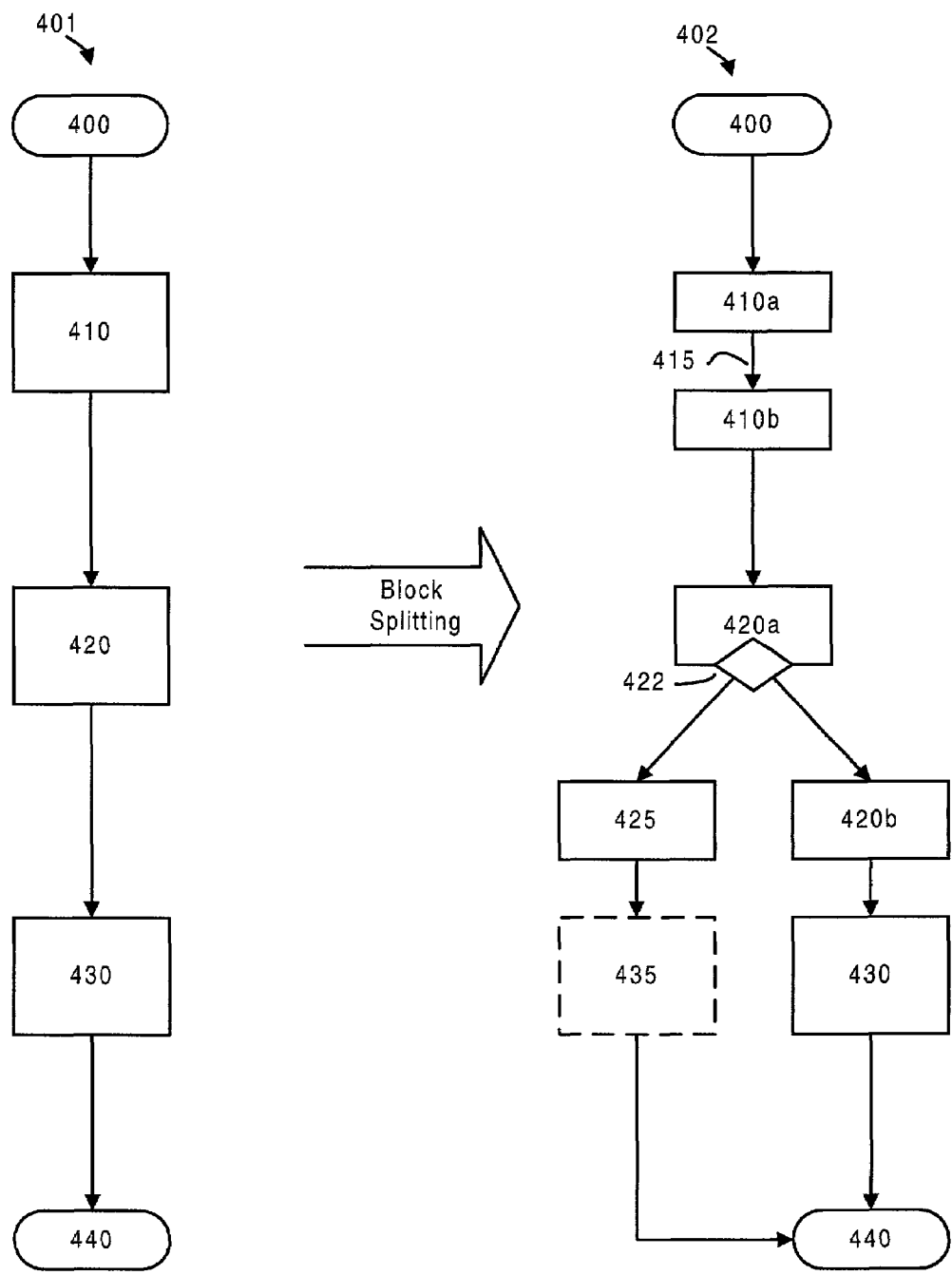
FIG. 4 illustrates a block splitting technique in accordance with the principles of the present invention.

An example of block splitting is shown in FIG. 4, in which control graph 401 represents an unobfuscated control graph and control graph 402 represents the same control graph after splitting. As shown in FIG. 4, control graph 401 includes blocks 400-440, control passing sequentially from one block to another until block 440 is reached. Control graph 401 is transformed into control graph 402 by splitting blocks 410 and 420. Referring to control graph 402, block 410 has been split into blocks 410a and 410b, with an unconditional jump or branch 415 connecting them. Block 420 has been split into blocks 420a and 420b, and a new block 425 has been added, representing an alternative path out of block 420a. Block 420a contains conditional jump 422, with one branch leading to block 420b and the other branch leading to block 425. In order to maintain a control flow equivalent to that of control graph 401, conditional branch 422 can be designed so that it always branches to block 420b, and not to block 425 (unless, e.g., block 425 is equivalent to block 420b). This can be done by, e.g., conditioning branch 422 on an opaque predicate that appears capable of taking on multiple values but actually always resolves to a value or values that trigger the branch to block 420b. For example, an opaque predicate such as "if x and not x'," or "if x**2<0," or any other suitable condition could be used.

One skilled in the art will appreciate that the obfuscation techniques illustrated in FIG. 4 can be readily used in combination with other software self-defense techniques and methods. For example, the conditional branch from block 420a can be designed so that it resolves in the direction of block 425 if there is evidence that tampering has occurred or that the program is running under the control of a debugger. In such an embodiment block 425 or subsequent blocks 435 can include code designed to mimic normal operation while taking protective action, as described in more detail below. In another embodiment, block-splitting can be combined with a block rearrangement technique such as that shown in FIG. 3 to provide even greater protection against, e.g., signature-based patching.

1.3.1.1.3. Duplicate Basic Blocks

Yet another technique for discouraging pattern matching is to split a basic block, duplicate the second half of the block, and use a conditional jump to decide whether to branch to the new, duplicate part of the block, or to fall through to the original second half of the block. A related approach is to duplicate entire basic blocks. To enable these transformations, the binary code modification engine should be able to duplicate basic blocks, or to at least adjust their addresses properly if they are duplicated using other means.

Figure 5:
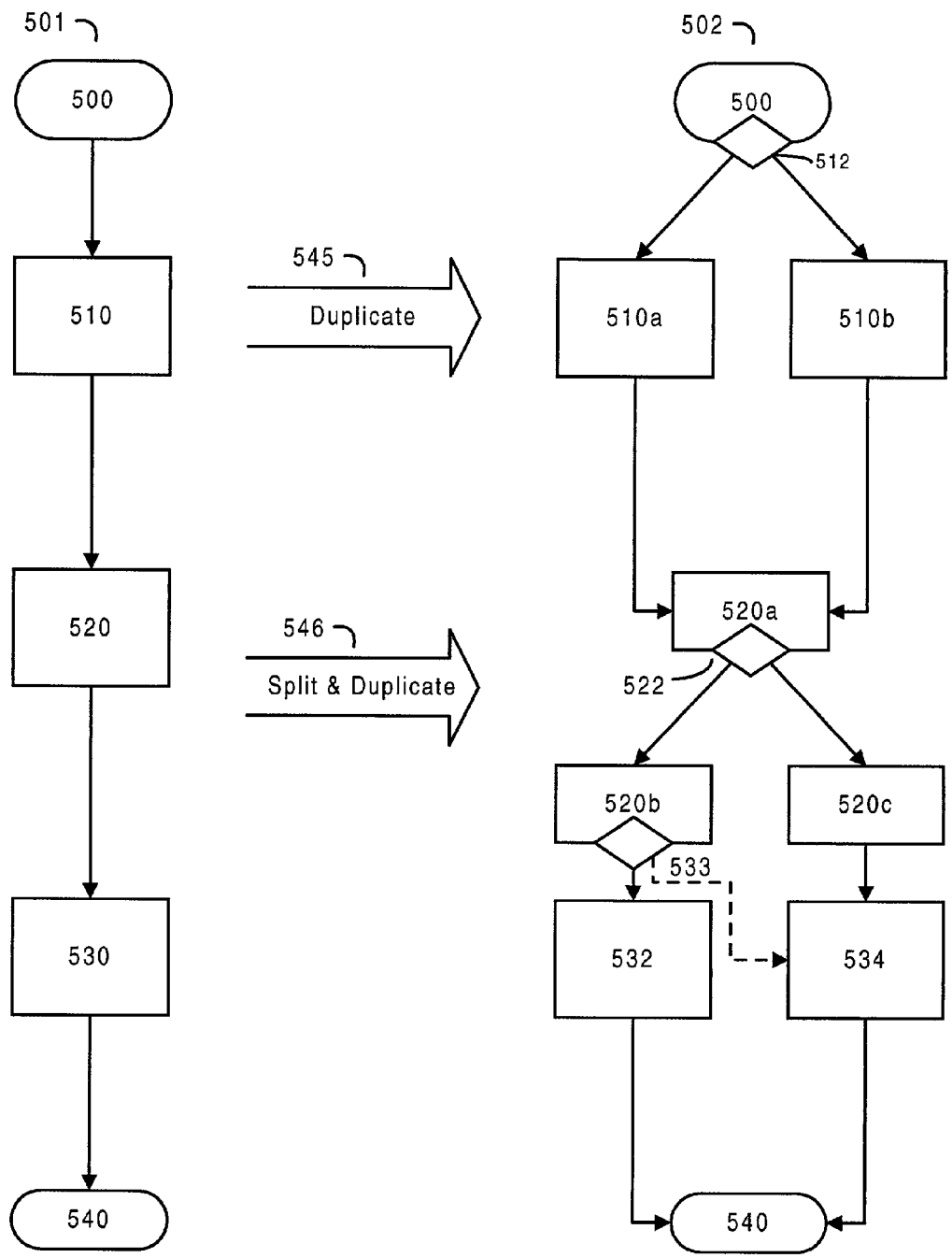
FIG. 5 is an illustration of a block-duplication technique in accordance with an embodiment of the present invention.

FIG. 5 is an illustration of a block-duplication technique in accordance with an embodiment of the present invention. With reference to FIG. 5, control graph 501 represents an unobfuscated control graph and control graph 502 represents the same control graph after the application of block duplication and splitting transformations 545 and 546. Block 510 of control graph 501 is duplicated, yielding blocks 510a and 510b in control graph 502. A conditional jump 512 is added to block 500, and is used to select which of blocks 510a and 510b is chosen in a particular execution of control graph 502. In one embodiment, the condition used in conditional jump 512 includes one or more live program variables. For example, a variable can be compared to a predefined threshold, block 510a being selected if the value of this variable exceeds the threshold, and block 510b being selected otherwise. In another embodiment, a non-deterministic condition is used. Both of these approaches make it more likely that conditional jump 512 will advantageously choose different branches on different executions of code sequence 502. In addition, in one embodiment blocks 510a and 510b do not have identical code, so as to advantageously decrease the likelihood that an attacker will be able to recognize that obfuscation is being applied. Proper program execution is ensured by maintaining equivalence between block 510 in control graph 501, and blocks 510a and 510b in control graph 502.

Referring once again to FIG. 5, block 520 in control graph 501 is split into blocks 520a, 520b, and 520c in control graph 502, and block 530 is duplicated to yield blocks 532 and 534. In one embodiment blocks 520b and 520c are equivalent, but not identical, code sequences. Equivalence between control graphs 501 and 502 is thus maintained regardless of the direction in which branch 522 evaluates. In a preferred embodiment, branch 522 is a conditional branch that includes local program variables that vary between program executions, and/or that depends on a non-deterministic condition.

In the example shown in FIG. 5, control passes from blocks 520b and 520c to blocks 532 and 534, respectively. In one embodiment, blocks 532 and 534 are equivalent (though preferably not identical) duplicates of block 530 in control graph 501. In another embodiment, the code contained in blocks 520a, 520b, 520c, 532, and 534 can be split and/or rearranged in such a manner that the block 520a/520b/532 sequence is equivalent to the block 520a/520c/534 sequence, although neither blocks 532 and 534, nor blocks 520b and 520c are equivalent to each other individually. In yet another embodiment, control passes from block 520b directly to block 534 via branch 533, and block 532 is either not created or not used. In other embodiments, other block-spitting and/or duplication arrangements are used. Thus, it should be understood that while the specific arrangements shown in FIG. 5 are provided for purposes of illustration, any suitable implementation of the techniques disclosed herein can be used without departing from the principles of the present invention. Moreover, it should be understood that the block splitting and block duplication techniques described above can be readily applied in combination with other software self-defense techniques.

1.3.1.1.4. Rearrange Code within Basic Blocks

As mentioned previously, code within basic blocks can be rearranged, thus making it even more difficult for an attacker to identify and/or use patterns and signatures contained within the unobfuscated program. Well-known techniques for local dependency analysis—generally developed to determine allowable instruction re-orderings for use in processor pipeline or multiple functional unit scheduling, see, e.g., Waite and Goos, *Compiler Construction* (Springer-Verlag, 1984), previously incorporated by reference herein—can be used to generate multiple, functionally-equivalent sequences of instructions in a given basic block. These equivalent sequences can be used, for example, to customize copies of the program and/or to serve as watermarks. In addition, such functionally-equivalent sequences can be used to differentiate basic blocks that have been duplicated as described above. Note that for these purposes "functionally equivalent" requires only that the resulting code produce the results expected from the original program, and that it create no undesirable side-effects that alter the overall functionality of the program.

1.3.1.1.5. Insert Null-Effect Instructions

Another technique for discouraging pattern matching is to insert instructions into a program that do not substantively affect the correct operation of the program. This technique is desirable in that it generally does not require knowledge of program semantics to implement. For example, virtually any instruction can be safely preceded by a NOP or null-effect sequence. Moreover, as is the case with code-rearrangement, insertion of null-effect instructions is something that conventional modification tools are capable of doing correctly. Thus, for example, a program can be customized by quasi-randomly selecting null-effect instructions and/or sequences from a predefined set and inserting them into the program, thereby ensuring that different instances of the program's code will look different. In a preferred embodiment the insertion of null-effect instructions and sequences is used in conjunction with other software self-defense techniques.

Figure 6:
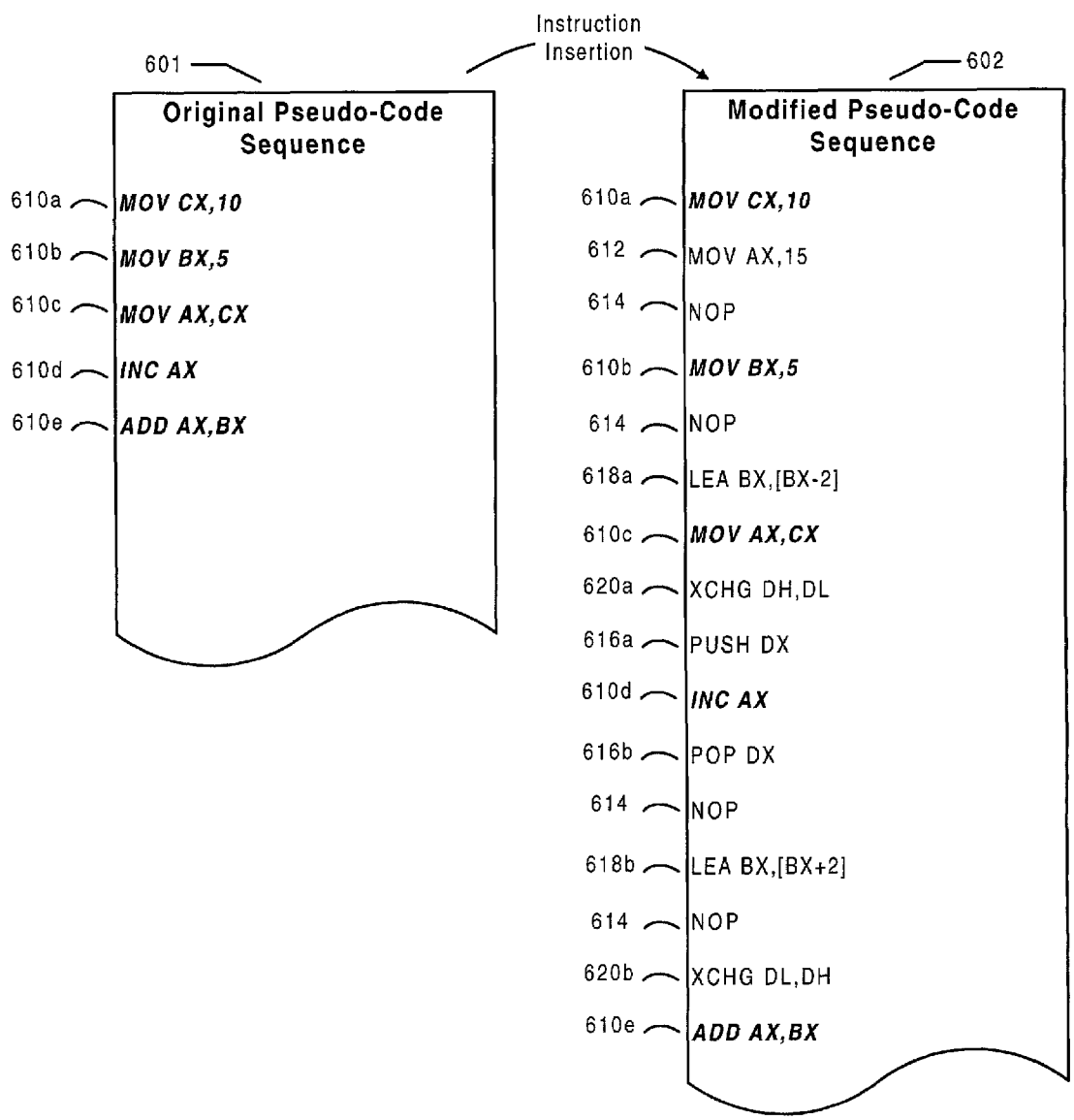
FIG. 6 illustrates the addition of null-effect sequences and instructions to a program.

FIG. 6 provides an illustration of the addition of null-effect sequences and instructions to a program. Referring to FIG. 6, pseudo-code sequence 601 moves constants into the CX and BX registers (610a and 610b), moves the value in CX to AX (610c), increments AX (610d), and adds BX to AX, storing the result in AX (610e). Pseudo-code sequence 602 represents program 601 after one possible insertion of null effect instructions and sequences. The techniques shown in FIG. 6 are described below in connection with some or all of the following illustrative null-effect instructions, instruction sequences, and related obfuscation techniques:

Insert Literal NOPs. Insertion of NOPs 614 before randomly chosen instructions can hinder an attacker's ability to apply patches that work on one instance of a program to other instances, since the NOPs will create different signatures in different instances and cause instructions to have different relative locations.

Insert Null-Effect Instructions and Sequences. Examples of null effect instructions and sequences include:
PUSH reg; POP reg (e.g., 616a, 616b in FIG. 6);
LEA reg, [reg−x]; LEA reg, [reg+x] (e.g., 618a, 618b);
XCHG reg1, reg2; XCHG reg2,reg1 (e.g., 620a, 620b);
AND reg, −1
OR reg, 0

These instructions and sequences are harder to detect and remove than simple NOPs 614, as it is more difficult to recognize that they do nothing. Note that in choosing and evaluating a potential null-effect instruction or sequence, consideration should be given to the effect, if any, that the instruction or sequence has on flags and special registers.

Insert Null-Effect Prefix Instructions. This type of instruction has no effect due to the instructions that follow it. In FIG. 6, for example, instruction 612 (i.e., "MOV AX, 15") does not affect program execution, since legitimate instruction 610c overwrites the value that instruction 612 moved into the AX register before that value can cause any harm. It will be appreciated that there are numerous examples of other implementations of this technique. For example, without limitation, instructions or sequences such as "LEA reg, value" and "PUSH value; POP reg" could be used instead of, or in addition to, instruction 612. Although any suitable null-effect instructions can be used, two particularly good choices are MOV and LEA, as they do not affect the flags. Arithmetic instructions can also be used, as long as any significant flags set by the null-effect instruction are also set by the legitimate instruction or instructions that follow. Instructions that involve the AX (or EAX) register or its equivalent are also particularly advantageous because of the various one-byte opcodes for decimal-adjust instructions.

Replace With Equivalent Instruction. The signature of a program can also be changed by replacing instructions and/or instruction sequences with equivalent instructions or sequences. Examples of this techniques include converting shift instructions into rotate and mask instructions, changing constant lengths, and expanding logical operations (e.g., changing "OR AL, 0xf0" to "OR AL, 0xc0; OR AL, 0x30").

Duplicate Idempotent Instructions. Another technique is to replace an instruction with two copies of itself that have the same effect. For example, an AND or OR operation with a constant or variable can be followed by a copy of itself.

Insert Unusual Instructions. Use of unusual instructions can also be advantageous, as attackers are less likely to take them into account. Examples include DAA, ARPL, SGDT, and flag-setting instructions chosen not to affect correct operation. However, the use of unusual instructions can have undesirable effects on program performance, since unusual instructions often take longer to execute. Accordingly, it will generally be preferable to avoid inserting such instructions in critical loops or other high-performance code sections.

Insert Null-Effect Suffix Instructions. These instructions have no effect on the operation of the program because of the instructions that they follow. For example, the duplication of indempotent instructions is a special case of this technique.

Use Computed Offsets. Memory-reference instructions can be rewritten to obscure the actual values of offsets, thus making it more difficult for a pattern-seeking attack to find the correct values. For example, "MOV EAX, offset[reg]" can be replaced with:
LEA EAX,offset1
LEA EAX,offset2[EAX]
MOV EAX, [reg+EAX]
where offset=offset1+offset2. There are many similar ways to avoid the use of predictable literal offsets or addresses. Examples include performing local constant propagation on the values in registers, and corresponding effective address calculations.

Rewrite Instructions to Obscure Operand Offsets. When software self-defense techniques are integrated with a compiler, predictable offsets can be avoided by rearranging the order of stack variables or static data before assigning their storage locations.

Change Base Register. Memory addresses can be developed in multiple steps by, e.g., inserting an LEA instruction prior to the memory reference instruction that changes the base register, rewriting the target instruction to use a different offset, and inserting another LEA to adjust the base register back. This technique is useful in defeating searches for "interesting" offsets.

Rewrite to Obscure Constants. Arithmetic and logical operations with constant operands can be rewritten by splitting these operations into two similar operations. For example, one ADD instruction can be split into two instructions, each of which has constant operands that together sum to the original value. The same is true for other operations. For example, a MOV with a constant operand can be replaced with an equivalent sequence involving a MOV with a constant operand and an OR operation with a constant operand.

Surround Code With XCHG Instructions. Instructions that use registers can be preceded by an XCHG instruction that swaps one or both registers. The original instruction is rewritten to use the different register, and a corresponding XCHG is inserted afterward. This is both a prefix/suffix change, and can surround a larger sequence as long as it is within a basic block that does not use the affected register. This technique advantageously changes the signature of specific register IDs in instructions.

Adjust Register Values. A target sequence of one or more instructions can be surrounded by a complementary pair of instructions that adjust the value of a register not used in the sequence. This is also a prefix/suffix change that can be used within a basic block. Examples of this technique include the insertion of complementary add/subtract pairs, the insertion of INC/DEC pairs, and the insertion of complementary XOR pairs for any unused constant, stack address, or data address.

A variety of exemplary null-effect instructions, sequences, and operations have thus been described, any suitable combination of which can be used to obfuscate a program in accordance with the principles of the present invention. Additional examples are described in the Collberg application, which was previously incorporated be reference, and in Cohen, "Operating System Protection Through Program Evolution," Computers & Security, vol. 12, no. 6, pp. 565-584 (Elsevier 1993), which is hereby incorporated by reference.

1.3.1.2. Confuse Static Analysis

The following techniques increase the difficulty of binary code static analysis by operating at two levels. At the instruction level, these techniques confuse disassemblers and other program analysis tools by making it appear that instructions are not what (or where) they should be. At the object file level, these techniques obscure, damage, and/or misdirect high-level structures that are often used to guide automated disassembly and/or other object file manipulation. In so doing, these techniques can frustrate the efforts of attackers using debugging and/or analysis tools such as Sourcerer or Soft-ICE.

1.3.1.2.1. Obfuscating the Executable Format

Binary editors, and other static analysis tools that an attacker might use, typically must first parse the binary image of a program into instructions and data. In general, this problem is undecidable. Accordingly, the format of the executable program—e.g., which parts are instructions and which parts are data—lends itself to obfuscation. In particular, programs can be algorithmically transformed so that it is infeasible for a binary editor to precisely parse the transformed binary program image. Initially, the binary editor receives a string of bits with a single address designated as an entry point. The problem is to determine which bits in the binary image are instructions and which are data. The editor proceeds by parsing the instruction at the entry point. To find the next instruction, the editor must disassemble the current instruction and either find its target, if it is a jump (or call, return, etc.), or move to the next instruction if it is not. However, even if an instruction is identified as a jump, finding its target is not always possible (Rice's theorem). For example, if the target address is computed by a sufficiently complex algorithm, even the application of control-flow and/or data-flow analysis will be unable to determine the jump target address precisely, and will yield an approximate answer instead (e.g., a set of possible target addresses).

In practice, fairly simple calculations of the target address will suffice to confuse the flow analysis and cause it to yield the set "all addresses" as the possible targets of the jump. For example, the call f(x) can be transformed to f+P( . . . ))(x), where P( . . . ) is a function that the obfuscator knows returns 0, but whose computation is sufficiently complex to confuse flow analysis. An even more confusing technique is to choose an arbitrary integer, a, and transform f(x) to (g+P( . . . ))(x), where g=f−a, and P( . . . ) returns a, in order to ensure that the attacker cannot simply guess that P returns 0.

Other methods of estimating branch targets, such as using relocation information, are also only approximate. Accordingly, transformations such as those set forth above provide provably hard resistance to direct parsing. They achieve similar results to obfuscation in making code difficult to analyze and understand, but they differ from other forms of obfuscation discussed herein, as they rely on instructions and data being indistinguishable without parsing.

1.3.1.2.2. Confuse Instruction Recognition

The following techniques confuse automated and manual instruction recognition, and can be practiced using, e.g., a binary modification engine, such as that described above, which allows manipulation and relocation of branch addresses. These techniques can also be implemented using a two-pass modification tool by inserting markers within the first pass and later changing those markers to the appropriate control transfers.

Forced-True Conditional Branches. One method of confusing instruction recognition is to insert forced-true conditional branches—either in-line or as replacements for JMPs—and to insert garbage bytes after them that appear to be valid instructions but that actually indicate incorrect instruction boundaries. Forced true conditional branches can be implemented in a wide variety of ways, including, for example: JNZ after OR with a constant other than zero; JNC after any logical operation (e.g., AND, OR, XOR, etc.); and JNO after any logical operation.

Never-Taken Conditional Branches to the Middle of Instructions. Instruction recognition can also be frustrated by inserting a conditional branch that will not be taken, the target of which is an inappropriate location. Examples of such locations include the middle of other instructions and locations in data sections. Suitable conditional branches include: JZ after OR with a constant other than zero; JC after any logical operation; and JO after any logical operation. If the branch target is itself an instruction that will not be executed (e.g., because it was inserted for tamper-resistance) or is in a data segment, it can include an immediate constant that appears to be part of a real instruction.

Use of PUSH, RET instead of JMP. Yet another technique for impeding instruction recognition is to replace JMP instructions with PUSH target-address, RET. This can be done using a binary modification engine. Assuming a free register can be found, the target address can also be generated by a multi-instruction sequence, as described elsewhere herein.

Obscured Branches. The insertion of branches that target invalid and/or misaligned code can be advantageously combined with the replacement of branches that target good code with relatively obscure equivalent forms that disassemblers cannot easily recognize. This technique makes it difficult for a disassembler to find the target of a legitimate branch, and thus can prevent a disassembler from re-synchronizing itself. For example, a branch through a register that is loaded with a constant, or that is loaded with the result of a computation (e.g., MOV EAX, constant1; XOR EAX, constant2; JMP [EAX];) can be substituted for a simple branch. This modification typically requires analysis of the target instructions to find a register that is not in use and that can be used for the branch target.

As another example, the following sequence can be inserted after a logical operation:
JO label1
MOV EAX,label2
JMP [EAX]
label1: garbage instructions
. . .
label2: legitimate instructions
In this code sequence, the jump to label1 is never taken. However, a disassembler will most likely see the JO and decide that label1 is, in fact, a legitimate instruction address. Garbage instructions can be chosen to make it appear that the location of label2 is in the middle of an instruction, thus causing the disassembler to misinterpret the following legitimate instructions. It will be difficult for the disassembler to resynchronize by analyzing the JMP, since its address is computed.

RET with Offset. Random bytes can be inserted after a CALL, and the return address of each corresponding RET can be increased to skip over them. This technique will generally make the code look as though the instructions after the CALL will be executed. This technique is particularly effective if the "instructions" after the CALL are fragments which will cause an instruction-recognizer to become unsynchronized. For example, the following code sequence could be used:
CALL Function
Garbage Instruction-1
Garbage Instruction-2
Legitimate Instruction-1
Legitimate Instruction-2
. . .

Function
...
   increment return address to skip garbage instrs
   RET

Reference Constants From Other Instructions. References to constants or immediate values in, e.g., MOV and arithmetic/logical instructions can be replaced with appropriately-selected addresses in the middle of null-effect instructions. To implement this technique, a modification engine would insert appropriate constants as null-effect instructions, which then have to be located so that a second pass can update the legitimate instructions that use the constants.

Replace CALL with JMP to Call-Emulator. A CALL can be replaced with a JMP to one of a collection of locations that emulates the CALL and branches back to the initial JMP after completion. Since JMP does not store a return address, a unique location is needed for each call and return address pair. These emulators can be sprinkled throughout the binary in any suitable location, including as operand bytes in null-effect instructions.

Replace JMP with CALL and SP Adjustment. If a branch target can be identified reliably, a branch, such as a jump, can be replaced with a CALL by prefixing the branch target with an instruction that pops the return address.

1.3.1.2.3. Modify Symbol Tables

Another set of techniques that can be used to discourage static analysis involves manipulation of the symbol information (and/or the source line map) used by, e.g., debuggers. Symbol tables are generally complex and hard to check, and programs that read them are likely to assume that they are accurate. Thus, as a basic defensive measure, in one embodiment the symbol table is simply removed from the SDP, thus eliminating inter alia the character strings it contains. In another embodiment, the symbol table is damaged by inserting binary garbage (e.g., negative lengths, incorrect offsets, etc.), with the intent of making programs (e.g., debuggers) that attempt to interpret this garbage fail.

In yet another embodiment, symbol tables are rewritten to be misleading. This is generally a more complex task than damaging the symbol tables, as it is desirable for the results to at least appear valid. Examples of misleading symbol tables include those with randomly-shuffled mappings between variable names and locations, those with variables that have been renamed with valid, meaningful, but incorrect names, and those wherein the mapping of source lines to code has been scrambled. Indeed, if the basic blocks of the program are randomly rearranged in accordance with the techniques described previously herein, the source map will often appear quite random; by replacing it with a source map that has a more conventional, sequential appearance, it will look more normal to an attacker, and thus disguise the application of obfuscation. In one illustrative embodiment, the original source map is used for this purpose—i.e., the map describing the program before the program was obfuscated using e.g., the block splitting, duplication, and rearrangement techniques described above.

1.3.1.2.4. Modify Relocation Information

Generally speaking, the obfuscation techniques described in the previous subsection are also effective with respect to relocation information. Thus, in one embodiment relocation information is simply removed, thereby discouraging sophisticated analysis programs from attempting to analyze the program. Note, however, that this technique is more useful on, e.g., EXE files, as DLL files typically need some relocation information in order to be loaded.

Similarly, in another embodiment relocation information is damaged. This technique will generally cause analysis programs to fail. Moreover, because the damaged information need not have a relationship to the original information, this technique can be applied to EXE files with relatively little effort. For DLLs, the damaged information preferably includes information which describes relocation of code sequences that are not executed, such as dead code inserted for software self-defense purposes.

A related technique is to rewrite the export dictionary to include a number of suggestively-named items that are not actually present, thus misleading a human attacker.

1.3.1.2.5. Instructions on Stack

Figure 7A:
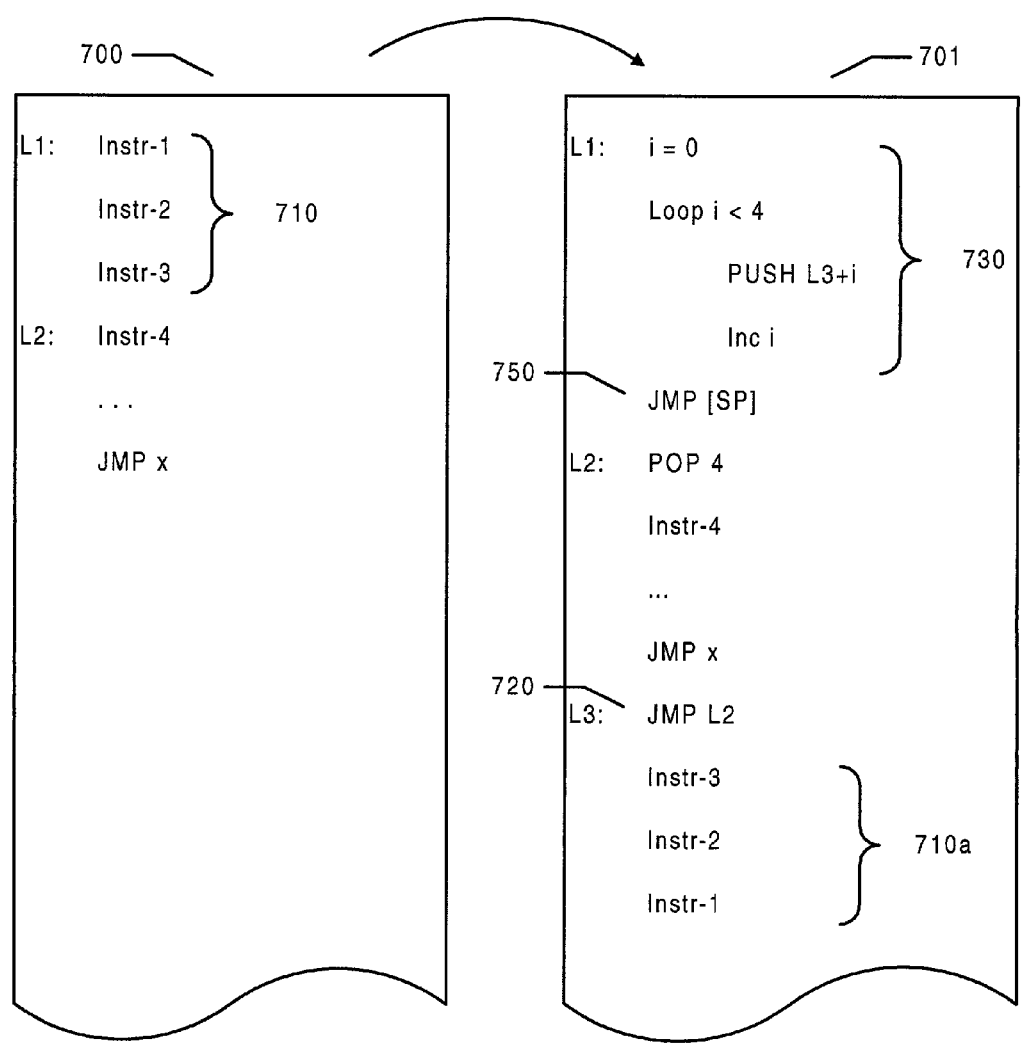
FIGS. 7A and 7B illustrate a stack-execution technique in accordance with the principles of the present invention.

Yet another technique for confusing static analysis involves copying instructions to the stack and executing them there. This technique is a variation of block encryption, which is described in more detail below. An illustrative implementation of this technique is shown in FIG. 7A, in which code sequence 700 is transformed into code sequence 701. Referring to FIG. 7A, an instruction sequence 710 in program 700 is identified that does not include code segment references. In code sequence 701, a jump 720 is inserted at the end of instruction sequence 710 to return to the appropriate location in program 701 (i.e., L2). Code sequence 710 can then be reversed and moved elsewhere in the program, as illustrated by sequence 710a, taking care to adjust any stack references to account for the change in the stack pointer. Next, code 730 is inserted at the old location of instruction sequence 710, code 730 being operable to copy instruction sequence 710 to the stack. A JMP 750 to the stack location of the first instruction to be executed is also inserted.

Figure 7B:
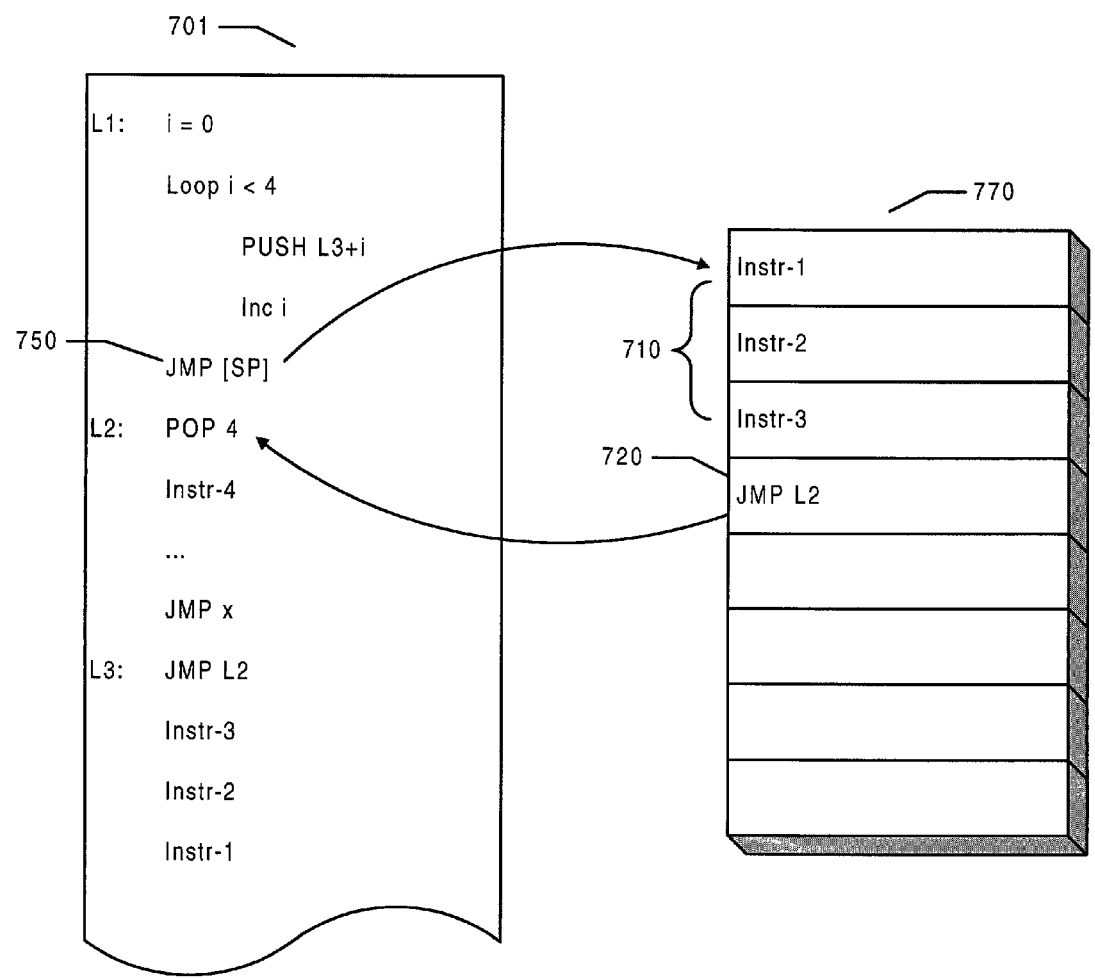

FIG. 7B illustrates the execution of code sequence 701. Referring to FIG. 7B, execution of copying code 730 results in instruction sequence 710 and jump 720 being copied to stack 770. Execution of jump 750 transfers control to stack 770, which executes instruction sequence 710, starting with Instr-1. When instruction sequence 710 is finished, jump 720 is executed, returning control back to code sequence 701 at the next instruction to be executed, i.e., POP 4.

It should be noted that if instruction stream 710 has been encrypted or masked, the copying operation may be more complex. In such embodiments it may be best to use a CALL to a support routine rather than inserting the copying code in line. Note, too, that while this technique is generally applied only to instruction sequences that do not make code segment references, and is generally limited in its application to individual basic blocks due to branch relocation issues, it is advantageous in that it does not interact with multithreading or multiprocessing. In addition, it will generally confuse static analysis since it is awkward to collect all of the instruction sequences placed on the stack, and it will generally complicate dynamic analysis as well. One skilled in the art will appreciate that this technique is applicable to data segments other than the stack, including the heap or static storage, as long as precautions are taken for multithreading.

1.3.1.2.6. Data Allocation Between Code Fragments

Another technique for discouraging static analysis is to enable dynamic or static data allocation in spaces created between fragments of code. This technique is advantageous, since the existence of modifiable data interspersed with executable code will generally obscure the distinction between code and data, and thus make it difficult for attackers to detect, e.g., self-modifying code. In one embodiment this technique effectively adds parts of the executable program segment into a memory that is treated as an allocable "heap" during the program's operation. This technique is also advantageous in that it can be used to insert information such as rules, controls, and watermarks into the code to indicate when and where specific actions occurred.

FIGS. 8A and 8B illustrate an embodiment of a module for creating spaces in executable code and for making these spaces available for allocating data and/or other instructions. The module can also provide operations to allocate and deallocate code spaces dynamically, and these operations can be used to replace selected invocations of the malloc and free commands.

As shown in FIGS. 8A and 8B, in a preferred embodiment the CodeSpace module includes the following operations:

Create. In general, spaces can be created within code by, e.g., inserting source-level code or using a binary editor. CodeSpace::create is an inlined operation that creates space statically at the point of call. In the embodiment shown in FIGS. 8A and 8B, the total amount of space created in the code section can be controlled by changing the number of invocations; however, this amount is fixed statically and does not grow dynamically like an actual heap.

Register. Code spaces created by CodeSpace::create should be registered so that the allocator will be aware of their availability. This can be done in at least two ways: (1) statically, by running a binary editor that looks for the code spaces and puts them in a free list; or (2) dynamically, by having each code space register itself when it is executed. In the embodiment shown in FIG. 8A, CodeSpace::register provides dynamic registration, and is invoked by CodeSpace::create. Thus, a code space created using CodeSpace::create is made available when it is invoked for the first time. Note that for convenience, and unless otherwise clear from the context, a "code space" will refer to a space allocated using CodeSpace::create or an equivalent routine, while a "data space" will refer to a space allocated using malloc.

Allocate. CodeSpace::alloc first tries to allocate space from available code spaces.

However, if a sufficiently large code space is not available it can allocate space using malloc, instead. This feature allows programmers to replace some calls to malloc with calls to CodeSpace::alloc without having to worry about the availability of code spaces. Since alloc may have to call malloc, it will generally take more time to execute; however, the performance impact can be reduced by limiting the number of times alloc is used instead of malloc. Thus, in one embodiment alloc is used in place of malloc in instances that get invoked relatively infrequently at run time and/or that are likely to be small enough to fit into a code space.

Deallocate. Spaces allocated using CodeSpace::alloc are deallocated using CodeSpace::dealloc. In a preferred embodiment, this is true even of spaces which CodeSpace::alloc allocated using malloc, and thus a programmer need not worry about which kind of space is returned at run time. However, spaces not allocated using CodeSpace::alloc should not be deallocated using CodeSpace::dealloc.

FIG. 8C provides an example of a program that uses the CodeSpace modules shown in FIGS. 8A and 8B. Referring to FIG. 8C, two blocks of code space are created by cs.create( ) statements 830. Next, the statements cs.alloc(size) 832 and cs.alloc(size−1) 836 each allocate code spaces for the storage of data, and set the variables b1 and b3, respectively, to point to these spaces. In contrast, the statement cs.alloc(size+1) 834 results in a space being allocated using malloc, since the amount of space to be allocated—i.e., "size+1"—exceeds the maximum size of the code spaces created using cs.create( ). Similarly, call 838 to cs.alloc( ) results in space being allocated using malloc since the two code spaces created by calls 830 to cs.create( ) are already allocated by statements 832 and 836. Following the call to cs.dealloc( ) 840, however, the code space pointed to by b1 is deallocated, and thus is available for allocation by the subsequent call 842 to cs.alloc( ).

Figure 8D:
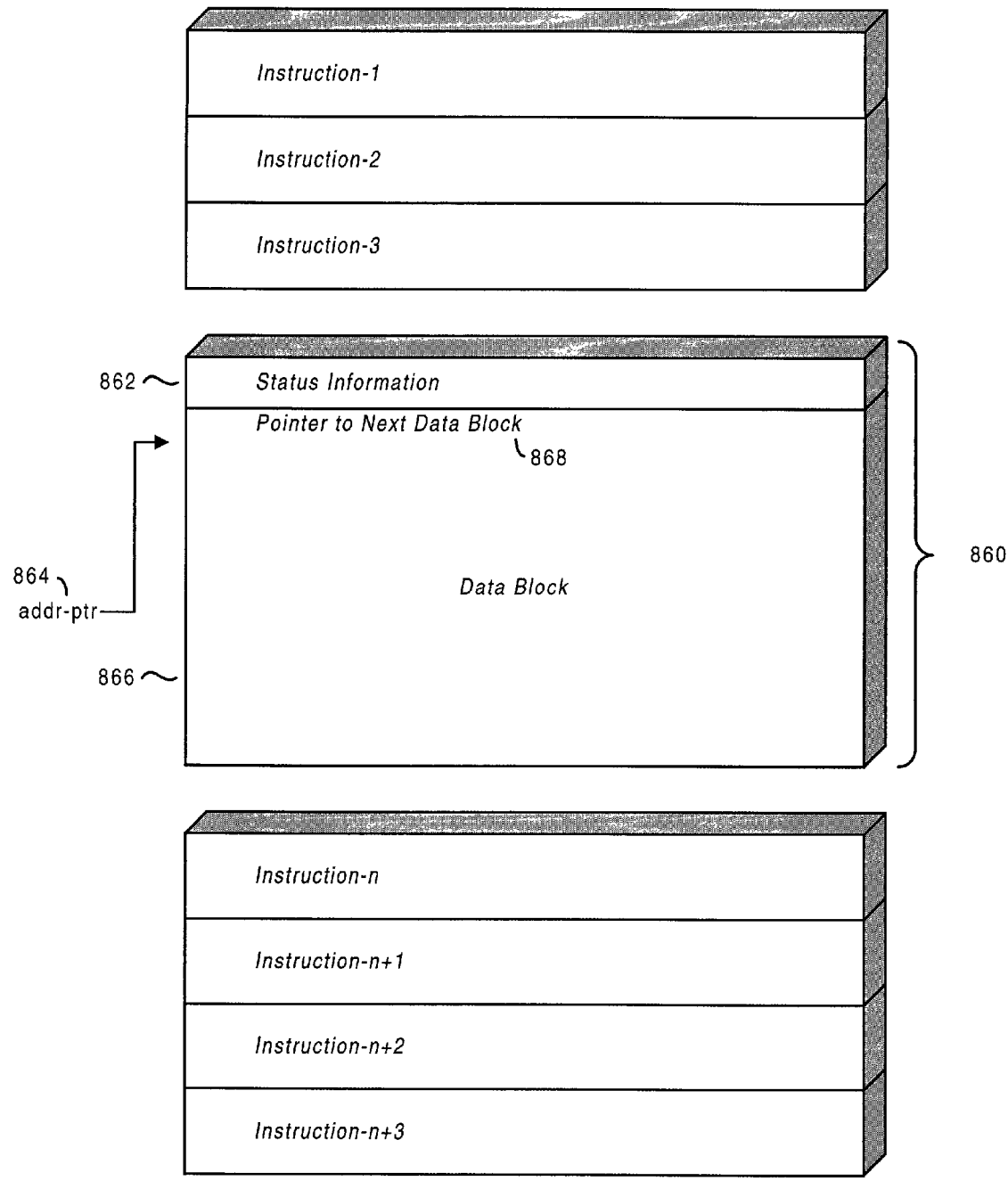
Figure 8E:
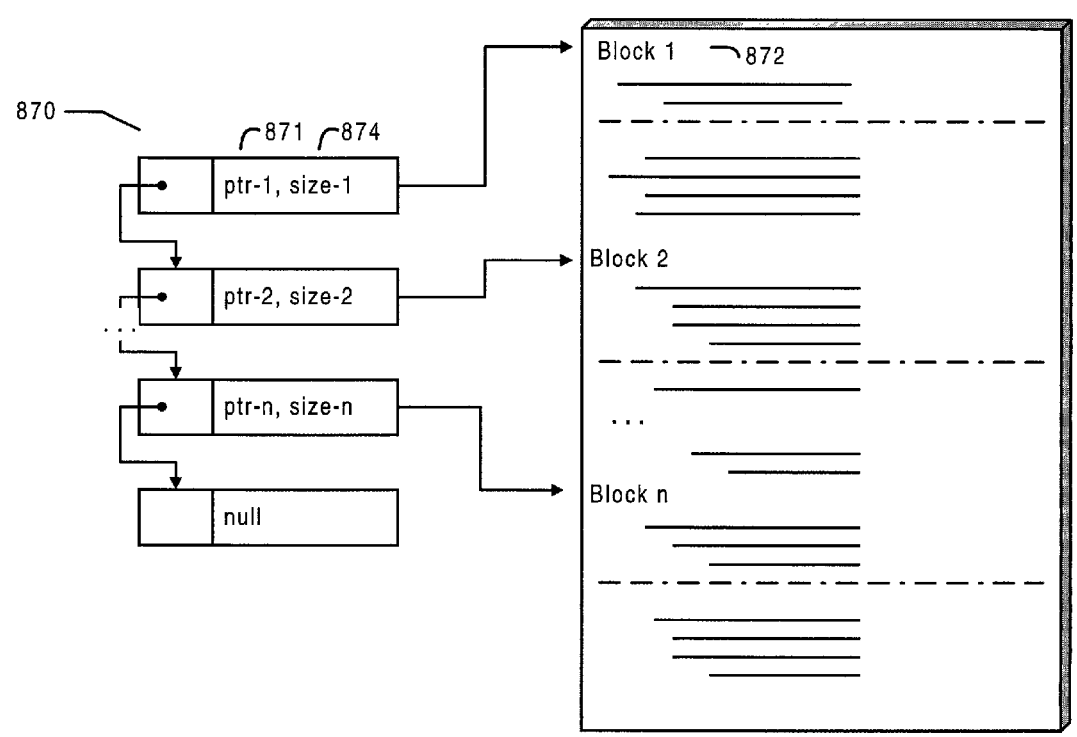

FIGS. 8D and 8E illustrate the operation of the CodeSpace module from the perspective of system memory. Referring to FIG. 8D, CodeSpace, like other allocators, stores status information 862 in the first byte of an allocated space 860. The caller of alloc receives a pointer 864 to the next byte in space 860, thus hiding the status information 862 and protecting it from being overwritten. The part of a space provided to a caller is referred to as the data block 866. In a preferred embodiment, status information 862 distinguishes between at least three kinds of spaces:

1. A code space that has not been registered. This is the static state of all code spaces. This information causes CodeSpace::register to be called when the create operation is invoked for the first time.
2. A code space that has been registered. This information causes the create operation to take no steps on subsequent invocations.
3. A data space. This information tells the allocator that it must deallocate this space using the "free" command, even though it was allocated by a call to alloc, since alloc called malloc.

In the embodiment shown in FIGS. 8A, 8B, and 8C each code space has the same size. This increases the simplicity of the CodeSpace module, however, it will be appreciated that code spaces of different sizes could also be used. For example, better space efficiency can be achieved by managing code spaces of different sizes, and by using a "best fit" policy to select one for allocation.

Registered but unallocated code spaces are stored in a list that links together the unallocated blocks. In the embodiment shown in FIG. 8D, the list is effectively inlined within the blocks, the first word in each unallocated block storing a pointer 868 to the next such block (or NULL, if there is no such block). Note that unlike status byte 862, the "next" pointer 868 is part of the block provided to callers, which is acceptable because the next pointer is present only in unallocated blocks. Thus, one constraint is that each block be big enough to store a pointer. In other embodiments, such as the one shown in FIG. 8E, free list 870 is a separately-allocated linked list containing (a) pointers 871 to free code spaces 872 and (b) information 874 regarding the size of each such space.

In a preferred embodiment, the code used to create a space is written in assembly language. This provides close control over the amount of space created, and helps to prevent the compiler from reordering instructions at the boundaries of the created space. Use of assembly code also enables global symbols or labels to be defined in the midst of code segments for purposes of registration.

The embodiment shown in FIGS. 8A, 8B, and 8C is written in the C++ programming language and should be compiled using the Microsoft compiler, since the source code contains MASM-specific assembler directives. It will be appreciated, however, that other suitable programming languages and/or compilers could be used without departing from the principles of the present invention. Note also that for the embodiment shown in FIGS. 8A, 8B, and 8C the code section in the final binary should be writable. This can be achieved in a variety of ways, including via a source-level run-time function call such as VirtualProtect( ); or, in a preferred embodiment, via a linker option such as Microsoft linker's/SECTION:.text,crew option; and/or via the tool "editbin," which provides the /SECTION option to change existing binaries.

1.3.1.3. Discourage Dynamic Analysis

This category of obfuscation techniques seeks to discourage dynamic or run-time analysis by, e.g., interfering with debuggers' and/or related tools' use of breakpoints and tracing mechanisms.

1.3.1.3.1. Detection and Obstruction of Debuggers

To keep an attacker from obtaining useful information about an SDP, it is advantageous to prevent the SDP's processes from being run under a debugger. For example, periodic checks can be performed to see whether a debugger is being used, and defensive measures can be taken if one is detected. This section describes techniques for detecting debuggers, and for obstructing their operation upon detection.

1.3.1.3.1.1. Checking for a Debugger

A debugger can be detected via operating system interfaces, which typically include calls for checking whether debugger or trace facilities are in use.

1.3.1.3.1.2. Performing Environmental Checks

Another technique for detecting a debugger is to insert calls to a routine (or to one of many quasi-randomly-selected instances of such a routine) that makes environmental checks. For example, a routine can check whether the debug registers are being used to analyze the program and/or whether single-stepping is being performed (e.g., a routine can check hardware-specific registers that cause the microprocessor to trap, single step, etc.). A more sophisticated technique involves the insertion of code to obtain and store the flags, and then to check them elsewhere so as to obscure the relationship between the two operations.

1.3.1.3.1.3. Adding Built-in Debugger Process

Another technique for detecting or resisting a debugger is to split a program into a debugger process and a main process that runs under it. The two processes can communicate via a cryptographic protocol to ensure that they form the equivalent of the original program. Well-known cryptographic techniques can be used to provide mutual authentication. Since most operating systems do not allow a program to be run under two debuggers at the same time, this technique can effectively obstruct an attacker's ability to analyze the program using a debugger.

1.3.1.3.1.4. Monitoring Cycle Counter

Another technique that can be used to detect a debugger is to check the cycle counter to determine whether a predefined piece of code executes within a predetermined number of cycles. In one embodiment, the piece of code is measured in advance—preferably after optimization, customization, and obfuscation—to determine an approximate number or range of clock cycles that should elapse when the piece of code is executed under normal conditions. When run under a debugger, the cycle count will typically be significantly different.

A related technique is for the program to check the real-time clock to determine whether an appropriate amount of time has elapsed for a measured piece of code. Because real time measurements and cycle counters can be affected by other system activities (e.g., page faults, interrupts, etc.), these indications are statistical in nature and their significance should be evaluated in context. Only when the frequency of measured deviations exceeds a suitably-defined threshold can tampering be reliably inferred.

1.3.1.3.1.5. Writing Into Instruction Stream

Another way to interfere with a debugger is to insert instructions that write data (or other instructions) to a location in the instruction stream that has already been loaded into the processor's pipeline. This technique works best on older systems, such those that use Intel 80386 or 80486 compatible processors, in which instructions are not modified after entering the processor's pipeline. In these systems, an instruction in the pipeline will be executed even if instructions that precede it in the program overwrite or modify the address location at which it was originally stored.

Figure 9:
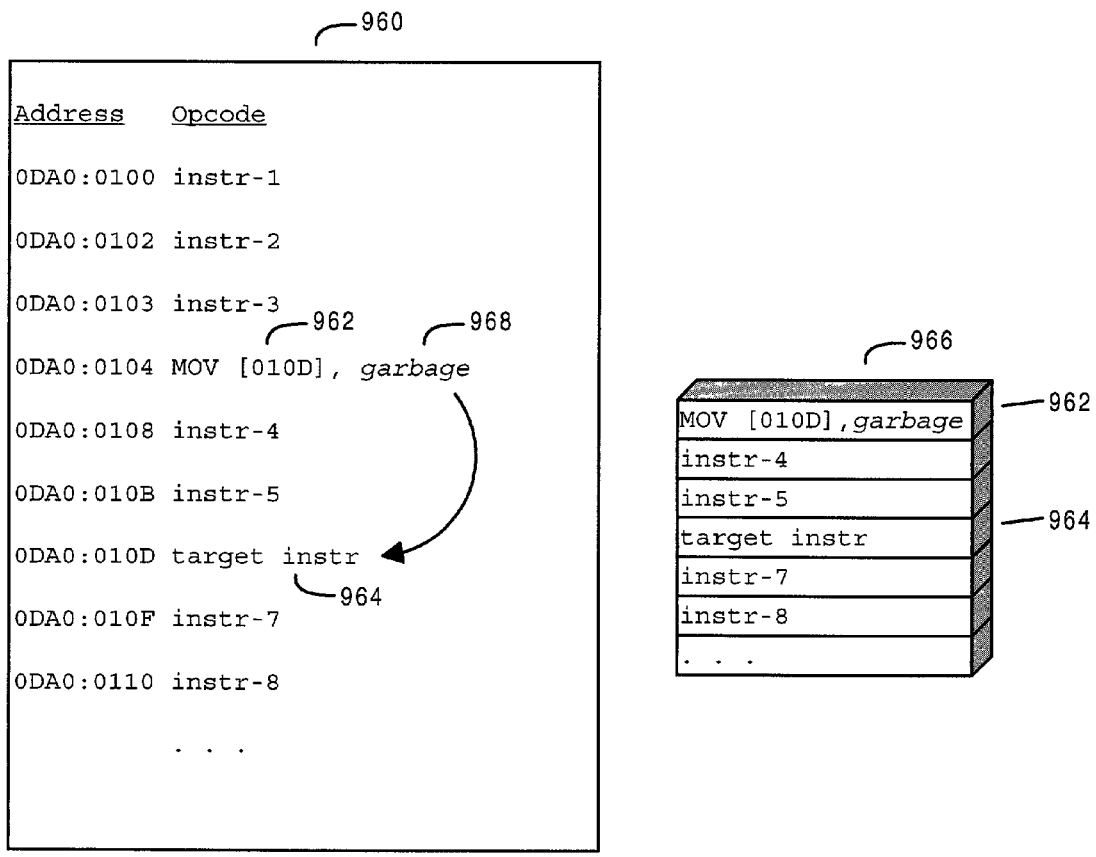
FIG. 9 illustrates a technique for interfering with a debugger.

This technique is illustrated in FIG. 9, in which code sequence 960 includes an instruction 962 which overwrites target instruction 964 with a garbage instruction 968. However, when the program is executed, target instruction 964 will already be loaded into pipeline 966 by the time instruction 962 is executed, and thus target instruction 964 will be executed even though instruction 962 has overwritten the memory location (i.e., 0DA0:010D) at which target instruction 964 was stored.

Debuggers typically do not replicate this behavior across breakpoints or while single-stepping. Thus, when code sequence 960 is run under the control of a debugger, instruction 962 will overwrite target instruction 964 with garbage instruction 968, and the debugger will subsequently attempt to execute garbage instruction 968 rather than target instruction 964. As a result, the program can be caused to run differently under the control of a debugger, and thus an attacker will have a difficult time obtaining accurate information about the operation of the program. Alternatively, or in addition, garbage instruction 968 can be chosen to signal the presence of a debugger to an external agent (EA), and/or to cause execution to fail.

1.3.1.3.1.6. Inserting Race Conditions

Because debuggers often affect the interleaving order of multi-threaded programs, another obfuscation technique is to intentionally insert race conditions between processes such that these conditions go one way when run "native" but another way when run under a debugger.

Figure 10:
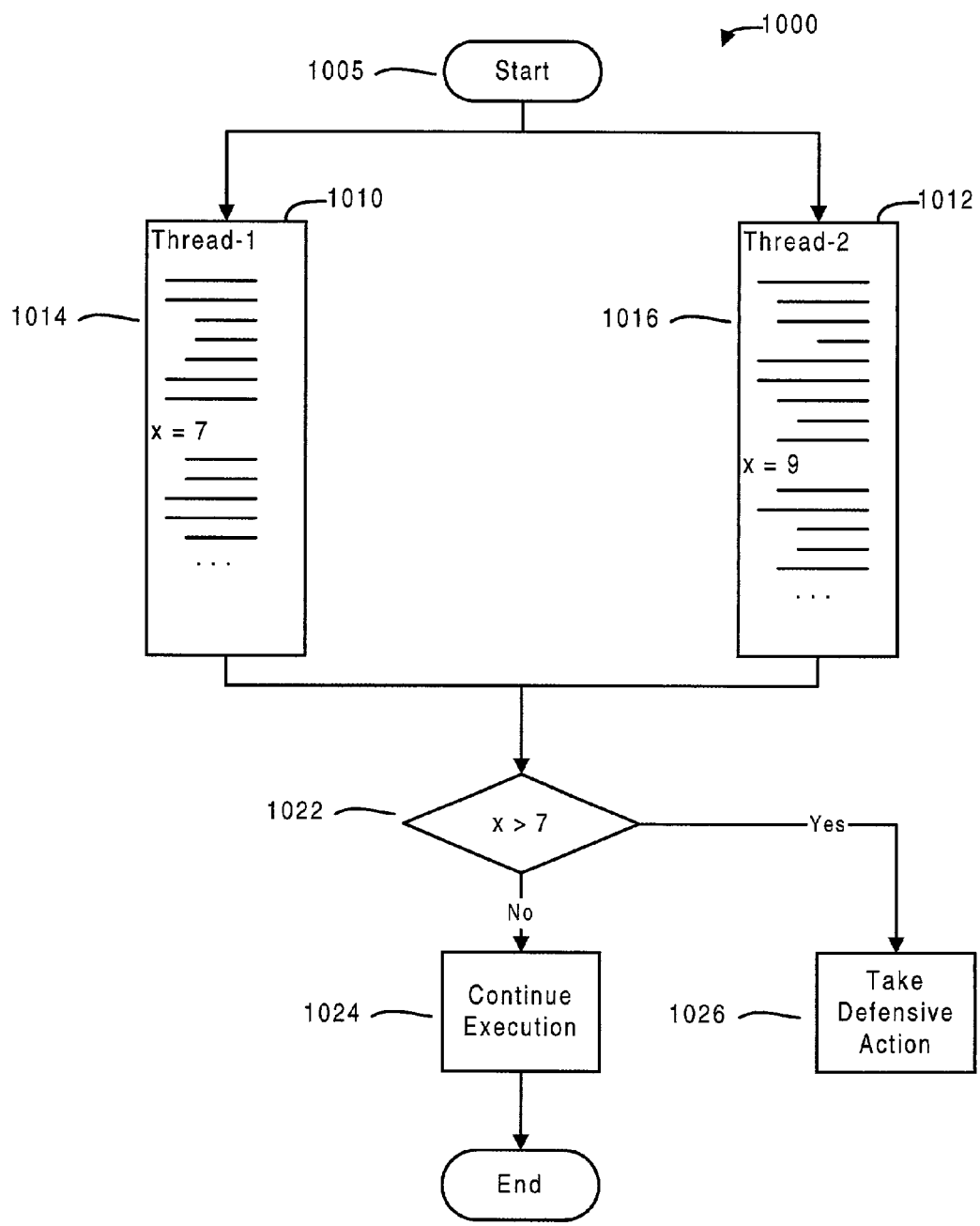
FIG. 10 illustrates a technique for detecting the presence of a debugger in accordance with the principles of the present invention.

This technique is illustrated in FIG. 10, in which code sequence 1000 contains control threads 1010 and 1012. Threads 1010 and 1012 each execute a sequence of code (1014 and 1016, respectively) before setting a variable, x, to a predetermined value. As shown in FIG. 10, if thread 1010 is able to execute code 1014 faster than thread 1012 is able to execute code 1016, the value of x will be equal to 9 after both threads have finished executing, since thread 1012 will set x to this value, overwriting the value that thread 1010 previously assigned to it. Thus, if a test 1022 is performed after both threads have finished executing (or after both threads have set x), it will be possible to determine which thread set x last. If the order of execution indicates that a debugger is present, appropriate defensive action can be taken (1026). Otherwise, normal execution continues (1024). The order of execution may be different under a debugger, since a debugger will typically execute only one thread at a time, or will stop only one of the threads for single-stepping. It will be appreciated that any suitable technique for monitoring the order of thread execution can be used in accordance with the principles of the present invention. Techniques like that shown in FIG. 10 can make code very difficult to dynamically trace, since if a debugger is detected the behavior of the code may differ from its normal behavior. Such techniques are also advantageous because they can obviate the need for suspicious code fragments that observe the cycle counter or real-time clock.

Because interrupts and other system processes will occasionally affect thread interleaving, it is typically only possible to give a high probability that race conditions will resolve consistently. However, that assurance can be strengthened by using appropriate loops. For example, block 1026 could test a counter and branch back to the start 1005 unless the counter exceeds a preset amount, in which case an attack could be reported.

1.3.1.3.2. Self-Modifying Code

Another way to discourage static or dynamic analysis of an SDP is to include self-modifying code. Code modification can take a variety of forms and encompasses a variety of techniques, including without limitation patching, encryption/decryption, and interpretation. Code can be modified in place or can be relocated to another location, such as the stack or the heap, and modified there. The following sections present several obfuscation techniques that involve code modification.

1.3.1.3.2.1. Dynamically Move Instructions into Stream

One advantageous obfuscation technique is to insert MOV instructions that store a byte (or some other predetermined amount of data) forward into the instruction stream. The targets of these MOV instructions can be initialized to incorrect values, thus making the static version of the program appear invalid. As the program runs, however, these "errors" will be corrected before they are able to affect execution, since the inserted MOVs will overwrite the incorrect values with the values that should be used during execution.

Figure 11:
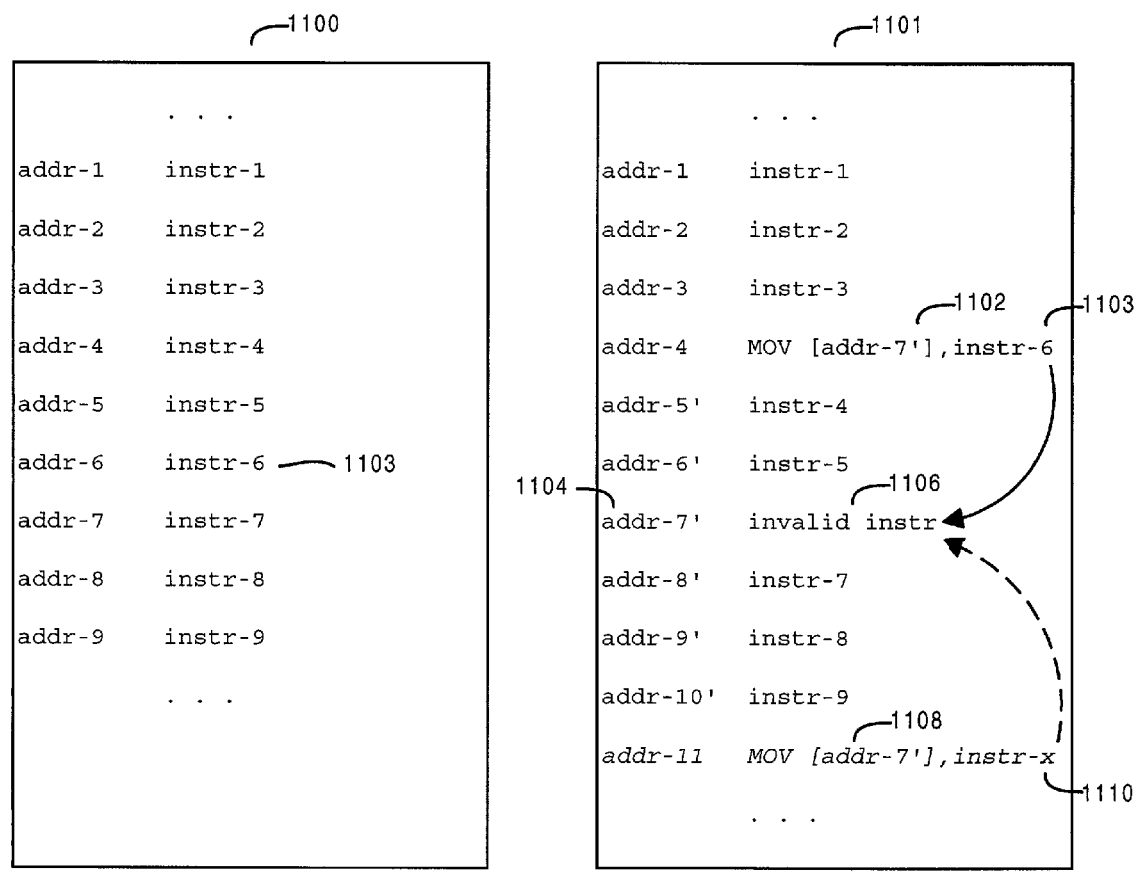
FIG. 11 illustrates a technique for interfering with the operation of debugger by storing instructions and/or data into the instruction stream.

FIG. 11 illustrates an implementation of this technique. As shown in FIG. 11, an obfuscated code sequence 1101 is formed by inserting a MOV instruction 1102 into code sequence 1100. MOV instruction 1102 is operable to move an instruction 1103 (or its numeric equivalent) to address location 1104. An instruction 1106—preferably invalid—is stored at address location 1104. When the program is executed, MOV instruction 1102 overwrites invalid instruction 1106 with valid instruction 1103. As a result, when execution reaches address location 1104, it will be occupied by instruction 1103, thus ensuring that execution of obfuscated code sequence 1101 is equivalent to the execution of original code sequence 1100.

Note that in the embodiment described in the preceding paragraph, only the first execution of instruction 1102 will effectively modify program 1101, since on subsequent executions of instruction 1102, instruction 1103 will already be stored at address 1104. Nevertheless, such frequent stores into the instruction stream can make it more difficult for a debugger to analyze what is happening. Alternatively, an initialization flag can be set after the first execution of instruction 1102. The initialization flag can be tested on subsequent passes, and instruction 1102 can be skipped if the flag is set. Either way, the technique shown in FIG. 11 advantageously lends itself to application in multithreading or multiprocessing environments, as the first thread (or processor) to execute will cause subsequent executions to work correctly.

The invalid instructions 1106 can be chosen to confuse static analysis. Thus, invalid instructions 1106 may, for example, include the opcodes for instructions of different lengths than the valid instructions that they replace (e.g., INC AX instead of MOV AX, BX), operand specifiers that cause the instruction length of the invalid instruction to be different than the instruction length of the valid instruction (e.g., INC AX instead of INC AH), and/or different operand values (e.g., MOV AX, BX instead of MOV CX, BX). As yet another example, the invalid instructions may replace branches with non-branches and vice versa (e.g., JMP target instead of INC CX).

To further confound static analysis, an additional MOV instruction 1108 can be inserted in instruction stream 1101 after target instruction 1103 is executed, the additional MOV instruction 1108 being operable to turn memory location 1104 back into an invalid instruction 1110. Such a change ensures that the memory image will be incorrect almost all of the time, thus making the memory image more difficult to analyze. The value 1110 written back to memory location 1104 need not be a constant, but may consist of any available value (e.g., a register value, etc.), since such a variable value will almost certainly not be equal to the correct value 1103. It will be appreciated, however, that the technique described in this paragraph generally does not interact well with multithreaded or multiprocessor operation, since if two threads are executing the same region, one may change the target instruction back to an invalid value before the other thread is able to execute the valid instruction. Thus, when this technique is used in a multithreaded or multiprocessor application, it is preferably applied within a critical section, or to code that is protected by a locking mechanism.

While modification of the instruction stream is relatively simple within a basic block, application of this technique across basic blocks generally requires that every entry into a block be modified to make the same correction to the block's code. Application across block boundaries is advantageous, however, in that it involves a JMP or conditional branch before the modified code is executed, further complicating static analysis. In any event, one skilled in the art will appreciate that the transformations of this section are preferably applied after the final basic blocks of the program have been determined.

1.3.1.3.2.2. Encryption Techniques

Figure 12:
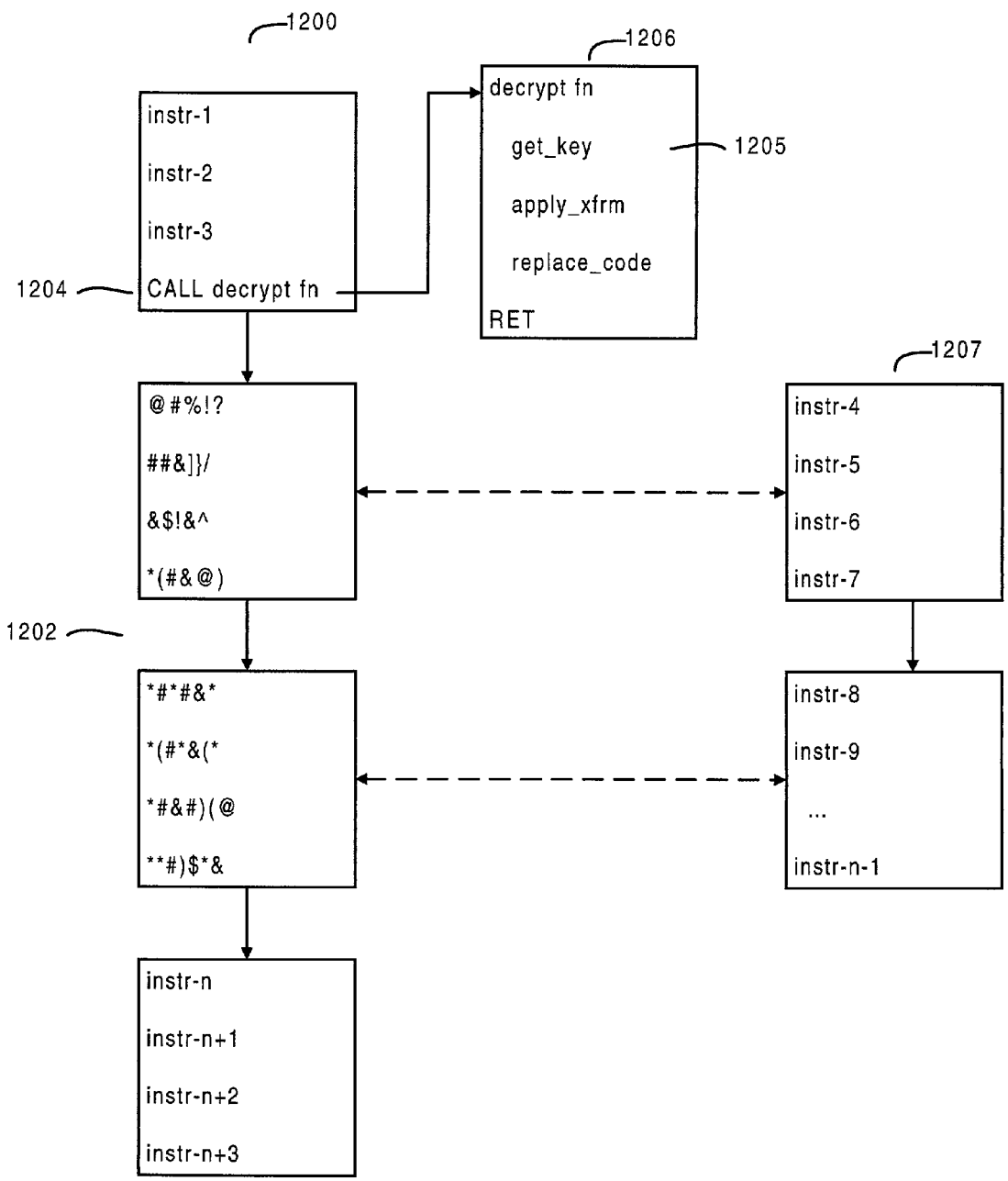
FIG. 12 illustrates a code encryption technique in accordance with the principles of the present invention.

Another code self-modification technique involves encrypting code sequences and inserting calls to, e.g., a support function that decrypts those code sequences prior to execution. FIG. 12 illustrates an embodiment of this technique. Referring to FIG. 12, portions 1207 of a code sequence 1200 are encrypted to form encrypted code sequences 1202. Any suitable encryption scheme can be used, including, e.g., an XOR with a constant key, a DES encryption scheme, or any of the well-known techniques set forth in Menezes et al., "Handbook of Applied Cryptography," pp. 191-319 (CRC Press, 1997), which is hereby incorporated by reference. It should be appreciated that entire blocks of instructions (e.g., basic blocks, sets of basic blocks comprising whole functions, etc.) can be encrypted in this manner in the static form of the program, preferably after any other software self-defense changes are made.

A call 1204 to a support function 1206 is inserted in code sequence 1200. Support function 1206 decrypts code sequences 1202 using a decryption key that reverses the encryption to recover code sequences 1207. The cryptographic key can be stored in a variety of places. For example, the key can be embedded in the call 1204 (at the point of modification), statically embedded in transformation function 1206, or derived from a mapping table in, or accessible to, transformation function 1206.

Thus, when code sequence 1200 is executed, a call to support function 1206 is made before encrypted code 1202 is executed. The support function obtains the cryptographic key (1205) and uses it to decrypt encrypted code 1202. Decrypted code 1207 is then written into the portion of memory occupied by encrypted code 1202. Support function 1206 then returns control to code sequence 1200, and the decrypted code is executed.

The security of this technique can be enhanced by decrypting immediately prior to execution and re-encrypting immediately after execution, thus minimizing the exposure of the decrypted code. Recurring, on-the-fly decryption of critical code also provides more obfuscation than a single decryption at the outset, as it is more difficult to find the decryption code and the keys, and more difficult to determine when and where to look at the result of the decryption. However, in multithreading applications this can require some locking and critical sections within the main program in order to ensure that a thread's decryption and encryption do not interfere with the execution of other threads. However, decryption at first entry also generally requires serializing the decryption function in order to ensure that another entry does not occur during decryption, which, although straightforward, must be explicitly coded.

In yet another exemplary embodiment, the encryption is recursive, with inner decryption routines protected by outer ones. And in one embodiment, the encryption techniques described in this section are used in combination with data allocation techniques similar to those discussed above in connection with FIG. 8, since applying both techniques typically makes the resulting code much harder to recognize than if either technique had been applied in isolation.

Figure 13:
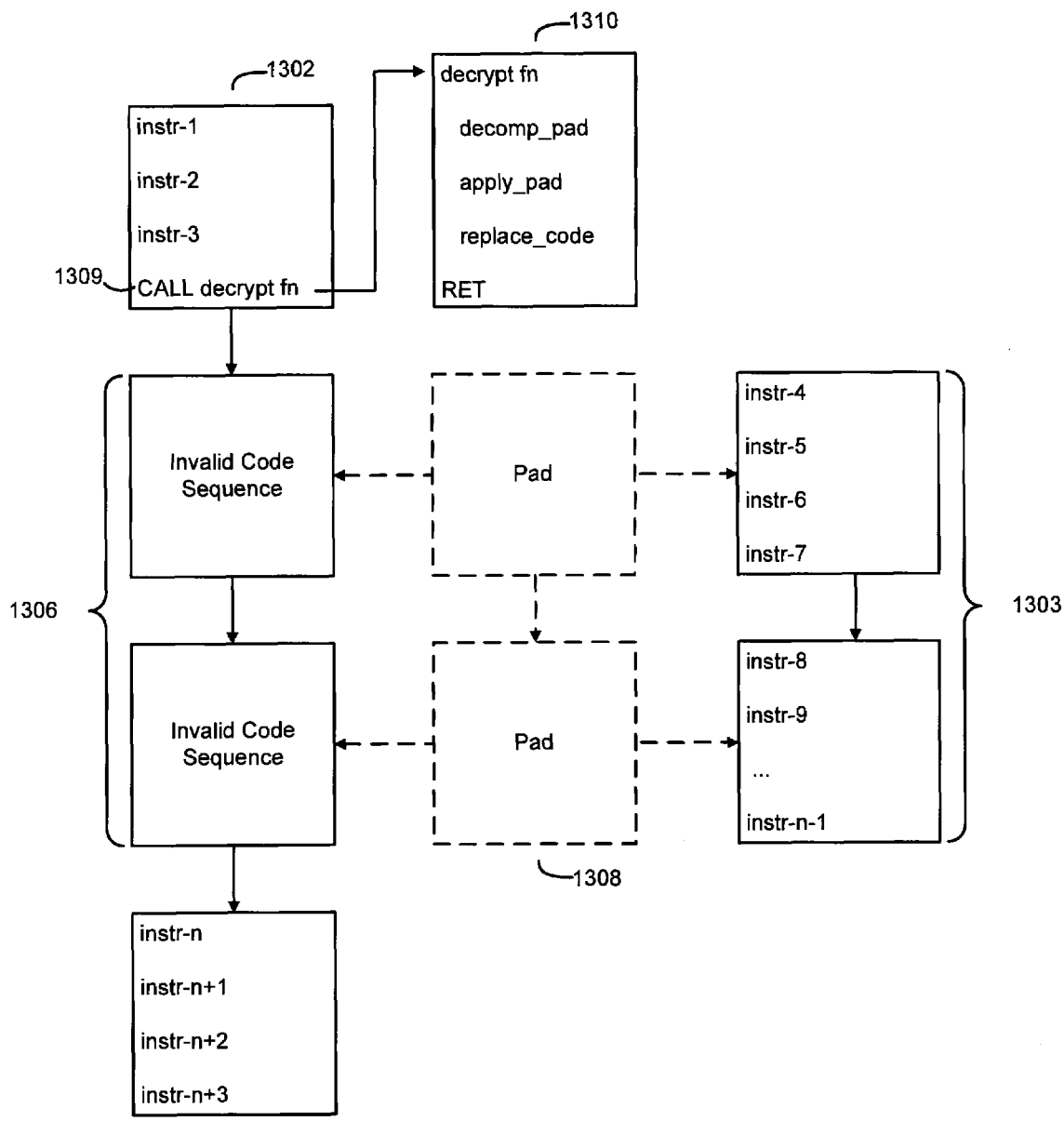
FIG. 13 illustrates a code self-modification technique in accordance with the principles of the present invention.

FIG. 13 illustrates a variation of the encryption technique described above. Referring to FIG. 13, a portion 1303 of code or data sequence 1302 is replaced with a sequence of invalid data or instructions 1306. This permits the static form of the program to contain apparently valid (or perhaps confusing) but incorrect instructions.

A one-time pad 1308 is generated by applying a transformation that maps sequence 1306 onto sequence 1303. For example, the exclusive-or (XOR) function can be used for this purpose, the one-time pad comprising the XOR of the desired instructions 1303 and the invalid instructions 1306. The one time pad is then stored in memory. In a preferred embodiment, the amount of storage needed to store the one-time pad can be reduced using compression. For example, a Lempel-Ziv encoding, run-length encoding, or any other suitable compression scheme can be used.

Referring once again to FIG. 13, a CALL 1309 to a support function 1310 is inserted in code sequence 1302. Support function 1310 is operable to decrypt code sequence 1306 using the one time pad 1308. Thus, support function 1310 will typically include instructions to decompress the one time pad, if it was compressed, and to apply the decompressed one time pad to invalid code sequence 1306, yielding valid code sequence 1303. As a result, when code sequence 1302 is executed, support function 1310 causes invalid code sequence 1306 to be replaced with valid sequence 1303. In one embodiment, a CALL to support function 1310, or a related support function, is inserted after invalid sequence 1306, this support function being operable to transform code sequence 1303 back into invalid code sequence 1306.

Yet another decryption technique is to insert CALLs to interprocess communication functions or MOVs to flags in shared memory that signal an external process to perform code modification. Specifically, the equivalent of self-modification can be performed using a separate process executing outside the thread requiring the modification. The separate process can be, e.g., another application process, a device driver, or some other independent thread of control. In addition, the separate process can share memory with the modified thread, and poll for flags set in the shared memory region to direct its activities. This technique is advantageous because binary modifications can readily test and set such flags; however, it will be appreciated that any interthread or interprocess communication mechanism available in the system (e.g., RPC, system calls, page faults, etc.) could also be used.

1.3.1.3.2.3. Prefetch Queue Dependencies

Another code modification technique is to store invalid instructions forward into the instruction stream. For example, HLT or INT 03 may be stored in place of a NOP (or a multi-byte privileged instruction), or a CALL to a support routine may be stored in place of several NOPs. If the cache and prefetch queue already contain the correct instruction, and the processor does not detect data/instruction interactions, the invalid information will not be seen in the instruction stream. However, when single-stepped under a debugger, the stores will complete well before the instructions are actually executed, so the invalid information will appear in the instruction stream. This technique is essentially equivalent to the technique discussed above in connection with FIG. 9.

This technique is generally processor-dependent, and for modern processors, such as the Pentium® processor family, may require that multiple page mappings be available (e.g., set up by program initialization). Once such addressability is established, however, the necessary binary modifications are similar to those for the other instruction stream modification techniques, described above, as are the issues with respect to multithreading and multiprocessing.

This technique may also be subject to random failures caused by interrupts or scheduler activity, since if the processor is interrupted between the store and the execution, execution will fail. For this reason such checks should be considered on a statistical basis, which is why HLT, INT 03, CALL, or a privileged instruction are appropriate choices, since they allow the exception handler (or CALLed function) to note that the exception has occurred, but to resume normal execution unless the frequency of such events is above a predefined threshold. Note that an arbitrary privileged instruction may be preferable to HLT, INT 03, or CALL, since such an instruction would be easily recognizable and would not interfere with other uses of the single-byte exception-generating instructions.

1.3.1.3.2.4. Implementation

Several of the obfuscation techniques set forth above involve writing or storing to the instruction stream. As a result, these techniques generally need the ability to write to the pages being executed. In some systems that may not be possible with the CS prefix, as some systems do not permit a code segment selector to be created that allows both execute and write permission. However, in Windows 95, Windows 98, and Windows NT, for example, the data segment maps the same addresses as the code segment, but with different permissions. Thus, obfuscation techniques that involve storing into the instruction stream can be enabled by ensuring that the pages containing the executable image are writeable. As one of ordinary skill in the art will appreciate, depending on system support, that may require adjusting page permissions or copying the image to writeable storage.

In addition, while some of the techniques set forth above—such as forward stores into the instructions stream and temporary modification of the instruction stream—can be readily implemented as binary modifications to the program, other techniques may require relatively complex code to be included in the SDP, and are thus more easily implemented via function calls. This allows the binary modifications made to the program itself to be relatively straightforward, consisting of little more than calls to the functions that implement the obfuscation techniques, rather than doing the work of the functions themselves. To complicate both static and dynamic analysis of a program that uses such support functions, multiple instances of the support functions can be used, each implemented differently.

Another implementation issue involves the ability of several of the techniques set forth above to interact with processor-specific handling of writes to the instruction stream. In some Intel 80x86 models (e.g., 80386, 80486), for example, such writes can get "ahead" of the instruction prefetch logic, and may not be recognized for several cycles. In such cases, a JMP instruction can be used to ensure that the prefetch queue is flushed. Moreover, in Pentium and later CPUs, a write to the linear address of a prefetched instruction will cause the prefetch queue to be flushed, so that the modified instruction will be re-fetched when required. Thus, obfuscation techniques should be coded to ensure the appropriate effect with respect to instruction prefetching. In some instances, forcing a branch before the modified instruction is executed will be sufficient. A simple alternative is to follow all such stores with a JMP x+2, where x is the address of the JMP x+2 instruction, which will cause the prefetch queue to be flushed. However, because a Pentium processor's check of instruction addresses is made by linear address, if two pages of different linear addresses are mapped to the same physical address, it will still be possible to modify an instruction after it has been prefetched without the modification having effect. In such cases, a serializing instruction will generally need to be executed, although anything that causes an interrupt or exception will typically suffice. For Intel processors, CPUID is an example of a non-privileged serializing instruction, however, in some applications it may be undesirable to use this instruction since it affects the registers and is not supported on 80486 and earlier processors. However, interrupts or exceptions such as IRET can be used instead, as they effectively serialize as well.

One skilled in the art will appreciate that although these techniques are described in the context of the Intel 80×86 processor architecture, other processors have similar issues with respect to self-modifying code. For example, RISC architectures generally have less support for code self-modification and typically require serialization or cache flushes in order to have access to modified instructions. However, one of ordinary skill in the art will appreciate that since virtually all processors need some support for code modification in order to support dynamic code generation and debugging, the techniques set forth herein are generally applicable across a wide range of architectures.

Obfuscation techniques that involve self-modifying code may also interact with internal and/or external mechanisms that attempt to validate the correctness of the program's memory image (e.g., the Authenticode® software produced by Microsoft Corporation, or other credential mechanisms, such as those described in the Ginter '900 patent, the Shear '754 application, and the Sibert application, previously incorporated by reference herein). While such mechanisms guard against patches, breakpoints, and other modifications, these mechanisms will also typically detect the changes caused by self-modifying code and indicate that they are invalid.

One way to prevent such an inappropriate detection is to identify the regions in which self-modification may take place, and exempt them from the validity check function. While an attacker could potentially obtain the location of the self-modifying code from the check function itself, this attack can be complicated by encrypting the check function's validation information. Yet another way to prevent inappropriate detection is to accept multiple results from the check function for certain regions. While this can lead to an increase in validation values (for example, if there are 20 possible self-modifying regions, there could be $2^{20}$ possible cryptographic hash values for the program, depending on which self-modifications have occurred), this technique is advantageous in that it conceals information regarding the whereabouts of the self-modifying regions.

A variety of techniques have thus been presented for discouraging static and dynamic program analysis. It should be appreciated that a variety of similar or equivalent techniques could also be used without departing from the principles of the present invention. Because some of these techniques can be relatively expensive at runtime, it may be preferable not to use these techniques in performance-critical code in applications that cannot afford such a degradation of performance.

1.3.1.4. Other Transformations

Additional obfuscation techniques that can be implemented via, e.g., binary code modification are described below.

1.3.1.4.1. Transformed External Calls

In an ordinary compiled program, external calls (e.g., to Windows primitives) can be identified with relative ease: their names through the import dictionary, and their locations through the thusly-identified offsets in CALL instructions. For purposes of obfuscation, it can be helpful to obscure either or both of these relationships. This section describes several illustrative techniques.

1.3.1.4.1.1. Funnel External References Through Redirector

Figure 14:
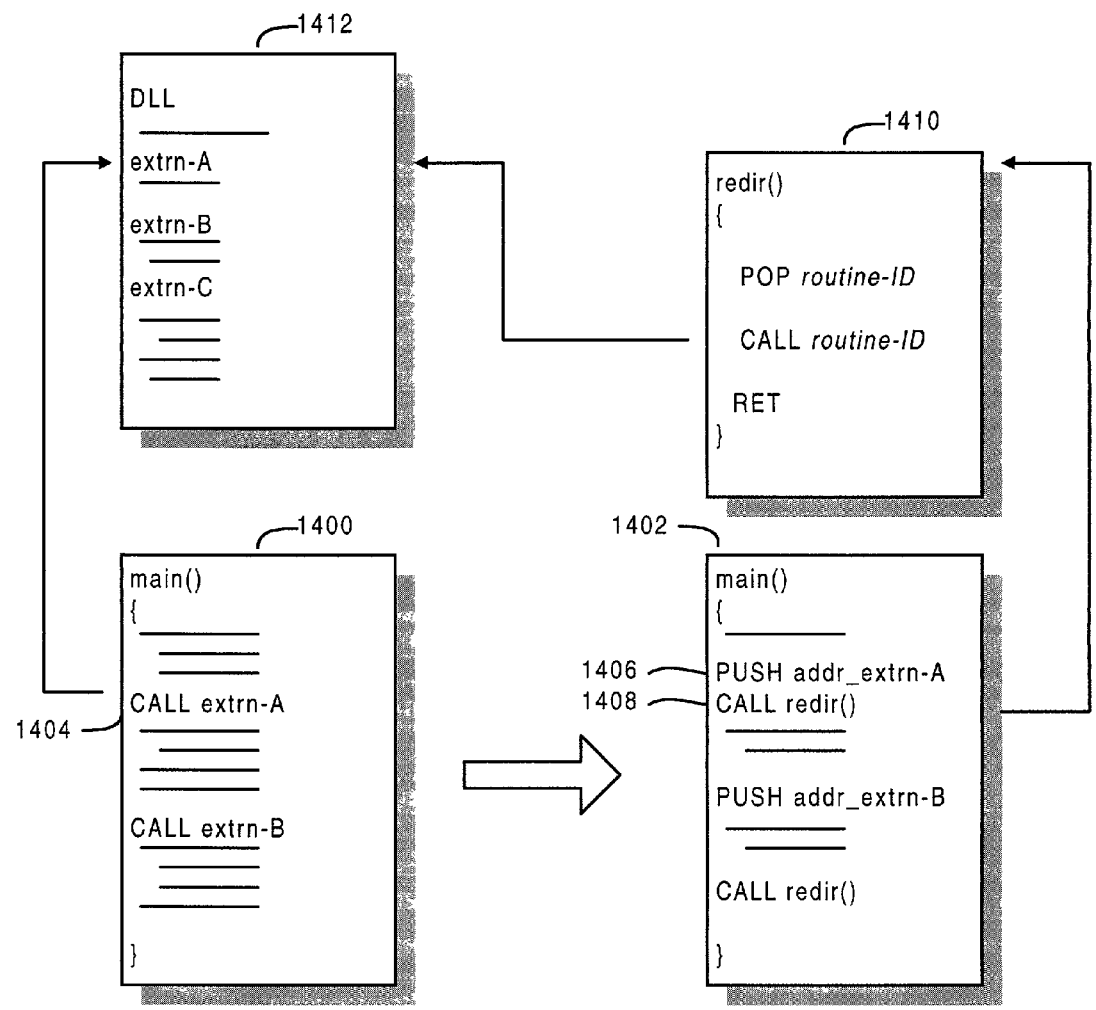
FIG. 14 illustrates a technique for obscuring external calls.

One technique for obscuring external calls is to replace them with calls to a special internal routine that invokes external functions. Referring to FIG. 14, a code sequence 1400 is transformed into obfuscated code sequence 1402 by replacing external CALLs 1404 with PUSH routine-ID instructions 1406 followed by CALLs 1408 to a special handling routine 1410. Special handling routine 1410 is operable to pop the routine-ID off of the stack and call the corresponding external routine in, e.g., library 1412.

The routine-ID can comprise any suitable mechanism for identifying the external routine that is to be called. For example, the routine-ID may consist of the name of the external routine or, for greater obfuscation, its address. Because the name or address will not appear with a CALL in the program binary, it can make the job of finding calls to external routines more difficult. Having multiple instances of target code 1410 can make the analysis still more complex, since even if the functionality of one instance of code 1410 is figured out, the other instances will still remain, thus obscuring additional CALLs to external routines in program 1402.

A way to achieve even greater obfuscation is to remove all reference to either the name or the address of external routines. For example, in Windows systems the routines in a loaded DLL will typically be in a certain order. Thus, one can examine this order at link time and modify the code of program 1400 to make external calls by ordinal, either directly or by using a redirection technique such as the one shown in FIG. 14. A related technique is to use an initialization routine with an encrypted table of all the names of the routines called externally. The initialization routine decrypts the table, uses run-time calls to locate the relevant entry-points of the external routines, and sets up a table that maps routine-numbers to entry-point addresses.

1.3.1.4.2. Automated Decryption of Object State

Much of the foregoing description has focused on the protection of program code. It is also possible to conceal the object state when it is stored in memory but is not being used. In addition to the techniques described above, one technique for protecting the object state is to use a modification tool to change some or all of the methods of specified classes to decrypt the object state at entry and to encrypt it again at exit or when calls are made out from the method. A relatively simple and fast encryption algorithm such as Vernam can be used, and particular classes can be selected by the programmer for this treatment. Note that the object state need not always be in encrypted form. For example, a boolean flag can be added that tells entry code whether decryption is necessary or not.

1.3.1.4.3. String Obfuscation

It is also desirable to minimize the number of meaningful literal strings in the body of the object program. For example, a program may include strings for user interaction, error messages, trace messages, and the like that could give an attacker useful information about the structure of the program and the location of important routines.

One way to avoid having meaningful literal strings in the body of the object program is to use a special mechanism such as a "primer" or macro to tag strings so that a modification tool can encrypt them and insert appropriate decryption code where they are used. Again, a relatively simple encryption system like Vernam is sufficient, although other techniques could also be used.

For example, a macro can be defined as follows:

define S(str) decrypt_string(SPECIAL_TAG str)

In this macro the string is prefixed at compile time with the constant SPECIAL_TAG, and passed as a parameter to the decrypt_string function, whose job is to return a pointer to the decrypted string. The programmer (or a special program pre-processor) replaces all uses of constant strings "<str>" in the source code by uses of S("<str>"). The modification tool searches for the constant SPECIAL_TAG and encrypts the string that follows it. The decrypt_string function preferably maintains a runtime pool of decrypted strings in the heap, and remembers the addresses of the strings so as not to make multiple copies of the same string.

1.4. Control Graph Obfuscation

A relatively strong form of software self-defense can be provided by manipulating a program's control-flow graph to obfuscate the program's control flow. There are a variety of techniques for obfuscating a program's control flow, and these techniques can be performed in a variety of ways, including via manual transformation of the source code and/or automatic source-to-source transformations, obfuscating compilers, or sophisticated binary program editors.

1.4.1. Code Replication

The idea behind code replication is to duplicate pieces of a program's code such that the structure of the resulting control-flow graph is made more complex, more difficult to generate by a source program using only structured control constructs, and/or one from which it is relatively difficult to recover the original control-flow graph.

The control-flow graph of the obfuscated program preferably has many redundant paths that correspond to a single path in the original program. Execution may follow any of these paths, as they each produce effectively the same behavior. Thus, different executions of a given path in the original program (e.g., different iterations of a loop) may take different paths in the obfuscated program, complicating attempts at static and/or dynamic analysis.

The increased complexity of the obfuscated control-flow graph can render the obfuscated program of little help to someone wishing to recover useful source code, as deobfuscating such a program entails discovering which redundant paths have the same behavior. The complexity of solving this problem using static or dynamic analysis makes it difficult to decompile the obfuscated program to a valid source program.

While this obfuscation technique can be advantageously applied to large, inter-procedural control-flow graphs (e.g., whole programs), it is also applicable to intra-procedural control-flow graphs (e.g., within functions). Indeed, this technique can be applied at the intra-procedural level, and can also be independently and/or simultaneously applied at the inter-procedural level. Thus, while the discussion of code replication that appears below is largely directed to the intra-procedural context, where basic blocks are connected by simple jumps, it will be appreciated that the disclosed techniques are readily applicable to other contexts.

Figures 16A, 16B:
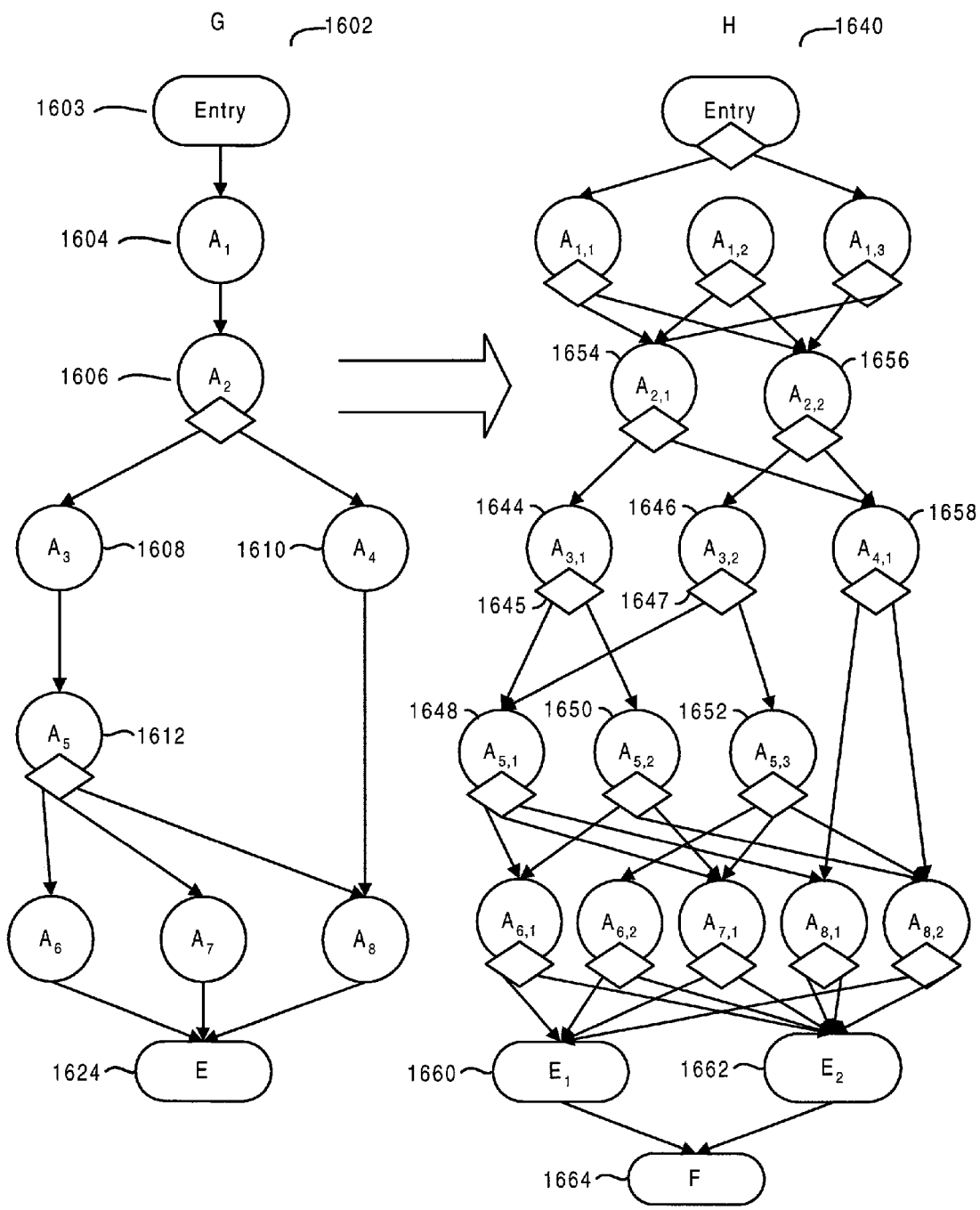
FIGS. 16A, 16B, 16C, and 16D illustrate code replication techniques in accordance with the principles of the present invention.

FIG. 16A illustrates the control graph, G 1602, of a program or program module. Control-flow graph 1602 can be seen as a directed graph with nodes, $A_i$ (1604, 1606, etc.) representing basic blocks, and outgoing edges (arrows) representing transfers of control. Nodes with a single outgoing edge, such as node 1604, represent unconditional jumps, while nodes with two outgoing edges, such as node 1606, represent ordinary conditional jumps, and nodes with more than two outgoing edges, such as node 1612, represent indirect jumps through function pointers or jump tables. Typically, there is a single node with no incoming edges, called the entry node (e.g., node 1603), and a single node with no outgoing edges, called the exit node (e.g., node 1624).

In most well-formed programs, all of the nodes, $A_i$, in the input graph are live. That is, all of the nodes in the input graph can be reached by one or more paths from root 1603. In general, each edge is also realizable. In other words, there exists at least one program execution that follows that edge. While an obfuscating transformation need not test for these properties—and indeed, can be applied to programs that do not possess one or both of these properties—it is preferable to substantially preserve these properties to the extent they are true in the original program, as it is desirable to avoid providing clues to a deobfuscator by adding obviously dead nodes or clearly unrealizable edges.

1.4.1.1. Code Replication Algorithm

Figure 16C:
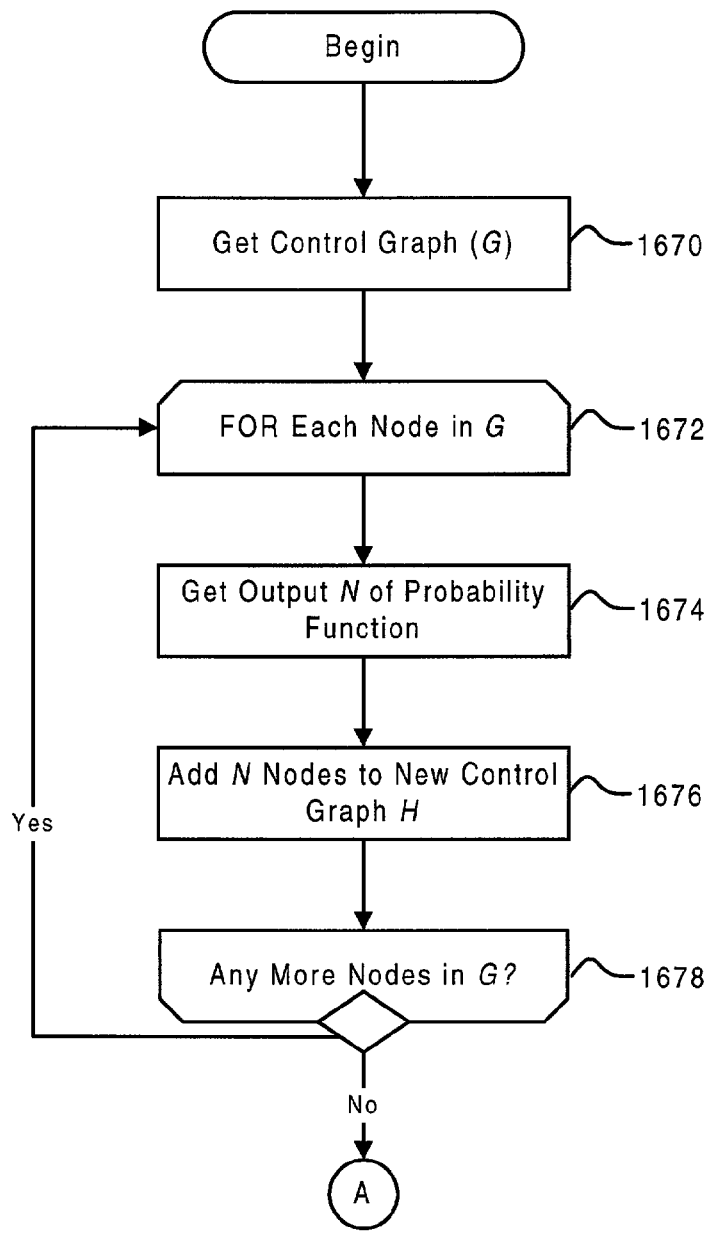
Figure 16D:
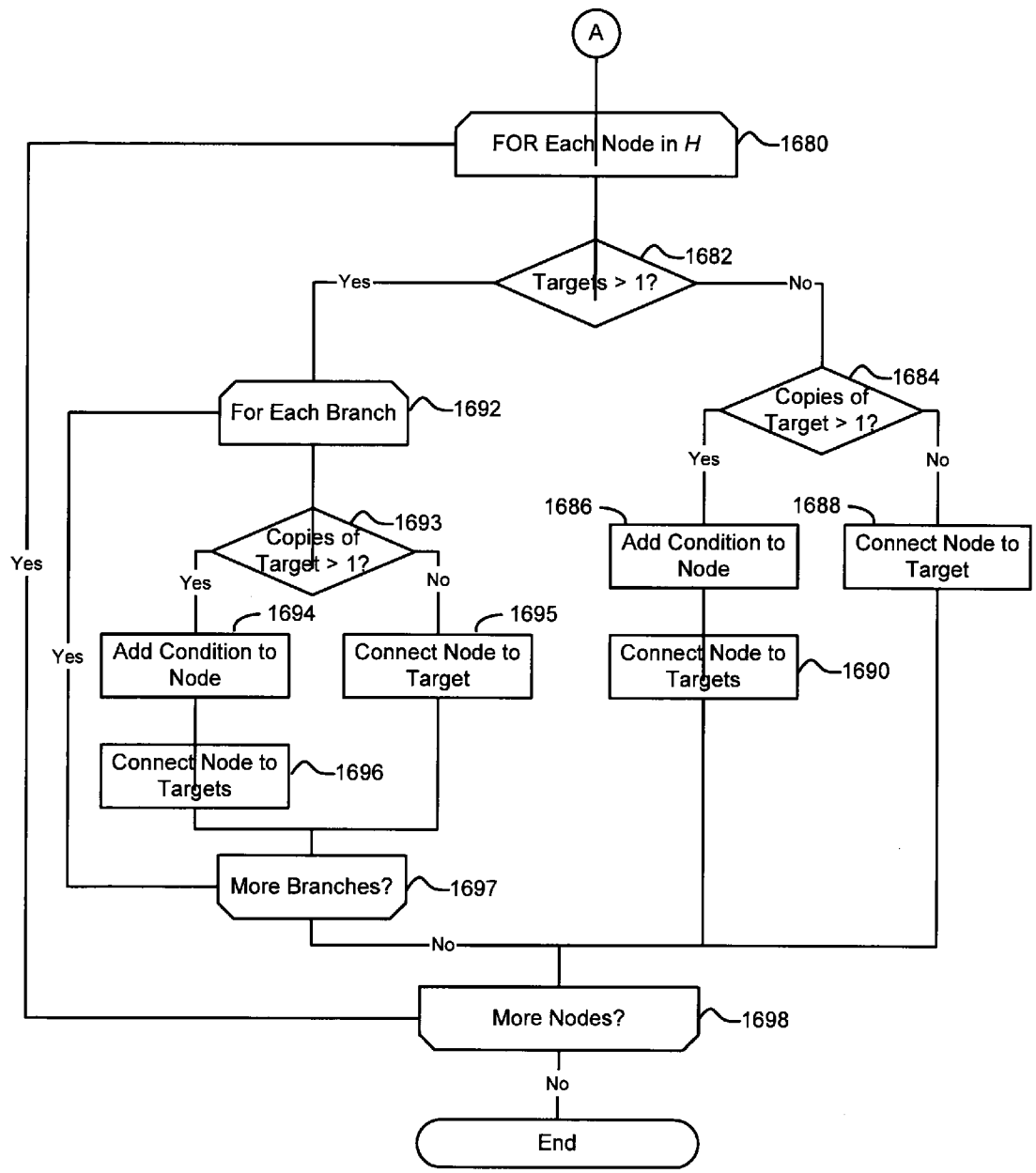

FIG. 16B illustrates a control graph, H, 1640 resulting from the application of a code replication algorithm such as that set forth in FIGS. 16C and 16D to the control graph, G, of FIG. 16A.

Referring to FIG. 16C, control graph H is constructed by creating one or more nodes $A_{i,j}$ for each node $A_i$ in control graph G. In a preferred embodiment, a decreasing probability function is used to control the number of nodes $A_{i,j}$ that are added to H, and hence the level of obfuscation (1670-1676). An advantage of probabilistic replication is that it makes it difficult for an attacker to determine how many copies of a node were made. In a preferred embodiment a negative exponential probability function is used, since a negative exponential provides an easy way to bound the expected code growth. In other embodiments, other probability functions can be used.

Once the nodes of control graph G have been replicated (1678), edges are added to H as shown in FIG. 16D. If a node $A_{i,j}$ in control graph H corresponds to a node $A_i$ in control graph G with a single outgoing edge directed at a target node $B_i$ (i.e., a "No" branch from block 1682), then there will exist one or more target nodes $B_{i,k}$ in control graph H. If there are multiple $B_{i,k}$ in H that correspond to $B_i$ in G (i.e., a "Yes" branch from block 1684) then a test is preferably added to $A_{i,j}$ (block 1686) and edges are connected from $A_{i,j}$ to a suitable number (e.g., 2) of $B_{i,k}$ (block 1690). In a preferred embodiment the particular nodes $B_{i,k}$ to which each node A is connected are chosen quasi-randomly. Otherwise, an edge is simply added from each $A_{i,j}$ to the unique $B_{i,k}$ in H (block 1688).

The results of this process are illustrated in FIGS. 16A and 16B, in which node 1608 in control graph G 1602 has been replicated by nodes 1644 and 1646 in obfuscated control graph H 1640. Similarly, node 1612 in G has been copied to nodes 1648, 1650, and 1652 in H. Because nodes 1644 and 1646 have multiple target nodes (i.e., 1648, 1650, and 1652), tests 1645 and 1647 are added to nodes 1644 and 1646, respectively, and edges are connected from each of nodes 1644 and 1646 to a pair of target nodes, as shown.

Referring back to FIG. 16D, if a node $A_{i,j}$ in control graph H corresponds to a node $A_i$ in control graph G with two outgoing edges directed at target nodes $C_i$ and $D_i$ (i.e., a "Yes" exit from block 1682), there will exist one or more corresponding target nodes $C_{i,k}$ and $D_{i,m}$ in control graph H. The nodes in H can be connected by simply adding edges from each $A_{i,j}$ to a quasi-randomly selected $C_{i,k}$ and $D_{i,m}$ in H (blocks 1692-97). (It will be appreciated that while a preferred embodiment uses quasi-random selection, any suitable method of selection could be used). The results of this process are illustrated in FIGS. 16A and 16B, with reference to nodes 1606, 1608, and 1610 in control graph G, and with reference to nodes 1644, 1646, 1654, 1656, and 1658 in control graph H in particular. A similar procedure can be used to handle nodes with more than two outgoing edges, as is also shown in FIGS. 16A and 16B with reference to node 1612 in control graph G and corresponding nodes in control graph H.

With regard to exit node, E 1624, in control graph G 1602 there may be more than one corresponding node, $E_i$ 1660, 1662, in new control graph, H 1640. If this is the case, as shown in FIG. 16B, a new node, F, 1664 is preferably created to serve as the unique exit node of H, and an edge is connected from each $E_i$ to F. Alternatively, an arbitrarily-selected $E_i$, can be selected to serve as the exit node, and the other $E_i$ can be directed to it. It will be appreciated that other ways of handling the exit node could also be used, including simply allowing H (or G) to have multiple exit nodes.

In selecting nodes $B_{i,k}$, $C_{i,k}$, and $D_{i,m}$, above, care should be taken to avoid creating new dead nodes in the resulting control flow graph. For example, when connecting nodes $A_{i,j}$ to target nodes $B_{i,k}$, it is possible to ensure that there are not any newly-created $B_{i,k}$ without incoming edges by first choosing $B_{i,k}$ that do not yet have an edge from an $A_{i,j}$, if there are such (as long as there are enough $A_{i,j}$). However, this may not ensure that all nodes in the final graph are live, as there can be connected regions of the graph that are not reachable from the root. In FIG. 16B, $A_{1,2}$ is an example of such a dead node, which could be recognized as such by an attacker and discarded. This can be avoided in any of several ways. For example, it is possible to iterate through the nodes of the original control-flow graph 1602 in either depth-first or breadth-first order, starting at the entry node, and deleting nodes and/or adding new edges as appropriate. This will ensure that there is a path from the root to each node $A_{i,j}$ and thus local liveness will imply global liveness.

When a node $A_i$ has a single outgoing edge to $B_i$ and there are multiple copies of $B_i$ (i.e., $B_{i,k}$), obfuscation can optionally be enhanced by partitioning the group of $B_{i,k}$ into two sets in order to make this case look more like the case where $A_i$ has two outgoing edges. A further refinement would be to use compiler constant-propagation techniques to propagate the results of the tests added to the $A_{i,j}$ through the $B_{i,k}$ to produce inequivalent code segments.

With regard to the tests that are introduced into the $A_{i,j}$, one embodiment advantageously uses tests that are the same as, or similar to, tests in nearby code (e.g., tests that are in the same scope, so that the same variables are available). For instance, if there is a nearby test of P, the test not(P) could be used in an $A_{i,j}$. As another example, if nearby code tests x>y, the tests x<y, x<(y+2), or x>=y could be used. Using tests similar to those in nearby code makes it possible for a given test to branch different ways in different executions, thus complicating dynamic analysis and making more edges realizable. Note that these tests or conditions are essentially irrelevant to the correct functioning of the program—it does not matter how they branch, since the nodes or sequences to which they branch are equivalent. In addition, or alternatively, tests and conditions can be chosen that are non-deterministic and/or opaque, in that they are known to the obfuscator, but not the attacker, to always (or never) be true.

To make recovering a smaller, more useful, control-flow graph difficult, it is desirable to make it relatively difficult to identify nodes in the obfuscated control-flow graph that are copies of a single original node. Thus, it is desirable for the various copies of a node to be relatively different, and/or for copies of different nodes to be similar. To make the copies different, the local obfuscation techniques discussed above can be used, such as choosing different instructions that do the same thing, using different register allocations, inserting short null-effect sequences or opaque tests, and/or inverting the sense of the test instructions at the ends of some blocks.

In one embodiment the code-replication techniques discussed herein are advantageously applied to relatively large control-flow graphs and relatively small basic blocks. Large control-flow graphs yield more potential execution paths, while small basic blocks make it harder to determine which basic blocks are copies of the same block. It should be appreciated that large basic blocks can be artificially split at a small cost in run time, and/or split differently in different copies of the program or code. This effectively increases the size of the obfuscated control-flow graph without significantly increasing program size, and makes it more difficult for an attacker to find corresponding blocks. It will be appreciated, however, that code-replication techniques are readily applicable to control-flow graphs, and basic blocks, of many different sizes.

1.4.1.2. Properties

The code growth associated with the code replication techniques described above can be adjusted on a per-function basis and/or on a per-block basis, and will typically be bounded by a small multiplicative factor as long as the probability distribution function in 1676 has a small expected value. For example, in the embodiment described above in connection with FIGS. 16A-16D, code growth can be tuned by selecting the probability function used to create nodes in the new control graph, H, and/or by varying the parameters of the probability function that is selected.

Run-time cost for an interpretive implementation (e.g., the Java Virtual Machine) should be small, as the additional cost is basically the cost of the extra tests. Cache performance, instruction scheduling, and instruction pipeline flushing will be largely unaffected for an interpretive implementation. These issues may, however, become more significant in the context of a native code implementation, but since control-graph duplication is tunable, its impact on frequently-used loops can be minimized.

1.4.1.3. Resistance to Attack

There are a variety of ways to frustrate attacks on a program that has been obfuscated using the code replication techniques described above. First, the number of basic blocks that are added to the control graph can be increased by duplicating blocks, splitting blocks, and/or adding null blocks. In addition, the attacker's task can be made more difficult by enlarging the set of obfuscation transformations that are used, and/or by increasing the strength of the transformations themselves (e.g., by rearranging code, inserting null-effect sequences, and/or making irrelevant conditions suitably stealthy, so that equivalent blocks seem to be different).

Figure 15:
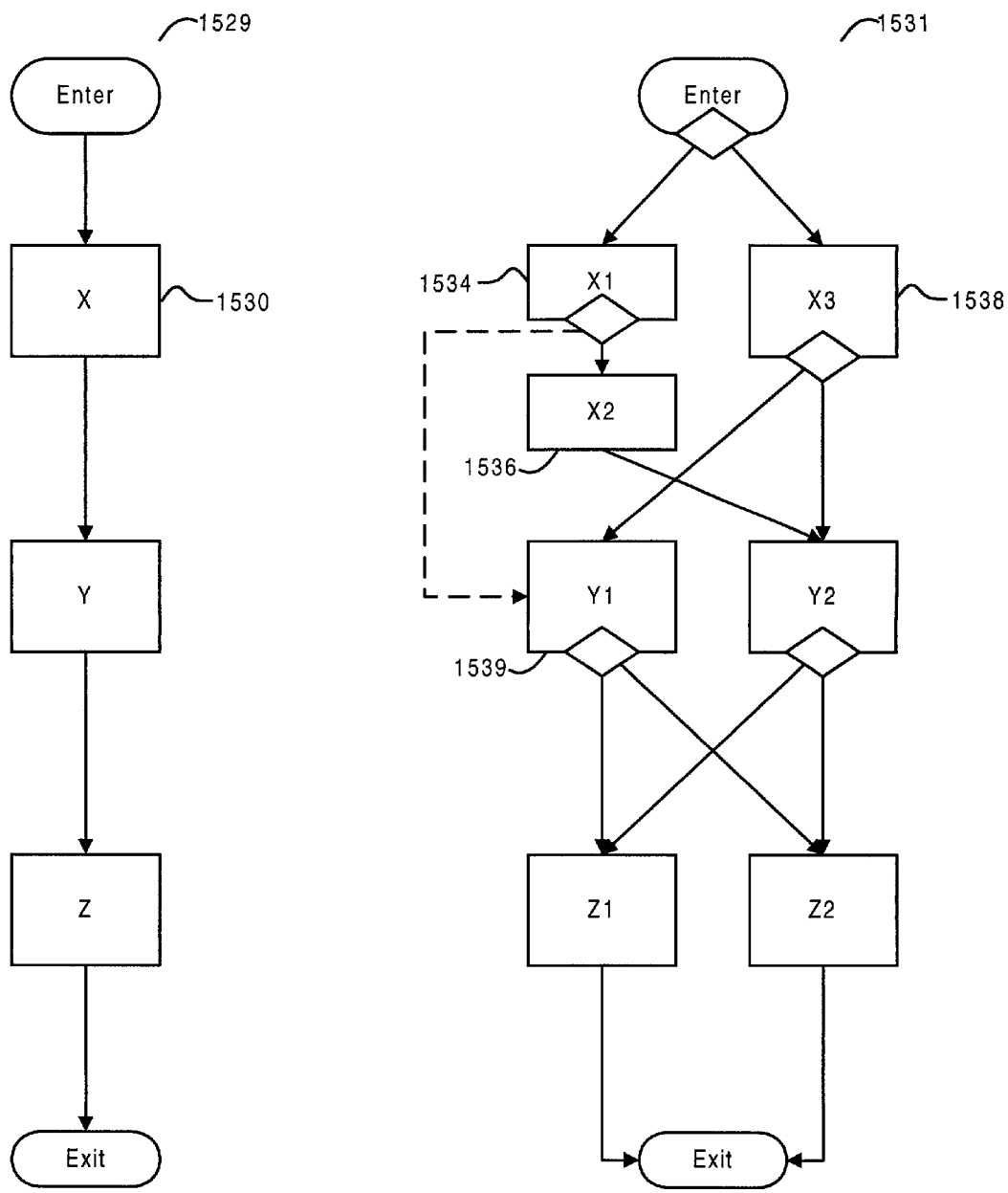
FIG. 15 illustrates a control graph obfuscation technique in accordance with an embodiment of the present invention.

Yet another technique for resisting attack is to split different paths through the control graph in different ways. For example, the block splitting, rearranging, and duplicating techniques that were discussed above can be applied to the control graph. This process is illustrated in FIG. 15, where block X 1530 in the original control graph 1529 is replaced by two equivalent code sections in the obfuscated control graph 1531—one section made up of blocks $X_1$ and $X_2$ (1534 and 1536), and the other made up of block $X_3$ (1538). Block $X_1$ (1534) includes a conditional branch to $X_2$ (1536), with a fall-through to block $Y_1$ (1539) that is not taken. Block $X_1$ can be written so that it affects the variables that are used by $Y_1$ (if it branched to $Y_1$, which it does not), but not those that are used by $X_2$ (or at least not permanently and/or adversely). Accordingly, it is only the combination of $X_1$ and $X_2$ that is equivalent to $X_3$. Analysis can be made more complicated by crossing between paths in such a way that the same block executes in two paths, but plays a different role in each.

Thus, the code-replication transformation makes it harder to understand the over-all structure of a program or to otherwise reverse-engineer the program, and is able to provide this protection without inserting special security mechanisms into the source code. As a result, this transformation is also valuable for hiding other software self-defense mechanisms.

1.4.2. Code Fusion

Another control graph obfuscation technique is code fusion. The idea underlying code fusion is to find common sequences of instructions that occur in different basic blocks, and to turn these common sequences into "semi-closed" subroutines. That is, the idea is to leave one copy of the common code in place and to replace the other occurrences of the code with branches to the retained copy. Following the retained copy, one or more conditional branches or a jump table can be placed to return control to the code following the other occurrences of the common sequence. Alternatively, all of the common code segments can be copied to a new subroutine which is configured to execute the common code segment and return control to the appropriate locations in the main program.

Like code replication, code fusion typically introduces irreducible control graphs, thus making the resulting code difficult or impossible to decompile directly into a structured program. Code fusion can also make a program's object code more difficult to understand by making it difficult to recover a control graph that is isomorphic to the original control graph. Moreover, like code replication, code fusion provides the obfuscator with the flexibility to vary the degree and cost of obfuscation for different parts of the code, and has a relatively small impact on run time.

Unlike code replication, however, which expands code by creating multiple equivalent instances of basic blocks in the original program, code fusion may contract code—or at least have little influence on its size—because it reuses common sub-sequences of instructions in the original program. However, since jumps or calls are added to break up what was originally straight-line code, there can be a certain amount of performance degradation.

Code fusion, like code replication, is most easily explained in terms of a program that is represented by a collection of nodes containing basic blocks (e.g., straight-line code not containing branch targets) connected by edges representing branches (conditional or unconditional).

Known tools, such as those used in the context of optimizing compilers, can be used to perform useful tasks including constant propagation and the computation of node reachability, node dominance (every control path from A ultimately goes through B), and variable liveness. See, e.g., Waite and Goos, *Compiler Construction* (Springer-Verlag, 1984).

One of the advantages that the obfuscator will have over an attacker is that this analysis can be done in the original, non-obfuscated control graph. Constant propagation and variable liveness are only needed for the extra obfuscation variables, if any, added by code fusion. Thus, it is not necessary to understand or fully analyze a program to obfuscate it using this technique.

1.4.2.1. Finding Common Sequences

Finding replica sets is potentially the most computationally demanding part of the code fusion process. Within the collection of basic blocks, the goal is to find sequences of instructions that occur in two or more places. To that end, it is possible to use virtually any of the well-known pattern-matching algorithms designed to find repeated patterns in large strings, and even the relatively simple ones will work well enough in practice. Since code generated by a compiler tends to be highly stylized, it will generally be fairly rich in common sequences.

It should be appreciated that for purposes of practicing the present invention it is not necessary to find all common sequences. Instead, it will typically be sufficient to find just enough to obfuscate the structure of the program. In addition, it is not necessary to find maximal sequences, although it is preferable to find sequences at least as long as the branching code that is added. In terms of obfuscation, it will also typically be an advantage to pick sequences that do not correspond to entire statements or expressions, as this will generally make decompilation more difficult.

1.4.2.2. Creating Semi-Closed Subroutines

Figure 17A:
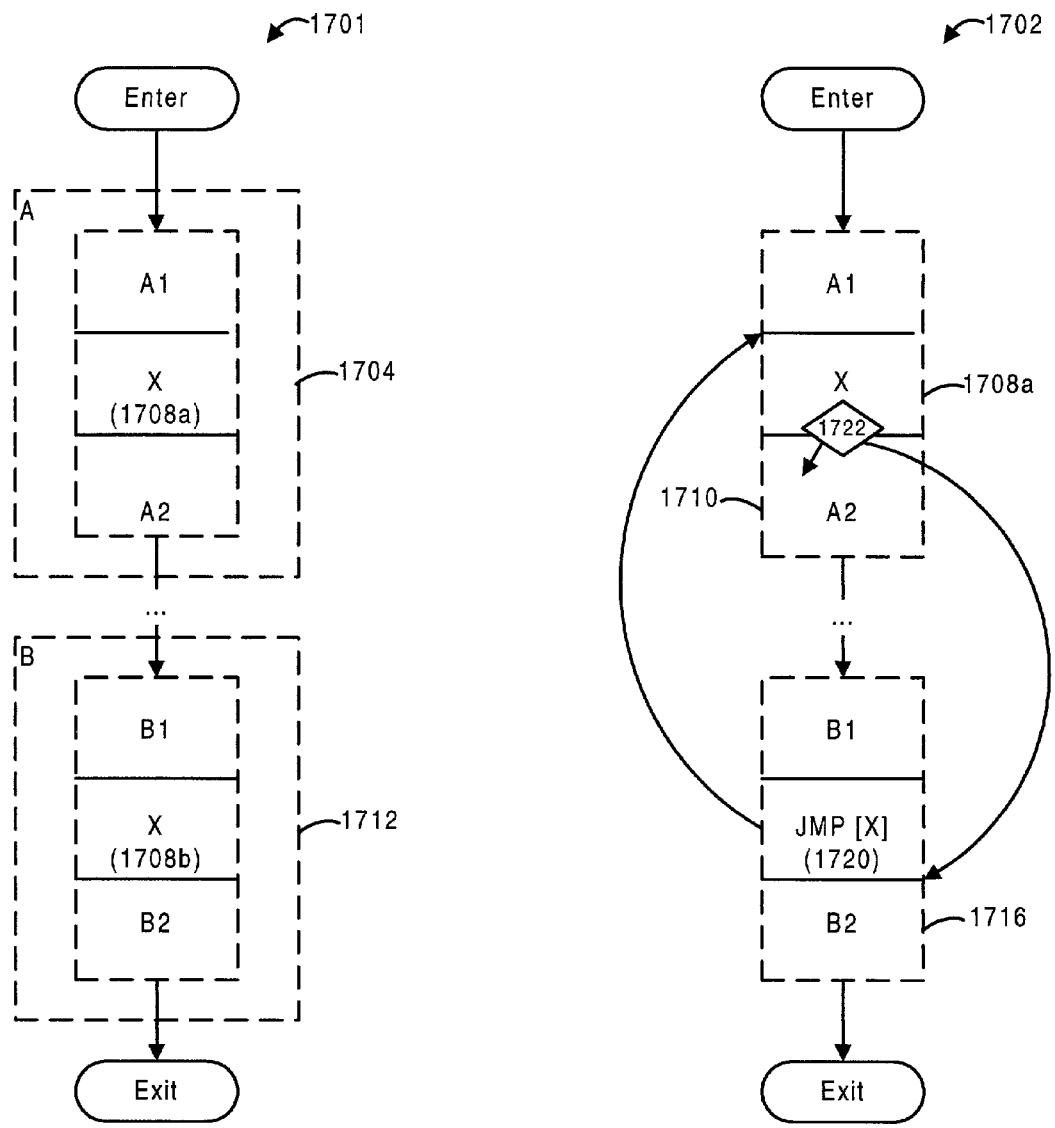
FIGS. 17A and 17B illustrate a control graph obfuscation technique in accordance with the principles of the present invention.

FIG. 17A illustrates a program fragment before (1701) and after (1702) the application of code fusion. Program fragment 1701 has two basic blocks, A 1704 and B 1712, each of which includes a common sequence of code, X, 1708.

In transformed program fragment 1702, code sequence X 1708*b* in block B 1712 has been replaced by a jump 1720 to code sequence X 1708*a* in block A. In addition, block A has been modified to include a conditional jump 1722 from the end of code sequence X 1708*a* back to the appropriate location in block B.

There are a variety of ways to ensure that test 1722 exits to the correct one of A2 1710 and B2 1716. One simple way is to push the appropriate return address (i.e., the address of A2 or B2) at the end of A1 and B1, respectively. In this embodiment, test 1722 simply pops the address off the stack and branches to it. Alternatively, if the number of calls is known—which is the case in the example shown in FIG. 17A—a boolean, integer, or other appropriate variable could be set such that test 1722 branches correctly. A more powerful approach is to use special variables added for the purposes of obfuscation. If an obfuscation variable (OV) has different values in A and B (at least through X), this fact can be used to choose the appropriate branch from test 1722. For example, if $OV_7$ is 3 in A and 5 in B, test 1722 can compare $OV_7$ to a constant equal to 4 and use the result to decide which way to branch. As a further example, if some other OV is known to have the same value in both nodes, this fact can also be used by test 1722. For example, if $OV_2$ is 9 in both A and B, the value of $OV_7+5$ could be tested against it. Moreover, if no known OV (or combination of OV) has different values in A and B, an OV that is dead in both A and B can be selected and set to different values in A1 and B1, although this may be easier for an attacker to detect.

In general, it is desirable to use OV that were set a relatively long distance from the test in which they are used (e.g., test 1722). For example, it would be desirable to set the OV to different values in the furthest dominator of A that only reaches B by going through A, and in the furthest dominator of B that does not reach A. Distinct assignments can be made there to the OV—for example, arbitrary small integers can be assigned—and the knowledge of these values can be propagated—not just live to A and B, but available to all nodes reached from A and B in which other assignments have not been inserted. Moreover, if there are other OV known at the point where this OV is to be set, greater obfuscation can be achieved by setting the OV using a value computed from the other known OV, rather than simply assigning it a literal constant.

Note that an operand is "available" to A from a block B if, in each block in SUCC(B) that leads to A (other than A itself), it is available to A and is not redefined. The "available" state is not generally tracked with live/dead variable analysis, because optimizing compilers are typically not designed to add extra computations, but it can be tracked using essentially similar techniques. In general, it is possible to use either a fresh OV, or an existing OV that is available to A in a node that pre-dominates A and is available to B in a node that pre-dominates B, and is either live in both with distinct known values or is not live in at least one of them (in which case it is set to a distinct value). Using a fresh OV tends to maximize regions of availability, while reusing an OV presumably makes it harder for an attacker to keep track of what the OV really records. Moreover, to minimize overhead (and clues), if there is an OV that is live or available in either A or B, but dead in the other, a distinct value can be assigned to it using a single assignment as far back as possible on the dead side.

The code fusion technique described above does not get much more complicated when the common sequence appears in three or more basic blocks. However, when the branching factor gets large enough, it is advantageous to convert the branching controls from a sequence of conditional branches to a jump table. To increase stealth, this should be done when the branching factor reaches approximately the size at which a compiler would convert to a jump table.

The values of OVs that are used in conditional branches are relatively unconstrained, and will be stealthier if they are not all taken from a small set. However, when a jump table is used, it is generally advantageous to have a reasonably compact set of possible values for a single OV. The generation of these values can be simplified by processing the largest replica sets first, and signing contiguous or nearly contiguous values to their OV, thus enabling the construction of relatively compact jump tables. In addition, a few non-reachable values can be placed in such a jump table to provide disinformation.

Note that a degenerate case of code fusion occurs when X is empty. In this case, code is not actually overlayed or fused, but complexity is nonetheless introduced into the control flow graph, as more basic blocks, joins, and conditional branches will be present.

Although it has been implicitly assumed that A and B can be broken up without worrying about, or affecting, their meaning, this may not be a safe assumption when the condition code (e.g., part of the hardware state) is live between instructions. Accordingly, some local analysis should be performed—using, for example, conventional defined-used bookkeeping—to ensure that instructions are not inserted that change the condition code at a point where it is live (i.e., used before being set again).

It has also been implicitly assumed that there is no overlap between the replicas of different replica sets. It should be understood, however, that it is possible to allow overlap, although this typically complicates the task of the obfuscator without necessarily imposing a correspondingly greater burden on the attacker. In addition, while the above description has treated X as straight-line code, it should be understood that this need not be the case. It will be recognized, however, that if X is not straight-line code, it will generally be necessary to make each exit branch conditional on the path of entry.

1.4.2.3. Relation to Code Replication

Code fusion can be readily applied in combination with code replication. However, while there is no reason in principle why, for example, code fusion cannot be applied to the output of code replication, code fusion might well eliminate many of the redundant nodes introduced by code replication, thus lessening code replication's effectiveness. In addition, while the larger and more complex control graphs resulting from code replication will typically raise the cost of the code fusion transformation, code fusion should not significantly raise the cost of a subsequent code replication. Accordingly, it will generally be more advantageous to apply code fusion first, followed by code replication.

In one such combination of code fusion and code replication, the code replication process is modified to only generate multiple instantiations of nodes that are the targets of unconditional branches, leaving nodes that are the targets of conditional branches alone. That is, conditionals are only added to the end of basic blocks that do not already end in a conditional. This will be referred to as Code Replication Lite.

Figure 17B:
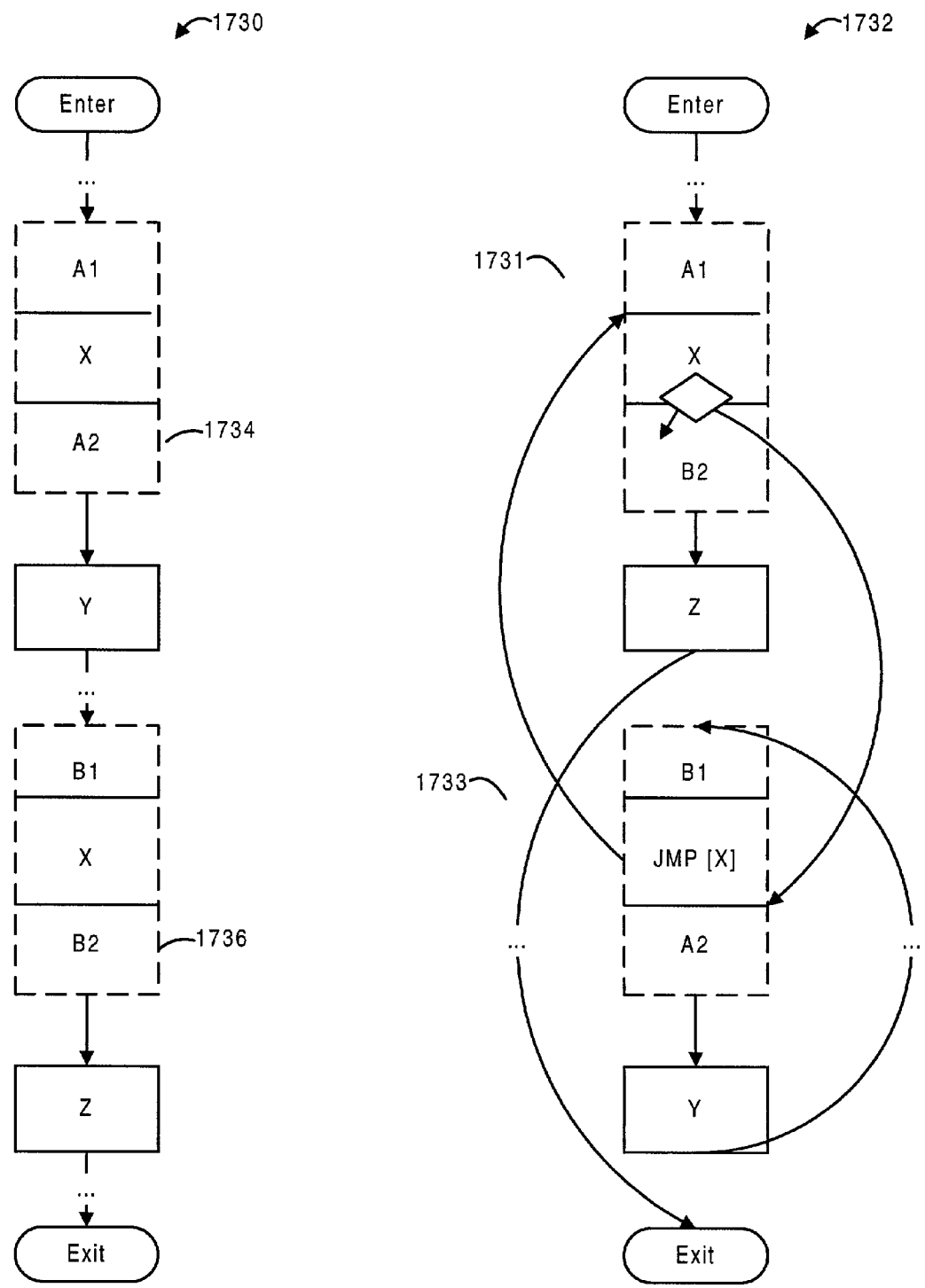

FIG. 17B shows another variation of code fusion that can be used to further confuse a potential attacker by "crossing branches." As shown in FIG. 17B, this involves swapping block B2 1736 with block A2 1734, so that code sequence 1731 contains A1, X, and B2, while code sequence 1733 contains B1, X, A2.

Since most compilers eliminate branches to unconditional branches, and unconditional branches to branches, it is advantageous to do the same with the branches introduced by code fusion, as this will make it more difficult for an attacker to identify them.

1.4.2.4. Additional Protective Techniques

There are a number of ways to strengthen the protective techniques described above. For example, one general technique is to make it hard to identify the obfuscation variables. This can be accomplished in a variety of ways, including:

Avoid Allocating the OV All Together. For example, a macro can be used to allocate various pieces of storage for OV, and to mark them with a primer, a la watermarking.

Avoid Always Using OV in Exit Tests. For example, regular program variables can be used to make the necessary distinctions, with constant propagation (perhaps only local) informing the obfuscator which variables/values will suffice.

Another protective technique is to follow code fusion with Code Replication Lite. The obfuscator replicates the successors of unconditional exits from basic blocks, and uses arbitrary tests on OV in the conditional branches. If the OV that is tested is not constant in an entry node, then making the exit branch unconditional will change the set of realizable paths in the control graph. Another protective measure is to implement the exit test of one or more of the replica sets as a jump table containing some holes that are filled with the addresses of arbitrary basic blocks.

Yet another way to strengthen code fusion is to replace some unconditional branches with opaque tests on OV, either instead of, or prior to, applying Code Replication Lite. The non-taken branch in these opaque tests can go to an arbitrary basic block, although it is preferably a block with existing, reachable code that is relatively distant from the test in the control graph.

Yet another illustrative strengthening technique is to do full constant propagation and live/dead analysis on a set of the ordinary program variables, instead of using variables from a separate OV set. For the exit test of each replica set, a variable that is known to have distinct values (or to be dead) at all entries can be used, adding a fresh variable only if such an ordinary variable cannot be found. This technique can entail a significant amount of work for the obfuscator, however, as it is generally a much more delicate task than propagating a special set of obfuscation variables or constants and keeping track of which of these variables are live, available, or dead. In short, the obfuscator will have to understand the program to obfuscate it using this technique. However, this technique increases the difficulty of attack by making virtually every conditional branch in the code a candidate for replication, and by making it unsafe for the attacker to prune an exit the first time, or any other time, control reaches a breakpoint. In addition, such a technique can obviate the need to follow code fusion with code replication.

1.4.3. Partial Code Fusion

Code fusion has been described in terms of its application to identical code sequences; however, this is only one limiting case. Code fusion can also be applied to code sequences that are not identical, and indeed, can be applied to code sequences that are totally different (another limiting case).

Figure 18:
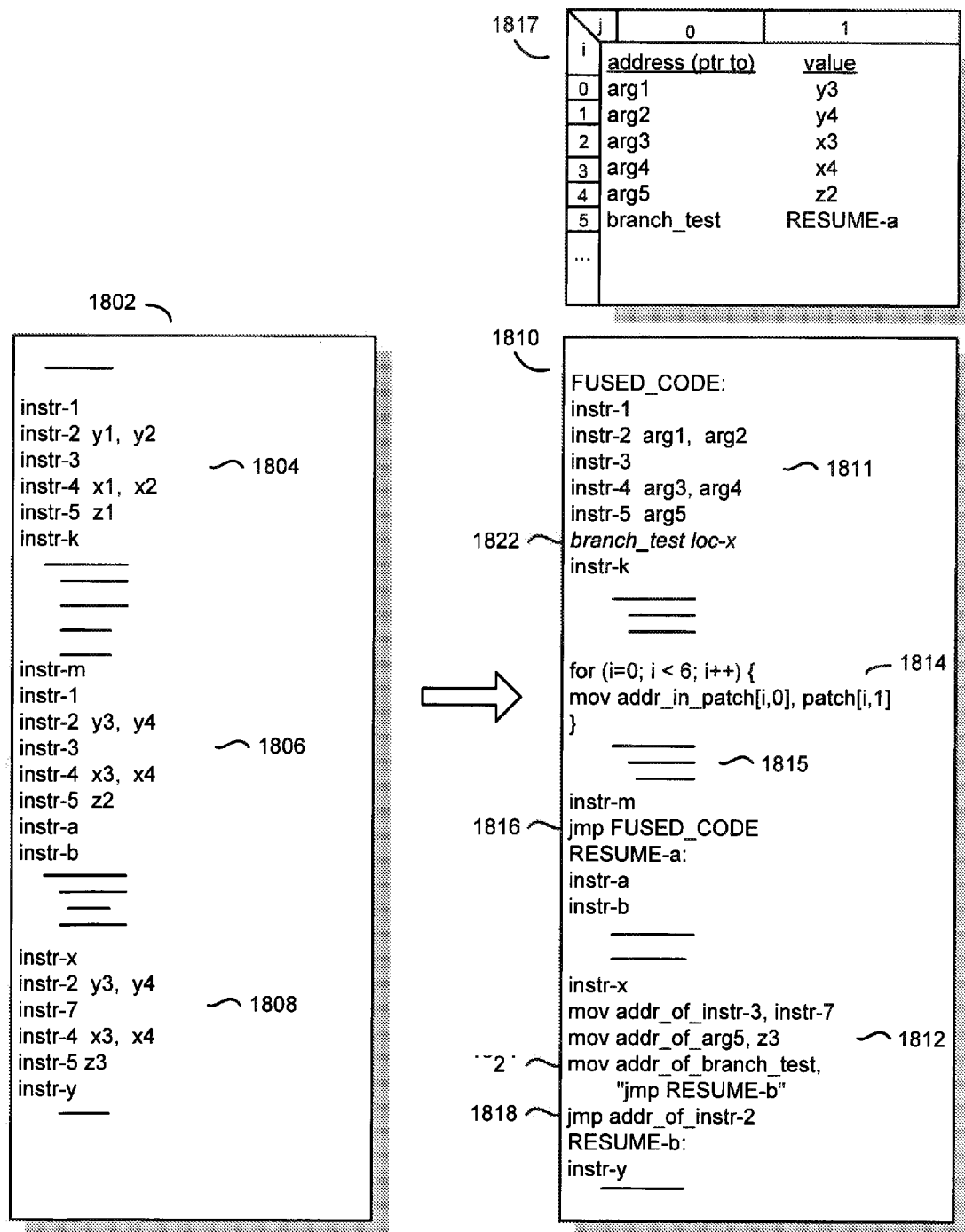
FIG. 18 illustrates a code fusion technique in accordance with an embodiment of the present invention.

FIG. 18 illustrates the application of code fusion to code 1802. Code 1802 includes several code sequences 1804, 1806, 1808 that are similar to each other, but differ in specific locations. For example, code sequence 1806 includes the same sequence of instructions as code sequence 1804, but some of the operands are different. Similarly, code sequence 1808 is similar to a portion of code sequences 1804 and 1806.

Code sequence 1810 illustrates one possible application of partial code fusion to code sequence 1802. As seen in FIG. 18, code sequences 1806 and 1808 have been replaced with calls (1816, 1818) to a semi-closed subroutine 1811. In the example shown in FIG. 18, before each branch (e.g., 1816, 1818) to subroutine 1811, the locations that differ between code sequence 1811, on the one hand, and 1804, 1806, or 1808, on the other, are patched with the values appropriate to that branch. This can be done, for example, by using a sequence of MOV instructions with immediate operands, as illustrated by code sequence 1812. An alternative that may be preferable if there are a relatively large number of differences between the code sequences is to use a loop that copies values from a patch table. This technique is illustrated by code sequence 1814, which includes a loop that moves values stored in patch table 1817 to locations pointed to by address pointers that are also stored in the patch table. It will be appreciated that other patching techniques could be used without departing from the principles of the present invention. As with other self-modifying code techniques, partial code fusion generally requires a region of memory that is mapped as both code and data.

When partial code fusion is applied to a program—in the manner illustrated in FIG. 18, for example—the patched locations can be effectively treated as obfuscation variables, and techniques similar to those used for other obfuscation variables can be used to decide where to set the patch values. For example, if it is practical, it can be advantageous to place the assignments that set the patched locations relatively far from the associated branches in the control graph. This is illustrated in FIG. 18, in which intervening code 1815 separates patch code 1814 from branch 1816.

Moreover, when there are more than two calls to a subroutine, as shown in FIG. 18, not all the values may need to be patched for each call. The necessary assignments can be determined by constant propagation in the same, or substantially the same, manner used for other obfuscation variables. Thus, in FIG. 18, code sequence 1808 can be replaced by code sequence 1812, where the operands y3 and y4 are not patched into subroutine 1811, those operands having been previously patched when code sequence 1814 was executed. Of course, if code sequence 1810 were designed to change subroutine 1811 back to its original form before executing code sequence 1812, then code 1812 could include additional MOV instructions to patch y3 and y4 into the appropriate locations of code 1811 (i.e., the locations of arg1 and arg2, respectively). One of ordinary skill in the art will appreciate that other variations could be used without departing from the principles of the present invention.

As shown in FIG. 18, subroutine 1811 includes a branch_test 1822 that is operable to return execution to the appropriate location in the program. The location to return to at the end of the subroutine can be selected in a variety of ways, including without limitation:

Testing a conventional boolean or integer variable.

Testing one of the patched values. For example, branch_test 1822 can test the argument of instr-5. If the argument is z3, then branch_test 1822 jumps to the next valid instruction following code sequence 1812 (i.e., instr-y). Similarly, if the argument of instr-5 is z2, branch_test 1822 jumps to the next valid instruction following code 1816, and so forth. Moreover, if the program contains additional subroutines similar to subroutine 1811, obfuscation can be increased by using patch values from one or more of those subroutines in branch_test 1822. Constant propagation can be used to select these patch values such that branch_test 1822 branches to the proper location.

Patching a return address directly into the branch instruction. For example, patch table 1817 can contain the address of the appropriate location following code 1816, such that code sequence 1814 is operable to write the correct return address directly into the appropriate location of branch_test 1822. In such an embodiment, branch_test 1822 could consist of a simple jump instruction, the destination of the jump instruction (i.e., RESUME-a) being patched in by code sequence 1814.

Patching the return branch itself. An illustration of this technique appears in code sequence 1812, in which instruction 1824 is operable to patch a jump instruction directly into subroutine 1811. Thus, when subroutine 1811 is called by instruction 1818, an instruction sequence equivalent to sequence 1808 will be executed, and control will jump from code 1811 to instr-y.

The patched locations can be initialized in a variety of ways. For example, if there is one call to the subroutine that is dominated by the program's entry node (without control passing through the other calls), the patch locations can be statically initialized to its values. Thus, in FIG. 18, the locations in code sequence 1811 that will be subsequently modified by code sequences 1814 and 1812, respectively (e.g., the locations of x1, x2, instr-3, etc.), can be initialized to the values used by code sequence 1804, since that is the first of the relevant code sequences that is executed.

Alternatively, or in addition, branch addresses can be initialized to locations that are in data, or in the middle of instructions, thus misdirecting attempts to perform static analysis of the program. The correct branch addresses can be patched in by the calls to the subroutine, as described above. Similarly, other operand addresses can be initialized to code locations to confuse code/data discrimination, and/or op-codes can be initialized misleadingly, for example, by replacing branches with data operations and vice-versa.

Moreover, if the branch that terminates the subroutine is patched into the subroutine during execution, analysis can be complicated further by initializing the location to be patched (and one or more following locations, if desired) to contain arbitrary and/or misleading code. This will obscure the end of the subroutine, as it will typically be difficult to discover that this code is not executed. Thus, in FIG. 18, for example, a portion of branch_test 1822 can be initialized to contain confusing values (assuming, of course, that branch_test 1822 contains code to pass execution of original code sequence 1804 on to the next appropriate code sequence).

A variety of code sequences lend themselves to partial code fusion. For example, in-lined functions and standard code sequences for common control structures (e.g., loop headers, function calls and returns, etc.) are typically well-suited for application of this technique. Another good candidate for partial code fusion is table-driven self-checking code.

Figure 19:
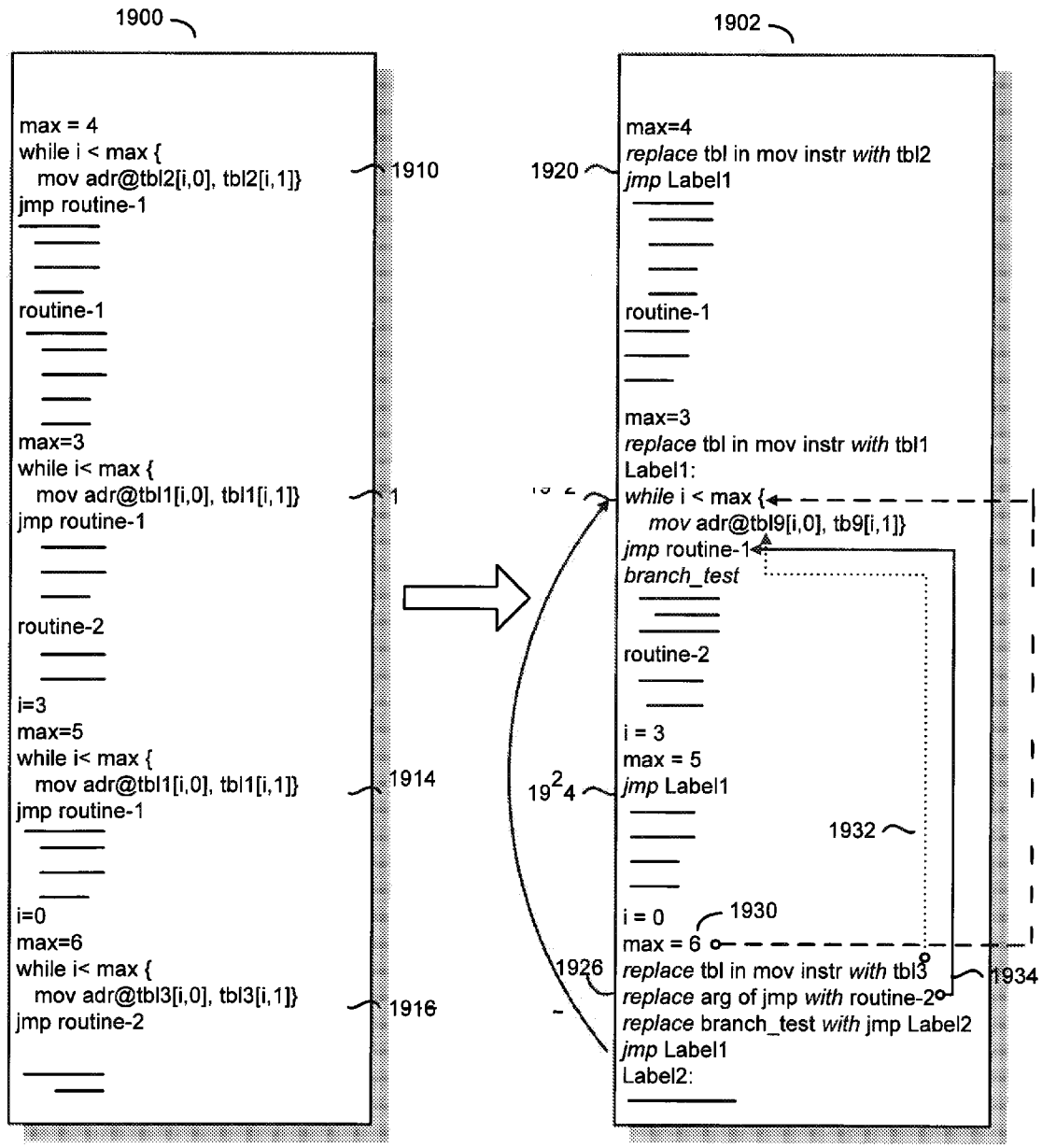
FIG. 19 illustrates an additional embodiment of a code fusion technique in accordance with an embodiment of the present invention.

Indeed, code sequences that perform table-driven patching are themselves good candidates for replacement by semi-closed subroutines. This is illustrated in FIG. 19, which shows a code sequence 1900 to which partial code fusion has been applied in the manner set forth above. Code sequence 1900 includes code sequences 1910, 1912, 1914, and 1916, each of which makes use of a patch table to write appropriate values to the subroutine to which it branches. Code sequence 1902 is formed by applying partial code fusion to code sequence 1900. In the example shown in FIG. 19, code sequences 1910, 1914, and 1916 are replaced with calls to code sequence 1922 and with appropriate patches. For example, code sequence 1916 is replaced with code sequence 1926, which branches to code sequence 1922 after patching the number of items to be patched (i.e., the loop limit, max) (1930), the address of the patch table (e.g., a table similar to table 1817 in FIG. 18) (1932), and the starting address of the appropriate subroutine (1934). Thus, it should be appreciated that partial code fusion can be recursively applied an arbitrary number of times.

A variety of additional techniques the same or similar to those set forth above can be used to make partial code fusion more obscure. For example:

If there are live obfuscation variables at the point where a patch is performed, the values of those variables, as determined by constant propagation, can be used to generate the patching values, rather than implementing the patching values as immediate operands or directly stored values.

The patch tables can be encrypted, to be decrypted upon use. This can be accomplished in a variety of ways, such as those set forth previously. For example, simple XOR keys can be generated as functions of obfuscation variables, or if two blocks of code, A and B, are available, their XOR can be used to convert either block to the other.

Code fusion generally complicates self-checking less than many other forms of self-modifying code. If constant propagation is used to keep track of the patched values, it is possible to ensure at obfuscation time that any given self-check skips patch locations whose values are not fixed at the point of call of that particular self-check, and it is also possible to calculate the effect on the hash function of locations whose values are fixed. Moreover, the semi-closed routines can be collected in one area of memory if it is desired to bound the range of locations where self-modification occurs, for purposes of self-checking, for example.

1.4.4. Dynamic Code Overlay

Prior to the advent of virtual memory, programs that were larger than available physical memory were executed using overlays. In accordance with this technique, the logical address space of the program was partitioned into a collection of sets of overlays. The members of a set of overlays were linked to execute in the same physical address space, and hence only one member of a set of overlays would be physically resident at any given time. When control was to transfer to an overlay that was not currently loaded, the target overlay was read from disk and was used to replace whatever overlay was currently loaded in the address space to which it was linked.

Figure 20:
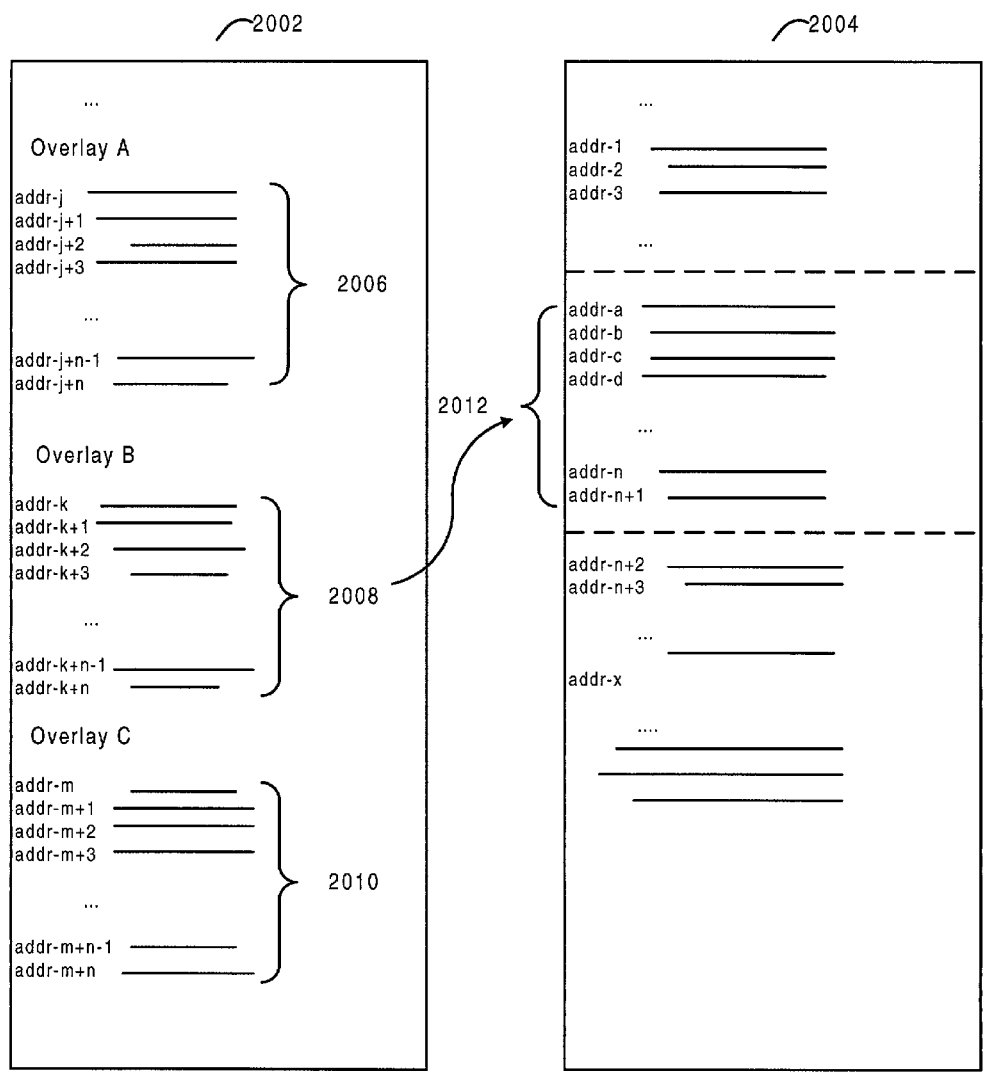
FIG. 20 illustrates the use of overlays.

FIG. 20 illustrates the use of overlays in accordance with one embodiment of the present invention. Code and/or data segments 2006, 2008, and 2010 are stored in memory 2002. For example, segments 2006, 2008, 2010 could represent sequential sections of a program. In a preferred embodiment segments 2006, 2008, and 2010 each contain code to load the next overlay. For example, code can be included at the end of segment 2006 that is operable to cause segment 2008 to be loaded into memory. Program 2004 is stored elsewhere in memory. When program 2004 is executed, overlays 2006, 2008, and 2010 are loaded into memory region 2012 as appropriate. When an overlay is loaded into memory region 2012, it overwrites any overlay that was previously loaded at location 2012. Thus, through the use of overlays, a program can be designed such that its entire executable image does not appear in contiguous memory locations. Also, because different segments of the program will appear at the same memory location, the use of overlays can make address tracing more difficult. Additional information on overlays can be found in Levine, *Linkers and Loaders*, chapter 8 (Morgan Kaufmann 1999), which is hereby incorporated by reference.

Overlays were extensively studied in the 1960s and 1970s, and many algorithms for efficiently partitioning code into overlays were published. See, e.g., Knuth, *The Art of Computer Programming*, vol. 1, pp. 453 et seq. (1968). For present-day purposes of obfuscation, however, it is not necessary to be as concerned with efficiency, since overlays can be read in (and optionally decrypted) from some other part of main memory, rather than from disk, and because a high degree of overlay is not needed to conserve main memory as was necessary in the past. For example, in FIG. 20, overlays 2006, 2008, and/or 2010 can be stored in main system memory (e.g., RAM) along with executable image 2004, rather than being stored separately on disk. Thus, it will be appreciated that relatively simple overlay algorithms will suffice for purposes of obfuscation, including those that can be implemented with a binary code modification engine. For example, the techniques described above for patching locations in semi-closed routines can readily be adapted to copy in overlays.

Figure 21:
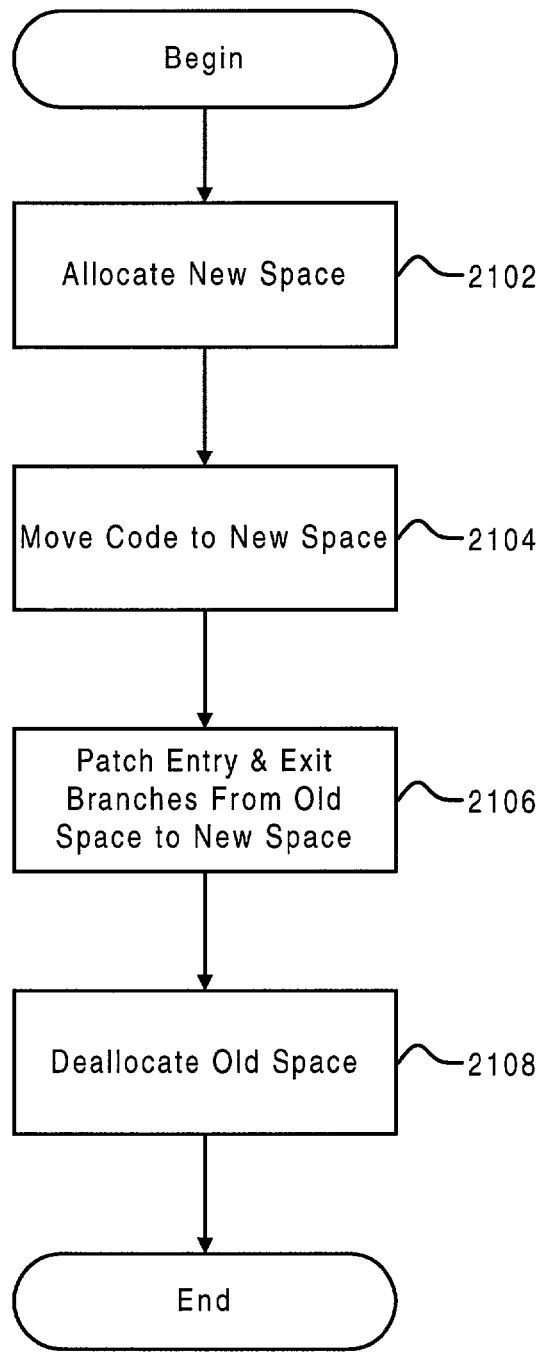
FIG. 21 illustrates a technique for relocating code in accordance with the principles of the present invention.

A technique that is related to the use of overlays is to simply move pieces of code occasionally to freshly allocated space, and to either shuffle some other piece of code into the old space, or to place the old space on a free space list. As illustrated in FIG. 21, code can be inserted into a program that is operable to allocate a new memory space (2102); copy a section of code to the newly allocated memory space (2104); patch entry and exit branches from the old memory space (i.e., the memory segment from which the code was copied) to the new space (2106); and deallocate the old memory space (2108). Thus, when execution of the program reaches the point where it would have branched to the old memory space, it will branch instead to the new memory space, execute the code contained there, then branch back to the appropriate memory location of the next part of the program (e.g., the location to which the code that was previously-stored in the old memory space would have branched). For purposes of allocating and deallocating space, the techniques described above in connection with FIG. 8 can be used. It should also be appreciated that moving code generally requires patching up relocation entries in other code that accesses the moved code by absolute address. Accordingly, in a preferred embodiment the relocation table and its use are hidden or obscured using the techniques set forth in the Collberg application or elsewhere herein.

1.4.5. Protecting Jumps

If an attacker identifies a critical piece of code that tests some condition and takes different actions based on that condition, he can focus his attack on that test. For example, in FIG. 22A test 2202 might check to see if a password is correct. Conditional jump 2204 (e.g., JZ, JNZ, etc.) branches to block A 2206 if the test evaluates one way (e.g., password correct), and branches to block B 2208 if the test evaluates the other way (e.g., password incorrect). For example, block B 2208 could be a sequence of code that prints out an error message such as "Password Incorrect" and exits the program, while block A 2206 could be the code sequence that is executed if the password is correct.

Figure 22A:
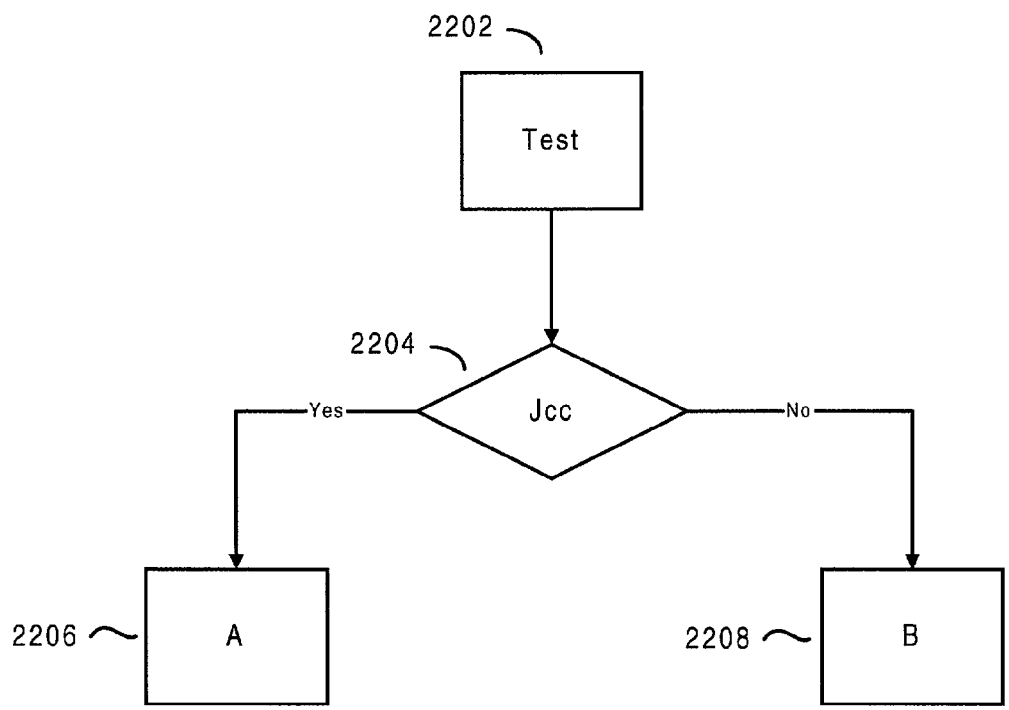
FIGS. 22A, 22B, 22C, and 22D illustrate a technique for protecting jumps or other conditional code sequences from attack.
Figure 22B:
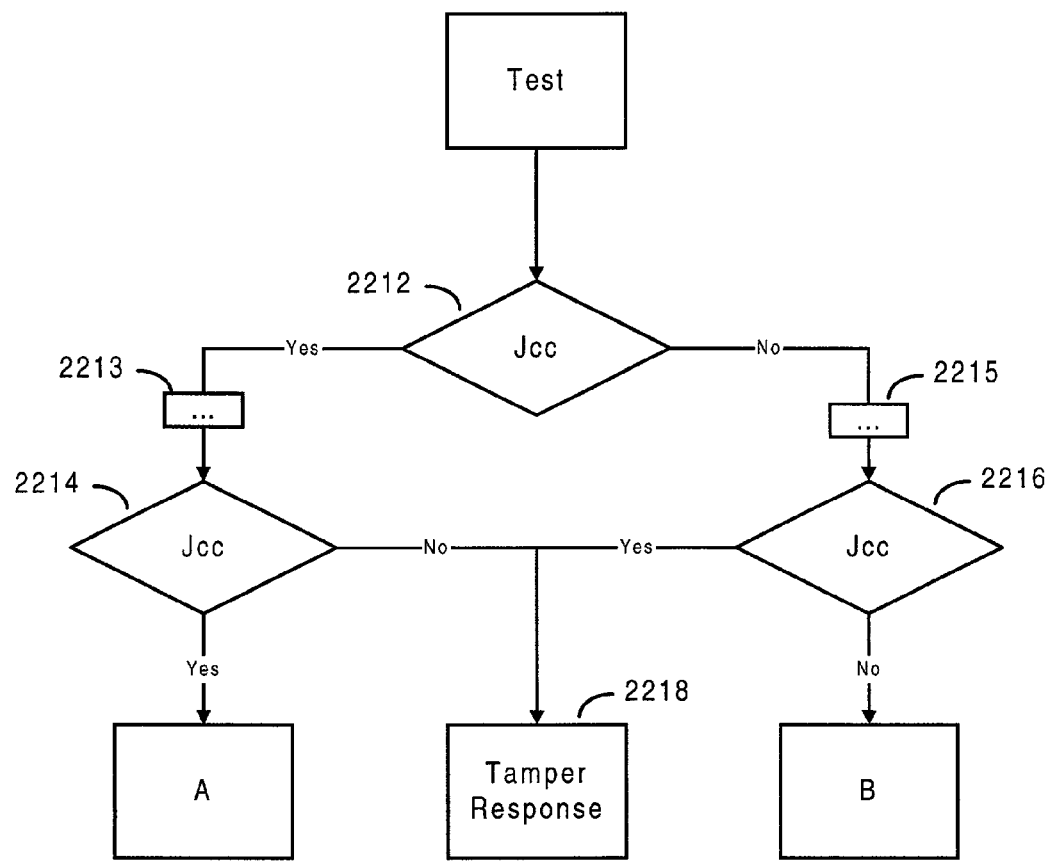

A technique for strengthening this test against attack is shown in FIG. 22B. A jump 2212 corresponding to jump 2204 in FIG. 22A is repeated for each of its possible outcomes. Thus, if jump 2212 evaluates one way, execution is routed to another jump 2214 which performs the same, or substantially the same, evaluation as jump 2212. If jump 2212 evaluates the other way, then execution is routed to jump 2216, which also performs the same, or substantially the same, evaluation as jump 2212. If the two consecutive jumps do not evaluate the same logically, then the jumps preferably branch to a tamper response mechanism 2218. As a result, the attacker has to defeat at least two jumps. If only one jump modified, the tamper response code gets executed.

Note that obfuscating code 2213, 2215 can be added between jump 2212 and jumps 2214 and 2216, respectively, in order to make the relationship between those jumps less clear. Such code should, however, preserve the condition code for the second jump, either by avoiding instructions that set it, by saving and restoring it as necessary, and/or by making the second condition code a predictable function of the first.

It will be appreciated that tamper response code 2218 can be implemented in any suitable manner, including, for example, using the techniques set forth herein. If the tamper response is made strong enough to disable the code permanently, an attacker that simply tries a few things is likely to get caught by this mechanism.

Figure 22C:
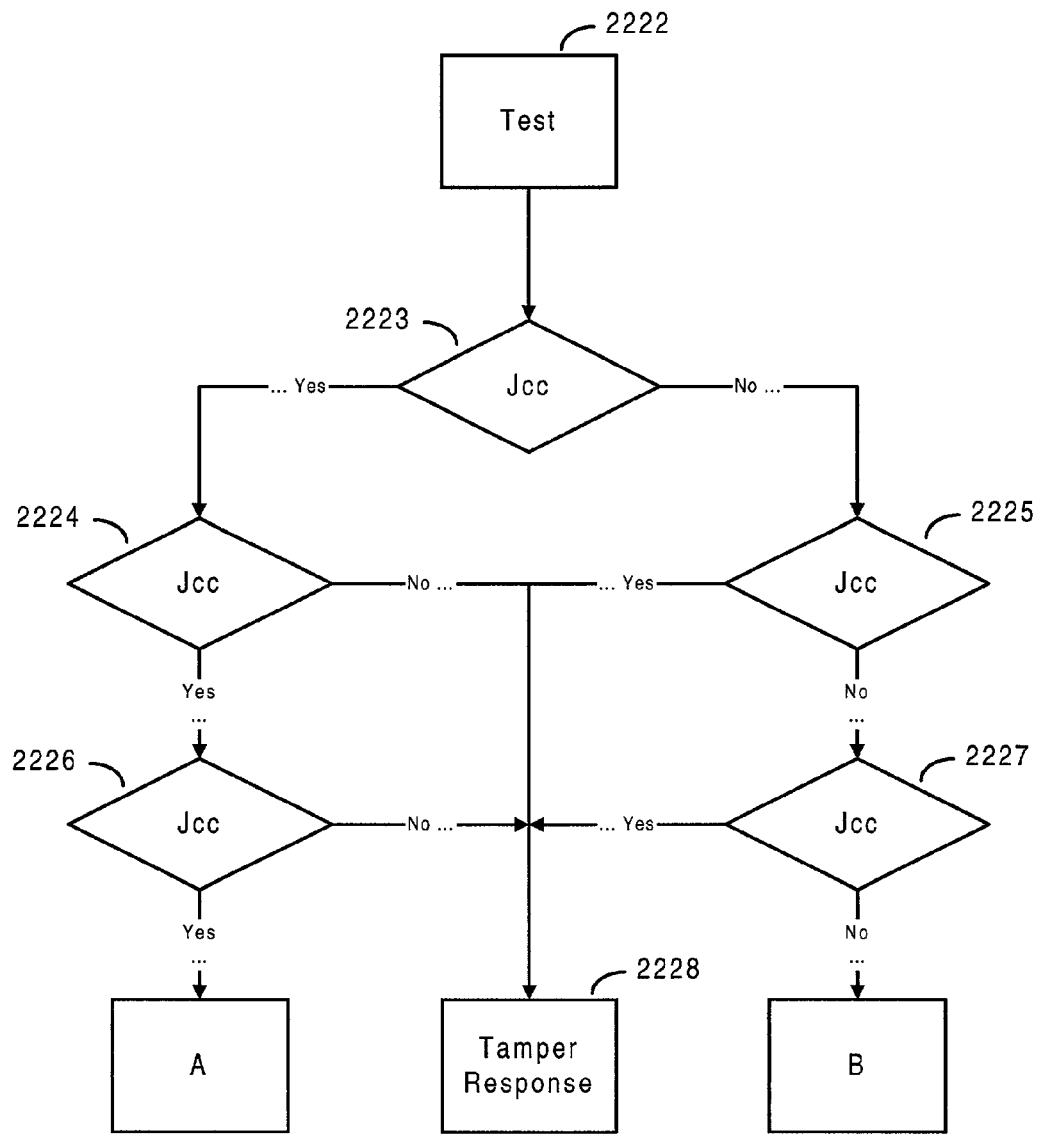

An extension of the technique shown in FIG. 22B is to chain N protected jump blocks together, as shown in FIG. 22C where N=3 has been selected. The depth of this construction, N, is the number of jumps that would have to be modified to defeat this mechanism. Moreover, it should be understood that while in one embodiment each of the jumps tests the same or substantially the same condition code, this need not be the case. For example, in one embodiment, jumps 2224 and 2226 may execute normally (i.e., reach block A) if a particular condition is true (e.g., JZ), whereas jumps 2225 and 2227 may execute normally (i.e., reach block B) if a related condition is true (e.g., JNZ). In other embodiments, this relationship can be varied. For example, jump 2224 and 2226 may be inverses (e.g., JZ and JNZ, respectively), with normal execution occurring if the condition code of jump 2224 is true and the condition code of jump 2226 is false (e.g., a "Yes" and a "No" exit from jumps 2224 and 2226, respectively).

Figure 22D:
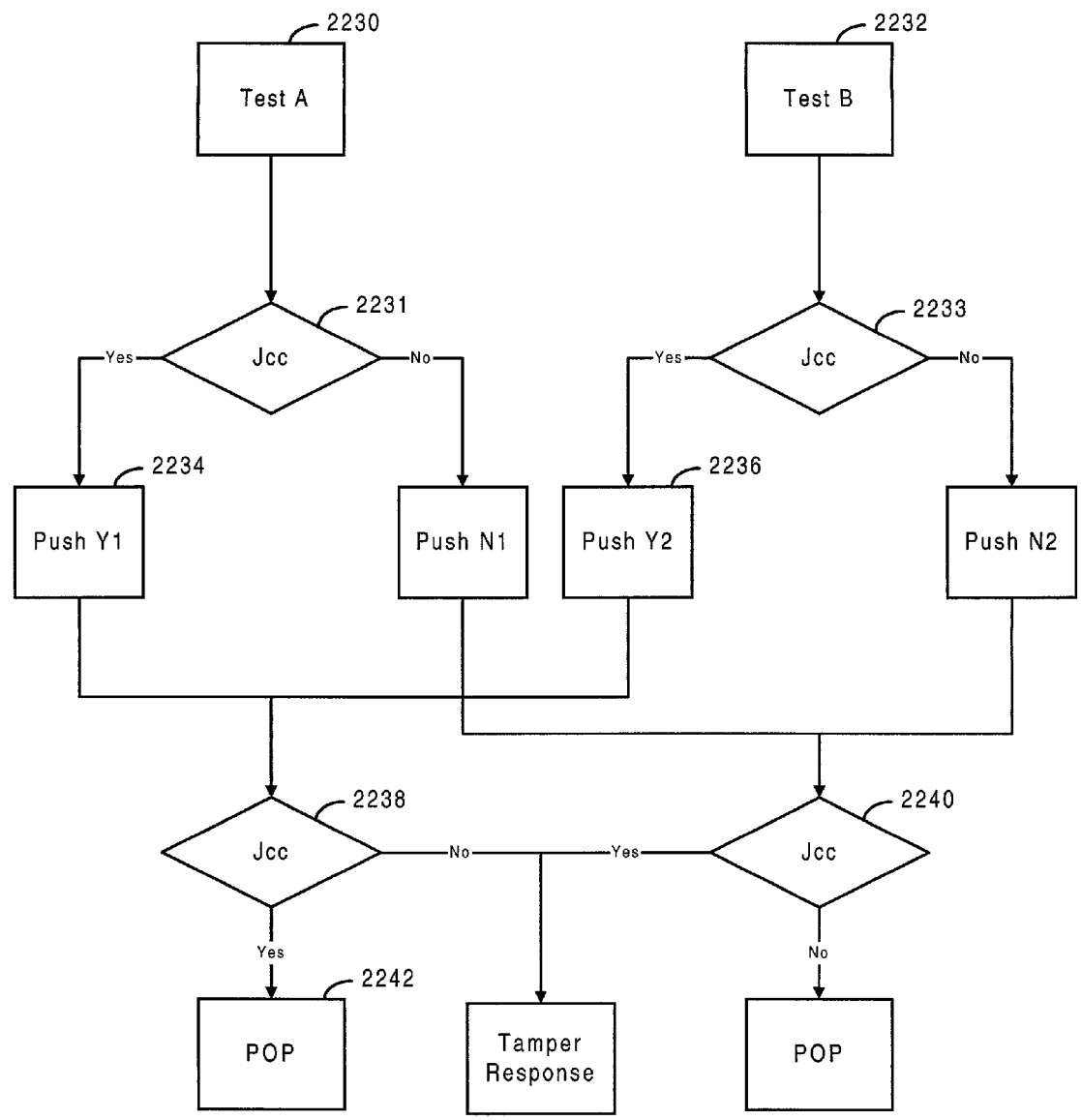

Another variation that provides additional resistance to attack is to intertwine separate applications of these techniques. For example, arrangements such as those shown in FIGS. 22B and 22C can be combined to share one or more common levels of jumps, as shown in FIG. 22D, in which the second level of jumps is shared (i.e., jumps 2238 and 2240). This can be supported by a PUSH/POP combination, as shown, in which code to pass control back to the appropriate location of the program (e.g., code 2234 and 2236) is effectively saved (e.g., pushed onto the stack), to be executed after flow has passed through the final level of jumps. In one embodiment, shared jumps 2238 and 2240 can test for either of two conditions. For example, jump 2238, or an equivalent code sequence, may be operable to jump to block 2242 if either condition A or condition B is true. In one preferred embodiment, tests A and B (2230 and 2232) are operable to produce the same condition code (e.g., set the same flag or variable), and jumps 2231, 2233, 2238, and 2240 are identical.

In other embodiments, more than just the conditional jump is repeated. For example, one might reevaluate and test expression 2202 in FIG. 22A using an independent code sequence. Another variation is to perform a checksum or hash on the original code that is responsible for evaluating the condition, in order to make sure that it has not been tampered with.

1.5. Obfuscation Through Concurrency

Concurrent (multi-threaded) programs are often difficult to design, debug, and understand. This property can be exploited for the purposes of obfuscation and tamper resistance. The basic idea is to hide a deterministic program in a non-deterministic state machine, where components of the state are modified by multiple threads of control in such a way that the correctness of the program is preserved by construction. An attacker who does not know the invariants of the state, and the partitioning of state components into obfuscation variables and significant variables, faces a potentially exponential number of possible interleavings (or genuine concurrency) in the various threads.

1.5.1. Baton Passing
1.5.1.1. Basic Baton Passing

This section describes a technique that allows an obfuscator to develop a program with the ease associated with the development of sequential programs, while presenting an attacker who tries to understand the program with the complexity associated with relatively-unstructured, concurrent programs.

Given a program composed of a series of sequential statements (e.g., S=S1; S2; . . . Sn), a fresh variable, PC, can be added to the program, and the series of statements can be rewritten more obscurely as:

```
PC = 1;
while PC <= n do {
    if PC == 1 then {S1; PC = 2}
    if PC == 2 then {S2; PC = 3}
    ...
    if PC == n then {Sn; PC = n+1}
}
```

The loop in the code sequence shown above executes until PC reaches a predetermined value, n+1. The if-statements contained in the loop are operable to execute one of the statements, $S_i$, from the original sequence, and to increment PC. Thus, PC is effectively "passed" from one if-statement to another until all of the relevant statements $S_i$ in the original code sequence have been executed.

For more obscurity, the if-statements can be permuted arbitrarily:

```
PC = 1;
while PC <= n do {
    if PC == 5 then {S5; PC = 6}
    if PC == n then {Sn; PC = n+1}
    ...
    if PC == 2 then {S2; PC = 3}
}
```

And to make the code even more difficult to follow (e.g., with a debugger), several threads can be started at the same time, and the relevant statements $S_i$ can be partitioned among them. For example:

```
PC = 1;
parallel {
/* thread 1 */
    while PC <= n do {
        if PC == 5 then {S5; PC = 6}
    }
|
/* thread 2 */
    while PC <= n do {
        if PC == n then {Sn; PC = n+1}
    }
|
...
|
/* thread m */
    while PC <= n do {
        if PC == 3 then {S3; PC = 4}
        if PC == 2 then {S2; PC = 3}
    }
}
```

In the example code sequence shown above, each thread contains a code sequence similar to the code sequences that were discussed previously. Since PC is shared by all of the threads, it can be used to ensure that the sequence of statements $S_i$ is executed in the proper order. Incrementing PC in one thread can pass control to another thread (or simply pass control to another if-statement within the same thread). The obfuscator can still be confident in the correctness of this parallel program, based on an analysis of the original (simpler) sequential program, and based on the fact that PC is a fresh variable, not modified by the $S_i$. In effect, PC implements a baton passed among the threads, such that the multiple threads emulate a single virtual thread, VT, in which the statements execute in their original order.

This technique generalizes to programs that are not simple sequences of statements. For example, branches can simply be treated as assignments to PC that do something other than increment it, while conditional branches become conditional assignments to PC.

To make the original structure even more difficult to understand and/or reconstruct, in one embodiment the program state is augmented with an assortment of obfuscation variables, OV, and obfuscation constants, OC. These can be of any type used in the program, although it will generally be helpful if OV is disjoint from the "genuine" program variables, GV+{PC}. Furthermore, an assortment of obfuscation statements, $OS_1, \ldots, OS_k$, can be created. In one embodiment obfuscation statements are made to appear relatively unobtrusive (i.e., to appear much like genuine statements, $S_i$). In general, obfuscation statements can read any available variables (GV+{PC}+OV) and constants (GC+OC); however, in a preferred embodiment they should write only to obfuscation variables (OV), terminate (e.g., no loops or recursive procedure calls), and avoid causing run-time errors or infinite loops.

Obfuscation statements can be scattered in each of the threads. For example:

```
PC = 1;
parallel {
/* thread 1 */
    while PC <= n do {
        if PC == 5 then {S5; PC = 6}
        if PC == 2 then {OS1; OS5}
    }
|
/* thread 2 */
    while PC <= n do {
        if PC == n then {OS2; Sn; OS7; PC = n+1; OS3}
    }
|
...
|
/* thread m */
    while PC <= n do {
        if PC == 1 then {OS1; OS5}
        if PC == 3 then {S3; PC = 4}
        if PC == 5 then {OS2; OS5}
        if PC == 2 then {S2; PC = 3}
        if PC == 3 then {OS3; OS6}
    }
}
```

Thus it is possible to place obfuscation statements within segments relatively freely, and also to add new top-level segments containing obfuscation statements. As far as the virtual thread is concerned, these are just null-effect sequences since they terminate cleanly and do not adversely affect genuine program variables. But to an attacker they can create non-trivial, concurrent computational activity that can make it difficult to distinguish the virtual thread's activity from obfuscation activity.

1.5.1.2. Distributed Baton

In the scheme described above, a baton is passed to a segment as an atomic action—for example, by a single assignment to a primitive data type like integer or boolean. As discussed in more detail below, however, it is not necessary that cancellation of a segment's possession be atomic, since the segment does that itself; however, the cancellation should generally be complete before the handoff occurs.

If a Gray code is used, setting a single bit would be enough to pass the baton, but $\log_2(n)$ bits (plus some dummies) would have to be tested. However, this generally holds true only if $S_i, \ldots, S_n$ are to be executed in sequence. If there is a more elaborate control structure, more bits might have to be changed.

A related technique is to replace PC with a collection of "guard" variables, g, one for each of the original segments. In one embodiment boolean variables are used, and to increase obfuscation a similar collection of obfuscation guard variables, og, are also used in obfuscation segments. The guard bits are preferably manipulated so that no two genuine segments have the baton (e.g., no two guard bits are true) at the same time, and so that there is always one genuine segment that either has the baton or is already being executed. Passing the baton is the last genuine code in a genuine segment. For example:

```
g1 = true; g2 = false; ... ; gn = false; g0 = false;
og0 = false; og1 = true; ... ogn = false;
parallel {
/* thread 1 */
    while !g0 do {
        if g4 then {g4 = false; S4; g5 = true}
        if og4 then {og4 = false; OS1; OS4; og5 = true}
        if g6 then {g6 = false; OS6; g7 = true}
    }
|
/* thread 2 */
...
|
/* thread m */
    while !g0 do {
```

```
        if gk then {OS2; Sn; OS7; gk = false; OS19;
            g0 = true; OS3}
    }
}
/* thread m+1 */
    while !go do {
        if og1 then {og1 = false; OS1; OS4; og4 = true}
        if g3 then {S3; g3 = false; g4 = true}
        if og4 then {og4 = false; OS2; OS4; og5 = true}
        if g2 then {og3 = false; g2 = false; S2; g3 = true}
        if og3 then {og3 = false; OS3; OS6; og4 = true}
    }
}
```

In this example, control is passed between (and within) multiple threads by making assignments to guard variables, $g_i$. For example, a conditional statement (e.g., an if-statement) in the last thread shown passes execution of the virtual thread to a conditional statement in the first thread by setting $g_4$ to true. When $g_4$ is true, the conditional statement in the first thread evaluates to true, and a sequence of instructions is performed which executes a statement from the virtual thread (e.g., $S_4$) and updates the guard variables appropriately. Obfuscation statements, obfuscation variables, and/or obfuscation threads can be added to obscure what is going on.

To add additional obfuscation, a compile-time key can be used to determine whether "selected" corresponds to true or to false for each $g_i$. That is, the key determines whether the guard-bit tests are for $g_i$ or $!g_i$, the assignments of true and false being reversed depending on the ith bit of the key. (Or, if the $g_i$ are not boolean variables, the key can determine, for example, how $g_i$ should be assigned so that a test involving $g_i$ evaluates to true or to false).

In the example set forth above, genuine branches can safely set obfuscation guards, and obfuscation branches can safely read genuine guards. Moreover, in this example, each branch assigns to two guard bits. It will be appreciated, however, that other conventions could be used to further complicate an attack. For example, each branch could write to, e.g., at least three guards. In the case of an obfuscation branch, all three guards could be obfuscation guards, and for a genuine branch the guards could comprise two genuine guards plus one obfuscation guard.

An attacker's analysis can be complicated still further by selecting a subset of the obfuscation guards to be invariant (although assigned to), and using them freely in the tests, knowing the outcome. In a genuine branch they can be (re-) assigned their invariant values. While in an obfuscation branch whose guard is (or includes) an invariantly false obfuscation guard or the negation of an invariantly true one, it is possible to not only assign complementary values, but also to assign to genuine guards (indeed, to genuine program variables), making it harder to distinguish the sets. In addition, arbitrary extra guards can be conjoined to the tests for obfuscation branches, and tautologous (e.g., invariantly true, or the negation of invariantly false) extra guards can be conjoined to the tests for genuine branches.

1.5.1.3. Deeper Invariants

One way to increase obfuscation is to distribute the baton over a collection of variables, and to encode the baton using a set of invariants that makes it hard to draw inferences about the uses of particular variables, but that still preserves the property that the baton can be passed easily with a single atomic action. Two exemplary techniques are described below, namely the use of obfuscation invariant guards and the use of virtual PCs.

1.5.1.3.1. Obfuscation Invariant Guards

As previously indicated, it is generally desirable to obscure the relationship between genuine guards, on the one hand, and obfuscation guards and obfuscation invariant guards on the other. This can be done, for example, by intermixing these variables in a thread's tests, and/or by varying the sense of the variables, as discussed above. To further increase obfuscation, it is desirable to be able to assign to a genuine guard variable in an executable obfuscation statement, thus making it more difficult for an attacker to determine which statements are obfuscation statements, which statements are genuine statements in the virtual thread, and which guard bits are genuine.

The present invention provides an advantageous technique whereby an obfuscator can assign incorrect values to genuine guard variables without causing incorrect execution of the virtual thread. Specifically, error correcting codes can be used to correct "erroneous" guard variable values. Thus, genuine variables can be assigned erroneous values (from the perspective of proper execution of the virtual thread), the errors being removed through the application of error-correcting codes before they are able to derail proper execution of the virtual thread. It should be appreciated that any suitable error-correcting code(s) could be used for this purpose, including without limitation Hamming codes, Reed-Solomon codes, and the like.

1.5.1.3.2. Virtual PCs

Another technique for distributing the baton is to use virtual PCs. For example, a collection of k integer variables can be used to represent PC. The table of k-tuples that is actually used to represent the virtual PC (VPC) values of each virtual thread (VT) is preferably an obfuscation-time secret. That is, the obfuscator can make it up, use it to obfuscate the program, and throw it away. It need not appear in the program.

For example, a table for k==3 might be:

| VPC | VPC1 | VPC2 | VPC3 | sum | product |
|-----|------|------|------|-----|---------|
| 1 | 2 | 3 | 4 | 9 | 24 |
| 2 | 2 | 5 | 4 | 11 | 40 |
| 3 | 2 | 6 | 4 | 12 | 48 |
| 4 | 2 | 6 | 7 | 15 | 84 |
| 5 | 2 | 6 | 8 | 16 | 96 |
| 6 | 3 | 6 | 8 | 17 | 144 |
| 7 | 4 | 6 | 8 | 18 | 192 |
| 8 | 4 | 9 | 8 | 21 | 288 |

It will be appreciated that while, in this example, the table has been kept fairly regular for ease of explanation, the table can be readily constructed in a different manner. For example, in one embodiment some randomness or quasi-randomness is used in the construction of the table.

Since, in this example, each of the $VPC_i$ is a positive and monotonically non-decreasing function of VPC, and one of them increases at each step, the sums and products of the triples are monotonically increasing, and therefore distinct. Moreover, since only one of the $VPC_i$ changes at each step, VPC can be incremented by assigning to a single $VPC_i$. (Note, however, that in general an arbitrary transfer of control requires using a mutually exclusive or mutex lock around as many as k assignments.) An illustrative application of this technique is shown below, using the relationships set forth in the VPC table shown above:

VPC1 = 2; . . . VPC2 = 3; . . . VPC3 = 4 . . . ;
OV9 = 31; OV11 = 75; OV13 = 9;
. . .

```
parallel {
/* thread 1 */
    while (VPC1+VPC2+VPC3) <= OV9 do {
        if(VPC1+VPC2+VPC3) == 15 then {S4; OS2; VPC3
            = 8}
        if (VPC3*OV13) == 18 then {OS1; OS5; VPC1=1}
    }
|
/* thread 2 */
...
|
/* thread n */
    while (VPC1<=4) do {
        if  (VPC1+OV13+VPC3)==19) then {OS2; S5;
            VPC1=VPC2/2}
    }
|
/* thread n+1 */
    while (VPC2*VPC3) < OV11 do {
        if VPC2 < 4 then {OS1; S1; OS5; VPC2 = VPC3+1}
        if   (41<(VPC1*VPC2*VPC3)<63)   then   {S3;
            VPC3=3*VPC1+1}
        if VPC1 == 2 then {OS2; OS5}
        if VPC2 == 5 then {S2; VPC2 = VPC2+1;}
        if  (VPC1*VPC2*VPC3)==36 then {OS3; OS6;
            VPC2=VPC3−1}
    }
}
```

It should be appreciated that the variable names (e.g., VP1, VP2, VP3, OV9, OV11, etc.) used in this example (and in the other examples shown herein) have been chosen to aid the explanation of this technique. In a preferred embodiment these variables are given obscure and/or misleading names in order to obscure their functionality and/or interrelationship. For example, the names of some or all of the variables could be arbitrary strings, or could suggest a relationship with an unrelated or irrelevant operation or code segment.

It should also be noted that while, in the example shown above, the baton is passed through the VPC table linearly from the lowest VPC to the highest (i.e., the first genuine statement, S1, corresponds to VPC=1, the second statement, S2, corresponds to VPC=2, etc.), this need not be the case. Instead, the table can be stepped through in an arbitrary order, and in the general case any suitably predefined virtual thread could be used. For example, assignments to the $VPC_i$ could be made in a manner such that the first statement, S1, executed if VPC was equal to 1; S2 executed if VPC was equal to 3; S3 executed if VPC was equal to 2; and so forth. In this case, the assignments to $VPC_i$ would be made so that the value of VPC varied sequentially from 1, to 3, and then to 2.

As shown above, the values of VPC can be tested without clearly revealing the values of the individual $VPC_i$ to static analysis (e.g., by testing the sum and/or the product of the $VPC_i$). Moreover, it is possible to test for a range of values rather than for an exact value (e.g., $41<(VPC_1*VPC_2*VPC_3)<63$). This can be especially advantageous when testing product-terms. In another embodiment, the VPC itself can correspond to a range of values, thus allowing some assignments to be made to the $VPC_i$ without changing the value of VPC. Since the sum (or the product) can be tested, and since the value of VPC can be changed by an assignment to, e.g., a single $VPC_i$, an attacker will generally have difficulty distinguishing between genuine segments and obfuscation segments.

Some rows in the VPC table can be uniquely determined by the value of a single $VPC_i$. In the example shown above, VPC==1 and the evenly-numbered rows are so determined. This can provide yet another way to test the value of the VPC without revealing all that is known about the $VPC_i$. For example, following the test $VPC_2=3$, a genuine segment can increment VPC by the assignment $VPC_2=5$, and an obfuscation segment can leave it unchanged by the assignment $VPC_3=4$.

Moreover, code that is never to be executed (and which can therefore contain arbitrary code) can be guarded by any test that is not satisfied by any of the rows. Without knowledge of the table, static analysis generally cannot reveal the unreachability of this code. For example, referring to the table shown above, it will generally be difficult to statically determine that, e.g., the tests $(VPC_3*OV_{13})==18$, $(VPC_1*VPC_2*VPC_3)= 36$, or $VPC_3==5$ are not satisfied. In addition, one or more versions of the code that establishes some or all of these impossible conditions can be scattered in other never-executed segments, so that in order to establish that any one of them is not executed, an attacker generally must know that all of them are not executed.

It should also be noted that the $VPC_i$ need not be statically initialized to values corresponding to a value of VPC. For example, each of the $VPC_i$ could be initialized to, e.g., −1, and in three different real threads' main loops, conditional assignments similar to the following could be placed:
    if VPC1==−1 then VPC1=2;
    if VPC2==−1 then VPC2=3; and/or
    if VPC3==−1 then VPC3=4

Moreover, these tests and assignments need not be simple or deterministic. For example, initialization of the $VPC_i$ could be made contingent on a test of whether the low order 3 bits of the clock are zero, a test of whether a predefined loop is executed in less than 100 microseconds, a test of whether a predefined real thread has repeated its main loop at least 150 times, a test of whether a pointer returned by malloc is a multiple of 32, or any other suitable test that is repeatedly executed until it succeeds (and preferably is expected to eventually succeed within a predetermined period). If something suspicious is detected, on the other hand, the value of $VPC_i$ can be set to, e.g., 0 or 1, thus preventing proper initialization and effectively preventing the virtual thread from starting.

It should be appreciated that the segment associated with a VPC value need not be contiguous in a real thread's main loop. Since there can be multiple ways to test for a single value of VPC, one such test can be performed, part of the associated segment can be executed, and VPC can be left unchanged. Later, in the main loop, the same VPC value can be tested for in a different way, and execution of the segment can be resumed. This process can be repeated, VPC being set to its next value after completing the final piece of the segment. As another example, if the top-level control construct of a segment is a fixed loop on an integer variable (e.g., i from 1 to 10), incrementing the loop variable can be done unconditionally in the main loop of the containing real thread. The segment detects the first time through (by the variable being over limit, e.g., 11) and initializes the variable for the current execution (e.g., to 1). It increments VPC only after the execution with the limit value (e.g., execution with i=10).

Thus, the above-described baton-passing techniques generally make static analysis more difficult, due in part to the use of implicit control transfers and due to the fact that few tools are available to perform multi-threaded dataflow analysis. These techniques can also be effective in impeding dynamic analysis, due to the presence of obfuscation segments and due to the difficulty involved in debugging multiple threads. These techniques can be implemented at the source-code level as well as at the binary or object code level.

Potential disadvantages of baton-passing techniques are that the use of multiple threads tends to slow program execution, and the resultant code can be difficult for the obfuscator to debug. In addition, data structures used by different segments of the virtual thread generally cannot be allocated on a stack, but instead must be allocated statically or on the heap so that all threads can access them.

However, these potential disadvantages can be substantially avoided or reduced by limiting the use of baton-passing techniques to certain well-chosen places. For example, self-checks are typically particularly good candidates for the application of baton-passing. In general, self-checking code includes code for checking for debuggers and also checking the integrity of other pieces of the program. Baton-passing can advantageously be applied to self-checking code, whereby segments that perform some crucial work are intermixed with segments that make self-checks and segments comprised of executable and/or non-executable obfuscation statements, the intermixing making it more difficult to remove the self-checks without interfering with the crucial work. Accordingly, if it were determined that for a particular application a relatively widespread application of baton-passing obfuscation techniques would lead to unacceptable performance degradation, baton-passing obfuscation could be applied on a more limited scale to those regions of code that perform self-checks, or any other suitably chosen regions, thereby obtaining the advantages of baton-passing while lessening the effect of its relative disadvantages.

1.5.2. Race Conditions

Multi-threaded programs are generally constructed to avoid race conditions that result in non-deterministic behavior. However, as previously described, it is possible to build race conditions into a program that resolve in the correct order under normal conditions, but not when the program is executed, e.g., under a debugger. Moreover, race conditions need not resolve in the correct order all of the time; instead, code can be put in a loop and repeated until it succeeds or until it becomes sufficiently probable that the repeated failures are due to deterministic behavior.

Another use of race conditions is to create a relatively long loop in the virtual thread of baton passing described above. The loop is preferably made to appear as if it has no exit, while, in fact, it exits if an improbable (but not impossible) race condition occurs. This technique can advantageously make static and/or dynamic analysis more difficult. An argument against the use of such techniques is that when constructing a difficult-to-solve maze, it is generally desirable to construct the maze such that there is only a single, relatively long path through it. The application of non-determinacy can create multiple paths, and, unless care is taken, an attacker may by chance find a relatively short one. Careful design is necessary to ensure that even the "luckiest" paths are still adequately long.

1.5.3. Non-Determinism

Figure 23:
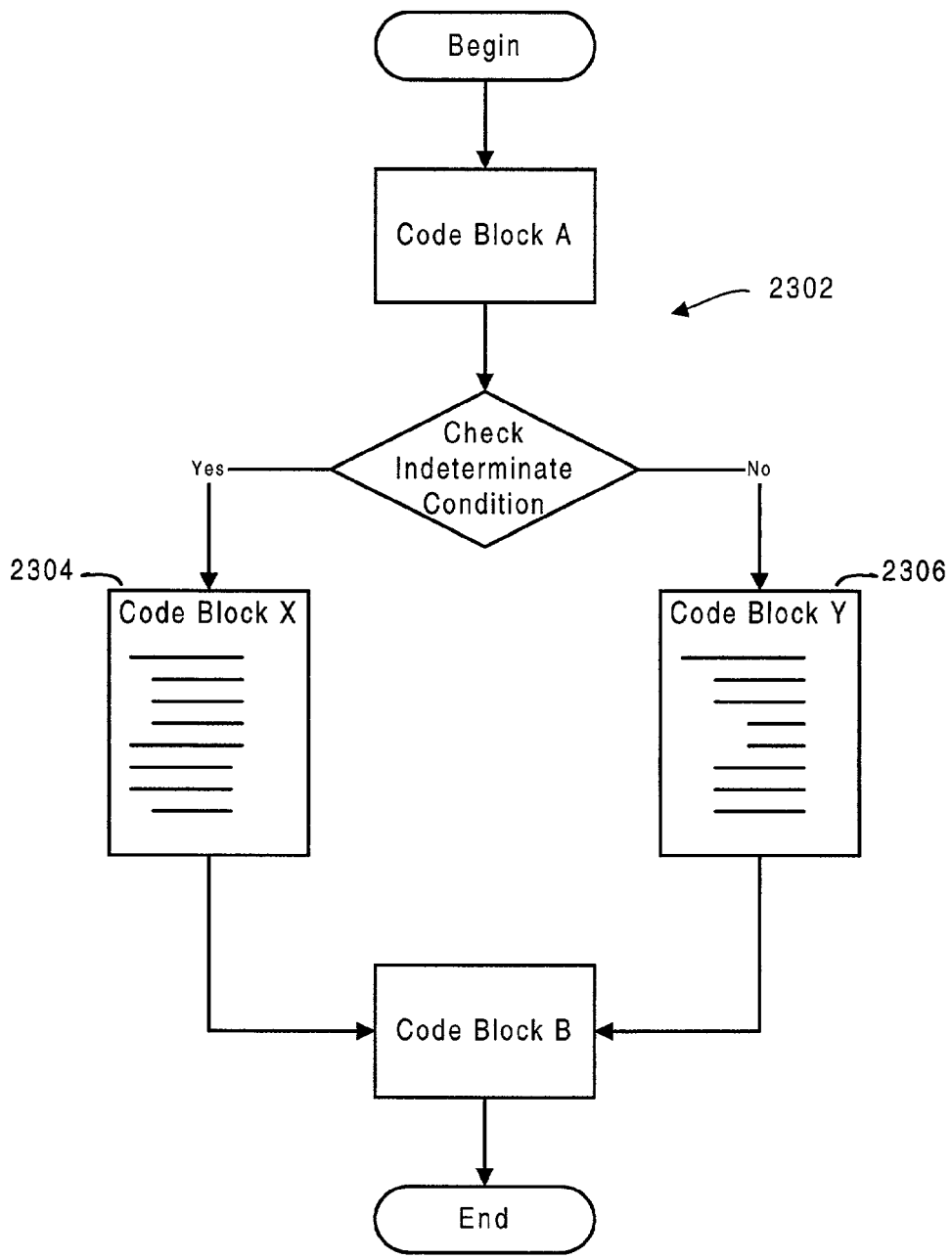
FIG. 23 illustrates the use of non-determinism in accordance with an embodiment of the present invention.

Debugging non-deterministic programs—even those without race conditions—is generally harder than debugging deterministic programs, since replaying program execution is typically more difficult. As a result, non-determinism can be advantageously injected into a program to render its operation more obscure to an attacker. Referring to FIG. 23, for example, in one embodiment branches such as branch 2302 are inserted into the program, the branches resolving in a substantially non-deterministic fashion. The program statements to which the branches lead (e.g., blocks 2304 and 2306) preferably consist of obfuscation statements and/or equivalent (but preferably non-identical) genuine code sequences. Thus, in FIG. 23, blocks 2304 and 2306 can be designed such that it does not matter which block is chosen by indeterminate branch 2302, since the program will execute correctly either way.

One source of pseudo-non-determinism is the cycle counter in Pentium and more advanced 80×86 processors. The cycle counter is typically reset when the processor is reset—e.g., at power-up—and ticks with each clock cycle. At 233 MHz, for example, the low-order 32 bits of the cycle counter wrap around in approximately 18 seconds, and the low-order 16 bits wrap around in about 0.3 milliseconds. In practice, it will be difficult for an attacker to eliminate this randomness, as enough randomness is typically present in the low-order 16 bits due to differences in disk read times (typically 10 ms), of which there are usually many when booting the operating system, and due to differences in the actual times when clock interrupts happen (typically every 50 ms). As a result, the value contained in the low-order bits on a given reading of the cycle counter can be treated as effectively random. Reading the cycle counter typically takes only one instruction; however, since such an instruction is usually easy to recognize, in one embodiment it is guarded by self-checking code and/or generated dynamically, e.g., on the stack.

1.5.4. Resisting Attack from a Known Point in the SDP

One potential point of attack on an SDP is its startup code. A determined attacker will be able to figure out where the operating system transfers control when starting up an executable, and will also be able to determine the state of memory at that point. With knowledge of the pre-startup condition, the attacker can simply start the program and attempt to follow along from there.

As a result, it is desirable to lose an attacker before going near a sensitive part of the SDP. That is, it is desirable to make it difficult for the attacker to follow execution of the program. Concurrency can be of assistance in this regard. For example, a sensitive segment of the SDP can be given a prologue whose primary or sole purpose is to elude and/or detect attackers. In a preferred embodiment, such a prologue uses a substantially different collection of defensive techniques than those used by the sensitive code itself, so that if an attacker is able to crack parts of the prologue, he will gain at most minimal clues about the defensive techniques used in the sensitive code.

Figure 24:
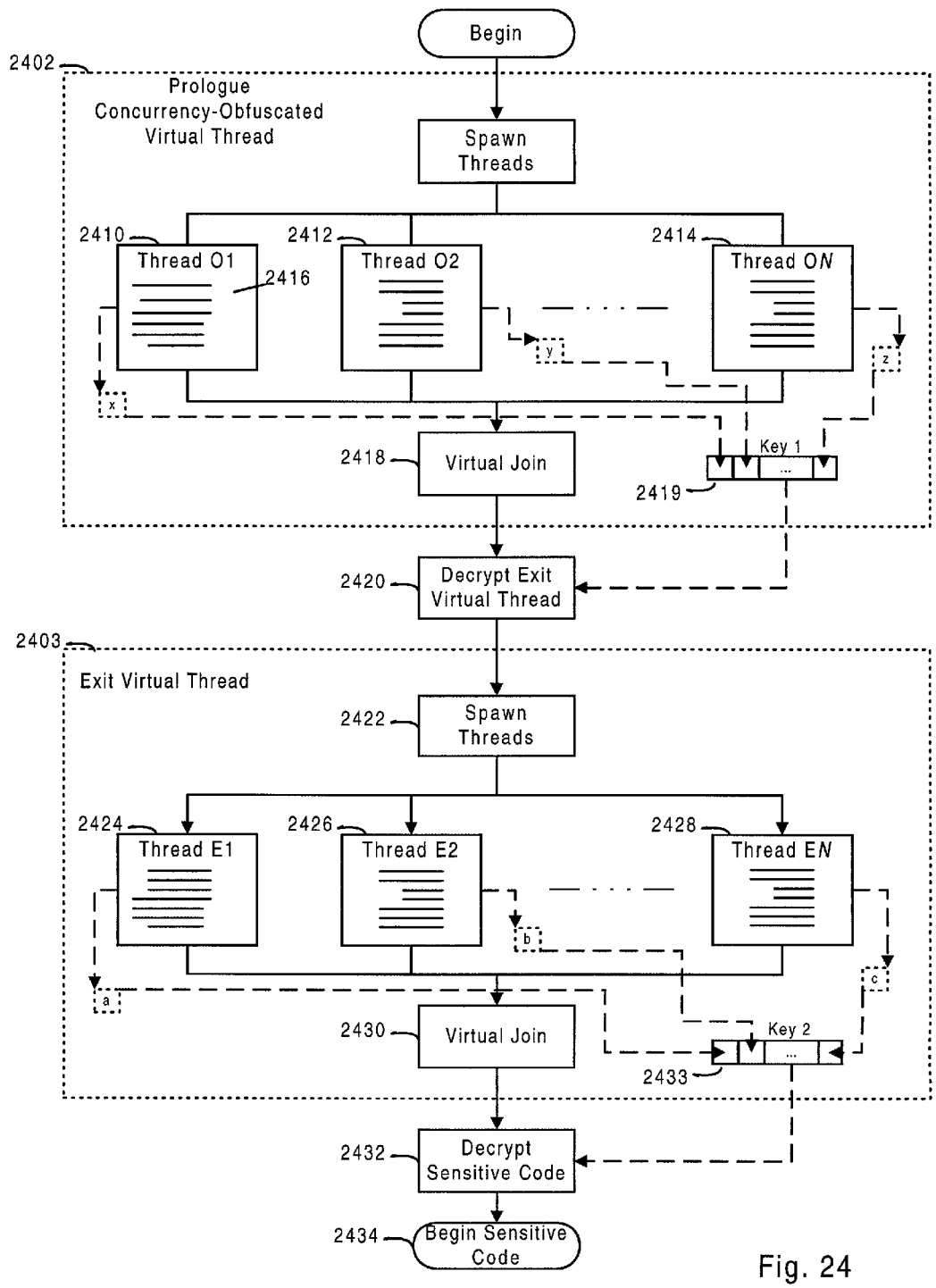
FIG. 24 illustrates the use of concurrency to obfuscate the operation of a program at start-up.

FIG. 24 illustrates one technique for interfering with an attacker's ability to determine what is happening in a sensitive piece of code. As shown in FIG. 24, several real threads (2410, 2412, 2414) can be started, which taken together implement a concurrency-obfuscated virtual thread (PVT) 2402. Some or all of these threads can primarily execute statements 2416 which are inserted for obfuscation and have no apparent purpose, or which misleadingly suggest that they serve some genuine purpose. Since a typical attacker will not know in advance that some or all of the threads are playing obfuscatory roles, he will have to assume that each thread is performing a legitimate function and trace it. As the number of threads—and the complexity of each thread—increases, the attacker's task will typically be rendered more difficult.

To prevent an attacker from simply removing threads, one or more genuine statements and/or segments can be embedded in some or all of the threads. Thus, if the attacker removes a thread, the program will not execute properly and/or other defensive action will be taken. Although the genuine segments may do little real work, in a preferred embodiment they should at least perform busy work or otherwise emulate obfuscation segments.

In one embodiment the virtual threads (2410, 2412, 2414, etc.) have different sets of batons and disjoint sets of genuine variables, yet share obfuscation guards and obfuscation variables. Each virtual thread preferably loops a relatively large number of times without using an obvious loop counter. For example, the loop can use a compiled-in pseudo-random sequence generator to generate a new value on each iteration, and the loop can do something different when the resulting value equals the nth value in that sequence (as computed in advance by the obfuscator). The loop can then perform part of the virtual join, discussed below, and continue looping so that it is not obvious that anything of special significance has happened.

The PVT 2402 terminates (and virtual join 2418 occurs) when each of the component threads (2410, 2412, 2414) "finishes" execution (e.g., when the VPC for each thread reaches its predetermined value). When this occurs, the exit virtual thread (EVT) 2403 is established (2420, 2422) and executed. The guards of EVT 2403 are preferably set one at a time by statements in the component threads of PVT 2402 (for example, after each thread has executed a loop a predetermined number of times). In one embodiment an EVT guard is set to a distinctive value by PVT 2402 when too much real time has elapsed since the prologue was started (e.g., a predefined value such as a few hundred milliseconds, or any other suitable value for the given application). Thus, if any of the threads, $O_1 \ldots O_N$, (2410, 2412, 2414) is delayed by an attacker, the prologue will never get around to exiting, as the guard value can, e.g., preclude virtual join 2418 and/or 2430 from occurring.

In one embodiment genuine statements in the component threads 2410, 2412, and 2414 of PVT 2402 are operable to store words that become all or part of the code of EVT 2403. In addition, genuine statements in PVT 2402 are also preferably operable to construct a key 2419 that can be used to decrypt the main body of EVT 2403. Each real thread, $O_1 \ldots O_N$ (2410, 2412, 2414) and $E_1 \ldots E_N$, (2424, 2426, 2428) can also keep a count of the number of times it has gone around its loop, and from time-to-time compare this with the count(s) maintained by some of the other real threads. If any real thread gets unreasonably ahead or behind (e.g., by more than can be accounted for by vagaries of scheduling), another thread can exit its loop, thus spoiling the other threads' chance to complete. Note that since a debugger typically executes one real thread at a time (or all but one), each virtual thread should have one or more segments in each real thread.

In a preferred embodiment a second phase of the attempt to lose an attacker involves the use of stronger, or different, forms of cryptography. EVT 2403 can use keys (e.g., 2433) constructed by its threads (2424, 2426, 2428) to decrypt components (2432) of code. The code can be concurrency-obfuscated, although it is operable to play more than an obfuscatory role. In addition, virtual threads may decrypt pieces of code for their own segments that will be executed later, and overwrite code for their own segments that will not be executed again, as well as decrypting other keys for future use.

After the trail has been sufficiently muddied, various virtual threads can start performing non-obfuscatory work. For example, they can look at the log to see how many unsuccessful—and not obliterated—attempts there have been to execute the sensitive code since the last successful attempt, and they can begin piecewise-decrypting the body of the sensitive code itself (e.g., 2432).

Finally, another virtual join (2430) can be performed, and control can be transferred to the sensitive code (2434) (optionally, after another round of decryption) Again, it is desirable to transfer control to the sensitive code only if the virtual join happens soon enough. If too much time passes, each virtual thread can simply start obliterating the useful information it has placed in memory, and then enter a complex and endless loop of obfuscation statements.

Additional techniques that are particularly well-suited for use in protecting a sensitive code segment include:

Inserting genuine race conditions. For example, a few genuine race conditions can be inserted such that multiple attempts by an attacker to follow program execution will get different results. Optionally, termination of loops can depend on relatively infrequent resolutions of the races.

Inserting disinformation. The obfuscation segments are also a good place to insert disinformation. For example, strings can be manipulated (e.g., print, concatenate, etc.) with suggestive values (e.g., "debugger detected", "secret key invalid", etc.), so as to divert the attacker's attention.

Decrypting code. Algorithms—including relatively simple algorithms such as ROT13, XOR with "5A5A5A . . . ", etc.—can be used to decrypt code for use in other obfuscation segments.

Performing system operations. Code can be inserted to, e.g., read the clock or initiate disk operations, although care should generally be taken to avoid things that take too long or that adversely affect the timing of a virtual thread.

Thus it can be seen that a variety of techniques can be used to elude, detect, or mislead attackers before the execution of sensitive code. Startup and places where the SDP receives or replies to RPCs or makes system calls are likely points of attack and thus make good candidates for protection using these obfuscation techniques.

1.6. Data Structure Obfuscation 1.6.1. Hidden Invariants

A program can be rendered effectively opaque by embedding invariants that are difficult for an attacker to infer, yet relatively simple for an obfuscator to maintain. An easy way to embed an invariant is via an opaque predicate. For example, in the code sequence "if P then E1; else E2;" the obfuscator can select P such that it is impractical for an attacker to determine whether P is constant (e.g., always true or always false) or variable. If the attacker does not know that P is constant, he must spend time understanding both E1 and E2.

One technique for creating opaque predicates makes use of aliasing. For example, determining whether two pointers point to the same location, or into the same structure, is an effectively intractable problem. Opaque predicates involving pointer equality are particularly useful, since the obfuscator will know about the partitioning of the pointer variables (e.g., between ones that point into a first structure and ones that point into a second), but it is not easy for an attacker to infer this information automatically. Substantially the same effect can be achieved with an incrementing counter, or with a pseudo-random number generator with a suitably long period. The important point is that the obfuscator knows, by construction, something that is hard for an attacker to deduce.

This type of aliasing analysis is effectively equivalent to subscript analysis for arrays. That is, it is typically just as hard to determine whether two subscripted references are to the same element of an array as it is to determine whether two pointers are aliased. Thus, if A is an N-element boolean array, pointer references can be replaced by suitable array references.

For example, if $ve_i$ and $vo_i$ are variables containing even and odd values, respectively, and N is even, then after the code sequence: "A[ve1% N]=False; A[ve2% N]=True;" the conditional statement "if (A[ve1% N])" could branch either way (depending on the values of ve1 and ve2) since ve2% N may evaluate to the same value as ve1% N. However, after the code sequence: "A[ve1% N]=True; A[vo1% N]=False;" the conditional statement "if (A[ve1% N])" will always take the true branch. (Note that "%" denotes a "mod" operation).

There are a variety of other techniques for constructing opaque predicates. For example, if the obfuscator has a set of variables that always hold even numbers, and another set that always hold odd numbers, opaque predicates can be constructed from the fact that no even number equals an odd number, that the product of two odd numbers is odd, that the difference between two odd numbers is even, and so forth. Assignments (or procedure calls, etc.) can be sprinkled throughout the program to update these variables in ways that maintain the invariant. For example:

ve1=ve2+2;
vo1=ve1+vo2;
ve3=ve1*ve4;
vo5=vo6*vo7;
ve4=2*vo1;
ve2=vo1−vo4+ve1;
ve1+=2;
ve2*=2; and/or
vo4=vo3% 16;

An advantage of using odd/even variables is that conventional tools are unlikely to analyze variables for oddness/evenness invariants, yet these invariants can be maintained relatively easily with ordinary (e.g., stealthy and cheap) operations. The use of odd/even variables also has the advantage of working with virtually any size of integer, and is preserved modulo any even integer, including, as a special case, integer overflow. It should be appreciated that there are numerous other simple predicates on integers that could be used instead of, or in addition to, the odd/even distinction (e.g., positive/negative, divisible by n, etc.), especially if it became known that deobfuscators should look for variables that are always odd or always even.

1.6.2. Data Scrambling

Figure 25:
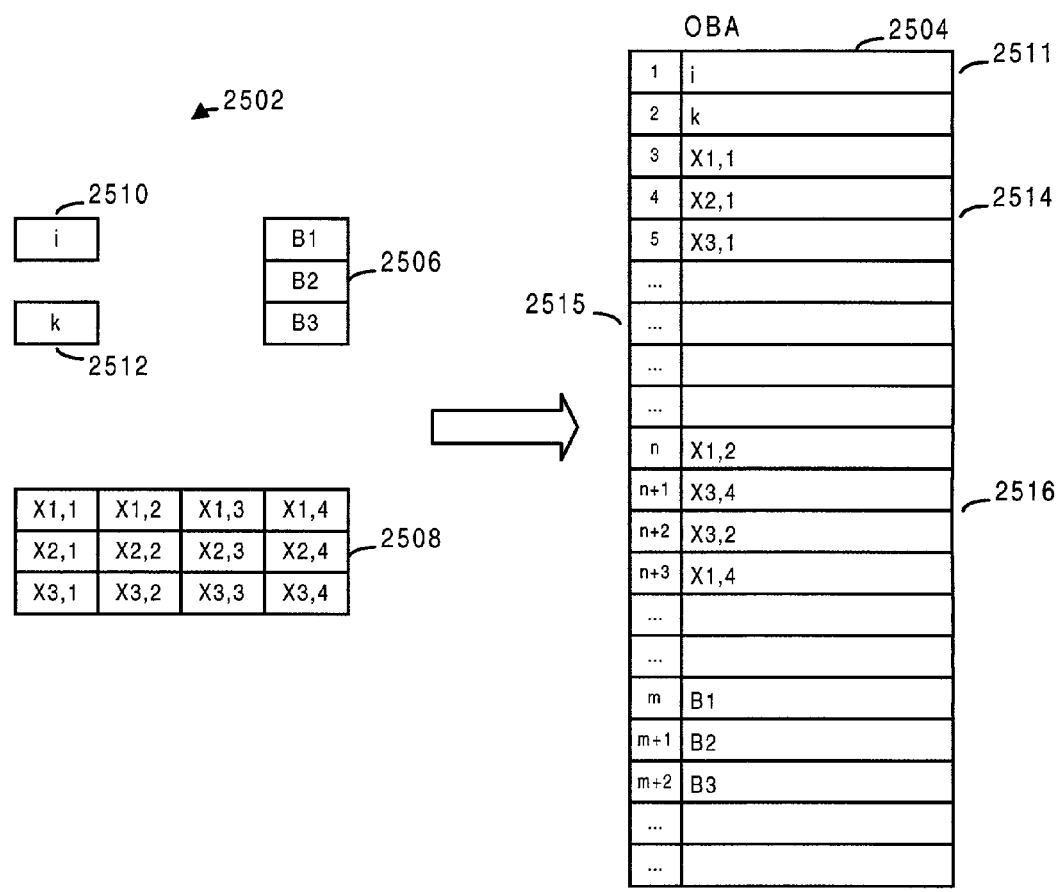
FIG. 25 illustrates a data scrambling technique in accordance with an embodiment of the present invention.

Another way to obfuscate data structures is to take a number of different data structures—some constant and some variable—and place them in an array, OBA. This technique is illustrated in FIG. 25, in which a variety of data structures and variables 2502 in a computer program are merged into an array 2504 in an obfuscated version of the computer program. For each individual variable (or constant), v, a distinct compile-time constant index, iv, is selected, and the program is appropriately modified to reference OBA[iv] instead of v. Thus, in FIG. 25, for example, a reference to variable i 2510 in the original program can be replaced with a reference to OBA[1] 2511 in the obfuscated program.

In many cases, OBA can contain arrays as well as scalar values. For example, an n-element array, A, that is indexed by constants can be placed in OBA. Distinct compile-time constant indices, Ai1, . . . , Ain, can be selected and used to systematically reference OBA[Aik] instead of A[k]. This technique is illustrated in FIG. 25, in which array B 2506 is incorporated into array OBA 2504, and the three elements of array 2506—i.e., B[1], B[2], B[3]—are referenced in array 2504 as OBA[m], OBA[m+1], and OBA[m+2], respectively. The elements of an array in the original program need not appear contiguously in OBA. Thus, in FIG. 25 the elements of array 2508 in the original program are separated in array 2504, with a first portion of the elements 2514 being separated from a second portion of the elements 2516 by one or more other variables, constants, or elements from other arrays (represented in FIG. 25 by ellipses 2515). Similarly, even when elements of an array do appear together in OBA, they can be rearranged so as to confuse or obscure the logical relationship, if any, between the elements in the original array. Thus, as illustrated in FIG. 25, the order of elements 2516 can be chosen so that it does not correspond to the order in which the same elements appear in the rows and columns of array 2508. If an array in the original program is indexed only by simple loop variables, the loops can be unrolled to get rid of the variable indices in the obfuscated program. If an array is indexed in more complex ways, it can be allocated to sequential locations in OBA, or it can simply be excluded from this scheme.

At SDP customization time, the elements of OBA can be permuted, respecting array elements that must be contiguous. To accomplish such a permutation, constants allocated within OBA are moved, and code that indexes into OBA is patched by replacing the compile-time constant index with the result of the permutation. The execution of the program will be unchanged, but differently-customized instances of the SDP will have different storage layouts, thus making them more difficult to recognize. In addition, since arrays will be dispersed, they will be harder to identify.

Other data structure permutations are also possible. For instance, several arrays might be merged together, and their indexes adjusted accordingly. For example, the even index elements might belong to logical array, A, and the odd index elements to logical array, B. Moreover, the mapping between arrays and index locations can be varied for different program customizations.

1.7. Optimization as Obfuscation

Program optimization can be viewed as a process of systematically sacrificing program structure to gain performance. As a result, optimized code is typically more difficult to debug or understand than code that is compiled in a more straightforward fashion. Thus, many optimizing transformations also tend to be good obfuscation transformations.

Optimization may involve moving computations around, combining variables, changing the flow of control, replacing straightforward but expensive computations with complex but cheaper ones, and introducing and exploiting hidden invariants, to name just a few of the processes that are commonly performed during optimization. In general, optimizing transformations:

Have varying potencies, depending largely on how much context they exploit. For example, peephole optimizations typically have low potency; local optimizations tend to have only moderate potency; global optimizations generally have higher potency; and inter-procedural optimizations can be extremely potent. They are all, of course, stealthy.

Are highly resilient. Since optimizations typically remove structure rather than add it, it is difficult to reverse these optimizations automatically. Indeed, many optimizations are one-way.

Have low cost. From a performance perspective, optimizations tend to have a negative cost; that is, they typically improve performance rather than degrade it.

One difficulty in performing program optimization is deciding whether a given transformation will improve program performance or degrade it. However, for obfuscation purposes a transformation can typically be applied without giving much consideration to whether it increases program performance or decreases it, as long as the transformation does not decrease performance too drastically.

Accordingly, techniques for program optimization, including without limitation constant folding and propagation; peephole transformations; elimination of common sub-expressions and other redundant code; loop unrolling and procedure in-lining (especially if different program instances are customized differently); strength reduction; hoisting and other code motion techniques; local reordering of instructions; partial evaluation; allocation of registers to variables; and other suitable techniques make good candidates for obfuscation.

Since a good optimizer may undo some of the work done by obfuscation transformations that are designed to add complexity to a program, it will often be more effective to apply these obfuscation transformations after the optimizer has been applied to the program.

1.8. Performance and Properties

While it is generally undesirable for obfuscation to seriously degrade the performance of a program by, e.g., performing a substantial amount of additional computation, it should be understood that there are places where it can be advantageous to perform extra computation. For example:

While trying to lose an attacker. As discussed above, it is desirable to impede an attacker's efforts to track the execution of sensitive regions of code. By employing the techniques described above, the amount of time an attacker takes to finish executing sensitive code can be increased. Since an attacker—unlike a normal user—is likely to want to repeatedly execute the sensitive code, the waste motion and delay added by the extra obfuscatory prologue computations are likely to present a nontrivial obstacle to an attacker's attempts to run experiments on the program.

While dealing with external devices. Another time in which heavy-duty obfuscation can be used at relatively little cost is while dealing with external devices, since the cost of the obfuscation will often be overshadowed by device and controller latency.

Thus, if an application is performance-sensitive, obfuscation techniques can be concentrated in certain parts of the program to lessen the effect (if any) that obfuscation has on the program's performance.

2. Tamper Resistance

An attacker should find it relatively difficult to tamper with the operation of an SDP, and should find it especially difficult to do so undetected. To this end, a tamper resistant program should possess some or all of the following characteristics:

Attacks on an intact SDP (e.g., running the SDP under a debugger, patching code, etc.) should be detected promptly—or at least made more difficult to perform undetected.

Attempts to run parts of an SDP—as opposed to a complete, properly-installed SDP—should generally be detected and/or rendered ineffective.

Suspected tampering should be reported externally for fraud detection, response, and/or prevention as soon as practical. In addition, in a preferred embodiment pressure to connect to an external site is subtly increased once tampering has been detected. For example, in an application in which a user is allotted a certain budget with which to perform various offline activities, the budget can be made to expire when tampering is detected (or soon thereafter), thus forcing the user/attacker to connect to an external site that preferably houses, or is communicatively coupled to, the external tamper-monitoring agent. It will be appreciated that other techniques for encouraging the user to connect to an external agent could be used in accordance with the principles of the present invention and the requirements of the particular application.

After tampering has been detected, critical information residing in the SDP (e.g., master keys, critical code segments, etc.) should be erased or modified relatively quickly. Preferably, however, this should not occur until after tampering has been reported and/or other appropriate defensive action has been initiated, since the SDP will generally need to be functioning in order to send a report to an external agent, and since it is desirable to avoid alerting the attacker to the fact that an attack has been detected for as long as possible, and preferably at least until other defensive action has been initiated or completed. To protect against false alarms, in a preferred embodiment only information that can be restored by, e.g., the external agent(s) is erased, while other information is left generally intact.

Useful functioning of the SDP should be restricted or prevented once tampering has been detected. In one preferred embodiment the SDP operates with limited functionality, rather than stopping entirely, so that the value to the attacker of continuing to run the program is lessened, and so that the attacker is not alerted to the precise location at which detection occurred.

Tamper resistance mechanisms should be relatively independent of the design of the SDP, thus minimizing the need for those involved in implementing the SDP to communicate with those involved in implementing the tamper resistance controls.

To accomplish these goals, preferred embodiments of the present invention make use of some or all of the following:

Tamper Testing. Tamper testing generally involves looking for evidence that the SDP may be under attack. For example, the tamper testing mechanism can check to see if the SDP is connected to a debugger, has code that has been modified (e.g., breakpoints set or instructions altered), and/or has key data structures that have been improperly changed.

Tamper Memory. Tamper memory is used to robustly record the fact that one or more tamper tests have detected suspicious activity, at least until certain tamper reaction measures have been initiated or completed.

Tamper Reaction. Tamper reaction generally refers to the process of reporting the detection of suspicious activity to an external agent and/or taking steps to limit the damage that a tampered SDP, or an attacker, can do.

2.1. Tamper Testing

In general terms, tamper testing involves looking for evidence that the SDP is under attack. For example, tamper testing can involve looking for evidence that an SDP is connected to a debugger, has been improperly modified (e.g., breakpoints set or instructions altered), and/or that key data structures have been improperly changed. To this end, the debugger-detection, watchdog, and self-validation techniques described herein can be used. In addition, an SDP can use, e.g., operating system calls to keep track of changes to the SDPs operating environment, such as changes to the modules loaded in system memory (e.g., the removal or addition of modules), changes to interrupt or exception handlers, and the like.

In a preferred embodiment tamper resistance and obfuscation measures are applied in a relatively pervasive (as opposed to local) fashion, thereby reducing the chances that an attacker will recognize the protection mechanisms that are being used and/or find and eliminate each test for tampering. While pervasive application of obfuscation and tamper resistance techniques can be impractical in certain situations, the use of such techniques can be directed or limited to certain areas of the SDP to the extent that there is a material engineering or support cost to applying them. For example, if source code must be manually obfuscated or instrumented for tamper-resistance, that would argue in favor of applying tamper resistance in a way that minimizes such costs. Thus, in one embodiment performance-critical regions are flagged, and tamper testing code is not added to the flagged regions. In a preferred embodiment conventional automated tools are used to identify and flag the performance-critical sections, while in other embodiments, other techniques are used (such as, e.g., manual identification).

2.1.1. The Priming-Stamping Approach

Figure 26:
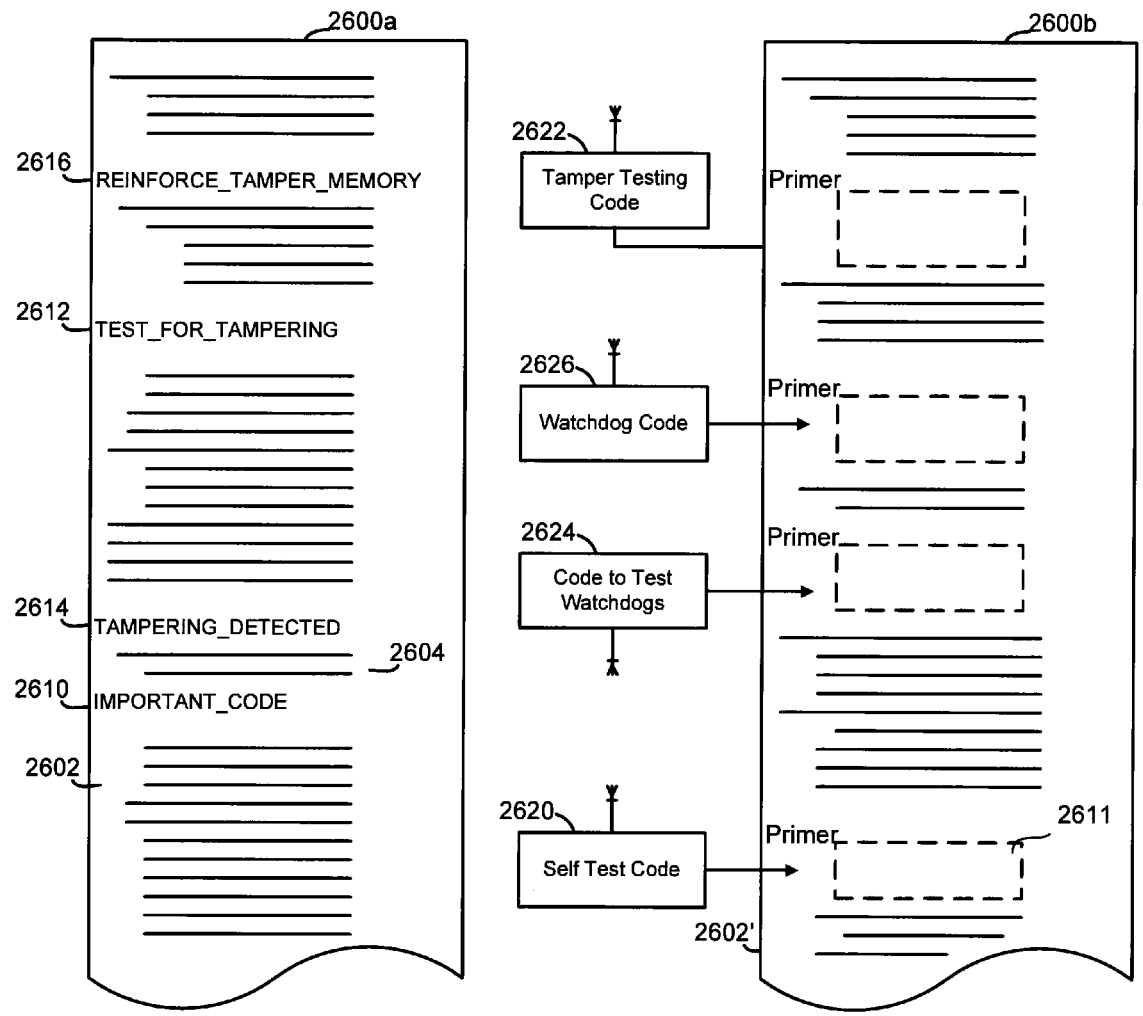
FIG. 26 illustrates a priming and stamping technique in accordance with an embodiment of the present invention.

Many tamper-resistance mechanisms can be implemented using a relatively small collection of macros and a binary image postprocessor. The macros can be transparently inserted into the code without substantially changing the semantics of the code and without requiring the user to know much, if anything, about the macros' implementation. The binary image postprocessor finds where the macros were used by looking for the distinctive primers that were created by the macros (preferably post SDP-customization), and implements tamper-resistance mechanisms in the spaces reserved by the primers. This technique is illustrated in FIG. 26.

In one preferred embodiment, some or all of the following macros are used:

IMPORTANT_CODE: As shown in FIG. 26, this macro 2610 is preferably inserted relatively close (e.g., within a thousand bytes) to code 2602 that is critical to the correct functioning of the SDP 2600. It serves as an indication by the programmer that a self-test 2620 should be performed at runtime to ensure that the nearby code 2602 has not been altered. Although a programmer will generally need some knowledge of the system structure to insert macro 2610 optimally, insertion can be done quite easily and precise placement is typically unnecessary. As shown in FIG. 26, a binary image postprocessor can be used to find the primer 2611 created by macro 2610 in the binary image 2600b of program 2600a. The desired self-test code 2620 is then inserted into the binary image in the space reserved by the primer, and executed when program 2600 is run.

TEST_FOR_TAMPERING: This macro 2612 can be inserted in a number of places in the source code 2600a to trigger full or partial tests for tampering 2622. For purposes of practicing the present invention, any suitable tamper testing code 2622 can be inserted. For example, tamper testing code 2622 may include code that checks for the presence of a debugger, checks for modification to the code 2600b, and/or for other suspicious activity. Macro 2612 is preferably used in places that are likely to be executed repeatedly—so that tests are done often enough—but preferably not in inner loops, where the cost of tests might become an issue. Again, some knowledge of the system structure will typically be needed to insert this macro optimally, but once again, it can be done quite easily and precise placement is generally not important.

TAMPERING_DETECTED: This macro 2614 is operable to trigger the insertion of code 2624 that returns a boolean value that is true if the tamper memory shows evidence of tampering. Macro 2614 is preferably called in places 2604 where the SDP is about to access sensitive or valuable information, or where there is an opportunity (or need) to "nudge" the user to connect to an external site to enable tamper reporting. Since deciding where to test TAMPERING_DETECTED—and how to respond when it returns true—generally requires knowledge of critical parts of the SDP 2600, it is preferably inserted by the programmers of the SDP source-code 2600a.

REINFORCE_TAMPER_MEMORY: This macro 2616 is preferably inserted in a number of places in source code 2600a to provide positive feedback in the tamper memory mechanism 2626. It should appear in places that are likely to be executed repeatedly, so that amplification is done often enough. Since it is typically not as expensive as TEST_FOR_TAMPERING 2612, it can be placed in more frequently-executed code. As described in more detail below, this macro can be used to implement the "watchdog" scheme 2626. In general, its roles are (i) to obscure the connection between instances of TEST_FOR_TAMPERING and TAMPERING_DETECTED, thus making it harder to find and disable the tests, and (ii) to create redundant paths between instances of TEST_FOR_TAMPERING and TAMPERING_DETECTED, thus making it more likely that even if a path is found and disabled, other paths will still function. Again, some knowledge of the system structure will typically be needed to insert this macro optimally, but it can be done quite easily and precise placement is generally not important.

In one embodiment, TEST_FOR_TAMPERING 2612 and/or TAMPERING_DETECTED 2614 include IMPORTANT_CODE 2610, since self-testing is typically an important target for tampering. In such an embodiment TEST_FOR_TAMPERING will thus typically check the validity of more than one block of code.

2.1.2. Self-Validation

One scheme for self-validation involves computing a checksum (or a secure hash) for a region of code before the code is executed, and comparing the computed checksum to a previously stored checksum value for that code region. If the checksums match, the code is deemed to be valid; otherwise, appropriate defensive action is taken. As another example, space can be reserved in the binary image of a program for a "correction" bit-pattern that makes the checksum for a particular region come out to a predefined value, e.g., zero. When a code block is to be executed, the checksum for the region can be computed and compared against the predefined value. If the calculated checksum does not match the predefined value, this can be used as evidence that the code in the original program has been modified, and appropriate defensive action can be taken. In a preferred the CS is used to ensure that checking is performed on the code that is actually being executed.

Figure 27:
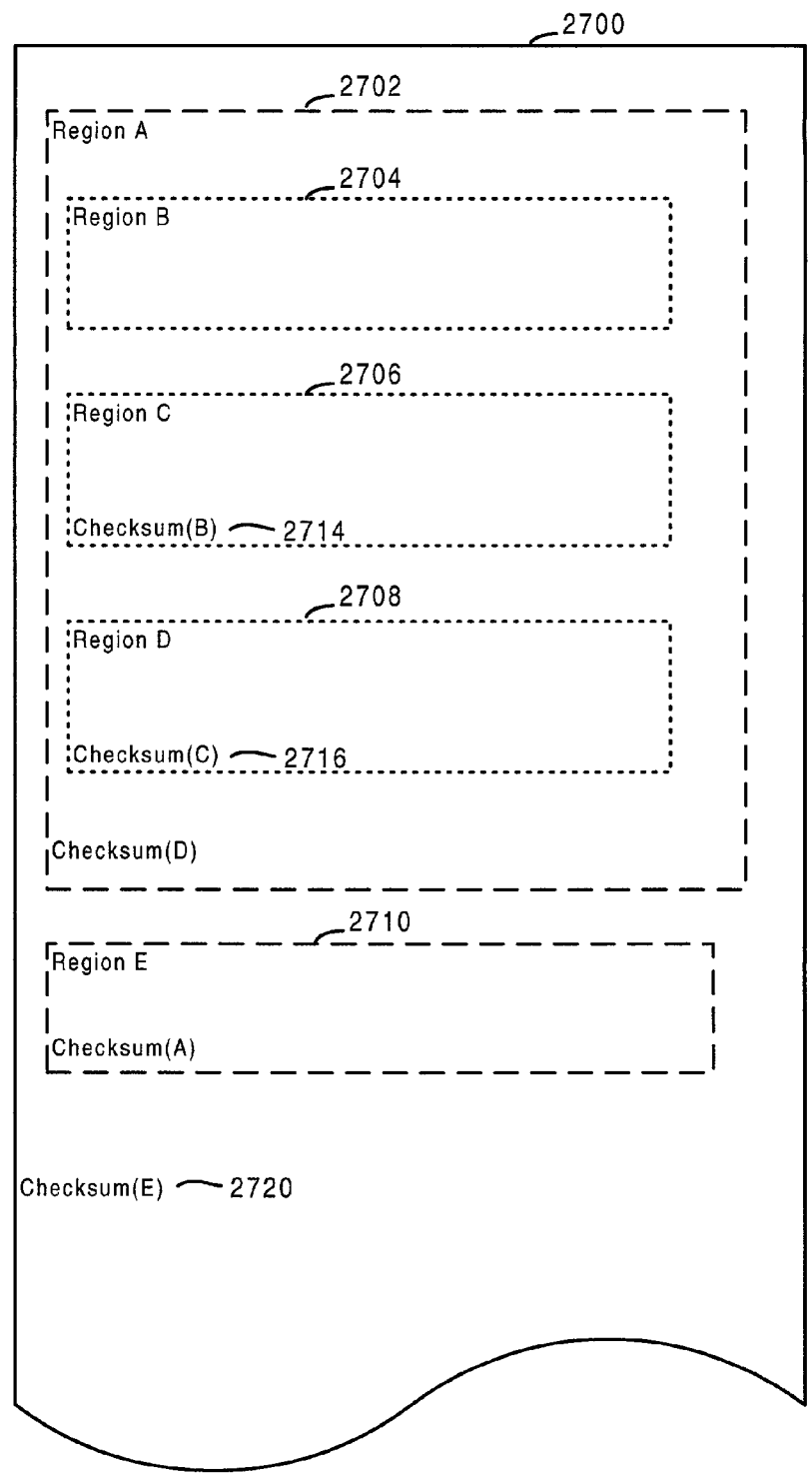
FIG. 27 illustrates the use of a self-validation technique in accordance with an embodiment of the present invention.

In one embodiment, none of the checked regions contain checksums for other checked regions. However, this generally means that the checksums themselves will not be checked for tampering. Thus, as illustrated in FIG. 27, in another embodiment the checksum 2714 for a region of code 2704 is embedded in another region of code 2706, and a checksum 2716 for code region 2706—including embedded checksum 2714—is computed and stored in a third region 2708. This process can be repeated for more regions of code (e.g., 2702, 2710). The final checksum value(s) 2720 are preferably encrypted, cryptographically signed, stored in tamper-resistant memory, and/or otherwise protected from undetected alteration.

Figure 28A:
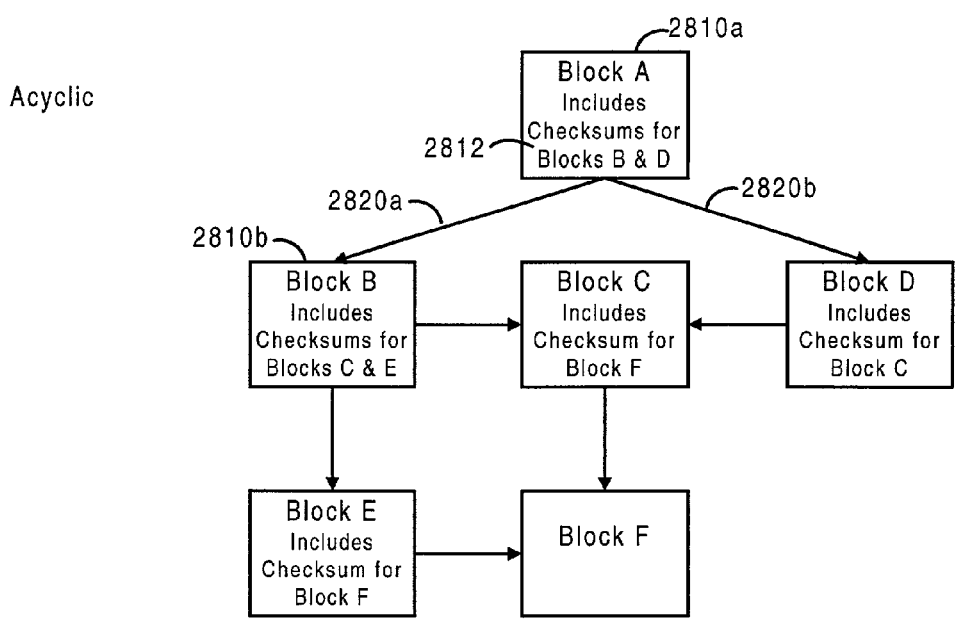
FIGS. 28A and 28B illustrate a mechanism for applying a self-validation technique in accordance with an embodiment of the present invention.
Figure 28B:
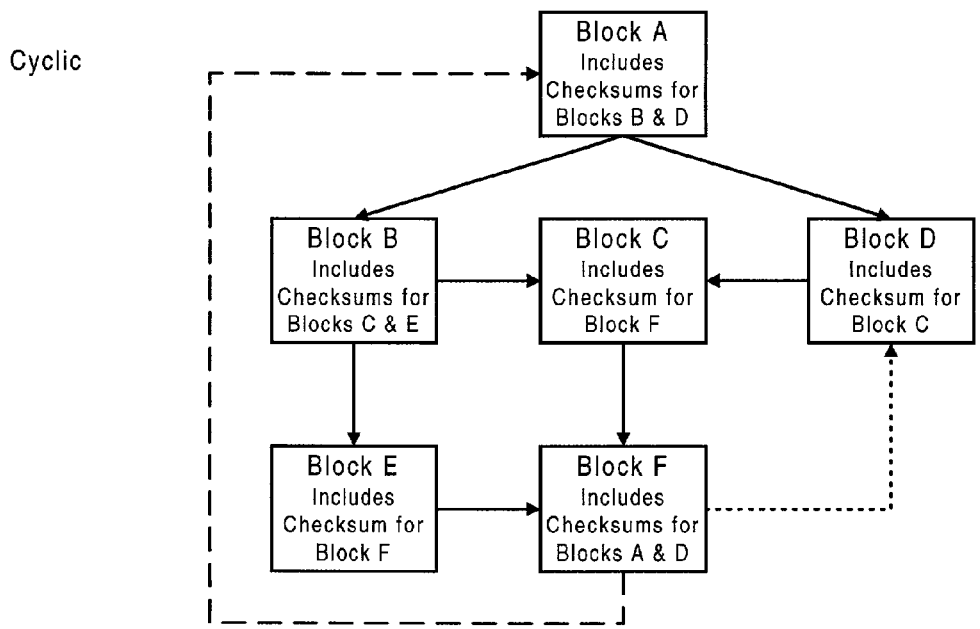

Care should be taken when inserting the checksums or correction values for a given code region to avoid altering the checksums of other code blocks, since modifying a code block without appropriately modifying its corresponding, stored checksum will cause self-validation of that block to fail. Accordingly, in one embodiment checksums for overlapping code regions are set using a directed graph that represents the checksum dependencies, as shown in FIG. 28. Each vertex 2810 represents a checked region. Each edge 2820 goes from a region 2810 containing a checksum 2812 to the region to which the checksum corresponds. If this graph is cyclic, as shown in FIG. 28B, then it will generally not be possible to make all the checksums mutually consistent. However, if the graph is acyclic, as shown in FIG. 28A, then it will be possible to make the changes (e.g., insert the checksums and/or correction bits) in an order consistent with the graph, for example, by using a topological sort.

Another relatively simple technique is to store checksums in the data section, thus avoiding an effect on the checksums for the code section. A checksum can be computed separately for the portion(s) of the data section containing these checksums and compared against a correct value stored outside the checksummed range.

Thus, it will be appreciated that self-verification can be designed so that it is relatively complicated to untangle—with checks in one part of the program validating checks in other parts of the program—so that the checking code cannot be patched out easily. Self-modification techniques, such as those described elsewhere herein, may also be used to provide additional protection.

2.1.3. Telomeres

Another tamper testing technique can be thought of as a software analog to telomeres, which are believed to be the genetic mechanism that keeps cells from reproducing indefinitely. An illustration of this technique is shown in FIGS. 29A, 29B, and 29C.

Figure 29A:
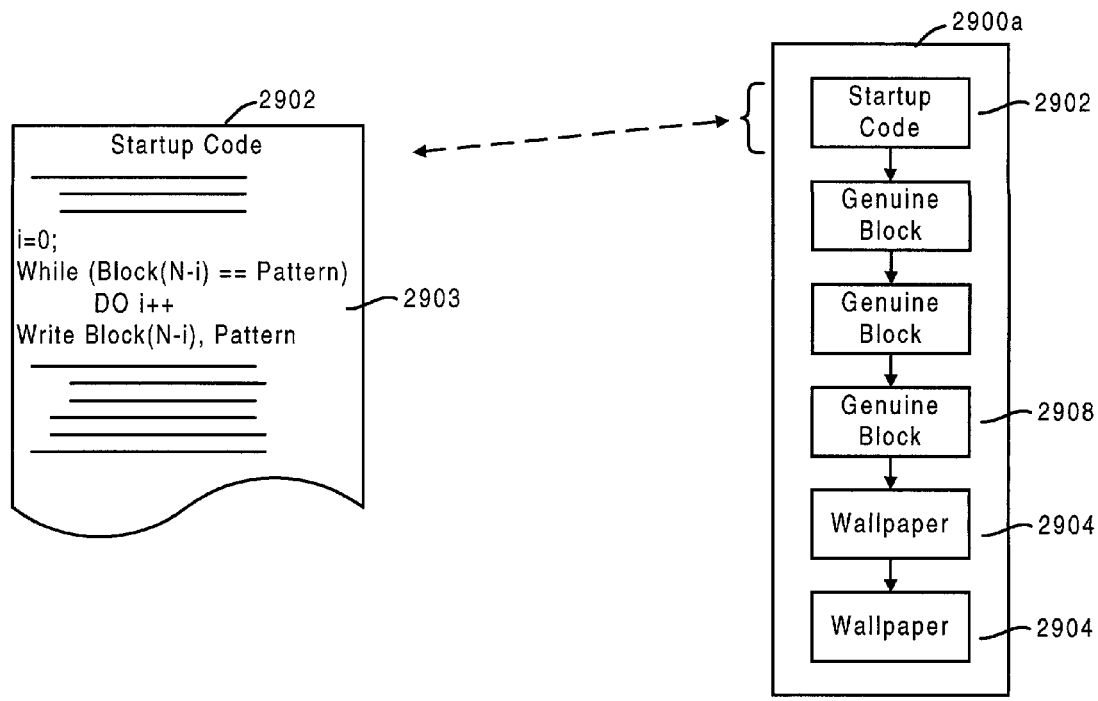
FIGS. 29A, 29B, and 29C illustrate a technique for preventing an attacker from repeatedly restarting a self-defensive program.
Figure 29B:
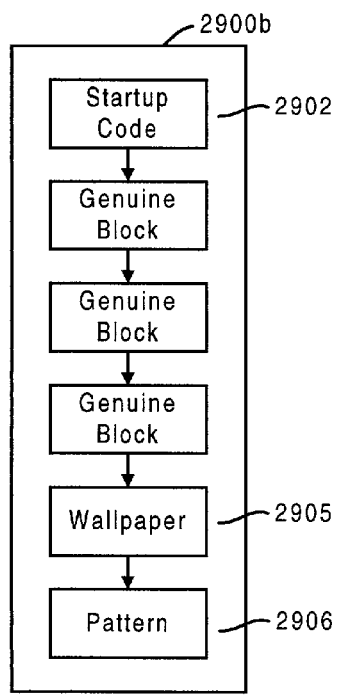
Figure 29C:
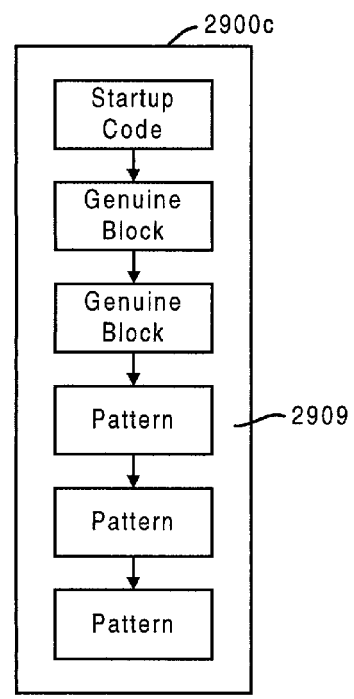

As shown in FIG. 29A, a few extra blocks of "wallpaper" 2904 are included at the end of SDP executable file 2900. For example, wallpaper 2904 may consist of non-functional code and/or unused data, preferably disguised to look similar to code or data that is actually used by the program. As shown in FIG. 29B, when the SDP startup code 2902 is run, it overwrites the last block 2906 in the executable file 2900b with a predefined pattern, such as a string of zeros, alternating ones and zeros, or the like. Preferably much later, SDP 2900b checks to see if the write succeeded (by, e.g., checking for the presence of the pattern) and takes defensive action if it did not. Still later, preferably after the startup sequence has finished executing and the SDP has performed a variety of tamper tests, the SDP restores wallpaper 2904 to the overwritten block(s) 2906. If startup code 2902 is executed again before the wallpaper is restored—as might happen if an attacker terminates program execution and restarts the program—the wallpaper in block 2905 will also be overwritten with the predefined pattern. For example, in one embodiment startup code 2902 contains code 2903 operable to overwrite the first block at the end of the program (or other suitably predefined location) that has not already been overwritten by the pattern. As shown in FIG. 29C, if there are too many consecutive attempts to restart the SDP, some critical executable code will get overwritten, and program execution will fail. For example, as shown in FIG. 29C, if startup code 2902 is restarted three consecutive times, pattern 2909 will overwrite genuine code block 2908, and execution of program 2900c will thus fail when pattern 2909 is encountered. The above-described telomere techniques are preferably used as a supplementary security measure in combination with other security measures.

2.2. Tamper Memory

In a preferred embodiment, tamper memory is provided to record information regarding suspicious activity so that the SDP and/or an external agent can later respond appropriately. Tamper memory should be robust; that is, it should be relatively difficult for an attacker to locate and/or modify or circumvent the tamper memory mechanism(s).

2.2.1. Watchdogs

One tamper memory mechanism makes use of "watchdogs" that are distributed (and possibly hidden) throughout the program, the watchdogs being operable to record evidence of tampering. For example, in one embodiment watchdogs are scattered throughout the system's global memory (e.g., from 0.1% to 10% of the total). In a preferred embodiment the watchdogs are simply extra variables in the SDP's memory, each of which may have values associated with the interpretations "quiet" and "barking" (i.e., "tampering detected" and "tampering not detected," respectively). Each variable may be of virtually any type, and its two values may be encoded using virtually any predefined distinction. For example, if a boolean variable is used, false could correspond to quiet, and true could correspond to barking, or vice versa. Similarly, for an integer variable the distinction could be between zero and non-zero, positive and negative, odd and even, and so forth. A character variable could distinguish between alphabetic and numeric values, between vowels and consonants, between printing and nonprinting, etc. As yet another example, a pair of variables could represent quiet by being different and barking by being the same, or vice versa. Thus, it will be appreciated that any suitable scheme for differentiating between quiet and barking (and/or additional or equivalent states) may be used.

Figure 30A:
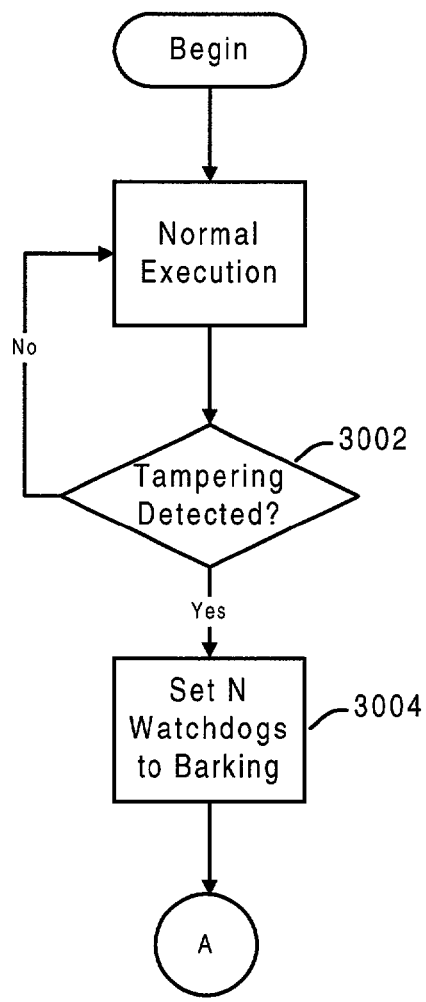
FIGS. 30A, 30B, 30C illustrate the use of watchdog bits in one embodiment of the present invention.
Figure 30B:
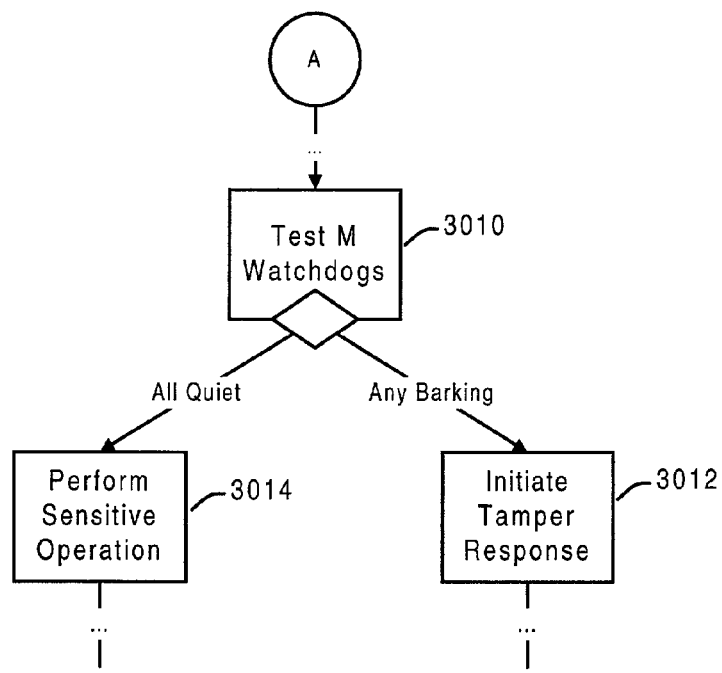
Figure 30C:
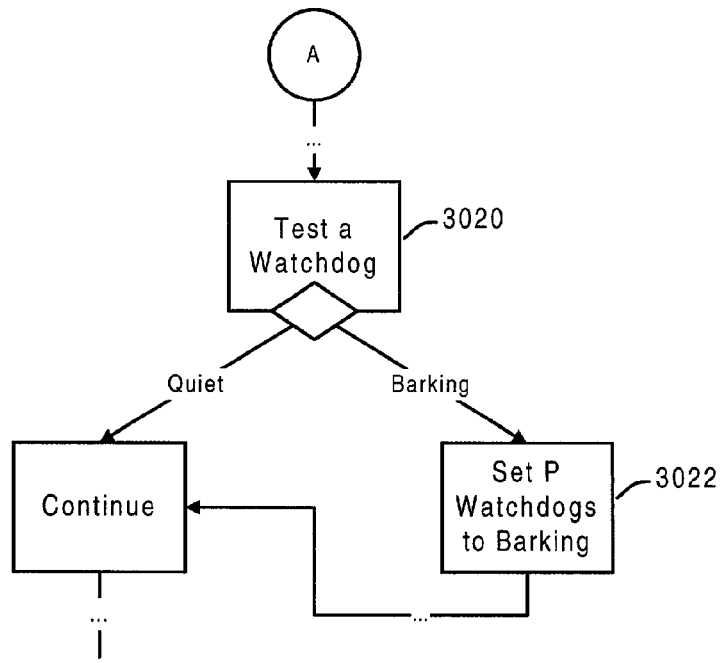

FIGS. 30A, 30B, and 30C illustrate the use of watchdogs. As shown in FIG. 30A, when a program fails a tamper test (e.g., evidence of a debugger or similar tool is detected, or alteration of a piece of code or watermark is detected) (3002), the program puts barking values in a predefined number of watchdogs (e.g., a few) (3004), but may take no further defensive action at that time.

However, as shown in FIG. 30B, before the program does something that might be valuable to the attacker (3014), the program tests a predefined number of watchdogs (e.g., a few) (3010), not necessarily in a contiguous code sequence. If one or more of the tested watchdogs is barking, the program can initiate a suitable tamper response (3012). For example, the program may do something that is less useful to the attacker, and/or that enables external reporting, such as indicating that the attacker needs to connect to an external site for an upgrade. In another embodiment, when barking watchdogs are detected the program simply transfers control to Interminable obfuscation code that looks like real code, but actually makes no useful progress.

In one embodiment, short sequences that test a random watchdog are scattered throughout the program (i.e., are not limited to potentially sensitive code segments). As shown in FIG. 30C, if one of these sequences determines that a watchdog is barking (3020), it can place barking values in a predefined number of other watchdogs (e.g., a few) (3022), thus spreading barking throughout the code and providing a form of positive feedback.

Note that, as used above, "a few" watchdogs refers generally to any quasi-random subset of preferably at least two (and in one embodiment not more than four) watchdogs chosen differently at insertion time for selected points in the code. This sort of randomization can be used to complicate the task of finding all of the watchdogs and all of the tests, while increasing the likelihood that barking will spread quickly and widely once initiated.

When the system has an opportunity to communicate with an external site, the system can send a block of memory that includes several watchdogs (without necessarily testing the watchdogs itself) for analysis by an external fraud-detection process. For example, in round-trip exchanges an external site can request that a range of the SDP's memory be returned. The external site can inspect, inter alia, the watchdogs contained in the requested memory range (using, e.g., a key that indicates where the watchdogs are located), thus giving away little or no information to an attacker about where the watchdogs are actually stored.

It should be appreciated that watchdogs need not be represented by single variables, or single bits, in memory. In general, they can consist of any predicates representing invariants on (correct) system states. In addition, in one embodiment the mapping from quiet/barking to true/false (or other appropriate values for non-boolean variables) is determined by an insertion-time random mask. Individual watchdogs can be distributed across multiple variables to ensure that the values stored in memory do not remain constant, and that replacing load instructions by immediate values will not keep a watchdog quiet (unless all loads from its components are found and patched at the same time).

In addition, barking propagation sequences can be inserted in place of, or in addition to, null-effect sequences during obfuscation, instance customization, or watermarking. Barking propagation sequences have the advantage that since they are not literal NOPs, and do affect the program state, they are generally more difficult for an attacker to recognize than true null-effect sequences. Shuffling the components of a distributed watchdog is another good NOP candidate. For example, if a watchdog is represented as the XOR of two boolean variables, it is effectively a NOP to, e.g., swap the values of the two variables, complement the values of both variables, or assign the XOR of the two variables to one of the variables and assign zero to the other. Since these operations may change the values of variables in memory, they generally cannot be recognized as NOPs unless the implicit relationship between the variables is known.

The selection of watchdogs can also be used to encode information about the identity of the instance. For example, the selection of watchdogs can serve as a form of watermark. Thus, it will be appreciated that the use of watchdogs, like the use of other techniques described herein, need not be limited solely to playing a role in performing one function (e.g., tamper resistance, obfuscation, or watermarking), but can instead play a role in accomplishing a combination of these functions (e.g., obfuscation, tamper resistance, and watermarking).

It should be appreciated that watchdogs can be set based on the occurrence of other conditions besides the failure of an explicit tamper test. For example, a calculation can be performed, and its results stored in such a way that if something is wrong, a watchdog starts barking. The redundant tests described above are an example of such implicit tests. Similarly, testing a watchdog need not involve an explicit test in the code, but can instead consist of, for example, performing a calculation that yields a different outcome if the watchdog is barking.

Placement of the watchdogs can vary from instance to instance of the SDP. For example, a larger pool of bits can be reserved, from which a random subset is drawn at insertion time.

Use of a watchdog mechanism (or any similar mechanism), generally makes it more difficult for an attacker to identify and disable tamper testing in the SDP. In addition, because it is independent of particular methods of tamper testing, it can be used in combination with virtually any collection of tamper testing techniques. Moreover, by effectively separating the tamper testing and the tamper reaction, and by inserting positive feedback into tamper memory, this mechanism makes it more difficult for an attacker to evade detection.

2.3. Tamper Reaction

Figure 31A:
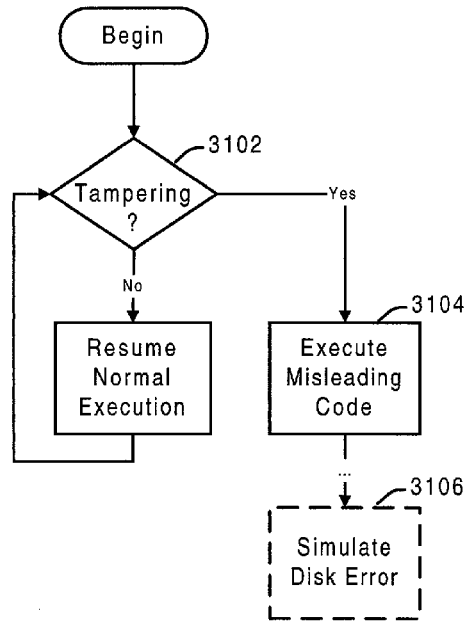
FIGS. 31A and 31B illustrate tamper reaction mechanisms in accordance with embodiments of the present invention.

Once tampering has been detected, any of a variety of techniques can be used to respond. For example, it is generally preferable to make the attacker think that he is making progress for as long as practical under the circumstances, and to make it relatively difficult for him to determine where he went wrong. Thus, as shown in FIG. 31A, in a preferred embodiment if tampering is detected (i.e., a "yes" exit from block 3102), the SDP branches to disinformation code (3104), and also preferably spoils locally-held keys and/or records information about the attack for eventual transmission to, or detection by, an external fraud detection agent (EA). Another stratagem is to start simulating disk or other I/O errors (3106), so that the attacker will think his problems are due to poor hardware and/or a poor operating system. Another tamper reaction is for the SDP to simply shut down immediately, although this may give the attacker clues regarding the location of the tamper detection mechanism.

Yet another tamper reaction mechanism targets the people who actually crack the SDP. Features are built into the SDP that selectively cripple cracked systems without affecting legitimate systems. For example, when there is evidence that the SDP is under attack or has been successfully attacked, key operations can be made to fail mysteriously and seemingly non-deterministically, as though the operating system were reporting a variety of errors (e.g., disk read errors, out of virtual memory errors, memory protection violations, execution of illegal instructions, etc.) at a low enough rate not to implicate the SDP, but at a high enough rate to make it difficult for the attacker to continue using/attacking the SDP. This form of tamper reaction is especially appropriate for systems that connect to external sites infrequently if at all, although it will be appreciated that it is readily applicable to other systems as well.

Figure 31B:
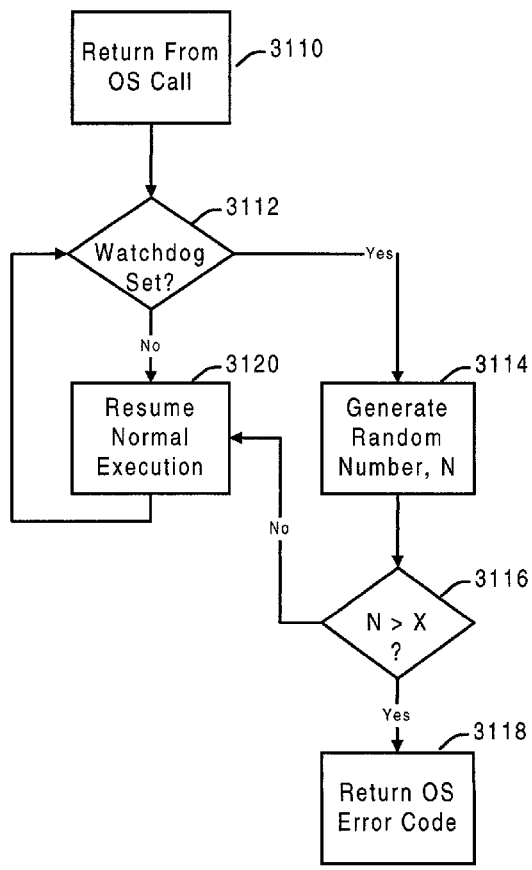

FIG. 31B illustrates another exemplary tamper reaction mechanism. As shown in FIG. 31B, upon receiving a return code after an operating system call (3110), a watchdog is tested (3112). If the watchdog is barking (i.e., a "yes" exit from block 3112), a random number can be generated (3114) and compared to a predefined threshold (3116) to decide whether to branch to the code that would be executed if a real error code had been returned by the operating system call (3118), or whether to proceed with normal execution (3120).

2.3.1. Forcing the SDP to Validate Itself

Figure 32:
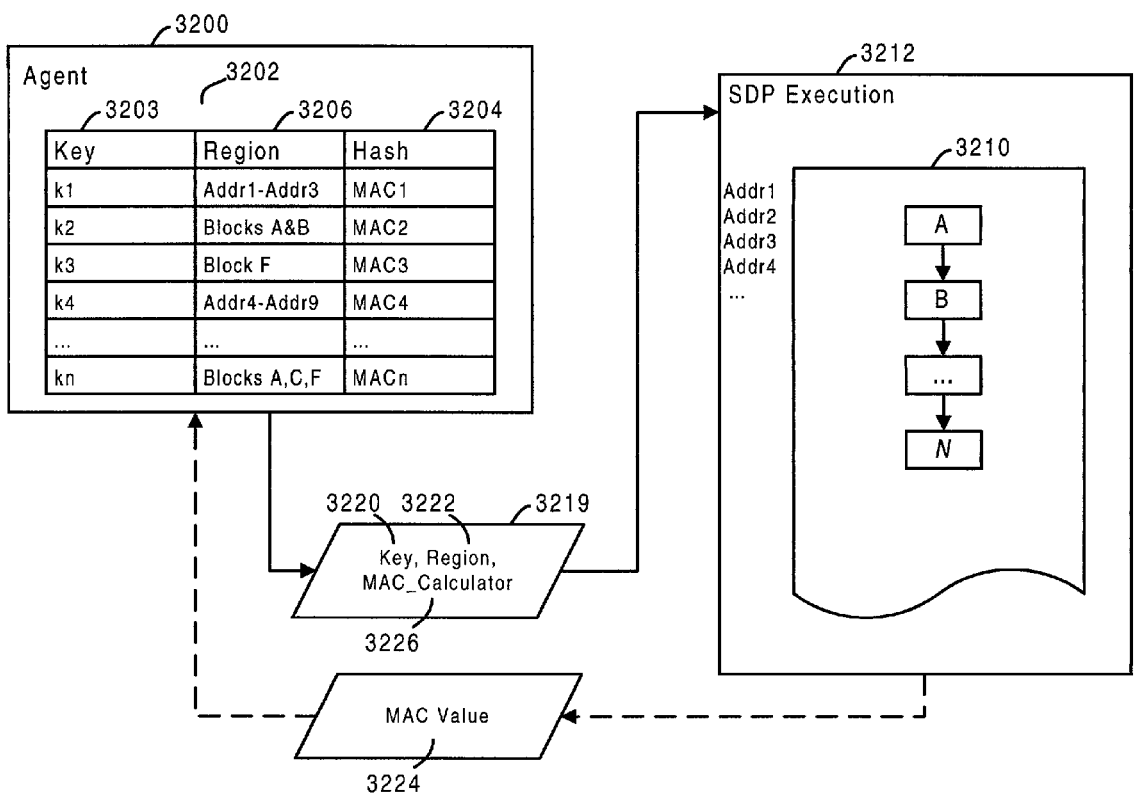
FIG. 32 is an illustration of a code validation technique in accordance with an embodiment of the present invention.

It will often be desirable for external agents to force an SDP to prove its own validity. FIG. 32 illustrates one such technique. Referring to FIG. 32, a table 3202 of random keys 3203 (e.g., 1000 or some other suitably large number) is created when an SDP binary 3210 is built. Keys 3203 are used to calculate hash values 3204 for various regions 3206 of SDP 3210. For example, a MAC-type hash function can be used to compute fixed-sized "digests" 3204 of arbitrary-sized blocks of code and/or data 3206, such that it is relatively difficult to find another block 3206 that yields the same MAC value. It will be appreciated that there are a variety of techniques for calculating such a MAC or hash value, any suitable one(s) of which can be used, including those set forth in Menezes et al., "Handbook of Applied Cryptography," pp. 321-83 (CRC Press, 1997), which is hereby incorporated by reference.

External agents 3200 can keep a copy of table 3202, and when an agent 3200 wishes to validate a particular instance of the SDP 3210, agent 3200 can send a key 3220 to the system 3212 running SDP instance 3210, and tell it to calculate the MAC value for the appropriate code region 3222. System 3212 uses key 3220 to calculate a MAC value 3224, which it sends to agent 3200. Agent 3200 compares received MAC value 3224 with the appropriate MAC value 3204 in table 3202. If the MAC values match, then the SDP is deemed valid; otherwise, appropriate defensive action is initiated (such as one or more of the tamper reaction techniques described herein). It will generally be difficult for an attacker to know the correct MAC value to return if the requested code region 3222 has been tampered with.

For robustness, the hash values 3204 are preferably relatively large. In addition, in a preferred embodiment a relatively large number of possible validation queries are defined (e.g., the size of table 3202 is relatively large). Additional security can be provided by sending system 3212 a program 3226 to calculate MAC 3224, in addition to sending key 3220, thus making it much more difficult for an attacker to fool external agent 3200 by tampering with the MAC calculator than would be the case if the MAC calculator formed part of SDP 3210 or was otherwise permanently stored on system 3212.

For additional security, code self-modification techniques (such as those described herein) are preferably used in SDP 3210, such that SDP 3210 modifies itself from time to time in ways predictable by external agent 3200 (e.g., copying the current date into a code location). As a result, queries 3219 directed to an out-of-date version of SDP 3210 will generate incorrect answers which external agent 3200 can detect, even if the original version of SDP instance 3210 continues to run. In addition, in a preferred embodiment the SDP can have a mechanism that only allows one instance of itself to be run at any one time on a given machine 3212.

The MAC calculation code contained in the SDP and/or included in query 3219 can also be written to have a stealthy side-effect (e.g., setting a watchdog-like variable) in addition to reporting results to the external agent 3200. The presence of the side-effect can be tested in subsequent SDP code and/or reported to an external agent in a subsequent interaction. For example, in one embodiment the stealthy side effect includes setting a flag. The flag is cleared if it is not reset within a predefined period of time. The SDP (or external agent) checks the flag periodically, and if it detects that the flag has been cleared, it can deduce that the SDP has not been asked to validate itself for at least the predefined time period. This may indicate that someone has disabled the self-validation mechanism or otherwise tampered with the system. Additional self-validation techniques are described in the Shear '754 application and the Sibert application, each of which was previously incorporated by reference herein.

2.4. Time Management

Many programs are largely dependent on the host platform's time services, which can often be manipulated with relative ease to change the platform's notion of date and time and thus potentially subvert the intent of time-related mechanisms used by the program. This section describes some useful techniques for maintaining an accurate time measurement, including:

- Adjustment for the difference between absolute time and the instance's time (which may become unsynchronized because of clock drift or operator error, entirely without malicious intent);
- Determination of the correct local time (e.g., time in the correct time zone) for the SDP instance, and optionally for each user of the instance;
- Automatic update of the time and time zone information during communications with external agents; and
- Countermeasures to detect and defeat deliberate attempts to adjust the SDP instance's time values.

Additional time management mechanisms are described in the Ginter '900 patent, previously incorporated by reference herein. In addition, in a preferred embodiment obfuscation and tamper resistance techniques, such as those described above, are used to, e.g., obscure and/or protect the operation of the time management mechanisms.

2.4.1. Time Offset Mechanism

Figure 33:
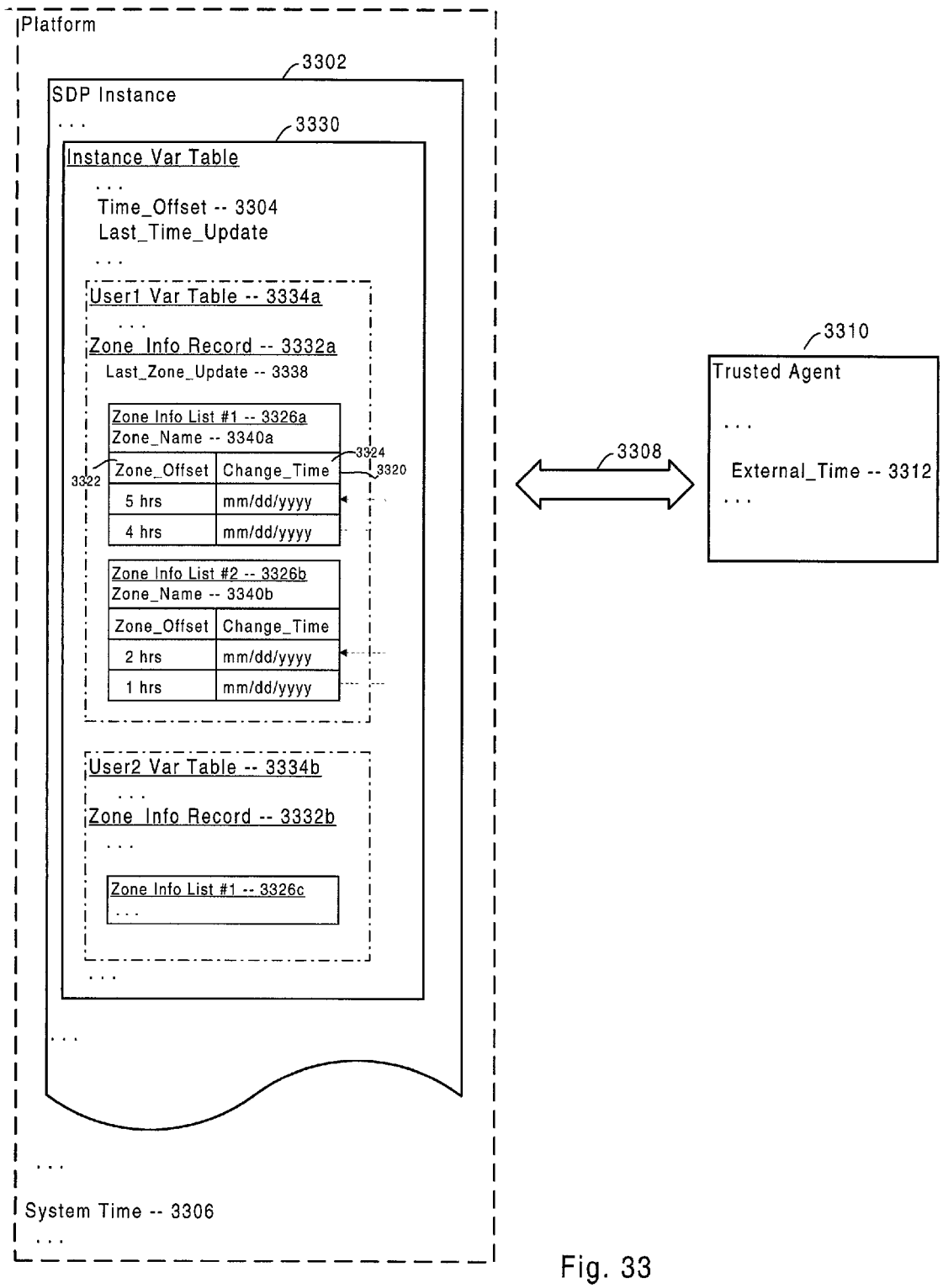
FIG. 33 illustrates a technique for maintaining secure time and time zone information in accordance with an embodiment of the present invention.

A basic time management mechanism uses a signed time offset that relates the platform's time to external time (e.g., indicates how much the SDP platform's system clock differs from a predefined external time source). As shown in FIG. 33, in a preferred embodiment this offset 3304 is stored with each SDP instance 3302, and is retrieved at instance initialization and added to the platform's time value 3306 whenever a time reading is required by SDP instance 3302. Offset 3304 can be determined initially and/or each time a connection 3308 is made to a trusted external source or agent 3310 by checking the platform's clock 3306 and calculating the difference between that time and the external time 3312 obtained from external source 3310. It will appreciated that if there are multiple external sources, their times can be synchronized using conventional synchronization techniques. For example, techniques such as those described in Lampart et al., *Synchronizing Time Services*, DEC/SRC Report 18 (June 1987) can be used.

Once the correct offset 3304 is determined, this technique ensures that SDP instance 3302 knows what time it is, as long as the SDP platform's clock 3306 does not drift and is not explicitly changed. Of course, these ideal conditions will typically not apply, since under normal conditions clocks can be expected to drift, to be explicitly set or changed, and so forth. Thus, an update mechanism such as that described below is preferably used to keep the SDP's time offset 3304 relatively synchronized with external time 3312.

2.4.2. Time Zone Correction

In addition to the time offset, in one embodiment a time zone offset is maintained by the SDP instance, the time zone offset being operable to facilitate conversion of external time to local time. During instance initialization, the user can be queried for the user's time zone, which can also be used as the time zone of the SDP instance. Based on this information, the SDP can compute the zone offset and store it in its database along with the time offset.

Unlike the time offset, however, which is per-instance, the zone offset may be different for each user of the SDP instance. In the case of a multi-user instance, for example, different users may be in different time zones. Accordingly, at user activation the user's time zone can be requested and used to calculate the appropriate time zone offset for that user.

Moreover, because of daylight savings time (and similar mechanisms throughout the world), the time zone offset for a particular user may change as time passes. Although these changes are relatively infrequent—e.g., usually twice per year—it is desirable to accommodate them automatically. Unfortunately, there is no simple rule by which such changes can be made, since they are subject to the vagaries of local governments. Thus, as shown in FIG. 33, in one embodiment the time zone correction is expressed as a list of pairs 3320, each pair including the following information:

- Zone Offset. Zone offset 3322 specifies the offset for calculating local time.
- Zone Change Time. Zone change time 3324 specifies the external time at which the corresponding zone offset changes to the zone offset in the next pair in the list.

The SDP 3302, or one or more of the external agents 3310, can calculate these values at instance initialization, and supply a list 3326 that is valid for a period of several years forward and backward. Whenever the SDP instance is started, it can look at list 3326, find the appropriate offset 3322 for the current value of external time, and set a background manager job to run at the next zone change time 3324 and to adjust the zone offset appropriately. Of course, on most days this background job will not run, nevertheless, it is preferably set each time to ensure that the zone offset update occurs when needed during normal SDP operation.

If the user switches time zones, a different set of time zone information will be needed. This can be provided at activation time (if the user supplies a list of possible time zones), or can be updated later. For example, in one embodiment an SDP instance is operable to store sets of time zone information for different time zones in order to allow a user to switch time zones without interacting with an external agent. Since the SDP instance knows the absolute time via the time offset, a user will generally be unable to tamper with the SDP by changing the time zone, since the time zone data simply affects the time display, not the SDP's internal functionality.

It will be appreciated that there are a variety of ways to store the time-related information discussed above, any of which can be used without departing from the principles of the present invention. FIG. 33 illustrates one exemplary embodiment. Referring to FIG. 33, in one embodiment SDP 3302 is operable to store a Time_Offset record 3304 in a per-instance configuration variable table 3330, and to store a Zone_Info record 3332 in each user's configuration variable table 3334 as well as the per-instance configuration variable table 3330. Time_Offset record 3304 holds the offset between external time 3312 and the platform's time 3306, while the Zone_Info record 3332 holds one or more zone information lists 3326, and an indication 3338 of the last time the Zone_Info record 3332 was updated by an external agent 3310. As discussed above, each zone information list 3326 can contain a zone name 3340 and one or more pairs 3320 of time and zone correction values (3324, 3322, respectively).

2.4.3. Time Update Mechanism

Because the platform's clock may drift or otherwise be adjusted, the SDP's time offset should be updated occasionally to maintain synchronization with the trusted external time source. In one embodiment this update occurs automatically whenever an SDP instance initiates an on-line communication with a trusted external agent using a predefined communication protocol (CP). This technique is illustrated in FIG. 34.

Figure 34:
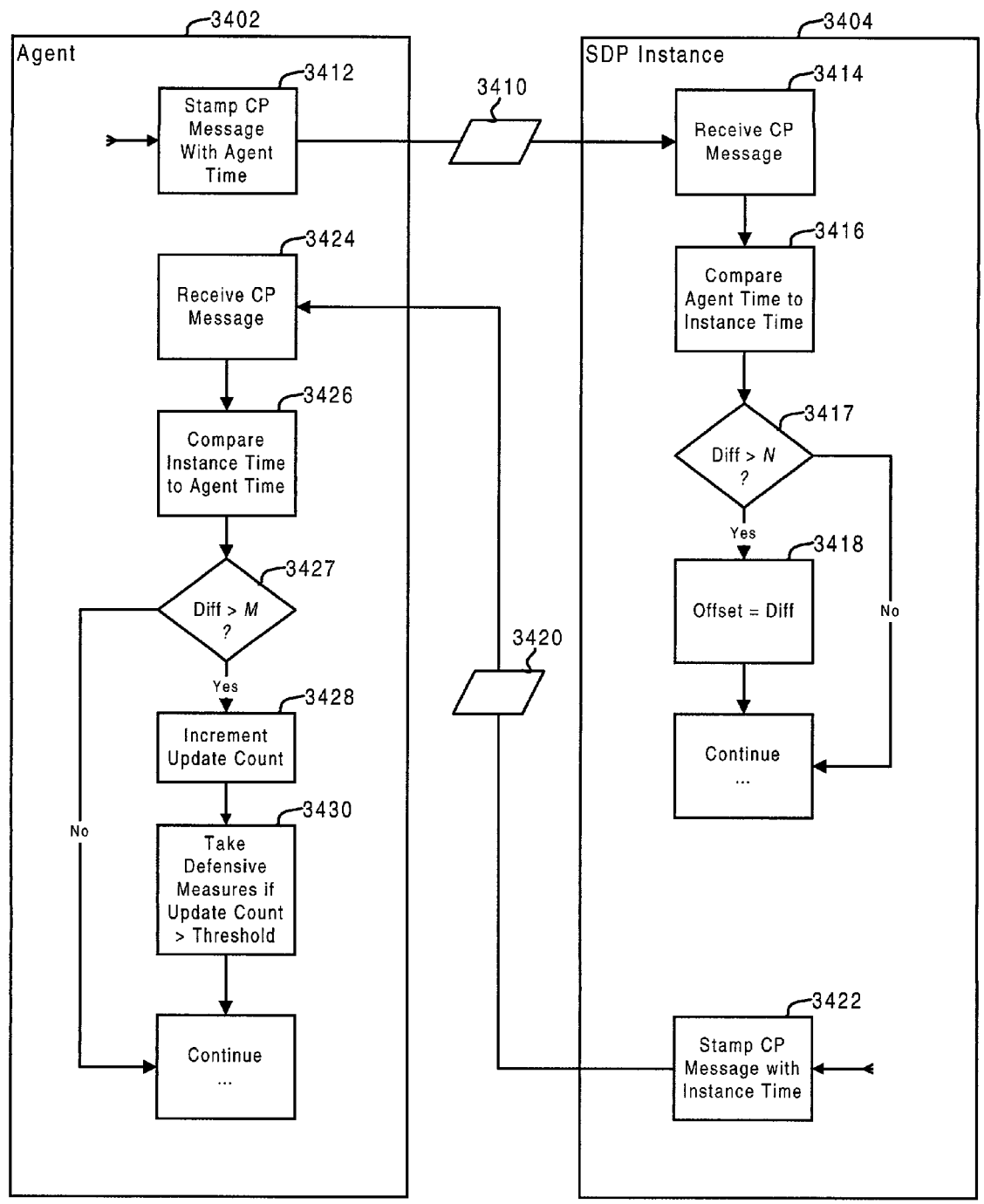
FIG. 34 illustrates a technique for resisting tampering with the system time as seen by a self-defensive program in one embodiment of the present invention.

Referring to FIG. 34, each CP message 3410 from an external agent 3402 is time-stamped (3412) with the external agent's time. Upon receiving the time-stamped message (3414), SDP instance 3404 compares the external agent's time with its own time (3416). If the difference between the external agent's time and the SDP instance's time is greater than a predefined amount, N (e.g., thirty seconds) (3417), the SDP instance automatically updates its current time offset (3418), stores it in its database, and uses the new value to calculate the correct time value from the platform time.

Similarly, when SDP 3404 sends a message 3420 to external agent 3402, the SDP is operable to stamp the message with the SDP instance's time (e.g., the platform time combined with the SDP instance's time offset, and/or the platform's time and the time offset individually) (3422). Upon receiving the time-stamped message (3424), agent 3402 compares the SDP instance's time with its own time (3426). If the difference between the SDP instance's time and the agent's time is greater than a predefined amount, M (e.g., thirty seconds) (3427), and/or if the value of the instance's time offset is different from the last offset value that the agent received from the SDP instance, the agent initiates appropriate defensive action. For example, the agent may record the detection of a change in the instance's time and/or time offset (3428), and if a predefined number of such changes are detected in a predefined time period, the agent can, e.g., refuse to grant the SDP permission to perform certain actions, send a message to the SDP that is operable to terminate operation of the SDP or to trigger defensive actions (such as the tamper reaction mechanisms described above), and/or perform any other suitable defensive action (3430). Although a time and/or offset update can potentially occur with every CP message 3420, once an adjustment occurs it is unlikely that normal operation will cause the time to become unsynchronized by more than, e.g., thirty seconds during a single CP session, and thus multiple updates per session can be detected and handled appropriately.

2.4.3.1. Offset Adjustment and Monotonicity

Simply updating the time offset (e.g., replacing an incorrect offset value with the correct value) may cause the SDP to perceive external time as moving backwards (i.e., the SDP may calculate a value of external time that is less than the value it previously calculated). Although updates that compensate for normal clock drift will generally not change the SDP's perception of external time significantly, updates that correct for deliberate changes or for fraud may result in wildly different computed external times for two apparently adjacent SDP operations. Although, in principle, this can be avoided by using sufficient tamper-resistance mechanisms, the system-level consequences may be relatively unimportant even if it cannot be prevented entirely.

However, it is generally desirable for routine adjustments (e.g., the thirty second adjustments discussed above) to take place without running time backwards. In one embodiment this is accomplished using a mechanism similar to the BSD UNIX adjtime( ) system call. The desired time offset is supplied and the real time offset is adjusted gradually until it is synchronized with the correct time, while ensuring that during this process the SDP instance's time service does not return a time value earlier than the previously returned value.

2.4.3.2. Time Zone Information Update

Because the initial time zone information will generally become outdated (e.g., it may be rendered obsolete by governmental action), it is important to have a mechanism by which it can be updated. For example, in one embodiment the SDP instance can refresh its time zone information by communicating at periodic intervals with an external agent. It would be appropriate to make such an update, for example, every time the zone info indicates an impending zone offset change (that is, about twice each year), or, depending on the situation, much more frequently.

2.4.4. Sources of Time Change

An SDP's attempts to maintain accurate time may face some or all of the following challenges:

Clock drift. The platform clock may not run at precisely the correct rate. This can be compensated for by, e.g., the update mechanism described previously.

Adjustment for daylight savings time. The platform clock may be adjusted automatically by the host operating system to change when daylight savings time changes, as typically occurs on platforms that do not maintain a zone offset (e.g., Windows). This, too, is easily compensated for by the update mechanism described above.

Explicit use of Date and Time commands or other time-adjustment interfaces. The user may make explicit use of operating system commands or the user interface to change the time. The user may do this either for normal adjustment (e.g., the user notices clock drift, and corrects it) or in an attempt to commit fraud. The former case can be handled by the update mechanism, described above, while the latter case is preferably handled in the manner described in more detail below.

These sources of time change apply to the time offset mechanism, as that is where the SDP instance has an explicit dependency on the platform's time services. In general, threats specific to the zone information are not as significant, as the zone information is maintained internally to the SDP instance and is not dependent on platform mechanisms.

2.4.5. Countermeasures

This section describes several mechanisms for handling the sources of time change set forth above. These mechanisms include techniques for updating the instance's time offset, detecting backward time motion, intercepting system interfaces for time-setting, using private instance-maintained time, internally detecting time anomalies, forcing notification of an external agent in suspicious circumstances, analyzing time change patterns, and performing immediate verification of time.

Most of these mechanisms are operable to detect a single platform time change event.

That is, they effectively notice that the time is now X±delta when it was expected to be X. Such changes may be benign (e.g., changing the system clock by a few minutes to compensate for clock drift) or may indicate attempted fraud (e.g., setting the system time back to yesterday to avoid the expiration of a time-limited right). Systems should apply heuristics to decide whether any particular time change is suspicious (e.g., comparing the magnitude of the time change with a predefined threshold). Appropriate heuristics will generally depend on the system/application. The heuristics may be applied independently to each event, or may be part of a larger pattern analysis activity performed at the instance, at the external agent(s), or at both.

Time Offset Update. As described above, a simple mechanism can be used to ensure that an SDP instance's notion of external time is synchronized with real external time each time an interaction with an external agent occurs. While not offering absolute protection, this mechanism is generally effective in ensuring that simple attempts to commit time fraud are detected by the external agent and defeated when the next external agent interaction occurs. If external agent interactions are largely unpredictable to the SDP user, avoiding detection of time fraud on a regular basis will generally require careful monitoring of communication activity, which is likely to necessitate the use of specialized tools for committing fraud.

Backward Time Detection. In one embodiment the SDP's time service is operable to detect each time it returns a time value that is less than the previous time value it returned. This represents evidence that either the platform time has been adjusted backward as a result of user activity (including automated host activity), or that the time offset has been changed as a result of some interaction with an external agent. Since the time service can be made aware when the latter type of adjustment occurs, unexplained backward motion can be detected unambiguously and appropriate responsive action taken. Note that since time zone information is preferably maintained separately from the SDP instance's indication of absolute time, legitimate changes in time zone will typically not trigger this countermeasure. Storage of the preceding time value is preferably protected against unauthorized modification (e.g., by storing it in tamper-resistant memory and/or by employing obfuscation and/or tamper-resistance techniques such as those described herein). However, finding and modifying the preceding time value generally requires a more sophisticated attack than simply resetting the computer's clock, and thus this countermeasure can be expected to deter most attackers even if special measures are not taken to protect storage of the preceding time value.

System Interface Interception. In some embodiments, the SDP instance is operable to detect when the platform's time is explicitly changed, whether through the DATE and TIME operating system commands, through other supported time-setting interfaces (e.g., the system's clock GUI), or through specialized software that invokes low-level interfaces to set the time. If this occurs when the SDP instance is running, the SDP can adjust its time offset accordingly, thus canceling out the attempted time change so that it has no effect on the SDP instance's view of external time. Since this technique detects changes in either direction (i.e., backward and forward), it is generally effective against a wider variety of attempted fraud.

Moreover, by allowing the external time offset to be adjusted silently when deliberate changes are made, this technique advantageously protects the SDP's integrity while avoiding the need to alert the user about suspected fraud, or to take other intrusive action, when the user may simply be experimenting with the system's clock without fraudulent intent. Nevertheless, it is still typically worthwhile to report the attempt to an external agent, to be used as data in screening for likely fraud.

If the instance is not running when a deliberate time change occurs, it will typically be necessary to employ additional measures. For example, in one embodiment a special driver can be loaded at system initialization to detect time setting operations and to record an offset adjustment that the instance can fetch when it starts up.

Instance-Maintained Time. In one embodiment, the SDP is operable to maintain its own idea of time using the platform's timer facility. For example, it might schedule a timer to tick once per second, and detect when two ticks are separated by a much larger (or smaller) interval than one second according to the platform's time service. Such a mechanism would be effective against attempts to set the time explicitly. In addition, in another embodiment a special service is created that does nothing but look for time anomalies. This special service is preferably started at operating system initialization so that stopping the instance server process itself would not interfere.

Time Anomaly Detection. There may be times during the execution of the SDP instance where an operation that should take a predictable amount of time to complete does not. Such anomalies may indicate attempted time fraud. Accordingly, one countermeasure is to request external time readings relatively frequently during operation of the instance, and to compare the amount of time certain predefined code segments take to execute against predefined thresholds. If an anomaly is detected—for example, if the execution time of a code sequence falls outside of the predefined thresholds—the anomaly can be reported and/or other appropriate defensive action can be taken.

External Agent Notification. When potential time fraud is detected, it is generally appropriate to notify an external agent, as discussed previously. This action serves at least two purposes: it notifies the agent of the attempt, and it allows the SDP instance to be resynchronized when the communication with the external agent occurs.

Time Change Analysis. The countermeasures described above generally address detection of single time-anomaly events. A large anomaly, of course, provides relatively strong evidence that fraud has been attempted, or that gross error has occurred. Similarly, small anomalies are generally benign, as it is reasonable to expect clocks to drift somewhat, and for a user to adjust the machine's clock to compensate. However, an attacker might exploit the fact that a large anomaly can be generated as a sequence of tiny changes. To counter this threat, the SDP instance (or an external agent) can keep track of the history of time anomalies and detect patterns that might result in large changes.

One such technique is to put a rate limiter on time changes. For example, a user can be prevented from making more than ten changes per day, since even if they are all seemingly benign (e.g., five minutes or less), together they may constitute evidence of attempted fraud and should result in forced external agent notification and/or other defensive action.

Immediate Verification. Of course, it is possible to require that a time-based SDP action be checked against time obtained directly from the external agent infrastructure, rather than from the platform's time. This is, in effect, an "immediate mode," as it would typically require an online connection to an external agent to supply the time.

2.5. Private Storage

This section describes the use and maintenance of a small amount of memory (for example, 100 bytes) for storing data critical to the SDP's operation. Such private storage can be used to store cryptographic keys and checksums that protect and validate the larger, on-disk database that holds an SDP instance's persistent data. To make the data relatively inaccessible through normal system interfaces, a combination of operating-system-dependent and/or hardware-dependent interfaces which are not ordinarily utilized by application programs—such as SMM on recent Intel processors—can be used.

Private storage can be used to counter fundamental attacks on an SDP instance (or, in general, on any system that stores transaction information locally). A counter can be maintained in the SDP instance's database. Each time the database is updated, the counter is incremented. Each time the counter is updated, the new counter value is also stored in private storage. If the SDP instance sees that the counter in private storage disagrees with the counter in its own database, it can conclude that there has been some attempt at tampering, and it can enter a tamper response mode.

It should be appreciated that the data stored in private storage can be more complex than a simple counter. For example, it can be cryptographically derived from the database contents. Moreover, the system can include some fault tolerance and transaction mechanisms to avoid false tampering alarms. The important thing is that each time (or some fraction of times) the database is updated, a value in private storage is updated also. Private storage can support frequent updates; its purpose is principally to store data for consistency checking, not to hide the data itself. The mechanism may also be used to store information (e.g., cryptographic keys) that should not be disclosed outside the SDP.

Private storage can be implemented in a variety of ways. In one embodiment the private storage mechanism can use Windows hidden files, or other camouflage techniques, to make it unclear to an attacker what data needs to be copied. Additional implementation techniques are described in the Ginter '900 patent, previously incorporated by reference herein 2.6. Driver-Loading Driver To avoid tampering with drivers on which the SDP depends, a "driver-loading driver" can be used. This driver can be started at boot-up, and is preferably operable to load other drivers through an interface that is not as easily spoofed, monitored, or intercepted—partly because it is completely undocumented for the attacker, but mostly because it is itself an SDP. This facility provides greater tamper resistance for driver loading, since the load activity will not be as visible and will not require registry changes and so forth to load additional SDP-related drivers. It will also make it easier to distribute new SDP-related driver code transparently, without going through an actual installation process. Moreover, it can be used to deliver updated tamper resistance mechanisms without giving obvious clues like registry changes or updates to driver files.

3. Debugging SDPs

Once software self-defense techniques have been applied, the resulting program may be more difficult to debug. If debugging an SDP is required, there are several measures that can be applied to make it more practical:

Since it may not be possible to track down all bugs using the original version of the program, it is generally prudent to retain the ability to regenerate each particular tamper-resistant version of the SDP. Tamper-resistant versions will generally be based on pseudo-random application of software self-defense techniques (possibly in accordance with explicit guidance based on performance and/or security considerations) to an original executable. Therefore, it will be straightforward to reproduce any particular version for support purposes by storing the pseudo-random generator seeds (and any guidance) along with the original executables.

Provide internal tracing and debugging features. Features for generating (encrypted) trace and debugging messages about the actual semantics of the program's internal operation will generally not be affected by the application of software self-defense techniques. Thus, if they are incorporated in the program, they will typically function as designed, and will support failure diagnosis.

Rewrite source line number maps. Given information about the equivalence between original instruction locations and their locations in the tamper-resistant version of program, it is relatively straightforward to rewrite the mapping of source code lines to object code locations. Such a mapping permits debuggers to identify the source code associated with an address in a tamper-resistant program where, for example, an exception was detected. Note that references to source code line numbers made through the C/C++ preprocessor facilities (e.g., the _LINE_variable) are not generally affected by these software self-defense techniques, and therefore are still fully meaningful in tamper-resistant versions.

Rewrite symbol tables. It is also possible to rewrite symbol tables to describe correctly where variables are located in the tamper-resistant versions, thus fully enabling symbolic debugging.

Provide independent maps. When software self-defense measures result in complex transformations of program behavior, it may not be possible to represent those transformations within the semantics of standard debugging information normally generated for the object file. For example, if a function is replicated in several places, the source line mapping for that function would need to identify several different locations for its generated code, a capability that is often not supported by common symbol table formats. In such cases, it is advantageous for the software self-defense tool to generate an additional database describing the specific results of the software self-defense measures; a tool can be provided to interrogate that database to facilitate debugging. For example, the tool could indicate that a particular instruction address is "replica #3 of code generated for line 783 in file f_rehash.c," that a particular offset in the data section represents a watchdog variable, or so forth.

4. Software Watermarking

A watermark can be used to deter unauthorized distribution of software by identifying the original owner or licensee of the software. For example, if an attacker anonymously posts a hacked copy of an SDP, a watermark can be used to identify the hacker. A variety of watermarking techniques are described in the Software Watermarking application, which was previously incorporated by reference herein.

4.1. Watermark Application

Watermarks can be applied to an SDP in a variety of ways. In one exemplary embodiment the source code is primed with several assembly language patterns and compiled. The patterns can be found in the executable by performing byte-level pattern matching, and can be replaced (stamped) with a unique watermark on an instance-specific basis. For example, when a user installs the SDP, he may be prompted to connect to a remote server which is operable to decrypt the program and apply a unique watermark.

In another embodiment, security is improved by moving the watermark writing algorithm from the client to the server. This is achieved by watermarking predefined "patches" at the server and sending them to the client at, e.g., installation. Security is also improved by the fact that the unwatermarked, unencrypted version of the program does not appear at the client.

Figure 35:
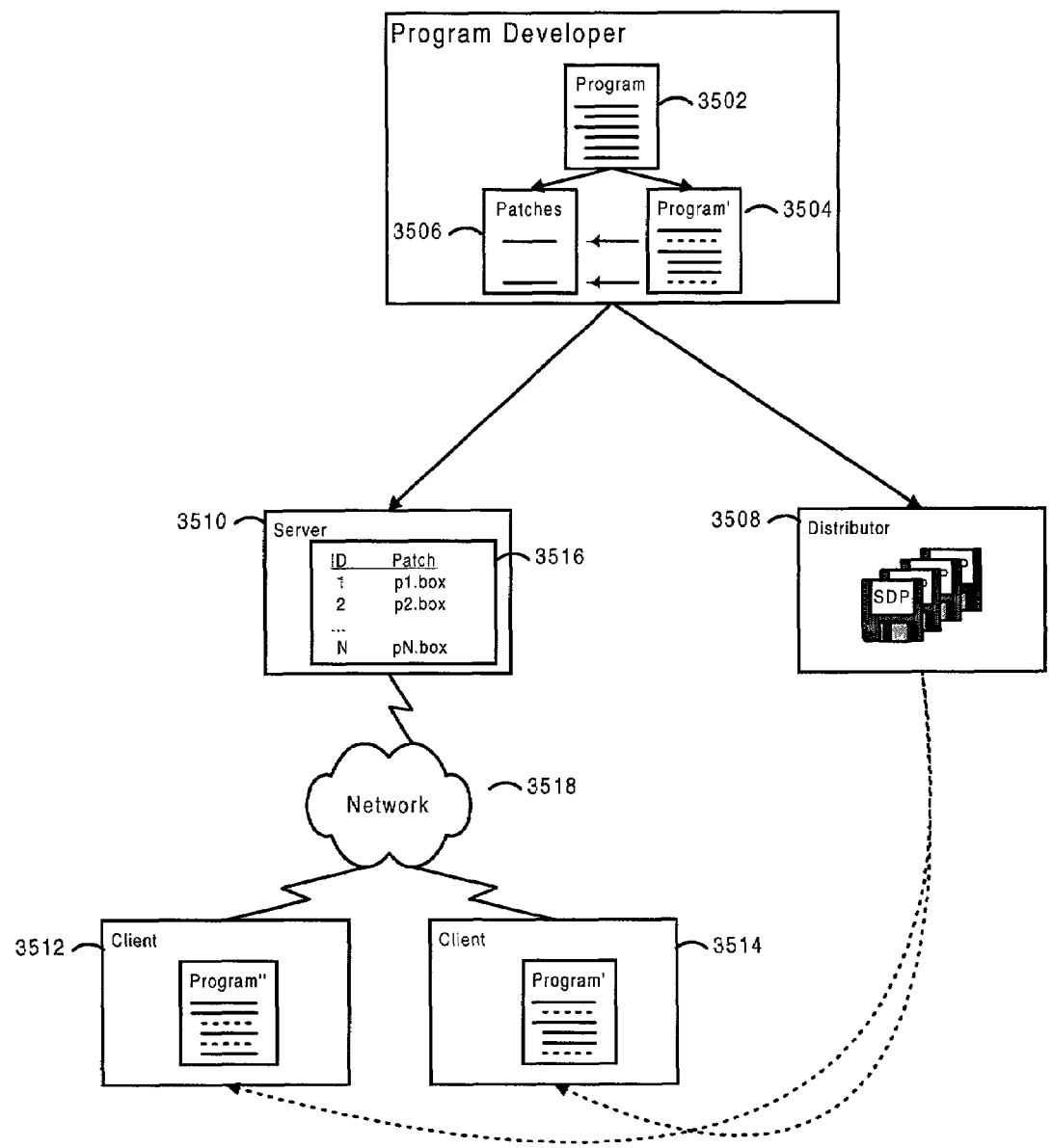
FIG. 35 illustrates a system and method for applying one or more watermarks to a program in accordance with an embodiment of the present invention.
Figure 36:
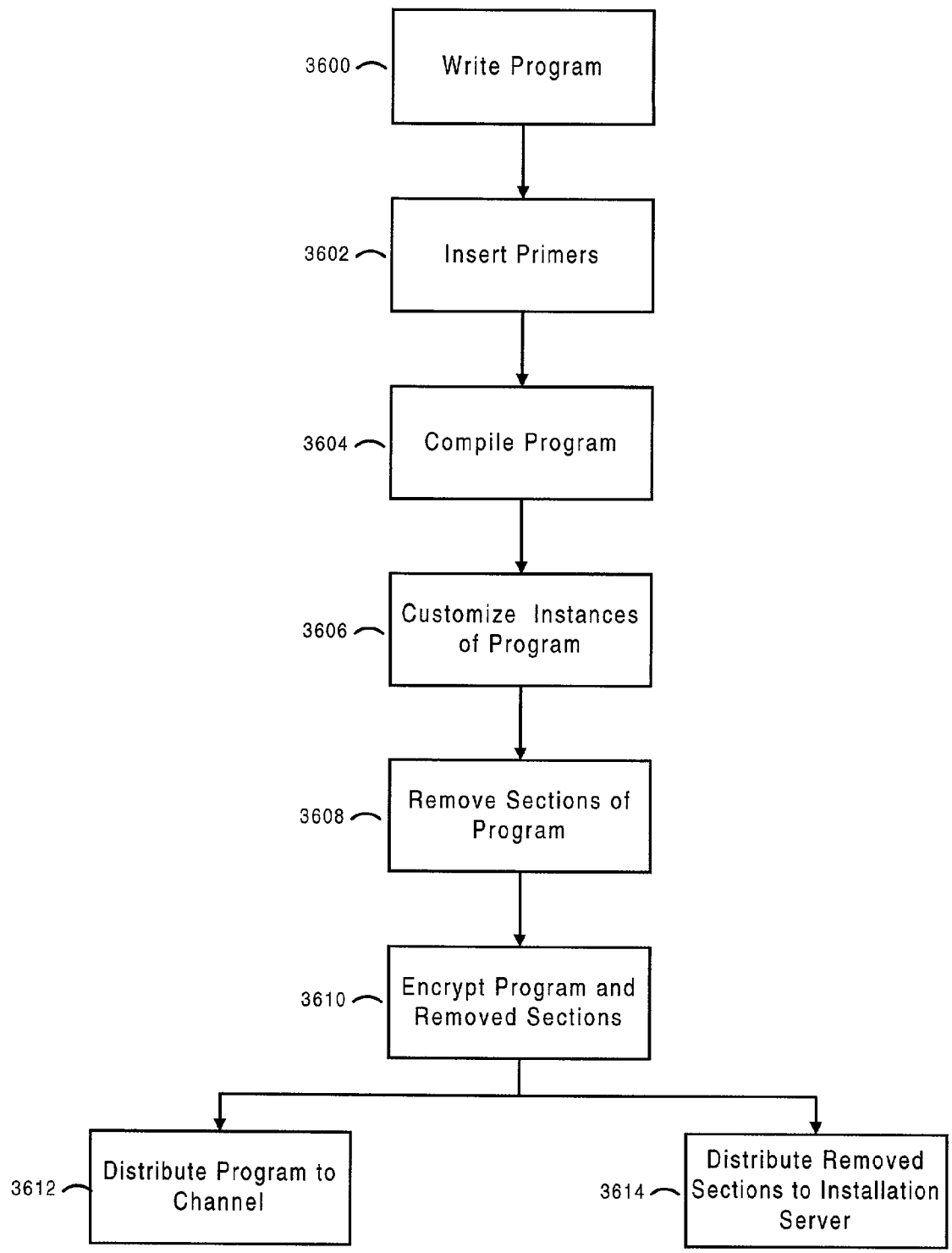
FIG. 36 is a flow chart of a method for applying one or more watermarks to a program in accordance with an embodiment of the present invention.

This technique is illustrated in FIGS. 35 and 36. As shown in FIG. 36, after a program has been written (3600), the program's code is primed or marked (3602). Priming can be done at the source code level, although it should be appreciated that priming could alternatively (or additionally) occur at the object or binary code level. In one embodiment, multiple primers are inserted into the code, each primer being chosen from a predefined set of distinct types (e.g., 10 distinct types). For example, in one embodiment 500 primers of 40 bytes each (on average) are inserted into a 1 megabyte program. It will be recognized that the optimum placement of the primers within the program, as well as the optimum number (and size) of primers to use, will depend on the particular application.

After compilation (3604), the program executable can be customized (e.g., obfuscated), taking care to preserve the primers (3606). To facilitate this process, the positions of the primers can be made known to the customization tool, so that it can avoid altering them. This can be accomplished in a variety of ways. For example, the customization tool can access the primer reading tool directly (e.g., through DLL calls), and/or the primers can be marked with signal flags indicating that a particular section of code is not to be customized. In another embodiment, a primer reading tool is used to generate a file that provides the locations of the primers, and this file is provided to the customization tool. In yet another embodiment some or all of the primers are simply inserted after customization.

After customization, in one embodiment each instance of the program is given credentials. This can be accomplished, for example, by computing one or more hash values (using a suitable hashing algorithm, such as MD5 or SHA-1) for one or more program locations, preferably not including the primed regions. As shown in FIG. 35, after the credentialing step, each customized, primed instance of the program can be split into a relatively large part 3504 consisting of most of the executable program, and a smaller part 3506 containing watermarks or primed locations and/or other security-related code (and an indication of where smaller part 3506 belongs in code 3504) (3608). Code 3504 can contain length preserving holes where the remaining code (e.g., code 3506) would go. In one illustrative embodiment most or all of these holes are filled with NOPs to add stealth. In another embodiment the holes are compressed out, thus effectively disabling code 3504 due to addressing misalignment.

Code 3504 may be encrypted, packaged, and sent to customers 3512, 3514 and/or distribution centers 3508 (3610, 3612). The appropriate patches 3506 for each customized instance of the program 3504 are stored at a server 3510 in a list 3516 (3614). Thus, when a customer installs program 3504, the appropriate patches 3506 can be supplied by server 3510. For example, as shown in FIG. 35, at installation a customer 3512 contacts server 3510 via a network 3518 such as the Internet. Customer 3512 supplies information regarding the identity (e.g., credentials) of the customized version of the program that the customer received in the installation package. Server 3510 retrieves the corresponding patches 3506, watermarks them (e.g., if they were not already watermarked), compresses and encrypts them (using, e.g., DES or any other suitable encryption technique), and transmits them to the customer. The customer's system decrypts and decompresses the program and the patches and merges them to form a functioning watermarked program. In a preferred embodiment, the decryption and decompression occur incrementally and concurrently.

In another embodiment, the patches 3506 can be stored on, e.g., the disk on which program 3504 is stored, and the installation program can apply the appropriate patches. It will be recognized that if patch files are distributed from a server 3510, there will be a tradeoff between security and ease of installation. On the one hand, patch files should be relatively small in order to limit the communication overhead of transmitting them from the server to the client. On the other hand, better security can generally be achieved if the patch files include decoy blocks that contain no watermarks, or if the patch files include random intervals around the watermarks to mask the watermarks' exact locations.

4.2. Layered Watermarks

Figure 37A:
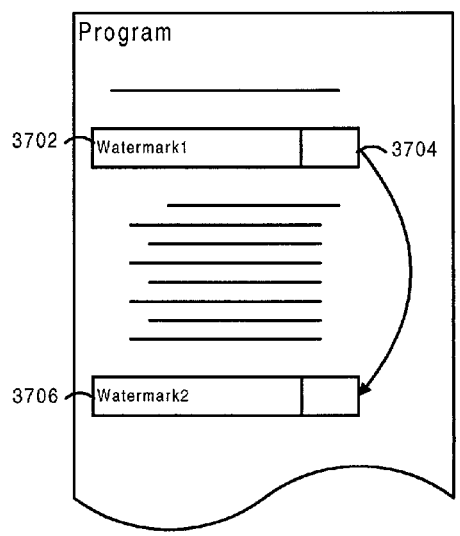
FIGS. 37A and 37B illustrate a watermark application technique in accordance with an embodiment of the present invention.

In one embodiment, multiple watermarks are applied to each instance of the program. As illustrated in FIG. 37A, the container for watermark 3702 includes a pointer or link 3704 operable to indicate the location of another watermark 3706 or the location at which another watermark can be stored.

One or more unique watermarks can be applied to a program at different stages of the development and distribution process. For example, the software developer might add one or more watermarks to a particular version of the program, these watermarks being the same across all instances of that version of the program. A second watermark can be inserted, for example, when the user installs the program, and can be chosen to be effectively unique for each instance of the program (or for each instance of that version of the program). The watermarks can be located using the version-specific watermark and following a pointer, such as pointer 3704, to the location of the instance-specific watermark. By connecting the watermarks in this manner, the instance specific mark can be relatively small, since it need not contain self-identifying information.

Although an attacker might be able to detect the instance-specific watermark using a collusive attack, such an attack would typically be unsuccessful in detecting the version-specific watermark since it would be the same across all instances of that version of the program and would not stand out upon comparison of two program instances. Accordingly, this technique provides resistance to collusive attacks, and also provides a level of redundancy that is effective in resisting cropping and patching attacks.

Figure 37B:
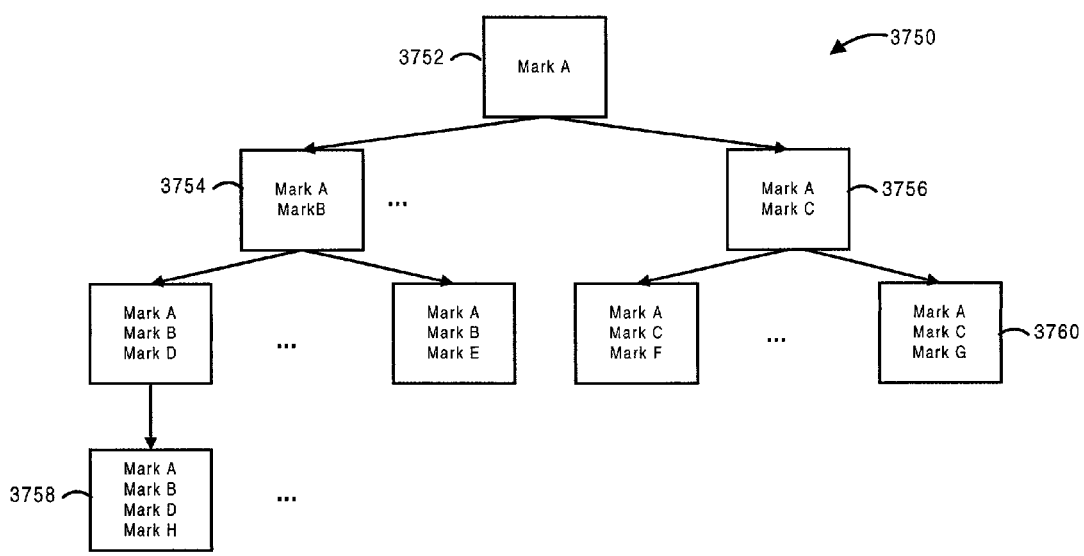

It will be appreciated that this technique can be readily used to create any suitable number of watermark layers. For example, a program might contain three or more layers of watermarks, the watermarks linked together with pointers in the manner shown in FIG. 37A. From a system perspective, the layers of watermarks create a tree structure, the leaves identifying each instance of the program in an effectively unique fashion. This is illustrated in FIG. 37B, in which node 3752 of tree 3750 represents the original program, nodes 3754 and 3756 represent different versions of the program, nodes 3758 and 3760 represent different instances of those versions, and so forth. Thus it can be seen that each instance of the program can contain a plurality of watermarks—the layers providing collusion resistance, and the multiplicity of watermarks providing resistance to cropping and patching attacks. If an attacker is able to remove one watermark, other watermarks will remain to identify the program.

4.3. A Robust Watermark

To enhance a watermark's robustness, it can be incorporated into actual calculations or operations performed by the program. If an attacker attempts to remove such a watermark, the program may fail to operate correctly. To facilitate adding the watermark to calculations or other program operations, redundancy can be added to the program and/or pre-existing redundancy can be exploited. For example, there are typically a variety of ways to perform any given operation, and thus information can effectively be stored in the choice of which technique is used to perform the operation. Additional examples of redundancy include the jump sequences discussed above with reference to FIGS. 22A through 22D, the manipulation of condition codes at the ends of basic blocks (e.g., using the parity of such variations to encode a watermark), and so forth.

4.4. Decoys

Relatively weak obfuscation, tamper resistance, and/or watermarking techniques can be used to decoy the operation of more effective techniques. For example, decoys can be used to lure the attacker into making program modifications that will break the program or trigger detection of the attacker's activity. For example, having detected a weak watermark or obfuscation technique, the attacker might press forward with eradicating or counteracting it, and not realize that in so doing, he has triggered other, more subtle defensive measures. For example, when removing a weak watermark, the attacker could be lured into making changes to the program binary that would cause the program to fail built-in self-checks, crash or yield incorrect results, and/or trigger communication with an external detection agent.

Although the foregoing invention has been described in some detail for purposes of clarity of understanding, it will be apparent that certain changes and modifications may be practiced within the scope of the appended claims. It should also be noted that there are many alternative ways of implementing the systems and the methods of the present invention. Accordingly, the present embodiments are to be considered as illustrative and not restrictive, and the invention is not to be limited to the details given herein, but may be modified within the scope and equivalents of the appended claims.

What is claimed is:

1. A method for obfuscating a computer program, the computer program being designed to carry out one or more specified tasks, the method including:

obtaining an object code representation of the computer program;

searching the object code representation of the computer program for first and second object code sequences, the first and second object code sequences being similar, at least in part; and modifying the object code representation of the computer program without materially affecting completion of the one or more specified tasks, the modification comprising:

inserting a third object code sequence into the object code representation of the computer program such that the third object code sequence is executed before the second object code sequence, the third object code sequence comprising one or more instructions, and being operable to pass control to an instruction that logically begins the first object code sequence;

executing instructions in the first object code sequence in place of instructions in the second object code sequence;

inserting a branch at the end of the first object code sequence, the branch being operable to:

pass control, upon detection of a first predefined condition, to an instruction that logically followed the first object code sequence in the unmodified object code representation of the computer program, and to pass control, upon detection of a second predefined condition, to an instruction that logically followed the second object code sequence in the unmodified object code representation of the computer program.

2. A method as in claim 1, further including:

removing some or all instructions contained in the second object code sequence from the object code representation of the computer program.

3. A method as in claim 1, wherein the first and second object code sequences do not correspond directly to an integer number of source code statements in the source code representation of the computer program.

4. A method as in claim 3, in which the first and second object code sequences each include an object code representation of a first sub-part of a source code programming statement, but do not include an object code representation of at least a second sub-part of the source code programming statement.

5. A method as in claim 1, further including:

searching the object code representation of the computer program for a fourth object code sequence, the fourth object code sequence being similar, at least in part, to the first and second object code sequences;

inserting a fifth object code sequence into the object code representation of the computer program, such that the fifth object code sequence is executed in place of the fourth object code sequence, the fifth object code sequence comprising one or more instructions, and being operable to pass control to an instruction that logically begins the first object code sequence;

wherein the branch at the end of the first object code sequence is further operable to pass control, upon detection of a third predefined condition, to an instruction that logically followed the fourth object code sequence in the unmodified object code representation of the computer program.

6. A method as in claim 1, in which modifying the object code representation of the computer program further includes:

duplicating a basic block in the object code representation of the computer program; and inserting a branch into the object code representation of the computer program, the branch being operable to pass control to one duplicate of the basic block upon detection of a fourth predefined condition, and to pass control to another duplicate of the basic block upon detection of a fifth predefined condition.

7. A method as in claim 6, further including obfuscating the similarities between duplicates of the basic block.

8. A method as in claim 1, in which the third object code sequence further comprises one or more instructions for overwriting at least a portion of the first object code sequence.

9. A method as in claim 8, in which one or more programming instructions for passing control to the first object code sequence, and the one or more object code instructions for overwriting at least a portion of the first object code sequence, are separated in the object code representation of the computer program by at least one intervening instruction.

10. A method for obfuscating a computer program, the computer program being designed to carry out one or more specified tasks, the method including:
   searching the computer program for first and second code sequences, the first and second code sequences being similar, at least in part;
   inserting a third code sequence into the computer program, the third code sequence including one or more instructions for overwriting at least a portion of the second code sequence, and for passing control to an instruction that logically begins the first code sequence;
   executing instructions in the first code sequence in place of instructions in the second code sequence;
   inserting a branch at the end of the first code sequence, the branch being operable to:
      pass control, upon detection of a first predefined condition, to an instruction following the first code sequence, and to
      pass control, upon detection of a second predefined condition, to an instruction following the third code sequence;
   whereby the third code sequence is executed at the location in the computer program of the second code sequence without materially affecting completion of the one or more specified tasks.

11. A method as in claim 10, in which the computer program is written in a high-level language selected from the group of programming languages consisting of: C, C++, Visual Basic, Basic, FORTRAN, Cobol, Java, Modula, Pascal, Perl, and Lisp.

12. A method as in claim 10, in which the first predefined condition comprises a predetermined variable having a first value, and the second predefined condition comprises the predetermined variable having a second value.

13. A method as in claim 10, further including:
   removing some or all instructions contained in the second code sequence from the computer program.

14. A method for obfuscating a computer program, the method including:
   selecting a sequence of programming statements, the sequence of programming statements having a predefined order;
   incorporating at least a first concurrent process and a second concurrent process into the computer program;
   incorporating at least a first programming statement from the sequence into the first concurrent process;
   incorporating at least a second programming statement from the sequence into the second concurrent process;
   introducing a plurality of guard variables to control the execution of the at least first concurrent process and the second concurrent process;
   controlling execution of the first concurrent process and the second concurrent process using one or more conditional statements containing one or more of the plurality of guard variables, and one or more conditional statements containing obfuscation guard variables such that the sequence of programming statements is executed in the predefined order as a function, at least in part, of two or more of the plurality of guard variables; and
   assigning an error value to at least one of the plurality of guard variables without causing incorrect execution of the sequence of programming statements.

15. A method as in claim 14, in which execution of the first programming statement depends on a first predefined condition, and in which execution of the second programming statement depends on a second predefined condition.

16. A method as in claim 15, in which the first concurrent process includes one or more programming statements that are operable to cause the second predefined condition to be satisfied following execution of the first programming statement.

17. A method as in claim 14, in which the first and second concurrent processes comprise first and second sequences of statements in a loop, respectively, and in which execution of the first sequence of statements is dependent on a first predefined condition, and in which execution of the second sequence of statements is dependent on a second predefined condition.

18. A method as in claim 14, in which the first and second concurrent processes comprise first and second threads.

19. A method as in claim 15, in which the first predefined condition comprises a predetermined variable having a first value, and the second predefined condition comprises the predetermined variable having a second value.

20. A method as in claim 19, in which the first value is any one of a first range of predefined values, and the second value is any one of a second range of predefined values.

21. A method as in claim 16, further comprising:
   incorporating at least a third concurrent process into the computer program;
   incorporating at least a third programming statement from the sequence into the third concurrent process, wherein execution of the third programming statement depends on a third predefined condition;
   incorporating one or more programming statements into the second concurrent process, the one or more programming statements being operable to cause the third predefined condition to be satisfied following execution of the second programming statement;
   whereby execution of the first, second, and third concurrent processes is controlled by one or more variables such that the sequence of programming statements is executed in the predefined order.

22. A method as in claim 19, in which the predetermined variable is an obfuscation variable.

23. A method as in claim 19, in which the predetermined variable is a genuine program variable that has been determined to be available.

24. A method as in claim 14, further comprising:
   incorporating a plurality of obfuscation statements and obfuscation variables into the first and second concurrent processes.

25. A method as in claim 14, further comprising:
   incorporating a third concurrent process into the computer program;

incorporating a plurality of obfuscation statements and obfuscation variables into the third concurrent process.

26. A method as in claim 15, in which the first predefined condition comprises a first variable having a first value, and in which the second predefined condition comprises a second variable having a second value.

27. A method as in claim 26, in which the first concurrent process includes one or more programming statements that are operable to detect the first predefined condition, and, if the first predefined condition is detected, to:

(a) assign a third value to the first variable,
(b) execute the first programming statement, and
(c) assign the second value to the second variable.

28. A method as in claim 15, in which the first predefined condition comprises a set of one or more variables having values that satisfy a first predefined relationship, and the second predefined condition comprises the set of one or more variables having values that satisfy a second predefined relationship.

29. A method as in claim 21, in which (a) the first predefined condition comprises a set of one or more variables having values that satisfy a first predefined relationship, (b) the second predefined condition comprises the set of one or more variables having values that satisfy a second predefined relationship, (c) the third predefined condition comprises the set of one or more variables having values that satisfy a third predefined relationship.

* * * * *